(12) United States Patent
Imamura et al.

(10) Patent No.: US 7,455,320 B2
(45) Date of Patent: Nov. 25, 2008

(54) SHOCK ABSORBING STEERING APPARATUS

(75) Inventors: Kenji Imamura, Toyota (JP); Shigeru Hoshino, Toyota (JP); Kiminori Yoshino, Toyota (JP); Hideo Kondo, Aichi-gun (JP); Junichi Nakano, Toyota (JP); Hiroaki Date, Komaki (JP); Hitoshi Nakanishi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 455 days.

(21) Appl. No.: 10/554,024

(22) PCT Filed: Apr. 28, 2004

(86) PCT No.: PCT/JP2004/006231

§ 371 (c)(1),
(2), (4) Date: Oct. 21, 2005

(87) PCT Pub. No.: WO2004/101345

PCT Pub. Date: Nov. 25, 2004

(65) Prior Publication Data

US 2006/0181070 A1  Aug. 17, 2006

(30) Foreign Application Priority Data

| May 14, 2003 | (JP) | ............................. 2003-136380 |
| Jul. 25, 2003 | (JP) | ............................. 2003-279544 |
| Aug. 5, 2003 | (JP) | ............................. 2003-286678 |
| Aug. 8, 2003 | (JP) | ............................. 2003-290149 |
| Sep. 2, 2003 | (JP) | ............................. 2003-310419 |
| Feb. 25, 2004 | (JP) | ............................. 2004-049733 |

(51) Int. Cl.
*B62D 1/00* (2006.01)

(52) U.S. Cl. ..................................... 280/777

(58) Field of Classification Search .................. 280/777
See application file for complete search history.

(56) References Cited

U.S. PATENT DOCUMENTS 4,838,576 A * 6/1989 Hamasaki et al. ........... 280/777

(Continued)

FOREIGN PATENT DOCUMENTS

DE          100 64 250 A1     9/2001

(Continued)

*Primary Examiner*—Kevin Hurley
*Assistant Examiner*—Nicole Verley
(74) *Attorney, Agent, or Firm*—Oliff & Berridge, PLC

(57) ABSTRACT

A shock absorbing steering apparatus for use in a vehicle, including a steering column to be fixed to a portion of a body of the vehicle such that the steering column is releasable from the body of the vehicle and movable in a forward direction of the vehicle in the event of a secondary collision of an occupant of the vehicle upon a collision of the vehicle, and wherein one of the steering column and the portion of the vehicle body includes a mounting portion, while the other of the steering column and the portion of the vehicle body includes a holding portion. The steering apparatus further includes an impact energy absorbing member to be mounted on the mounting portion. The impact energy absorbing portion includes an engaging portion engageable with the holding portion and is deformable as the steering column is moved in the forward direction while the engaging portion is held in engagement with the holding portion, whereby the impact energy absorbing member absorbs an impact energy generated by the secondary collision.

38 Claims, 52 Drawing Sheets

U.S. PATENT DOCUMENTS

| | | |
|---|---|---|
| 4,901,592 A | 2/1990 | Ito et al. |
| 5,209,135 A * | 5/1993 | Ichikawa ............... 74/492 |
| 5,286,056 A * | 2/1994 | Speich ............... 280/777 |
| 5,378,021 A | 1/1995 | Yamaguchi et al. |
| 5,547,221 A | 8/1996 | Tomaru et al. |
| 5,673,937 A * | 10/1997 | Fevre et al. ............ 280/777 |
| 5,715,730 A | 2/1998 | Riefe et al. |
| 5,788,278 A | 8/1998 | Thomas et al. |
| 5,961,146 A | 10/1999 | Matsumoto et al. |
| 6,224,104 B1 | 5/2001 | Hibino |
| 6,283,508 B1 * | 9/2001 | Nouwynck et al. ...... 280/753 |
| 6,454,302 B1 | 9/2002 | Li et al. |
| 6,655,716 B2 * | 12/2003 | Riefe ............... 280/777 |
| 6,761,376 B2 * | 7/2004 | Riefe et al. ............ 280/777 |
| 6,764,098 B2 * | 7/2004 | Matsumoto et al. ...... 280/777 |
| 6,942,250 B2 * | 9/2005 | Dubay et al. ............ 280/777 |
| 2002/0167157 A1 | 11/2002 | Matsumoto et al. |

FOREIGN PATENT DOCUMENTS

| | | |
|---|---|---|
| EP | 0 474 400 A2 | 3/1992 |
| EP | 0 955 225 A2 | 11/1999 |
| EP | 1 247 721 A2 | 10/2002 |
| JP | A 55-068471 | 5/1980 |
| JP | U-2-123472 | 10/1990 |
| JP | U 03-060155 | 6/1991 |
| JP | U-03-060156 | 6/1991 |
| JP | U-3-63463 | 6/1991 |
| JP | A 04-230470 | 8/1992 |
| JP | U-06-079690 | 11/1994 |
| JP | Y2-06-045415 | 11/1994 |
| JP | A-07-186974 | 7/1995 |
| JP | A 09-123925 | 5/1997 |
| JP | A 09-272448 | 10/1997 |
| JP | A-10-045004 | 2/1998 |
| JP | A 11-165643 | 6/1999 |
| JP | A-2000-16307 | 1/2000 |
| JP | A-2001-114113 | 4/2001 |
| JP | A-2002-137743 | 5/2002 |
| JP | A-2002-362378 | 12/2002 |
| JP | A-2002-362381 | 12/2002 |
| JP | A 2003-148539 | 5/2003 |
| JP | A-2003-165448 | 6/2003 |
| JP | A 2005-59668 | 3/2005 |
| WO | WO 03/035449 A2 | 5/2003 |

* cited by examiner

FIG.22
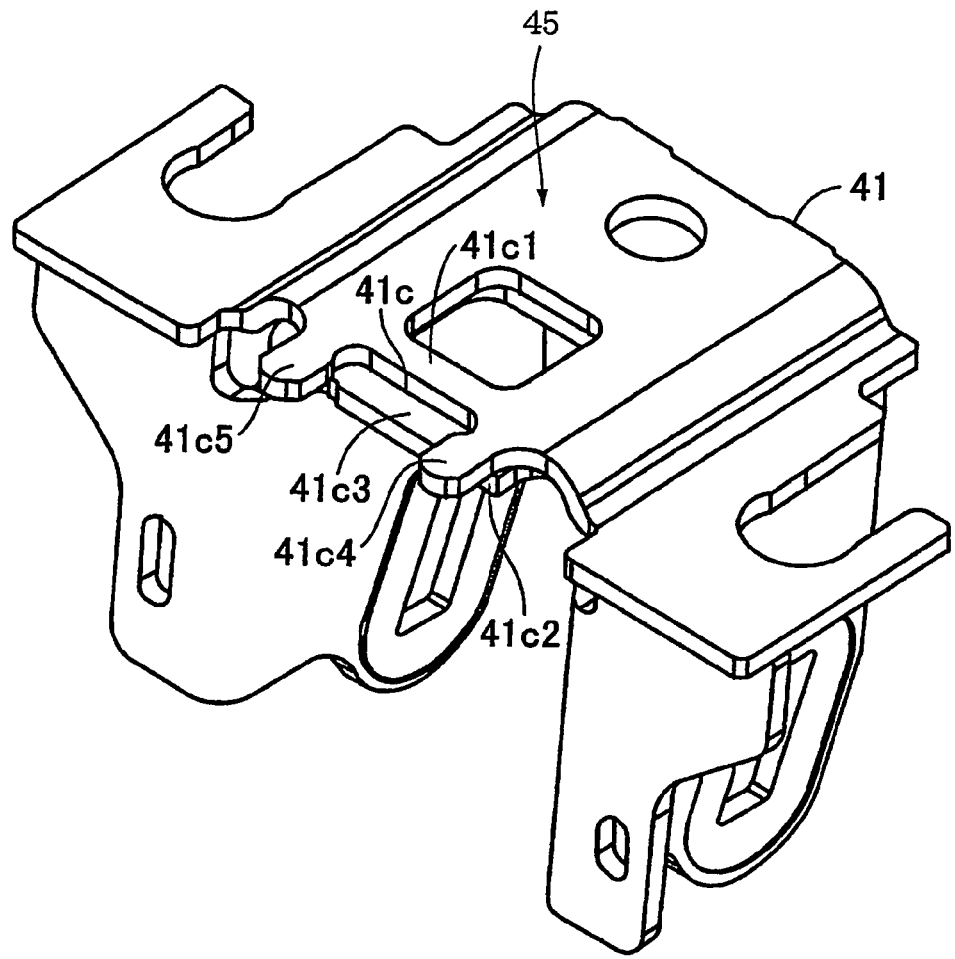
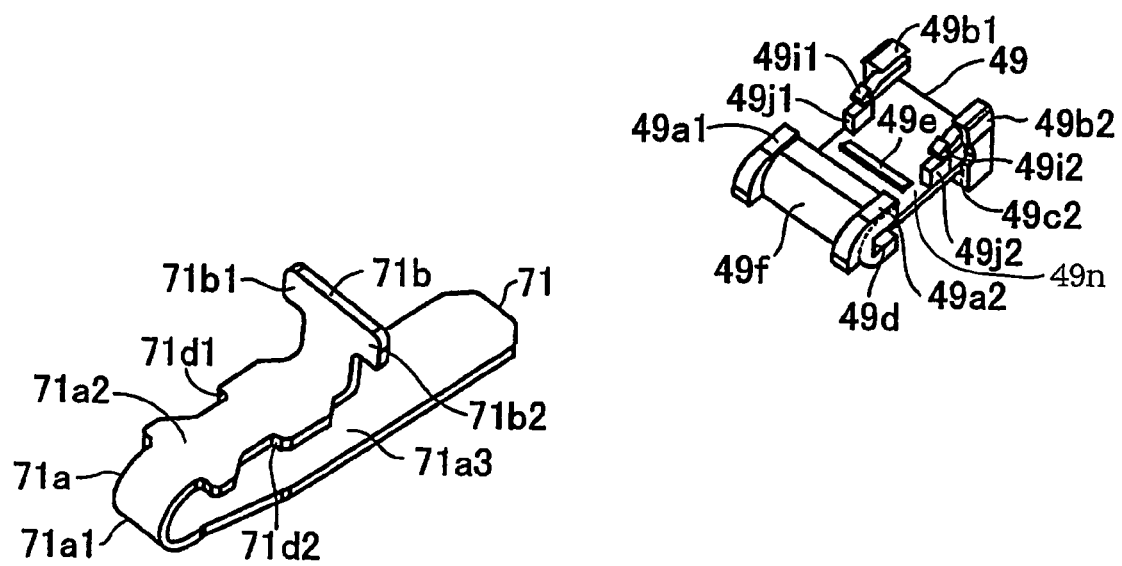

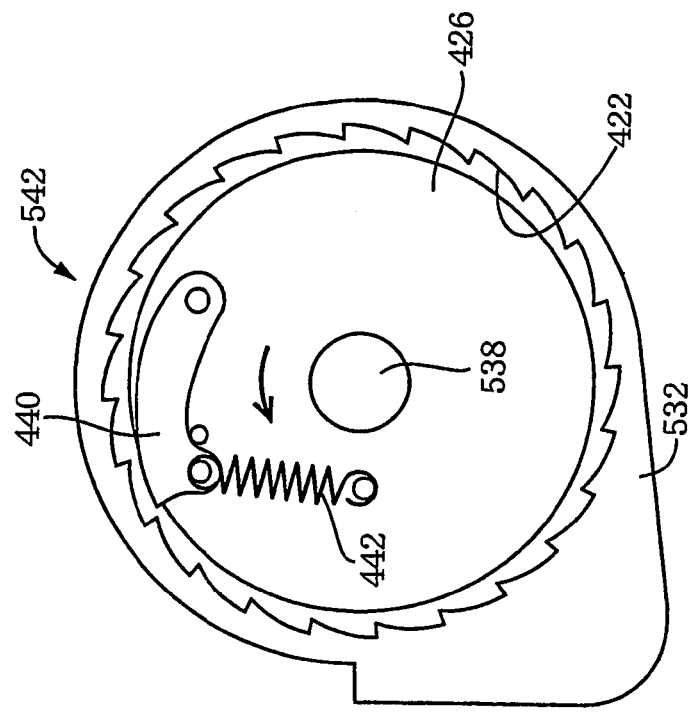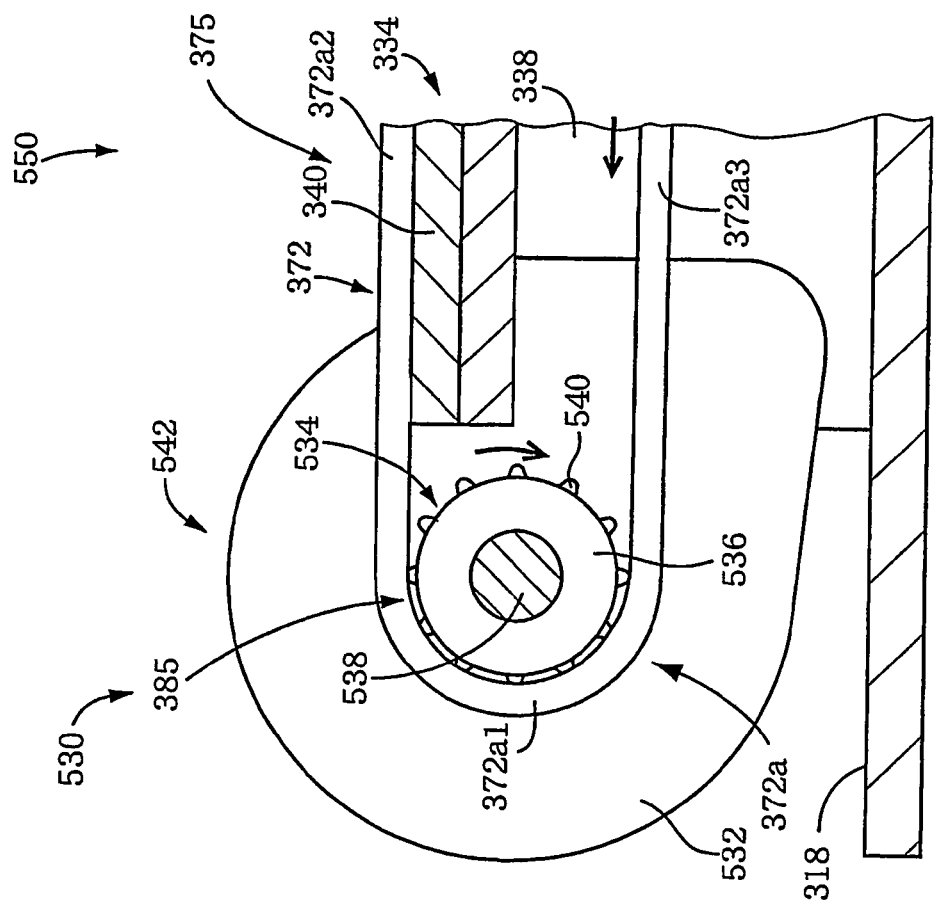
FIG.75B
FIG.75A

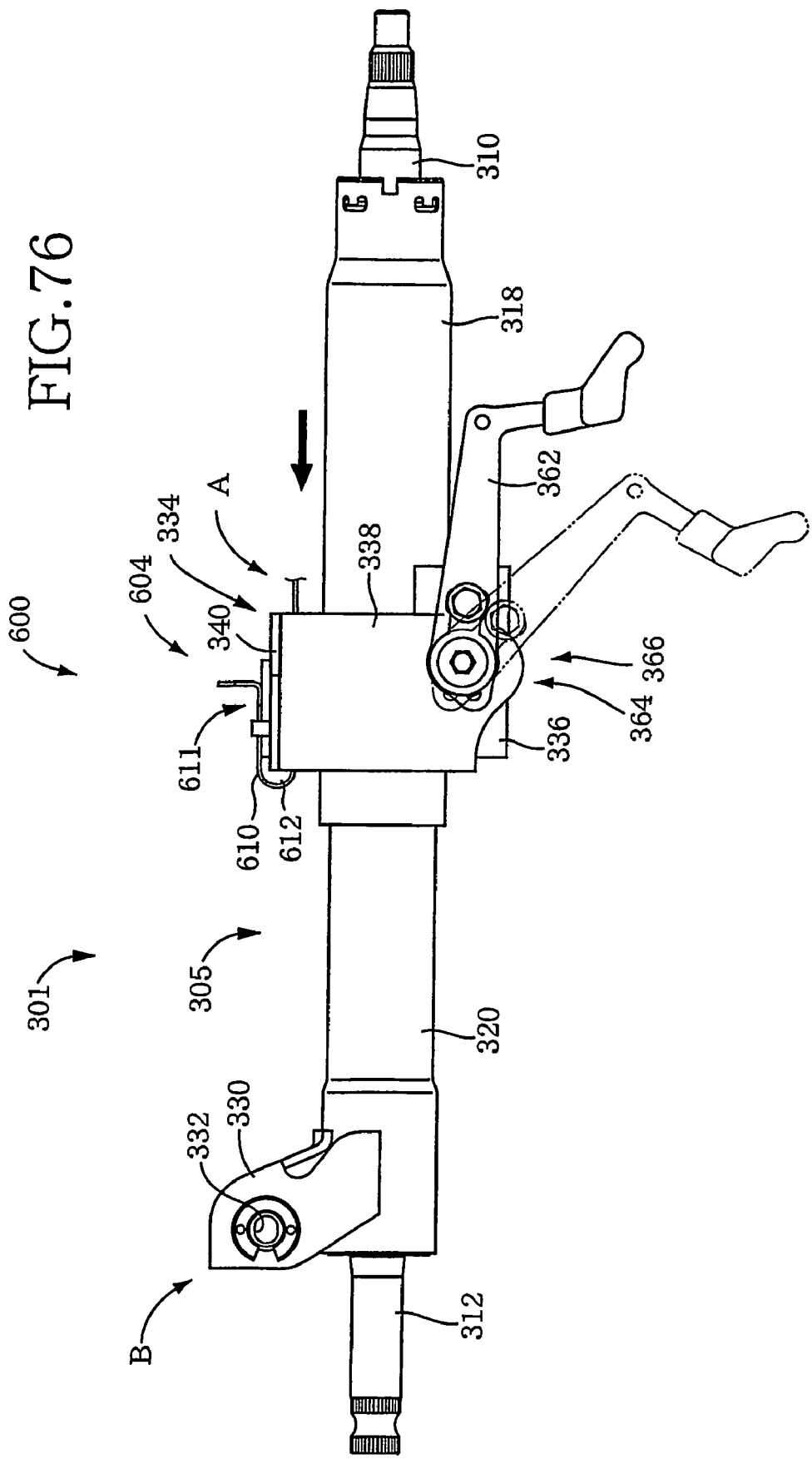

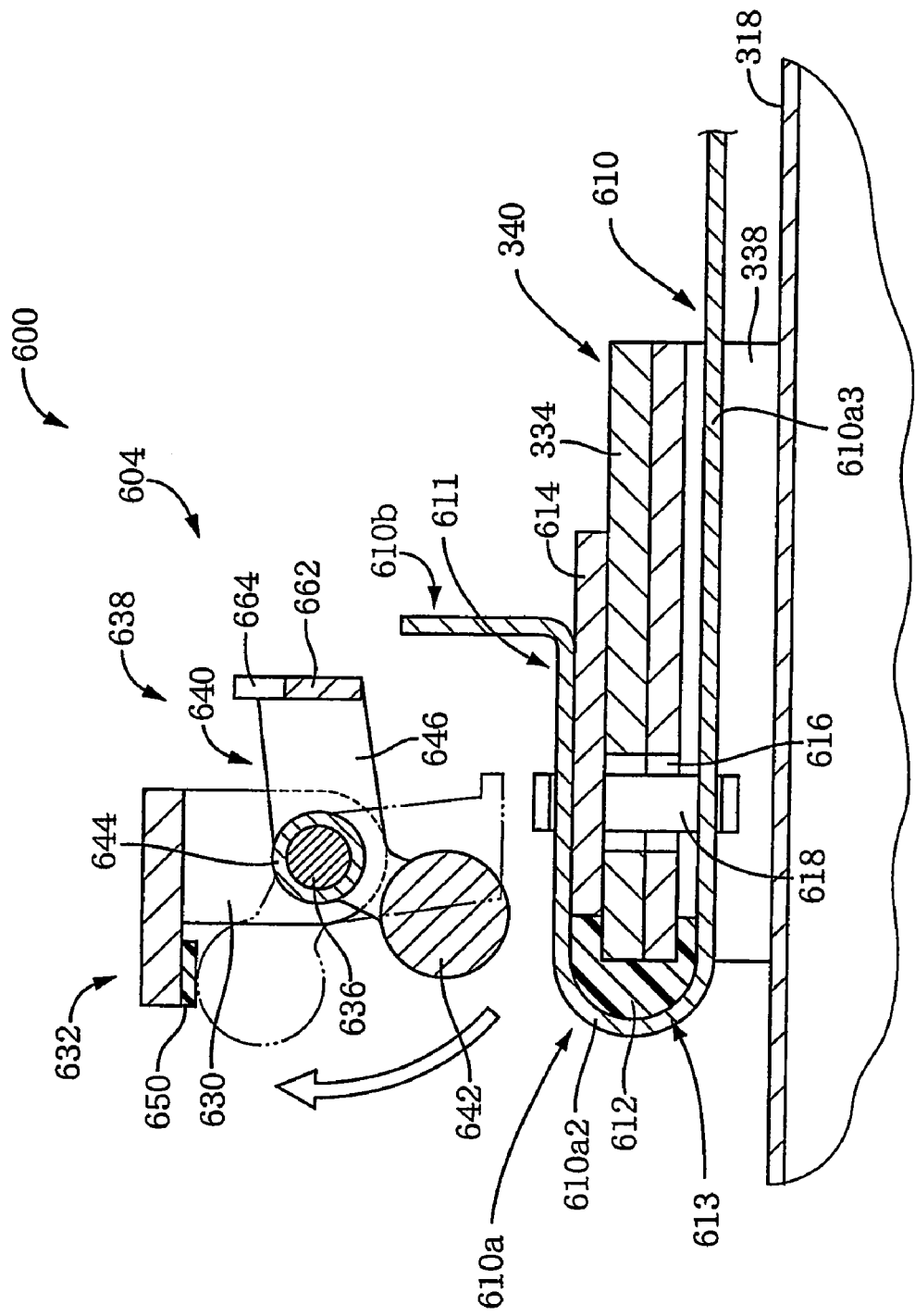

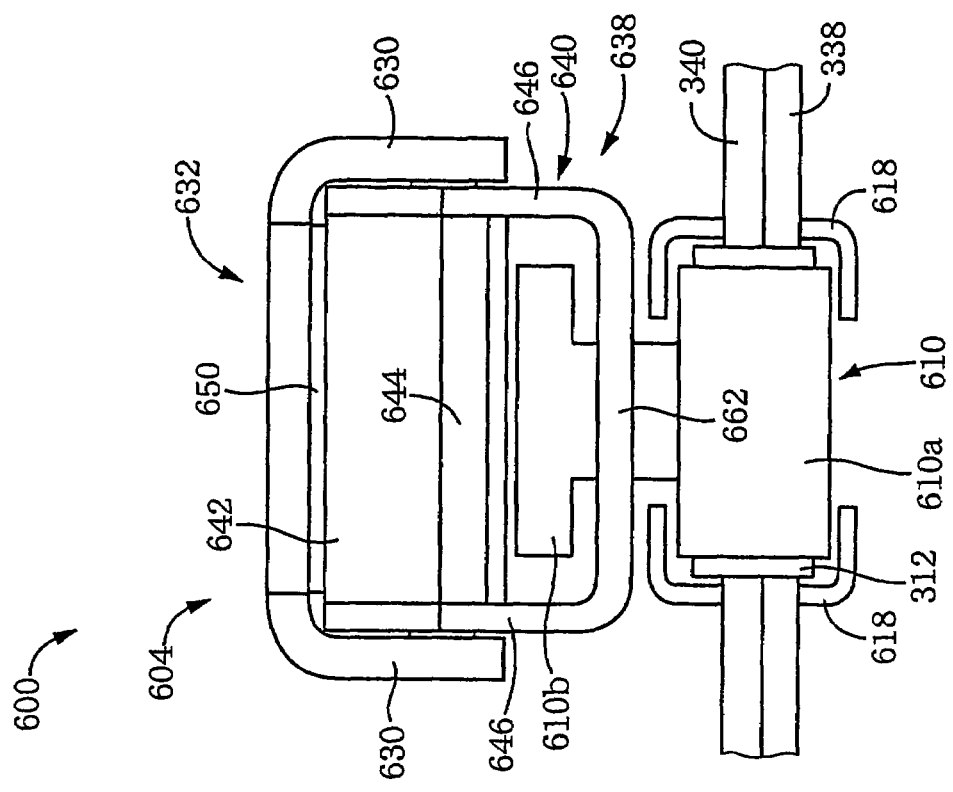
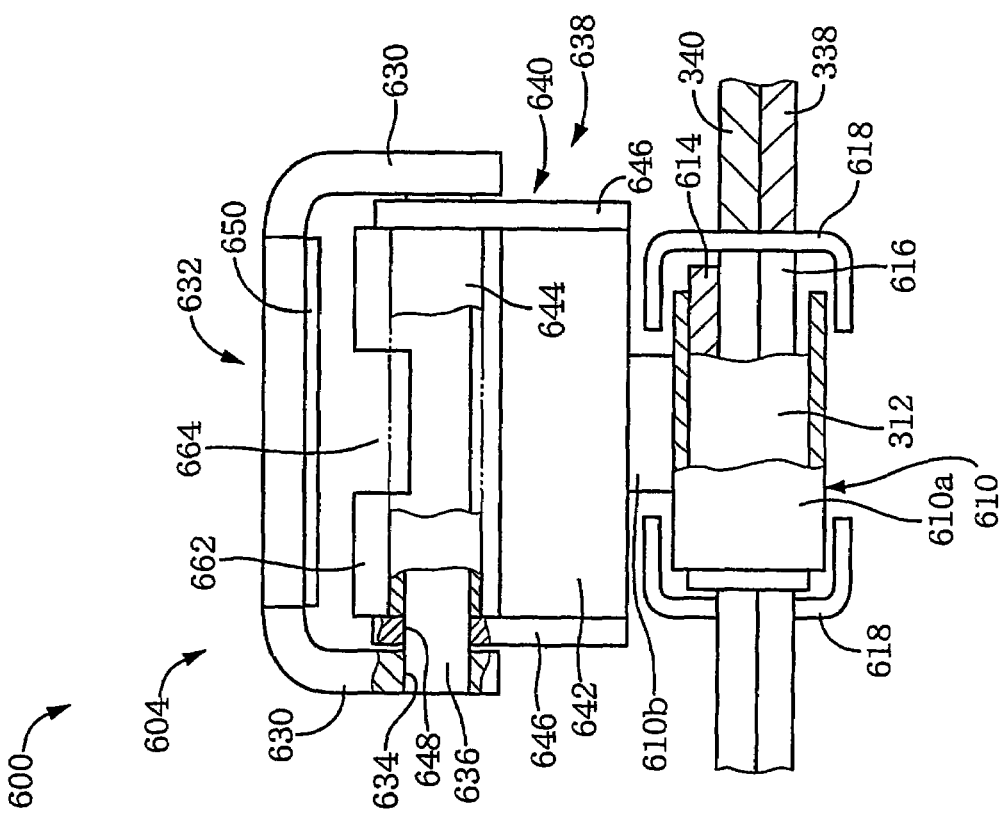

SHOCK ABSORBING STEERING APPARATUS

TECHNICAL FIELD

The present invention relates to a shock absorbing steering apparatus for use in a vehicle, which includes a steering column as a major element and which is provided with an impact energy absorbing member arranged to absorb an impact energy generated by a secondary collision of an occupant (operator or driver) of the vehicle, upon a collision of the vehicle.

BACKGROUND ART

The steering apparatus of this type is arranged such that in the event of a secondary collision of the vehicle occupant or operator, for example, with the steering wheel attached to the steering column, the steering column is releasable from the body of the vehicle, and axially movable in the forward direction of the vehicle, while a force of resistance to this movement of the steering column (namely, an impact energy absorbing load) is generated. That is, an impact energy absorbing member is provided to absorb an impact energy generated by the secondary collision. Described more specifically, the impact energy absorbing member is arranged, for example, to deform as the steering column is moved in the forward direction of the vehicle, so that a force which causes the deformation of the impact energy absorbing member is generated as the impact energy absorbing load. JP-U-6-79690 and JP-Y2-6-45415 disclose examples of the steering apparatus of the type described above.

The two examples of the steering apparatus disclosed in the above-identified publications use an elongate metallic plate or strip called an energy absorbing plate (impact absorbing plate), as the impact energy absorbing member. This energy absorbing plate is interposed between the steering column and a portion of the vehicle body. Described in greater detail, the steering apparatus disclosed in JP-U-6-79690 (herein after referred to as "first conventional apparatus) is provided with a column holder structure (referred to as "column bracket" in the publication) arranged to hold a column body, which is a major portion of the steering column. The energy absorbing plate has an intermediate portion in the form of a substantially U-shaped energy absorbing curved portion, which is simply accommodated in a space formed between the column body and the column holder structure. Further, the energy absorbing plate has one end portion welded or otherwise fixed to an upper portion of the outer circumferential surface of the column body. In the steering apparatus disclosed in JP-Y2-6-45415 (herein after referred to as "second conventional apparatus), on the other hand, one end portion of the energy absorbing plate is fastened to a portion of the vehicle body.

DISCLOSURE OF THE INVENTION

In the first conventional apparatus, the energy absorbing plate is required to be securely welded or otherwise fixed to the upper portion of the outer circumferential surface of the steering column, more precisely, of the column body. This requirement reduces ease of assembling of the steering apparatus. In the second conventional apparatus, the energy absorbing plate is required to be fastened to the vehicle body while the steering column is fixed to the vehicle body. This requirement increases complexity of the procedure to assemble the steering apparatus with respect to the vehicle body. While the first and second conventional apparatuses described above suffer from those drawbacks, various other conventional steering apparatuses also suffer from specific drawbacks. In this respect, improvements to overcome the drawbacks of the conventional steering apparatuses are needed to provide an improved steering apparatus provided with an impact energy absorbing member.

It is therefore an object of the present invention to provide a steering apparatus which is improved in construction over the conventional apparatuses. This object may be achieved according to the principle of this invention, which provides a shock absorbing steering apparatus for use in a vehicle, comprising a steering column to be fixed to a portion of a body of the vehicle such that the steering column is releasable from the body of the vehicle and movable in a forward direction of the vehicle in the event of a secondary collision of an occupant of the vehicle, upon a collision of the vehicle, and wherein one of the steering column and the above-indicated portion of the body of the vehicle includes a mounting portion, while the other of the steering column and the above-indicated portion includes a holding portion. The shock absorbing steering apparatus further comprises an impact energy absorbing member which is to be mounted on the mounting portion and which includes an engaging portion that is engageable with the holding portion and deformable as the steering column is moved in the forward direction of the vehicle while the engaging portion is held in engagement with the holding portion, whereby the impact energy absorbing member absorbs an impact energy generated by the secondary collision.

In the shock absorbing steering apparatus of the present invention constructed as described above, the impact energy absorbing member is mounted on only one of the steering column and the relevant portion of the vehicle body, so that the steering apparatus can be easily assembled with respect to the vehicle body. Further, the impact energy absorbing member is not required to be welded or otherwise fixed to one of the steering column and the portion of the vehicle body, so that the impact energy absorbing member can be simply and economically held in position. In addition, the impact energy absorbing member is not required to be fastened to the other of the steering column and the portion of the vehicle body, so that steering column can be easily assembled with respect to the vehicle body. Thus, the present shock absorbing steering apparatus is improved in construction over the conventional counterparts.

It is noted that the shock absorbing steering apparatus described above is one fundamental form of the present invention, and that the present invention may be embodied in various other forms as discussed below under the heading "DETAILED DESCRIPTION OF THE INVENTION", which have respective specific features and advantages.

BRIEF DESCRIPTION OF THE DRAWINGS

FIG. 22 is a fragmentary exploded perspective view showing a shock absorbing steering apparatus constructed according to a fifth embodiment of the present invention;

FIGS. 75A and 75B are views showing a resistance generating device employed in a shock absorbing steering apparatus which is a modification of the fourteenth embodiment;

FIG. 76 is a side elevational view showing a shock absorbing steering apparatus constructed according to a fifteenth embodiment of the instant invention;

FIG. 81 is a cross sectional view for explaining an arrangement of the shock absorbing device shown in FIGS. 79A and 79B;

FIGS. 82A and 82B are front elevational views of the shock absorbing device shown in FIGS. 79A and 79B;

DETAILED DESCRIPTION OF THE INVENTION

Figure 1:
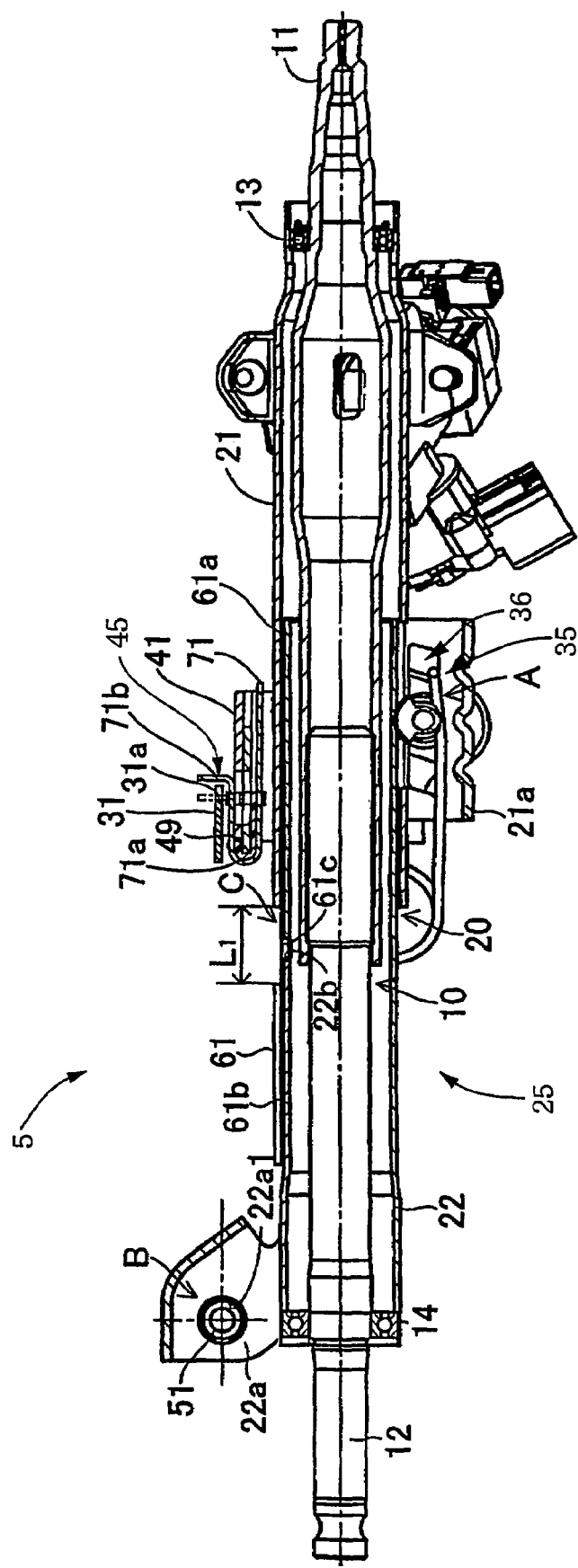
FIG. 1 is a side elevational view in axial cross section showing shock absorbing steering apparatus constructed according to a first embodiment of this invention.

There will be described in detail various forms of the steering apparatus, which are considered inventive according to the principle of this invention. Each of these forms of the invention is numbered like the appended claims and depends from the other form or forms, where appropriate, for easier understanding of the technical features disclosed in the present specification. It is to be understood that the present invention is not limited to the technical features or any combinations thereof which will be described. It is to be further understood that a plurality of elements or features included in any one of the following forms of the invention are not necessarily provided all together, and that the invention may be embodied with selected at least one of the elements or features described with respect to the same form. It is to be still further understood that Japanese Patent Application Nos. 2003-136380, 2003-286678, 2004-049733, 2003-310419, 2003-279544 and 2003-290149 on which the present application is based are incorporated hereinto by reference.

(1) A shock absorbing steering apparatus for use in a vehicle, comprising:

a steering column to be fixed to a portion of a body of the vehicle such that the steering column is releasable from the body of the vehicle and movable in a forward direction of the vehicle in the event of a secondary collision of an occupant of the vehicle upon a collision of the vehicle, one of the steering column and the above-indicated portion of the body of the vehicle including a mounting portion, and the other of the steering column and the above-indicated portion including a holding portion; and an impact energy absorbing member to be mounted on the mounting portion, the impact energy absorbing member including an engaging portion engageable with the holding portion and being deformable as the steering column is moved in the forward direction of the vehicle while the engaging portion is held in engagement with the holding portion, whereby the impact energy absorbing member absorbs an impact energy generated by the secondary collision.

The shock absorbing steering apparatus described above is one fundamental form of the present invention. As described above, the impact energy absorbing member provided in the present steering apparatus is mounted on only one of the steering column and the relevant portion of the vehicle body, so that the steering apparatus can be easily assembled with respect to the vehicle body. Further, the impact energy absorbing member is not required to be welded or otherwise fixed to one of the steering column and the portion of the vehicle body, so that the impact energy absorbing member can be simply and economically held in position. In addition, the impact energy absorbing member is not required to be fastened to the other of the steering column and the portion of the vehicle body, so that steering column can be easily assembled with respect to the vehicle body.

In the present application, the expression "the steering column is releasable from the body of the vehicle and movable in a forward direction of the vehicle" is not necessarily interpreted to mean that the steering column as a whole is releasable and movable from the vehicle body, but may be interpreted to mean that only a rear portion of a column body of the steering column is releasable and movable from the vehicle body, where the column body is contractible and extensible, for example, where the column body is provided with a telescopic mechanism. Namely, the steering column has a portion which is releasable and movable apart from the vehicle body. The expression "a forward direction of the vehicle" is not limited to a horizontal direction parallel to the longitudinal direction of the vehicle. Where the steering column is inclined relative to the vertical or horizontal direction, for example, the impact energy is absorbed during a movement of the steering column along its inclined axis. In this case, the "forward direction of the vehicle" means a direction which is parallel to the longitudinal direction of the vehicle and which is inclined with respect to the horizontal direction. Namely, the expression "forward direction of the vehicle" should be interpreted to comprehend this direction, and directions which more or less deviate from the horizontal direction parallel to the longitudinal direction of the vehicle. Similar interpretation applies to the expressions "rearward direction of the vehicle", "longitudinal direction of the vehicle", etc.

Further, the expression "impact energy absorbing member to be mounted on the mounting portion" is not interpreted to mean that the impact energy absorbing member is to be welded or otherwise fixed to the mounting portion", but is interpreted to mean that the impact energy absorbing member is to be simply assembled with respect to the mounting portion. The impact energy absorbing member is preferably arranged to be easily engageable with and disengageable from the mounting portion provided on one of the steering column and the relevant portion of the vehicle body; Since the impact energy absorbing member is deformable to absorb the impact energy generated by the secondary collision indicated above, this absorbing member is desirably mounted on the above-indicated one of the steering column and the portion of the vehicle body, such that the absorbing member is displaceable relative to the above-indicated one of the steering column and the relevant portion of the vehicle body, in order to absorb the impact energy. Further, the impact energy absorbing member is preferably provided with a fitting or positioning portion for holding it in position with respect to the mounting portion.

(2) The shock absorbing steering apparatus according to the above-described form (1), further comprising an engagement adjusting mechanism operable to permit or inhibit an engagement between the engaging portion of the impact energy absorbing member and the holding portion.

In the above-described form (2) of the shock absorbing steering apparatus, the impact energy absorbing member can be disabled to function even when the steering column is released from the vehicle body and moved in the forward direction relative to the vehicle body upon collision of the vehicle. Where the impact energy absorbing member includes a U-shaped portion as described below, the engagement adjusting mechanism may be arranged to inhibit the engagement of the engaging portion of the impact energy absorbing member with the holding portion, for thereby preventing deformation of the U-shaped portion of the impact energy absorbing member even when the steering column is moved in the forward direction relative to the vehicle body. Thus, the engagement adjusting mechanism makes it possible to permit or inhibit the functioning of the impact energy absorbing member to absorb the generated impact energy.

(3) The shock absorbing steering apparatus according to the above-described form (2), wherein the engagement adjusting mechanism includes an actuator operable between a first position for permitting the engagement between the engaging portion and the holding portion, and a second for inhibiting the engagement.

In the above-described form (3) of the shock absorbing steering apparatus wherein the impact energy absorbing member includes the actuator, the actuator may be arranged such that the holding portion provided on the steering column or on the portion of the vehicle body is moved by the actuator between an advanced position and a retracted position for permitting and inhibiting the engagement between the engaging portion and the holding portion.

(4) The shock absorbing steering apparatus according to the above-described form (3), wherein the engagement adjusting mechanism is arranged such that an impact energy absorbing load to be generated by deformation of the impact energy absorbing member does not act on the actuator when the engaging portion is brought into engagement with the holding portion.

In the above-described form (4) of the shock absorbing steering apparatus wherein the impact energy absorbing load does not act on the actuator of the engagement adjusting mechanism upon engagement of the engaging portion with the holding portion, the required size and cost of manufacture of the actuator can be reduced.

(5) The shock absorbing apparatus according to any one of the above-described forms (2)-(4), wherein the engagement adjusting mechanism is operable to permit or inhibit the engagement between the engaging portion and the holding portion, on the basis of an output of a sensor provided to detect a state of the vehicle or an occupant of the vehicle.

In the above-described form (5) of the steering apparatus, the engagement between the engaging portion and the holding portion is permitted or inhibited depending upon the detected state of the vehicle or vehicle occupant, it is possible to change the impact energy absorbing characteristic of the impact energy absorbing member. Where the sensor is provided to detect whether a seat belt is worn on the vehicle occupant, for example, the engagement adjusting mechanism may be arranged to permit the engagement between the engaging and holding portions when the output of the sensor indicates that the seat belt is not worn on the vehicle occupant. Where the sensor is provided to detect a running speed of the vehicle, for instance, the engagement adjusting mechanism may be arranged to permit the engagement when the detected running speed of the vehicle is higher than a predetermined upper limit.

(6) The shock absorbing steering apparatus according to the above-described form (2), wherein the engagement adjusting mechanism includes a mechanism operable to cause the holding portion to be displaced by an amount corresponding to a magnitude of an impact applied to the body of the vehicle upon the collision of the vehicle, and a mechanism operable to permit the engagement between the engaging portion and the holding portion when the amount of displacement of the holding portion is larger than a predetermined threshold.

In the above-described form (6) of the shock absorbing steering apparatus, the impact energy absorbing member is enabled to function to absorb the impact energy when the magnitude of the impact applied to the vehicle upon the vehicle collision has exceeded a predetermined threshold. The amount of the impact energy generated in the event of the secondary collision principally changes with the magnitude of the impact applied to the vehicle body upon the vehicle collision, so that the impact energy generated in the event of the secondary collision can be effectively and suitably absorbed by the impact energy absorbing member, depending upon the magnitude of the impact applied to the vehicle body upon the primary vehicle collision.

(7) The shock absorbing steering apparatus according to the above-described form (6), wherein the mechanism operable to cause the holding portion to be displaced by the amount corresponding to the magnitude of the impact is arranged to cause a displacement of the holding portion by utilizing an inertia mass of the holding portion.

In the above-described form (7) of the steering apparatus, the holding portion is displaced due to an inertial force acting thereon upon the vehicle collision, relative to the steering column or vehicle body on which the holding portion is provided, such that the amount of displacement of the holding portion corresponds to the magnitude of the impact applied to the vehicle body. In this arrangement of the engagement adjusting mechanism, the impact energy absorbing member is permitted or inhibited to function to absorb the impact energy, by purely mechanical means, without any electrical means, so that the steering apparatus can be simplified in overall arrangement The displacement of the holding portion may be a linear movement, a rotary movement, or a combination of linear and rotary movements. Although the engagement adjusting mechanism in this form of the invention may permit the holding portion to be displaced relative to the steering column or vehicle body, upon a normal operation of a braking system to brake the vehicle the engagement adjusting mechanism is preferably arranged to inhibit a substantial displacement of the holding portion upon the normal braking operation, but permit a substantial displacement of the holding portion only in the event of the vehicle collision.

(8) The shock absorbing steering apparatus according to any one of the above forms (1)-(7), wherein the impact energy absorbing member is arranged to be positioned relative to the mounting portion such that the engaging portion and the holding portion are spaced from each other by a predetermined free-running distance in the forward direction before the steering column is moved in the forward direction relative to the portion of the body of the vehicle.

In the above-described form (8) of the steering apparatus, the provision of the free-running distance or spacing between the engaging portion and the holding portion makes it possible to delay a moment of absorption of the impact energy by the impact energy absorbing member, with respect to a moment at which the steering column is released and moved from the vehicle body. Accordingly, an impact generated in the initial period of the secondary collision can be made smaller in the present arrangement, than in an arrangement in which the engaging portion is brought into engagement with the holding portion as soon as the movement of the steering column relative to the vehicle body is initiated. It is noted that the moment at which the impact energy is absorbed by the impact energy absorbing member can be suitably adjusted as needed by adjusting the free-running distance.

(9) The shock absorbing steering apparatus according to the above form (8), wherein one of the engaging portion and the holding portion includes a recessed part which has a recess engageable with the other of the engaging and holding portions and which cooperates with the other of the engaging and holding portions to define therebetween the predetermined free-running distance.

In the above-described form (9) of the steering apparatus, the recessed part functions as guiding means for guiding a relative movement of the engaging and holding portions until the relative movement is stopped at the end of the recess part. Thus, the recessed part assures high stability of holding of the engaging portion by the holding portion. Further, the above-indicated free-running distance is provided between or defined by the end of the recessed part and the above-indicated other of the engaging and holding portions. In the presence of the recessed part, the provision of the free-running distance does not require the engaging portion to be spaced a large distance apart from the end of the holding portion before the forward movement of the steering column.

(10) The shock absorbing steering apparatus according to any one of the above-described forms (1)-(9), further comprising an initial-load adjusting mechanism operable to reduce a rate of increase of an impact energy absorbing load to be generated by deformation of the impact energy absorbing member in an initial period of the absorption of the impact energy, the initial-load adjusting mechanism being provided at at least one position selected from among: a position between the impact energy absorbing member and the steering column; a position on the impact energy absorbing member; and a position between the impact energy absorbing member and the steering column.

In the above-described form (10) of the steering apparatus including the initial-load adjusting mechanism, the impact energy absorbing load is increased at a relatively low rate in an initial period of absorption of the impact energy by the impact energy absorbing member, that is, in an initial period of operation of the impact energy after the engagement of the engaging portion with the holding portion. Accordingly, the impact energy can be smoothly absorbed, without an abrupt increase of the impact energy absorbing load which would cause an accordingly large impact on the vehicle operator or occupant.

(11) The shock absorbing steering apparatus according to any one of the above-described forms (1)-(10), wherein the engaging portion of the impact energy absorbing member and the holding portion are engageable with each other so as to provisionally hold the steering column on the portion of the body of the vehicle through the impact energy absorbing member when the steering column is fixed to the portion of the body of the vehicle.

In the above-described form (11) of the steering apparatus, the steering column can be easily assembled with respect to the vehicle body.

(12) The shock absorbing steering apparatus according to any one of the above-described forms (1)-(11), wherein the impact energy absorbing member is a plate having an end portion formed as the engaging portion.

In the above-described form (12) of the steering apparatus, the impact energy absorbing member takes the form of a plate. For example, the impact energy absorbing member may be a generally elongate strip which is deformed as the steering column is moved relative to the vehicle body, such that an originally straight portion of the strip is curved or bent while an originally curved portion of the strip is straightened. The impact energy generated in the event of the secondary collision is absorbed by an impact energy absorbing load-generated due to a force of resistance to the deformation of the strip. Where the impact energy absorbing member is constituted by a plate, the steering apparatus can employ a simple impact energy absorbing mechanism. Further, the impact energy absorbing load can be easily adjusted by suitably determining the thickness and width of the plate. The present form of the steering apparatus is further advantageous in that the impact energy absorbing plate is simple in construction with one end portion thereof being formed as the engaging portion engageable with the holding portion. Accordingly, the steering apparatus is simplified in construction, with a relatively small number of components, without using an exclusively designed separate member as the engaging portion. The impact energy absorbing member in the form of a plate will be referred to as "an energy absorbing plate" or "an impact energy absorbing plate" where appropriate.

(13) The shock absorbing steering apparatus according to the above form (12), wherein the engaging portion and the holding portion are arranged such that the engaging portion receives a shearing load after the engaging portion is brought into engagement with the holding portion.

In the above-described form (13) of the steering apparatus wherein the engaging portion formed at one end portion of the energy absorbing plate receives a shearing load or stress after the engagement with the holding portion, the engaging portion provides required degrees of strength and rigidity even where the engaging portion has relatively small thickness and width dimensions. The thickness of a portion of the plate which is to be deformed, and the width dimensions of the engaging portion and the other portions of the plate can be determined as need for the energy absorbing plate to be able to exhibit the desired energy absorbing characteristics while assuring the required strength and rigidity of the engaging portion.

The above-described form (13) is preferable particularly where the engaging portion of the energy absorbing plate and the holding portion are engageable with each other so as to provisionally hold the steering column on the portion of the body of the vehicle when the steering column is fixed to the portion of the body of the vehicle, as described above. In the first conventional apparatus described above under the heading of BACKGROUND ART, the energy absorbing plate has an engaging portion formed by bending one of its opposite end portions. This bent engaging portion (provisionally holding hook portion) receives a bending load or stress acting thereon so as to bend it back, when the bent engaging portion is in engagement with the holding portion to provisionally hold the steering column on the vehicle body when the steering column is fixed to the vehicle body. Accordingly, the energy absorbing plate is required to have relatively large thickness and width dimensions so that the plate has strength and rigidity sufficient to resist the bending at the engaging portion (provisionally holding hook portion). In the present steering apparatus wherein the engaging portion is subjected to a shearing load or stress when the engaging portion and holding portions are held in engagement with each other so as to provisionally hold the steering column on the vehicle body. Accordingly, the required thickness of the energy absorbing plate at its engaging portion is comparatively small, and the required overall weight of the energy absorbing plate is accordingly reduced.

(14) The shock absorbing steering apparatus according to the above-described form (12) or (13), wherein the impact energy absorbing member includes a plurality of plates which are superposed on each other and each of which has the engaging portion.

In the above-described form (14) of the steering apparatus, the absorption of the impact energy by each of the plates of the energy absorbing member can be selectively permitted or inhibited so that the total amount of absorption of the impact energy by the energy absorbing member can be changed in a plurality of steps, by means of the engagement adjusting mechanism described above with respect to the forms (2)-(7). For instance, an actuator is provided to move the holding portion to a selected one of a plurality of positions, for permitting or inhibiting the engagement of each of the engaging portions of the plates with the holding portion, to thereby change the total amount of absorption of the impact energy by the energy absorbing member.

(15) The shock absorbing steering apparatus according to any one of the above-described forms (12)-(14), wherein the impact energy absorbing plate includes a generally U-shaped portion consisting of a curved section and two arm sections extending from respective opposite ends of the curved section, the impact energy absorbing member being arranged to be mounted on the mounting portion such that the two arm sections extend in a direction almost parallel to a direction of movement of the steering column relative to the portion of the body of the vehicle and such that the mounting portion is sandwiched by and between the two arm sections in a direction of thickness of the plate of the energy absorbing member, the impact energy absorbing member being deformed by one end portion of the mounting portion, during the movement of the steering column relative to the portion of the body of the vehicle in the forward direction of the vehicle with the engaging portion held in engagement with the holding portion, such that a position of the curved section in the impact energy absorbing member is gradually changed, whereby the impact energy generated by the secondary collision is absorbed in the process of deformation of the impact energy absorbing member.

In the above-described form (15) of the steering apparatus, the impact energy absorbing member can be mounted or fitted on the mounting position such that the mounting portion is sandwiched by and between the two arm sections of the generally U-shaped portion of the impact energy absorbing member. Before the steering column is moved forward relative to the vehicle body with the engaging portion held in engagement with the holding portion, the U-shaped portion functions as a portion for holding the impact energy absorbing member on the mounting portion. In the process of the forward movement of the steering column with the engaging portion held in engagement with the holding portion, the generally U-shaped portion of the impact energy absorbing member is displaced relative to the mounting portion and is plastically deformed in pressing sliding contact with the above-indicated one end portion of the mounting portion, such that an instantly straight portion of the arm section which is on one side of the curved section remote from the engaging portion is continuously curved along the mounting portion while an end portion of the instantly curved section which is adjacent to the other arm section is continuously straightened into that arm section. Thus, the impact energy absorbing member functions to absorb the impact energy with high stability, in the process of its plastic deformation.

(16) The shock absorbing steering apparatus according to the above-described form (15), wherein the engaging portion is formed integrally with one of the two arm sections such that the engaging portion extends, from one end of that one arm section which is remote from the curved section, in a direction away from the other of the two arm sections.

In the above-described form (16) of the steering apparatus, the engaging portion of the impact energy absorbing member can be easily formed by bending the free end portion of one of the two arm sections of the generally U-shaped portion. The engaging portion may be configured as needed depending upon the function to be achieved by the engaging portion.

(17) The shock absorbing steering apparatus according to any one of the above-described forms (1)-(16), wherein the steering column includes a column body, and a column holder structure which holds the column body and which is fixed to the portion of the body of the vehicle such that the column holder structure is releasable and movable away from the portion of the body of the vehicle in the event of the secondary collision, and the column holder structure includes the mounting portion while the portion of the body of the vehicle is provided with the holding portion.

In the above-described form (17) of the steering apparatus, the steering column includes the column holder structure including the mounting portion on which the impact energy absorbing member is to be mounted. An operation to assemble the impact energy absorbing member with respect to the steering column which is then mounted on the vehicle body is easier than an operation to assemble the impact energy absorbing member with respect to the vehicle body on which the steering column is then mounted. The arrangement according to the above-described form (17) permits higher efficiency of assembling of the steering apparatus.

(18) The shock absorbing steering apparatus according to the above-described form (17), wherein the column holder structure includes a pair of arms which are spaced apart from each other in a lateral direction of the vehicle, and a central portion which is located almost intermediate between the pair of arms in the lateral direction, the column holder structure being fixed at the pair of arms to the portion of the body of the vehicle, and the mounting portion being located in the central portion of the column holder structure.

In the above-described form (18) of the steering apparatus, the impact energy absorbing member is mounted in the almost laterally central part of the column holder structure. Thus, the space in the almost laterally central part of the column holder structure is effectively utilized for installation of the impact energy absorbing member. This arrangement is desirable particularly where the steering apparatus employs only one element as the impact energy absorbing member.

(19) The shock absorbing steering apparatus according to the above-described form (17) or (18), wherein the column holder structure holds the column body through a tilting mechanism.

In the first conventional apparatus described above, the impact energy absorbing member is fixed to the column body, so that the energy absorbing characteristic of the impact energy absorbing member may vary when the column body is supported by the vehicle body through a tilting mechanism, which permits an angle of tilting of the column body in a vertical plane parallel to the longitudinal direction of the vehicle. In the above-described form (19) of the steering apparatus, the column holder structure on which the impact energy absorbing member is mounted is not vertically moved even when the column body is vertically tilted. Thus, the impact energy absorbing member functions as intended irrespective of a tilting motion of the steering column by the tilting mechanism. In other words, the present steering apparatus wherein the impact energy absorbing member is not fixed to the column body can be easily equipped with the tilting mechanism, without an adverse influence of the tilting mechanism on the energy absorbing characteristic of the impact energy absorbing member.

(20) The shock absorbing steering apparatus according to any one of the above-described forms (17)-(19), wherein the column holder structure holds the column body through a telescopic mechanism.

In the first conventional apparatus wherein the impact energy absorbing member is fixed to the column body, the energy absorbing characteristic of the impact energy absorbing member may vary when the column body is supported by the vehicle body through a telescopic mechanism, which permits a change in the axial length of the column body. This variation is similar to that when the column body is supported by the vehicle body through a tilting mechanism described above. In the above-described form (20) of the steering apparatus, the impact energy absorbing member functions as intended irrespective of an operation of the telescopic mechanism to adjust the axial position of an axial portion of the column body at which the column body is supported by the column holder structure. Thus, the present steering apparatus wherein the impact energy absorbing member is not fixed to the column body can be easily equipped with the telescopic mechanism, without an adverse influence of the telescopic mechanism on the energy absorbing characteristic of the impact energy absorbing member.

(21) The shock absorbing steering apparatus according to any one of the above-described forms (17)-(20), wherein the impact energy absorbing member is a plate, and includes a generally U-shaped portion consisting of a curved section and two arm sections extending from respective opposite ends of the curved section, and one of the two arm sections includes an end portion terminating in the engaging portion, the impact energy absorbing member being arranged to be mounted on the mounting portion such that the two arm sections extend in a direction almost parallel to a direction of movement of the steering column relative to the portion of the body of the vehicle and such that the mounting portion is sandwiched by and between the two arm sections in a direction of thickness of the plate of the impact energy absorbing member, the impact energy absorbing member being deformed by a front end portion of the mounting portion, during the movement of the steering column relative to the portion of the body of the vehicle in the forward direction of the vehicle with the engaging portion held in engagement with the holding portion, such that a position of the curved section in the impact energy absorbing member is gradually changed, whereby the impact energy generated by the secondary collision is absorbed in the process of deformation of the impact energy absorbing member.

In the above-described form (21) of the steering apparatus, the impact energy absorbing member takes the form of a plate which includes a generally U-shaped portion and which is mounted on the column holder structure of the column body of the steering column. This plate including the generally U-shaped portion has been described above with respect to the form (15) of this invention. Preferably, the arm section of the plate which includes the engaging portion is located nearer to the holding portion. Where the steering column is fixed to a lower portion of a reinforcement of an instrument panel of the vehicle body (which corresponds to the above-indicated portion of the body of the vehicle) such that the mounting portion is sandwiched by and between the two arm sections in the vertical direction, for example, the engaging portion is preferably formed so as to extend from the free end of the upper one of the two arm sections.

The above-described first conventional apparatus also employs an impact energy absorbing plate including a generally U-shaped intermediate bent portion for absorbing the impact energy. However, the impact energy absorbing plate is fixed at its one end to the column body, and the column body is then assembled with respect to a portion of the vehicle body through a column holder structure (which is referred to as the column bracket, in the publication JP-U-6-79690). In this arrangement, it is difficult to assemble the impact energy absorbing plate with respect to the vehicle body, with high accuracy of positioning of the plate relative to the vehicle body. In the above-described form (21) of the steering apparatus, however, the impact energy absorbing plate is held by only the column holder structure, so that the accuracy of positioning of the plate relative to the vehicle body can be significantly improved.

In the first conventional apparatus, the generally U-shaped bent portion is merely accommodated in a space formed between the column body and the column holder structure, so that the impact energy absorbing plate may not be deformed as intended at its bent portion, leading to a risk of instability of absorption of the impact energy by the deformation of the impact energy absorbing plate. Namely, the impact energy absorbing plate tends to suffer from a variation in its impact energy absorbing characteristic. In the above-described form (21) of this invention, on the other hand, the generally U-shaped portion of the impact energy absorbing plate is plastically deformed by the front end portion of the column holder structure, more specifically, by the front end portion of the mounting portion of the column holder structure. Accordingly, the generally U-shaped portion of the plate can be deformed as intended, along the front end of the mounting portion of the column holder structure, assuring high stability of absorption of the impact energy by the plastic deformation of the generally U-shaped portion of the plate.

(22) The shock absorbing steering apparatus according to the above-described form (21), wherein the engaging portion is formed integrally with one of the two arm sections such that the engaging portion extends, from one end of the end portion of the above-indicated one arm section which end is remote from the curved section, in a direction away from the other of the two arm sections.

In the above-described form (22) of the steering apparatus employing the impact energy absorbing plate which includes the generally U-shaped portion and which is mounted on the column holder structure, the engaging portion of the plate is formed as described above with respect to the form (16) of this invention.

(23) The shock absorbing steering apparatus according to the above-described form (21) or (22), wherein the front end portion of the mounting portion is formed as a guide portion for guiding a displacement of the curved section of the impact energy absorbing member along of the front end portion while the impact energy absorbing member is deformed.

The guide portion of the mounting portion provided in the above-described form (23) of the steering apparatus functions to guide the displacement of the impact energy absorbing plate relative to the column holder structure, so as to cause deformation of the plate along the front end portion of the mounting portion. Preferably, the curved section has an arcuate or part-cylindrical shape, and the guide portion has a semi-cylindrical shape so that the plate is deformed along a semi-cylindrical outer surface of the semi-cylindrical guide portion. To assure smooth deformation of the impact energy absorbing plate, the surface of the guide portion for sliding contact with the plate preferably has a relatively low coefficient of friction, to prevent a large force of friction between the contacting surfaces of the plate and the guide portion.

(24) The shock absorbing steering apparatus according to the above-described form (23), wherein the mounting portion of the column holder structure consists of two plates which are superposed on each other such that one end portion of one of the two plates projects from a corresponding front end face of the other of the two plates in the forward direction of the vehicle, and the guide portion of the mounting portion is constituted by a guide member which is generally J-shaped in cross section and which has a short arm and a long arm, the guide member being fitted on the above-indicated one end portion of said one plate such that a rear end face of the short arm is held opposed to the front end face of the above-indicated other plate.

The steering apparatus according to the above-described form (24) is arranged to absorb the impact energy with high stability, with a simple and inexpensive structure. In the second conventional apparatus described above, the column holder structure is provided in its front end portion with a U-shaped mounting portion on which a guide member is mounted. This U-shaped mounting portion requires a relatively high cost to form, and tends to be easily bent due to a load applied thereto through the guide member when the U-shaped impact energy absorbing plate is deformed to absorb the impact energy. Thus, this conventional arrangement tends to suffer from instability of absorption of the impact energy.

Contrary to the second conventional apparatus, the steering apparatus according to the above-described form (23) is arranged such that the generally J-shaped guide member which receives a load when the U-shaped impact energy absorbing plate is deformed by the guide member to absorb the impact energy is fitted on one end portion of one of the two plates which constitute a base portion of the column holder structure and which are superposed on each other such that the above-indicated one end portion of one of the two plates projects from the corresponding end of the other plate in the forward direction of the vehicle. To mount the guide member on the mounting portion, it is not necessary to bend any portion of the mounting portion, since the guide member is merely fitted on the above-indicated projecting front one end portion of one of the two plates of the mounting portion. Accordingly, the cost required to form the mounting portion can be reduced. Further, the projecting front end portion of the above-indicated one plate has a comparatively high strength, and is highly resistant to a bending load received through the guide member, so that the U-shaped impact energy absorbing plate is deformed as intended to absorb the impact energy, assuring a high degree of stability of absorption of the impact energy by deformation of the U-shaped impact energy absorbing plate. In addition, the present steering apparatus is advantageous in that the U-shaped impact energy absorbing plate is displaced while the arm section of the U-shaped portion of the impact energy absorbing plate which corresponds to the short arm of the guide member can be held in contact with or close proximity to the surface of the other plate of the mounting portion, since the short arm is held opposed to the front end face of that other plate. Accordingly, the required dimension of the mounting portion in the direction in which the two plates are superposed on each other can be reduced.

(25) The shock absorbing steering apparatus according to the above-described form (23), wherein the mounting portion of the column holder structure includes a plate having a generally U-shaped projecting end portion which constitutes the guide portion.

In the above-described form (25) of the steering apparatus, the mounting portion does not include the guide member described above with respect to the form (24), and the generally U-shaped projecting end portion of the base plate of the column holder structure functions as the guide portion. The present mounting portion not using a separate guide member is simple in construction.

(26) The shock absorbing steering apparatus according to any one of the above-described forms (23)-(25), wherein the impact energy absorbing member is mounted on the mounting portion such that there is an air gap between the curved section and the guide portion.

In the above-described form (26) of the steering apparatus, the front end portion of the mounting portion of the column holder structure is permitted to be moved forward through the air gap during an initial portion of the forward movement of the steering column relative to the vehicle body, so that the moment of absorption of the impact energy by deformation of the generally U-shaped portion of the impact energy absorbing plate by the front end portion of the mounting portion is delayed with respect to the moment at which the column holder structure is released from the vehicle body. Accordingly, an impact generated in the initial period of the secondary collision can be made smaller in the present arrangement, than in an arrangement in which there is not an air gap between the curved section of the impact energy absorbing plate and the guide portion. Further, the moment at which the impact energy is absorbed by the deformation of the impact energy absorbing plate can be suitably adjusted as needed by adjusting the amount of the air gap.

(27) The shock absorbing steering apparatus according to any one of the above-described forms (21)-(26), further comprising positioning and holding means for positioning and holding the above-indicated one arm section of the impact energy absorbing member with respect to the column holder structure.

In the above-described form (27) of the steering apparatus, first embodiment, the above-indicated one arm section of the generally U-shaped portion of the impact energy absorbing plate is positioned and held with respect to the column holder structure, by the positioning and holding means. The positioning and holding means assures stable engagement of the engaging portion of the impact energy absorbing plate with the holding portion provided on the vehicle body, with the above-indicated one arm section being positioned relative to the column holder structure, when the column holder structure is moved, together with the steering column, relative to the vehicle body. The stable engagement of the engaging portion with the holding portion is permitted even in the presence of the free-running distance between the holding portion provided on the vehicle body and the engaging portion formed integrally with the relevant arm section of the impact energy absorbing plate. Where the engaging portion of the, impact energy absorbing plate and the holding portion are engageable with each other so as to provisionally hold the steering column on the vehicle body when the steering column is fixed to the vehicle body, the positioning and holding means is effective to minimize dislocation of the above-indicated one arm section of the impact energy absorbing plate relative, to the column holder structure, thereby facilitating the assembling of the steering column with respect to the vehicle body, for instance, an operation to fix the column holder structure to the vehicle body by using screws and nuts. The positioning and holding means is required to position the above-indicated arm section in at least one of directions of its width, thickness and length, and is preferably arranged to position that arm section at least in the direction of width (in the lateral or transverse direction of the vehicle).

(28) The shock absorbing steering apparatus according to the above-described form (27), wherein the positioning and holding means includes a pair of positioning and holding pieces disposed on opposite sides of the above-indicated one arm section such that the pair of positioning and holding pieces are spaced from each other in a direction of width of the above-indicated one arm section.

In the above-described form (28) of the steering apparatus, the above-indicated one arm section of the impact energy absorbing plate can be easily positioned by the pair of positioning and holding pieces, which may be simple in construction. These positioning and holding pieces may be formed on a rear extension of the guide member which will be described, or on any other part of the mounting portion.

(29) The shock absorbing steering apparatus according to he above-described form (28), wherein the pair of positioning and holding pieces have respective mutually opposed slant surfaces which are formed such that a distance between the opposed slant surfaces decreases in a direction from the above-indicated other arm section toward the above-indicated one arm section.

In the above-described form (29) of the steering apparatus, the impact energy absorbing plate can be positioned and held by the pair of positioning and holding pieces having the slant surfaces, irrespective of the specific width and thickness of the impact energy absorbing plate, even where the impact energy absorbing characteristic of the impact energy absorbing plate is adjusted by suitably selecting the width and thickness dimensions of the impact energy absorbing plate.

(30) The shock absorbing steering apparatus according to the above-described form (29), wherein the above-indicated one arm section of the generally U-shaped portion of the impact energy absorbing member is supported by a portion of the mounting portion, at an inner surface of the above-indicated one arm section which faces inwardly of the generally U-shaped portion.

In the above-described form (30) of the steering apparatus, the above-indicated one arm section is positioned by the pair of positioning and holding pieces and the above-indicated portion of the mounting portion, in a direction of thickness of the above-indicated on arm section. The above-indicated portion of the mounting portion which supports the above-indicated on one arm section may be provided on a rear extension of the guide member which will be described, or on any other part of the column holder structure, for example, on any portion of the column holder structure.

(31) The shock absorbing steering apparatus according to any one of the above-described forms (28)-(30), wherein the engaging portion is formed integrally with the above-indicated one arm section such that the engaging portion extends, from one end of the above-indicated one arm section which is remote from the curved section, in a direction away from the other of the two arm sections and such that the engaging portion has a larger height than the pair of positioning and holding pieces, as measured from an outer surface of the above-indicated one arm section that is opposite to an inner surface thereof which faces inwardly of the generally U-shaped portion, the engaging portion being engageable at a free end portion thereof with the holding portion, and having a width smaller than a distance between the pair of positioning and holding pieces, at a height position of the engaging portion which corresponds to the height of the pair of positioning and holding pieces.

In the above-described form (31) of the steering apparatus, the U-shaped impact energy absorbing plate can be mounted on the mounting portion of the column holder structure, by moving the impact energy absorbing plate relative to the mounting portion in a rearward direction of the vehicle such that the proximal or fixed end part of the engaging portion is passed between the pair of positioning and holding pieces.

(32) The shock absorbing steering apparatus according to any one of the above-described forms (27)-(31), wherein the mounting portion includes a guide member located at a front end portion thereof and operable to guide a displacement of the curved section of the impact energy absorbing member while the impact energy absorbing member is deformed, and the guide member includes a rear extension extending in a rearward direction of the vehicle, the pair of positioning and holding means being provided on the rear extension.

In the above-described form (32) of the steering apparatus, the guide member provided at the front end portion of the mounting portion may be generally J-shaped in cross section, as described above with respect to the form (24) of this invention. In the present steering apparatus, the above-indicated one arm section of the U-shaped impact energy absorbing plate is positioned and held with respect to the column holder structure, by the positioning and holding means formed on the rear extension of the guide member, which rear extension is distant from the front end portion of the guide member by which the impact energy absorbing plate is deformed. This arrangement is effective to improve the accuracy of positioning and holding of the above-indicated one arm section. This guide member may constitute the guide portion described above with respect to the form (23) of the present invention.

(33) The shock absorbing steering apparatus according to the above-described form (32), wherein the rear extension of the guide member includes a positioning and holding portion for positioning and holding the other of the two arm sections of the impact energy absorbing member.

In the above-described form (33) of the steering apparatus, the U-shaped impact energy absorbing plate is positioned and held at its two arm sections by the guide member which is simple in construction and which includes the positioning and holding means and the positioning and holding portion. The guide member is effective to assure a high degree of accuracy of positioning of the impact energy absorbing plate relative to the column holder structure, more specifically, relative to the mounting portion of the column holder structure.

(34) The shock absorbing steering apparatus according to the above-described form (27), wherein the mounting portion includes a supporting portion, and the positioning and holding means includes a generally rectangular three-sided clip having an elastically deformable portion which cooperates with the supporting portion to elastically hold therebetween the above-indicated one arm section of the generally U-shaped portion of the impact energy absorbing member in elastically pressing contact therewith in a direction of thickness of the above-indicated one arm section.

In the above-described form (34) of the steering apparatus, the above-indicated one arm section of the U-shaped impact energy absorbing plate is elastically held in pressing contact with the elastically deformable portion of the rectangular three-side clip and the supporting portion of the mounting portion, in the direction of thickness of that arm section, so as to assure high accuracy of positioning of the impact energy absorbing plate with respect to the mounting portion. Since the clip includes the elastically deformable portion, the same clip can be used to hold the impact energy absorbing plate, irrespective of the specific thickness of the plate, even where the impact energy absorbing characteristic of the impact energy absorbing plate is adjusted by suitably selecting the thickness dimension of the impact energy absorbing plate within a range of the amount of elastic deformation of the elastically deformable portion of the clip.

(35) The shock absorbing steering apparatus according to the above-described form (27), wherein the mounting portion includes a supporting portion, and the positioning and holding means includes a holding band which cooperates with the supporting portion to hold the above-indicated one arm section of the generally U-shaped portion of the impact energy absorbing member, the holding band having a variable effective length of holding.

In the above-described form (35) of the steering apparatus, the above-indicated one arm section of the U-shaped impact energy absorbing plate is held by the holding band and the supporting portion of the mounting portion. Since the effective holding length of the holding band is variable, the same holding band can be used to hold the impact energy absorbing plate, irrespective of the specific thickness and width of the plate, even where the impact energy absorbing characteristic of the impact energy absorbing plate is adjusted by suitably selecting the thickness and width dimensions of the impact energy absorbing plate. Accordingly, the cost of manufacture of the steering apparatus is reduced.

(36) The shock absorbing steering apparatus according to any one of the above-described forms (21)-(35), wherein the column holder structure has a pair of slots which are spaced apart from each other in a lateral direction of the vehicle and through which the column holder structure is attached to the portion of the body of the vehicle such that the column holder structure is releasable and movable away from the portion of the body of the vehicle in the forward direction of the vehicle, the column holder structure further including a central portion which is located almost intermediate between the pair of slots in the lateral direction and which includes the mounting portion on which the impact energy absorbing member is mounted, and wherein the impact energy absorbing member includes a pair of wing portions which extend from the above-indicated one arm section in respective opposite directions parallel to the lateral direction of the vehicle and which are provided with respective cylindrical portions which are respectively press-fitted in the pair of slots of the column holder structure and which are releasable from the pair of slots when the column holder structure is moved away from the portion of the body of the vehicle in the forward direction of the vehicle.

Where the above-described form (36) of the steering apparatus is arranged such that the engaging portion of the impact energy absorbing plate is used to provisionally hold the steering column on the vehicle body when the steering column is fixed to the vehicle body, as described above with respect to the above-described form (11), the steering column is supported by the vehicle body through the engaging portion and the wing portions of the impact energy absorbing member, so that the weight of the steering column does not act on the U-shaped portion of the impact energy absorbing member, which U-shaped portion is to be deformed to absorb the impact energy. Thus, the present arrangement is effective to prevent undesirable deformation of the U-shaped portion of the impact energy absorbing member upon assembling of the steering column with respect to the vehicle body, and assures high stability of absorption of the impact energy by deformation of the U-shaped portion after the steering column is mounted on the vehicle body. It is further appreciated that the pair of wing portions of the impact energy absorbing member can function as the positioning and holding means for positioning and holding the above-indicated one arm section of the impact energy absorbing member, as described above with respect to the above-described form (27). The pair of wings are desirably located relatively near the engaging portion, preferably, adjacent to the engaging portion in the forward direction of the vehicle.

(37) The shock absorbing steering apparatus according to any one of the above-described forms (21)-(35), further comprising an energy-absorbing-load changing mechanism operable to change an impact energy absorbing load to be generated by deformation of the impact energy absorbing member, depending upon a velocity of the movement of the steering column in the forward direction of the vehicle relative to the portion of the body of the vehicle.

The magnitude of the impact applied to the steering column upon the secondary collision of the vehicle occupant (operator), for example, with the steering wheel, is not only determined depending upon whether a seat belt is worn on the vehicle occupant or not, but also determined by a kinetic energy of the vehicle occupant upon the secondary collision. Namely, the impact applied to the vehicle occupant and to the steering column increases with an increase in the kinetic energy of the vehicle occupant, that is, varies depending also on various factors including the impact acting on the steering column and the weight of the vehicle occupant colliding with the steering wheel. In this respect, it is desirable to change the impact energy absorbing load to be generated by deformation of the impact energy absorbing member, on the basis of a parameter indicative of the impact actually acting on the steering column, for effectively absorbing the impact energy. The steering column is moved relative to the vehicle body by the kinetic energy of the vehicle occupant colliding with the steering wheel, so that the velocity of movement of the steering column increases with an increase in the kinetic energy of the vehicle occupant. Accordingly, the velocity of movement of the steering column can be suitably used as a parameter indicative of the impact actually acting on the steering column. In the above-described mode (37), the energy-absorbing-load changing mechanism is provided to change the impact energy absorbing load, depending upon the velocity of movement of the steering column, that is, depending upon the magnitude of the impact actually applied to the steering column in the event of the secondary collision of the vehicle occupant with the steering wheel, so that the impact applied to the vehicle occupant is effectively reduced by deformation of the impact energy absorbing member, for thereby protecting the vehicle occupant from the impact generated by the secondary collision.

The term "velocity of movement of the steering column" used in connection with the above-described form (36) is interpreted to mean a velocity at which the steering column is moved relative to a portion of the vehicle body at which the steering column is attached to the vehicle body. The velocity used by the energy-absorbing-load changing mechanism may be the velocity of movement of the steering column over its entire distance of movement, or the velocity at any point of time during the entire distance or stroke of movement. Preferably, the velocity in a relatively initial period of the movement of the steering column is used by the energy-absorbing-load changing mechanism, since this velocity at a relatively early point of time after the initiation of the movement of the steering column tends to accurately reflect the impact actually applied to the steering column upon the secondary collision of the vehicle occupant with the steering wheel. The term "impact energy absorbing load" is interpreted to mean a force of resistance to the forward movement of the steering column relative to the vehicle body.

The energy-absorbing-load changing mechanism provided in the above-described form (36) may be constructed as needed to change the impact energy absorbing load to be generated by deformation of the impact energy absorbing member. For instance, the energy-absorbing-load changing mechanism includes an electric means such as an electrically operated actuator which is operated to control the impact energy absorbing load, under the control of an electronic control device, according to a signal indicative of the detected velocity of movement of the steering column. Alternatively, the energy-absorbing-load changing mechanism includes a purely mechanical means operable according to the principle of dynamics. The use of mechanical means as described below is more desirable for structural and control simplification and reduction of the cost of manufacture of the steering apparatus.

(38) The shock absorbing steering apparatus according to the above-described form (37), wherein the energy-absorbing-load changing mechanism increases the impact energy absorbing load with an increase in the velocity of movement of the steering column.

As discussed above, the velocity of movement of the steering column increases with an increase in the magnitude of the impact acting on the steering column. On the other hand, the distance of movement of the steering column for absorbing the impact energy is determined by the specific construction of the steering apparatus, in particular, the specific structure for mounting the steering column on the vehicle body. For effectively absorbing the impact energy within the predetermined distance of movement of the steering column, it is desirable that the amount of the impact energy to be absorbed per unit distance of movement of the steering column increases with an increase in the velocity of movement of the steering column. This desire is satisfied in the above-described form (38) of this invention, which is constructed so as to prevent bottoming of the steering column at the end of its predetermined movement distance or stroke, which would cause a considerably large impact applied to the vehicle operator, when the secondary collision of the vehicle operator with the steering wheel generates a relatively large impact energy, and so as to smoothly absorb the impact energy over a relatively long distance of movement of the steering column, when the secondary collision generates a relatively small impact energy.

(39) The shock absorbing steering apparatus according to the above-described form (37) or (38), wherein the energy-absorbing-load changing mechanism changes the impact energy absorbing load such that the impact energy absorbing load is larger when the velocity of movement of the steering column is higher than a predetermined threshold, than when the velocity is not higher than the predetermined threshold.

The impact energy absorbing load can be changed continuously according to the velocity of movement of the steering column, or alternatively changed in steps depending upon the velocity of movement as in the above-described form (39) of this invention. Namely, the impact energy absorbing load is made relatively large when the velocity of movement of the steering column is higher than the predetermined threshold, and relatively small when the velocity is, not higher than the threshold. The present steering apparatus capable of changing the impact energy absorbing load in only two steps is comparatively simple in construction of the energy-absorbing-load changing mechanism.

(40) The shock absorbing steering apparatus according to any one of the above-described forms (37)-(39), wherein the energy-absorbing-load changing mechanism changes the impact energy absorbing load by changing a force of resistance to the deformation of the impact energy absorbing member (372).

The impact energy absorbing load generated by deformation of the impact energy absorbing member is relatively small when the impact energy absorbing member in the form of a plate, for example, is relatively easily deformable, and is relatively small when the plate is relatively hardly deformable. In the above-described form (40) of this invention, the force of resistance to the deformation of the impact energy absorbing member is used as a parameter indicative of the force required to cause the deformation of the impact energy absorbing member, and is changed to change the impact energy absorbing load. The term "force of resistance to the deformation" is broadly interpreted to indicate a degree of difficulty to cause the deformation of the impact energy absorbing member, and to comprehend not only a stress required to cause the deformation, but also a force of friction existing between the impact energy absorbing member and the mounting member, which force of friction is a force of resistance to a displacement of the impact energy absorbing member relative to the mounting portion.

(41) The shock absorbing steering apparatus according to the above-described form (40), wherein the impact energy absorbing member is a plate, and includes a generally U-shaped portion consisting of a curved section and two arm sections extending from respective opposite ends of the curved section, and one of the two arm sections includes an end portion terminating in the engaging portion, the impact energy absorbing member being arranged to be mounted on the mounting portion such that the two arm sections extend in a direction almost parallel to a direction of movement of the steering column relative to the portion of the body of the vehicle and such that the mounting portion is sandwiched by and between the two arm sections in a direction of thickness of the plate of the impact energy absorbing member, the impact energy absorbing member being deformed by an end portion of the mounting portion, during the movement of the steering column relative to the portion of the body of the vehicle in the forward direction of the vehicle with the engaging portion held in engagement with the holding portion, such that a position of the curved section in the impact energy absorbing member is gradually changed, whereby the impact energy generated by the secondary collision is absorbed in the process of deformation of the impact energy absorbing member, and wherein the energy-absorbing-load changing mechanism includes (a) a deformation-resistance increasing member provided on the mounting portion and engageable with the impact energy absorbing member so as to increase the force of resistance to the deformation of the impact energy absorbing member, and (b) an engaging mechanism operable to cause engagement of the deformation-resistance increasing member with the impact energy absorbing member when a velocity of movement of the impact energy absorbing member relative to the front end portion of the mounting portion is higher than a predetermined threshold.

In the above-described form (41) of the steering apparatus wherein the impact energy absorbing member takes the form of a plate, the energy-absorbing-load changing mechanism utilizes the impact energy absorbing plate as a deformable member and the end portion of the mounting portion as a forcing member for forcing the impact energy absorbing plate so as to cause deformation of this plate, so that the impact energy absorbing load is changed by changing a state of engagement between the deformable member and the forcing member. Described more specifically, the energy-absorbing-load changing mechanism includes the deformation-resistance increasing member, which for example, takes the form of at least one projection projecting from the mounting portion, or alternatively a friction generating member arranged to generate a large force of friction with respect to the impact energy absorbing plate, so that the impact energy absorbing load is increased by engagement of the at least one projection or the friction generating member with the impact energy absorbing plate. These examples of the energy-absorbing-load changing mechanism is considered to employ a purely mechanical means operable according to the principle of dynamics, which is highly reliable in operation and simpler in construction and available at a lower cost than an electrical means.

(42) The shock absorbing steering apparatus according to the above-described form (40), The shock absorbing steering apparatus according to claim 40, wherein the impact energy absorbing member is a plate, and includes a generally U-shaped portion consisting of a curved section and two arm sections extending from respective opposite ends of the curved section, and one of the two arm sections includes an end portion terminating in the engaging portion, the impact energy absorbing member being arranged to be mounted on the mounting portion such that the two arm sections extend in a direction almost parallel to a direction of movement of the steering column relative to the portion of the body of the vehicle and such that the mounting portion is sandwiched by and between the two arm sections in a direction of thickness of the plate of the impact energy absorbing member, the impact energy absorbing member being deformed by an end portion of the mounting portion, during the movement of the steering column relative to the portion of the body of the vehicle in the forward direction of the vehicle with the engaging portion held in engagement with the holding portion, such that a position of the curved section in the impact energy absorbing member is gradually changed, whereby the impact energy generated by the secondary collision is absorbed in the process of deformation of the impact energy absorbing member, and wherein the energy-absorbing-load changing mechanism includes (a) a movable member provided on the mounting portion and engageable with the impact energy absorbing member such that the movable member is movable when the impact energy absorbing member is displaced relative to the end portion of the mounting portion, and (b) a movable-member-movement restricting mechanism operable to restrict a movement of the movable member when a velocity of movement of the movable member is higher than a predetermined threshold.

In the above-described form (42) of the steering apparatus wherein the impact energy absorbing member takes the form of a plate, the energy-absorbing-load changing mechanism utilizes the impact energy absorbing plate as a deformable member and the end portion of the mounting portion as a forcing member for forcing the impact energy absorbing plate so as to cause deformation of this plate, as in the above-described form (41), so that the impact energy absorbing load is changed by changing a state of engagement between the deformable member and the forcing member. Unlike the energy-absorbing-load changing mechanism provided in the above form (41), the energy-absorbing-load changing mechanism provided in the present form (42) includes the movable member provided on the movable portion, and the movable-member-movement restricting mechanism for restricting the movement of the movable member, so that the impact energy absorbing load is increased by a force of friction generated between the movable member and the impact energy absorbing member. This energy-absorbing-load changing mechanism is also considered to employ a purely mechanical means operable according to the principle of dynamics, which is highly reliable in operation and simpler in construction and available at a lower cost than an electrical means. The movable member includes not only a linear movable member but also a rotatable member.

Best Mode for Carrying Out the Invention

There will be described some embodiments of the present invention, and some modifications thereof, in the form of a steering apparatus for use in a motor vehicle, in particular, a shock absorbing steering apparatus of the type wherein a column holder structure is provided with an energy absorbing plate. For convenience sake, the embodiments described below are classified into several groups, and the embodiments and modifications thereof of each group will be described in detail by reference to the accompanying drawings. It will be understood that the present invention is not limited to the following illustrated embodiments, and may be otherwise embodied with various changes, alterations and improvements, such as those described in the foregoing DETAILED DESCRIPTION OF THE INVENTION, which may occur to those skilled in the art. In the following descriptions, the same reference numerals will be used in the different embodiments of the invention, to denote functionally identical or similar elements, where appropriate, and redundant description of those elements is avoided as much as possible unless some redundancy is deemed necessary.

First Group of Embodiments

There will be described first through fifth embodiments of this invention, which are similar to each other and constitute the first group of embodiments.

Figure 2:
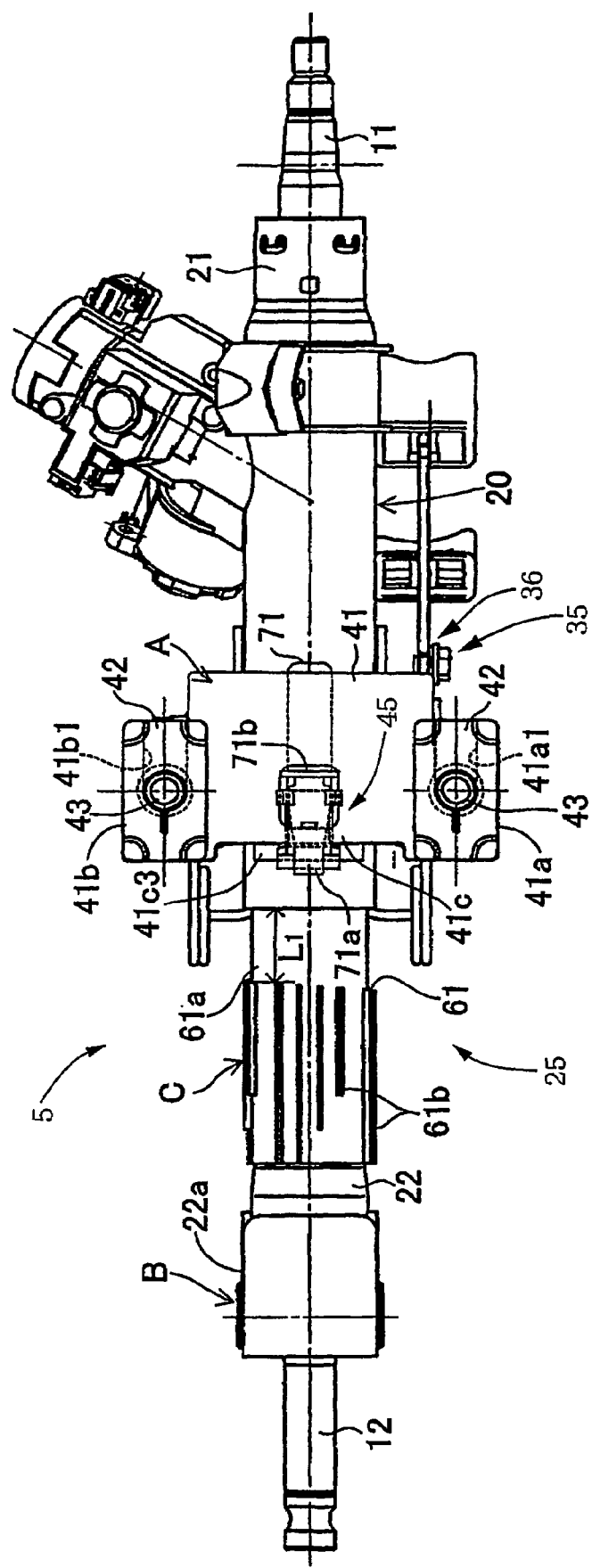
FIG. 2 is a plan view of the shock absorbing steering apparatus shown in FIG. 1.

First Embodiment i) Arrangement of Shock Absorbing Steering Apparatus of the First Embodiment Referring first to FIGS. 1-6, there is shown a shock absorbing steering apparatus constructed according to a first embodiment of this invention. In this first embodiment, the steering apparatus includes a steering shaft 10 having an upper shaft 11 and a lower shaft 12 which are axially movable relative to each other and rotatable together so as to transmit a torque. Thus, the steering shaft 10 is contractible and extensible in the axial direction. The steering shaft 10 is freely rotatably supported by a steering tube 20 having an outer tube 21 and an inner tube 22 which are axially movable relative to each other. Thus, the steering tube 20 is also contractible and extensible in the axial direction. The steering shaft 10 and the steering tube 20 cooperate to constitute a column body 25. This column body 25 is assembled with respect to a body of a motor vehicle such that the column body 25 is inclined, with its right end portion (as seen in FIGS. 1 and 2) being located rearwardly and upwardly of its left end portion.

The upper shaft 11 is freely rotatably supported by the outer tube 21 via a bearing 13 such that the upper shaft 11 is not axially movable relative to the outer tube 21. To the right end portion (as seen in FIG. 1) or upper end portion of the upper shaft 11, there is attached a steering wheel (not shown) provided with an air bag device, such that the steering wheel is rotatable with the upper shaft 11. On the other hand, the lower shaft 12 is freely rotatably supported by the inner tube 22 via a bearing 14, and is connected at its left end portion (as seen in FIG. 1) through a universal joint (not shown) to an intermediate shaft (not shown), which is axially contractible and extensible and capable of transmitting a torque. The intermediate shaft is connected through a universal joint to a steering gear box (not shown), as well known in the art.

The outer tube 21 is axially slidably fitted at its front or lower end portion on a rear or upper end portion of the inner tube 22, and is provided at its lower end portion with a bracket 21a and a rear support mechanism A. The rear support mechanism A incorporates a tilting mechanism for adjusting the angle of inclination or tilting of the steering shaft 10, and a telescopic mechanism for adjusting the axial length of the steering shaft 10. The outer tube 21 is fixed to a body-side bracket 31 (which may also be called "steering support bracket") via the bracket 21a and the rear support mechanism A. The body-side bracket 31 is fixed to a portion of the vehicle body. On the other hand, the inner tube 22 is provided at its front or lower end portion with a bracket 22a and a front support mechanism B, and is pivotally connected to another portion of the vehicle body via the bracket 22a and the rear support mechanism B.

The rear support mechanism A includes a column holder structure in the form of a break-away bracket 41 arranged to support the bracket 21a fixed to the outer tube 21, such that the bracket 21a is pivotable or tiltable in the vertical direction.

The rear support mechanism A further includes a tilting mechanism 35 arranged to lock and release the bracket 21a fixed to the outer tube 21, to and from the break-away bracket 41, and a telescopic mechanism 36 arranged to lock and release the outer tube 21 to and from the inner tube 22.

The tilting mechanism 35 is constructed as well known in the art, and is operable by a manually operated lever between a locking position and a releasing position. In the releasing position of the tilting mechanism 35, the column body 25 is integrally tiltable relative to the break-away bracket 41, in a vertical plane parallel to the longitudinal direction of the vehicle. The telescopic mechanism 36 is also constructed as well known in the art, and is operable by a manually operated lever between a locking position and a releasing position. In the releasing position of the telescopic mechanism 36, the upper shaft 11 and the outer tube 21 are axially movable relative to the lower shaft 12 and the inner tube 22, respectively, so as to permit adjustment of the axial length of the column body 25.

Figure 5:
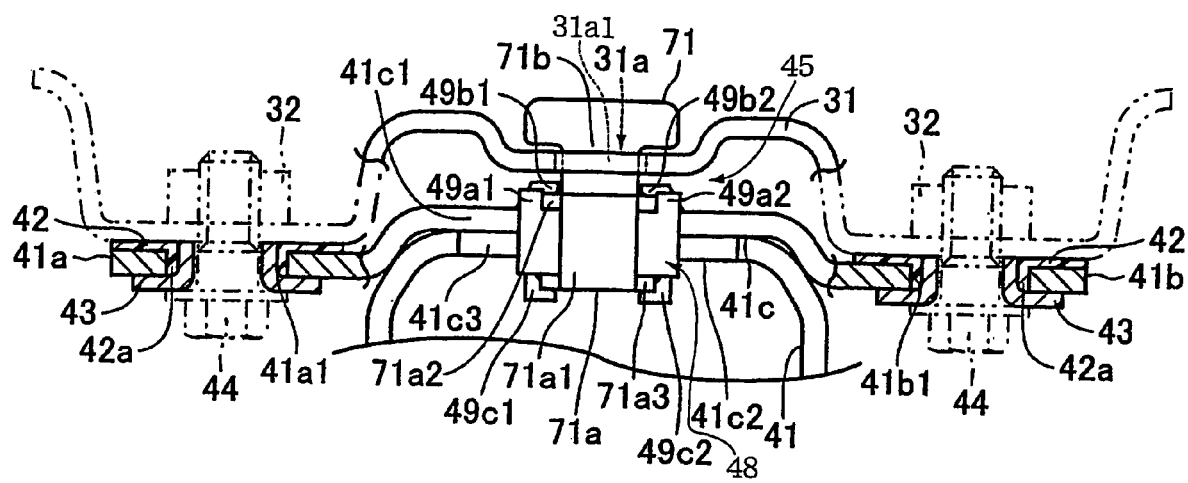
FIG. 5 is an enlarged fragmentary partially cut-away front elevational view showing the relationship among the body-side bracket, break-away bracket, guide member, energy absorbing plate and other elements shown in FIG. 1.
Figure 6:
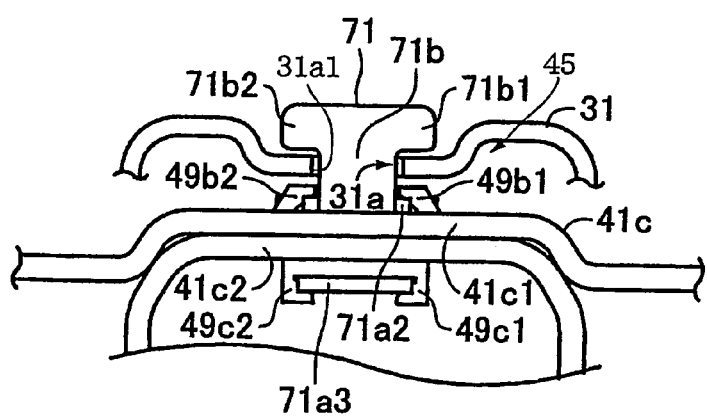
FIG. 6 is a rear elevational view showing the relationship among the body-side bracket, break-away bracket, guide member, energy absorbing plate and other elements shown in FIGS. 3-5.

The break-away bracket 41 has a pair of arms 41a, 41b extending in the lateral or transverse direction (direction of width) of the vehicle, and is fixed to the body-side bracket 31 by bolts 44 inserted through slots 41a1, 41b1 formed in the respective arms 41a, 41b, via intermediate members in the form of resin capsules 42 and metallic collars 43, as shown in FIG. 5. Each bolt 44 is screwed into a nut 32 fixed to the body-side bracket 31.

The slots 41a1 and 41b1 formed through the break-away bracket 41 permit this break-away bracket 41 to be moved in the forward direction relative to the body-side bracket 31 in the event of a secondary collision of the vehicle operator (occupant or passenger) with the steering wheel upon collision of the vehicle with a preceding vehicle, for example. As indicated by broken lines in FIG. 2, each of the slots 41a1 and 41b1 is formed through a rear half of the corresponding arm 41a, 41b, such that the slot extends from an almost central portion of the corresponding arm toward its rear or upper end and is open at the rear end in the rearward direction (upward direction). As shown in FIG. 5, each resin capsule 42 has a cylindrical portion 42a fitted in the corresponding slot 41a1, 41b1, and is bonded to the upper surface of the corresponding arm 41a, 41b. When an impact force acting on the resin capsule 42 exceeds a given threshold in the event of the secondary collision, the resin capsule 42 is broken down or fractured. Each metallic collar 43 is press-fitted in the cylindrical portion 42a of the corresponding resin capsule 42, and the bolt 44 is inserted through the metallic collar 43 and fixed to the body-side bracket 31. The impact force acts on the resin capsule 42 through the bolt 44 and the metallic collar 43.

The front support mechanism B is provided to pivotably support the inner tube 22 of the steering tube 20, and includes a collar 51 freely rotatably fitted in a fitting hole 22a1 formed through the bracket 22a fixed to the front or lower end portion of the inner tube 22. The collar 51 is fixed to a portion (not shown) of the vehicle body by a bolt and a nut (both of which are not shown).

The shock absorbing steering apparatus constructed as described above includes a steering column generally indicated at 5 in FIGS. 1 and 2. This steering column 5 includes: the column body 25 (steering shaft 10 and steering tube 20); the rear support mechanism A including the break-away bracket 41, the tilting mechanism 35 and the telescopic mechanism 36; and the front support mechanism B including the bracket 22a.

The shock absorbing steering apparatus according to the present first embodiment further includes an impact energy absorbing mechanism C interposed between the outer tube 21 and the inner tube 22, as shown in FIGS. 1 and 2. The impact energy absorbing mechanism C is provided to absorb an impact energy generated in the event of a secondary collision of the vehicle operator (occupant or passenger) with the steering wheel upon collision of the vehicle. The impact energy absorbing mechanism C is arranged to permit the column body 25 to be axially contracted, for thereby absorbing the generated impact energy. To this end, the impact energy absorbing mechanism C is provided with an energy absorbing member 61.

The energy absorbing member 61 is deformable in a shearing or plastic deformation mode as a result of axial contraction of the column body 25 from its initial position of FIGS. 1 and 2 by more than a predetermined axial distance L1. The energy absorbing member 61 is formed of a resin, a light metal or a similar material and generally C-shaped in transverse cross section. The energy absorbing member 61 is integrally fixed to the outer circumferential surface of the inner tube 22.

The energy absorbing member 61 includes a thin-walled support portion 61a which axially slidably supports the front portion of the outer tube 21, and a plurality of ribs 61b formed integrally on the outer surface of the support portion 61a. The ribs 61b undergo shearing or plastic deformation by the front end portion of the outer tube 21 when the column body 25 is axially contracted by more than the predetermined axial distance L1. As shown in FIG. 1, the energy absorbing member 61 has a plurality of protrusions 61c fixedly fitted in respective fitting holes 22b formed in the inner tube 22. The protrusions 61c are formed integrally with an axially intermediate portion of the impact energy absorbing member 61, so as to extend radially inwardly of the inner tube 22.

Figure 3:
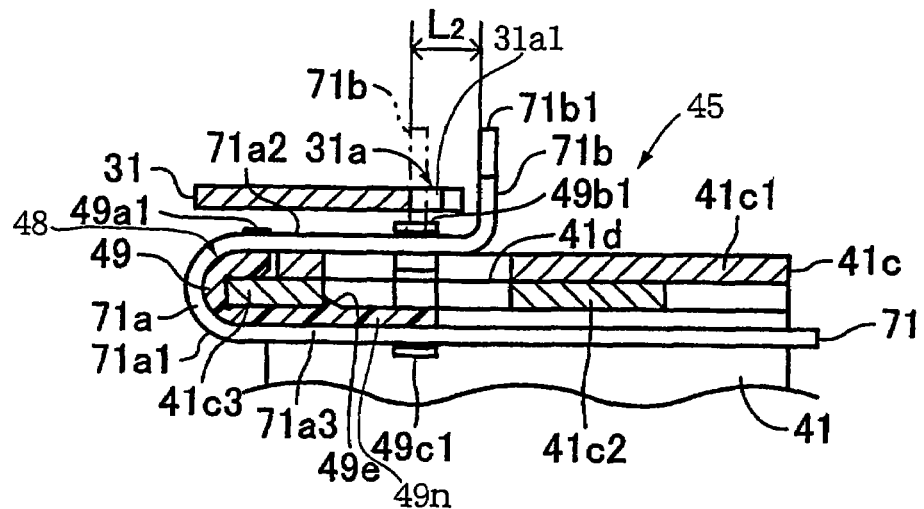
FIG. 3 is an enlarged fragmentary side elevational view in axial cross section showing a relationship among a body-side bracket, a break-away bracket, a guide member, an energy absorbing plate and other elements that are shown in FIG. 1.

Each of the ribs 61b has a suitable amount of protrusion from the outer surface of the support portion 61a in the radially outward direction of the inner tube 22, and has a suitable axial length. When the outer tube 21 is axially moved from its initial position of FIGS. 1 and 2 relative to the inner tube 22 in the forward and downward direction, by more than the predetermined axial distance L1, the ribs 61b are deformed in the shearing or plastic deformation mode, thereby generating a suitable amount of impact energy absorbing load. The shape and number of the ribs 61b may be selected as needed. (*1) In the first embodiment shown in FIGS. 1-6, the break-away bracket 41 includes a main body portion having a central portion 41c which is located almost intermediate between the two arms 41a, 41b in the lateral direction of the vehicle. The central portion 41c consists of two plates 41c1 and 41c2 partially superposed on each other, as shown in FIG. 3. The lower plate 41c2 projects from the front end of the upper plate 41c1 by a suitable distance in the axial direction of the column body 25. That is, the lower plate 41c2 includes a projecting front end portion 41c3, on which a guide member 49 formed of a resin is mounted. An impact energy absorbing member in the form of an energy absorbing plate 71 is mounted on the central portion 41c of the break-away bracket 41, with the guide member 49 being interposed therebetween. In the present embodiment, the central portion 41c of the break-away bracket 41 and the guide member 49 attached to the projecting front end portion 41c3 of the central portion 41c cooperate to constitute a mounting portion 45 on which the impact energy absorbing member in the form of the plate 71 is mounted.

The energy absorbing plate 71 is a single generally elongate metallic plate capable of functioning to absorb the impact energy generated in the event of the secondary collision of the vehicle operator (or passenger) with the steering column 5 (more precisely, with the steering wheel) upon collision of the vehicle, such that the impact energy is absorbed with a forward movement of the break-away bracket 41 relative to the vehicle body, which takes place when the outer tube 21 of the column body 25 is axially moved forward relative to the vehicle body by the secondary collision. As shown in the enlarged views of FIGS. 3-6, the energy absorbing plate 71 includes a U-shaped portion 71a held in engagement with the guide member 49 such that the U-shaped portion 71a is displaceable relative to the break-away bracket 41. The energy absorbing plate 71 further includes a T-shaped engaging portion 71b formed at its upper rear end portion. The engaging portion 71b is engageable with a holding portion 31a formed on the body-side bracket 31.

The U-shaped portion 71a is fitted on the two plates 41c1 and 41c2 of the break-away bracket 41 and the guide member 49 of the mounting portion 45, such that opposed two straight arms of the U-shaped portion 71a sandwich the two mutually superposed plates 41c1, 41c2 in the vertical direction, as shown in FIG. 3. The U-shaped portion 71a includes an arcuate curved section 71a1, and the above-indicated two straight arms in the form of an upper arm section 71a2 and a lower arm section 71a3 which are connected together by the curved section 71a1. The guide member 49 has a front portion held in contact with the curved section 71a1, and functions as a guide portion 48 operable to deform the energy absorbing plate 71 along the curvature of the curved section 71a1, in pressing and sliding contact with the curved section 71a1, when the outer tube 21 is axially moved relative to the vehicle body in the event of the secondary collision indicated above. The guide portion 48 also functions as a forcing portion operable to force a deformable member in the form of the energy absorbing plate 71, so as to cause deformation of the deformable member.

The upper straight arm section 71a2 extends from the upper end of the curved section 71a1 rearwardly of the steering column 5, and is held in contact with the upper surface of the guide member 49 and the upper surface of the upper plate 41c1 of the break-away bracket 41. However, the upper arm section 71a2 may be held in close proximity to the upper surfaces indicated above. The upper arm section 71a2 terminates at its rear end in the T-shaped engaging portion 71b. On the other hand, the lower straight arm section 71a3 extends from the lower end of the curved section 71a1 rearwardly, of the steering column 5, and is held in contact with or in close proximity to the lower surface of the guide member 49 and the lower surface of the lower plate 41c2 of the break-away bracket 41. When the break-away bracket 41 is moved forward relative to the vehicle body, the lower arm section 71a3 is forced by a semi-cylindrical portion 49f of the guide member 49 in sliding contact with the semi-cylindrical portion 49f, and is plastically deformed along the curvature of the semi-cylindrical portion 49f. This semi-cylindrical portion 49f constitutes the guide portion 48 described above. This deformation of the lower arm section 71a3 results in absorbing the impact energy generated upon the above-described secondary collision, and a change in the longitudinal position of the energy absorbing plate 71 in which the curved section 71a1 is formed.

The T-shaped engaging portion 71b extends upwards from the rear end of the upper arm section 71a2 of the U-shaped portion 71a. In other words, the T-shaped engaging portion 71b is formed by bending the rear end section of the U-shaped portion 71a1 such that the T-shaped engaging portion 71b is perpendicular to the upper arm section 71a2. The T-shaped engaging portion 71b includes a pair of engaging pieces 71b1 and 71b2 formed at its upper end, such that the engaging pieces 71b1, 71b2 are engageable with the holding portion 31a of the body-side bracket 31 fixed to the vehicle body. Before the break-away bracket 41 is moved forward relative to the vehicle body, the T-shaped engaging portion 71b is rearwardly spaced by a predetermined distance L2 from an engaging position (indicated by phantom line in FIGS. 1 and 3) at which the T-shaped engaging portion 71b engages the holding portion 31a of the body-side bracket 31. Thus, there is provided a free running distance L2 between the T-shaped engaging portion 71b and the holding portion 31a (more precisely, the front end of a recessed part 31a1 of the holding portion 31a), so that the break-away bracket 41 and the energy absorbing plate 71 are freely movable relative to the body-side bracket 31 by the free running distance L2 from the initial position (before the movement). When the two engaging pieces 71b1, 71b2 of the engaging portion 71b are brought into engagement with the holding portion 31a of the body-side bracket 31, the engaging pieces 71b, 71b2 are subjected to a shearing stress.

As indicated above, the holding portion 31a of the body-side bracket 31 has the recessed part 31a1, which is open at its rear end in the rearward direction of the vehicle and with which the engaging portion 71b of the energy absorbing plate 71 is engageable. This recessed part 31a1 has a cutout having a width slightly larger than a width W1 of an upright part of the T-shaped engaging portion 71b. This cutout of the recessed part 31a1 functions as a guide for guiding a movement of the T-shaped engaging portion 71b relative to the holding portion 31a when the engaging portion 71b is brought into engagement with the holding portion 31a. The upper surface of the recessed part 31a1 is inclined in its rear end portion, to facilitate an initial action of engagement of the engaging portion 71b with the recessed part 31a1. (*2)

In the present first embodiment, the arcuate curved section 71a1 of the U-shaped portion 71a of the energy absorbing plate 71 has a smaller width than that of the other sections 71a2, 71a3, so that the impact energy absorbing load increases at a relatively low rate in an initial period of engagement of the engaging portion 71b with the holding portion 31a. Thus, the curved section 71a1 having the relatively smaller width dimension serves as an initial-load adjusting mechanism arranged to adjust the impact energy absorbing load in the initial period of engagement of the engaging portion 71b with the holding portion 31a.

Figure 4:
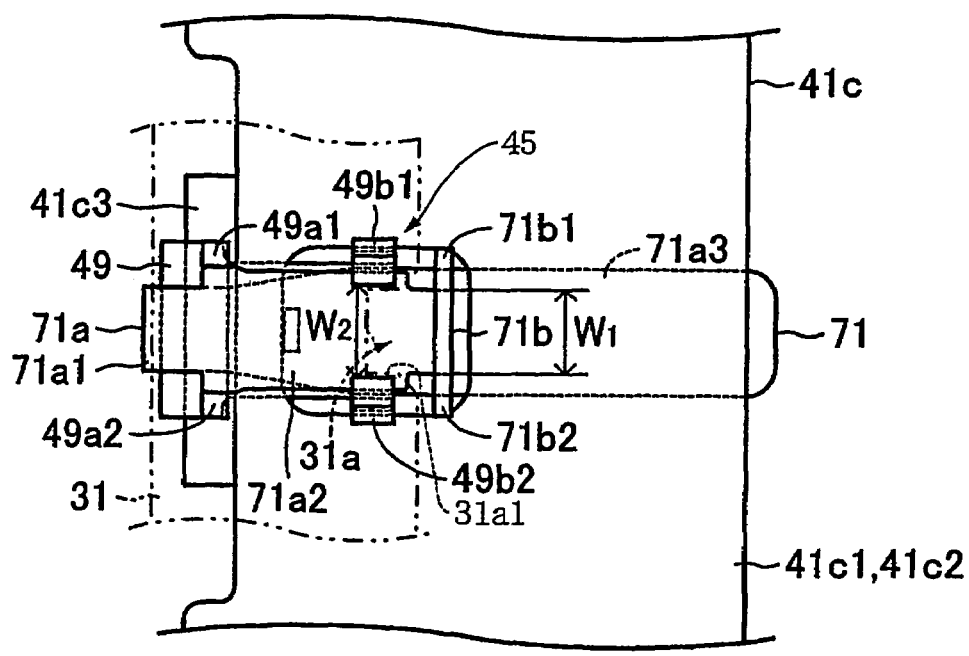
FIG. 4 is a plan view showing the relationship among the body-side bracket, break-away bracket, guide member, energy absorbing plate and other elements shown in FIG. 3.

The guide member 49 has a pair of upper positioning projections 49a1, 49a2 which are spaced apart from each other in the direction of width of the upper arm section 71a2, and a pair of upper positioning and holding pieces 49b1, 49b2 which are also spaced apart from each other in the above-indicated direction of width, as shown, in FIG. 4. The upper positioning projections 49a1, 49a2 are formed in the front end portion of the guide member 49, while the holding pieces 49b1, 49b2 are formed in the rear end portion of the guide member 49. The upper arm section 71a2 of the energy absorbing plate 71 is positioned in a relatively front portion thereof by and between the two upper positioning projections 49a1, 49a2 in the direction of width, and in a relatively rear portion thereof by and between the two upper positioning and holding pieces 49b1, 49b2 in the direction of width and in the direction of thickness. The front end portion of the lower arm section 71a3 has a width which gradually increases in the rearward direction from its front end toward its rear end, so that the impact energy absorbing load in the initial period of engagement of the engaging portion 71b with the holding portion 31a gradually increases. The guide member 49 further has a pair of lower positioning and holding pieces 49c1, 49c2 which are spaced apart from each other in the direction of width of the lower arm section 71a3, so that the lower arm section 71a3 is positioned in a longitudinally intermediate portion thereof by and between the lower positioning and holding pieces 49c1, 49c2 in the directions of width and thickness.

In the present first embodiment, the T-shaped engaging portion 71b has a length or height in the direction of thickness of the upper arm section 71a2, which is larger than a height of the upper positioning and holding pieces 49b1, 49b2 of the guide member 49. As shown in FIG. 4, the width W1 of the upright part of the T-shaped engaging portion 71b is made smaller than a distance between the two upper positioning and holding pieces 49b1, 49b2 of the guide member 49, so that the upright part is movable between the two upper positioning and holding pieces 49b1, 49b2 in the axial direction of the steering column 5.

Figure 7:
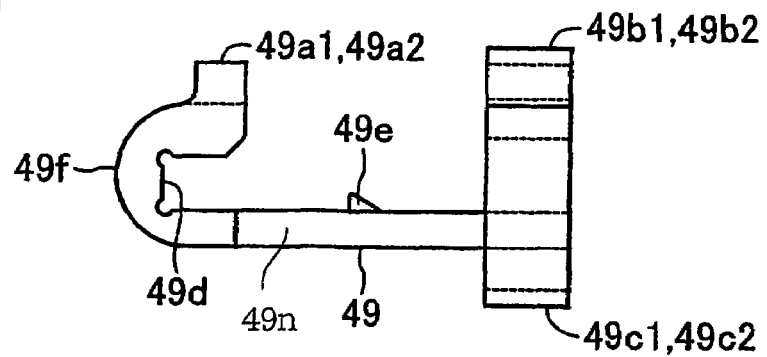
FIG. 7 is an enlarged side elevational view of the guide member shown in FIGS. 1-6.
Figure 8:
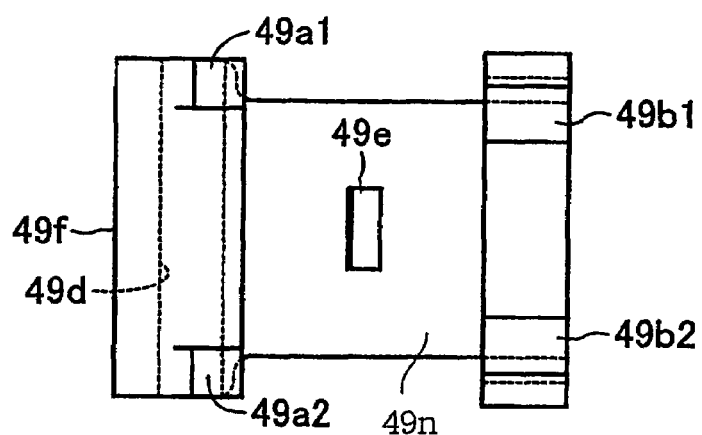
FIG. 8 is a plan view of the guide member shown in FIG. 7.
Figure 9:
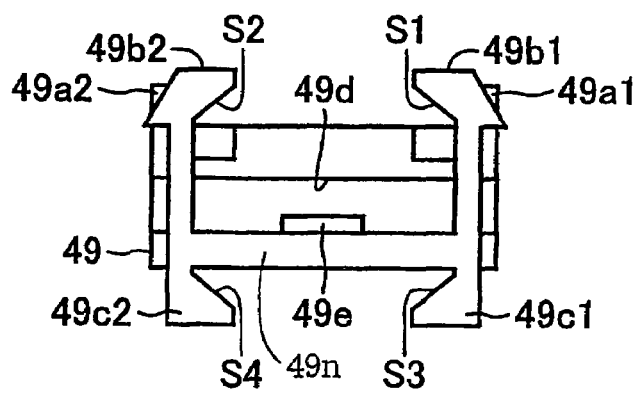
FIG. 9 is a rear elevational view of the guide member shown in FIG. 7.

As shown in FIGS. 7-9, the guide member 49 is generally J-shaped as seen in the plane of FIG. 7, and has the above-described two upper positioning projections 49a1, 49a2 and two upper positioning and holding pieces 49b1, 49b2 for positioning the upper arm section 71a2 of the energy absorbing plate 71, and the above-described two lower positioning and holding pieces 49c1, 49c2 for positioning the lower arm section 71a3 of the energy absorbing plate 71.

The guide member 49 has a recessed portion 49d and an engaging protrusion 49e for engagement with the projecting front end portion 41c3 of the break-away bracket 41, as shown in FIGS. 7-9, and the above-described semi-cylindrical portion 49f for plastically deforming the lower arm section 71a3 of the energy absorbing plate 71. The guide member 49 includes a rear extension 49n extending along the lower plate 41c2 of the break-away bracket 41, as shown in FIGS. 3 and 7, and the engaging protrusion 49e is formed on the rear extension 49n. The guide member 49, which is thus generally J-shaped as seen in FIG. 7, is mounted on the break-away bracket 41 such that the rear end face of the short upper arm on which the upper positioning projections 49a1, 49a2 are formed is held opposed to the front end of the upper plate 41c1 of the break-away bracket 41.

The two upper positioning and holding pieces 49b1, 49b2 are formed integrally with the rear extension 49n of the guide member 49, and extend through a through-hole 41d formed through the break-away bracket 41 such that the upper end portions of the upper positioning and holding pieces 49b1, 49b2 are located adjacent to the respective opposite side faces of the upper arm section 71a2 of the energy absorbing plate 71. As shown in FIG. 9, the upper end portions of the two upper positioning and holding pieces 49b1, 49b2 have respective slant surfaces S1 and S2 which are formed such that a distance between these two slant surfaces S1, S2 decreases in the upward direction in which the upper positioning and holding pieces 49b1, 49b2 extend from the rear extension 49n, that is, in a direction from the lower arm section 71a3 toward the upper arm section 71a2. The upper arm section 71a2 of the energy absorbing plate 71 is positioned in its directions of width and thickness, between each of the slant surfaces S1, S2 and the upper surface of the upper plate 41c1 of the break-away bracket 41.

The two lower positioning and holding pieces 49c1, 49c2 are also formed integrally with the rear extension 49n of the guide member 49, such that the lower positioning and holding pieces 49c1, 49c2 are located adjacent to the respective opposite side faces of the lower arm section 71a3 of the energy absorbing plate 71. As also shown in FIG. 9, the two lower positioning and holding pieces 49c1, 49c2 have respective slant surfaces S3 and S4 which are formed such that a distance between these two slant surfaces S3, S4 decreases in the downward direction in which the lower positioning and holding pieces 49c1, 49c2 extend from the rear extension 49n. The lower arm section 71a3 of the energy absorbing plate 71 is positioned in its directions of width and thickness, between each of the slant surfaces S3, S4 and the lower surface of the rear extension 49n of the guide member 49.

ii) Operation of Shock Absorbing Steering Apparatus of First Embodiment

In the shock absorbing steering apparatus according to the first embodiment of the invention described above, the break-away bracket 41 is moved and released from the body-side bracket 31 in the forward direction of the vehicle, with breakage of the resin capsules 42, in the event of a secondary collision of the vehicle operator or occupant with the steering wheel attached to the steering column 5, upon collision of the vehicle in question with any object such as a vehicle existing in front of the vehicle in question. As a result, a rear portion of the steering column 5 (referred to as "movable portion" of the steering column 5, which includes the outer tube 21 of the column body 25, and the break-away bracket 41 supporting the outer tube 21) is moved in the forward direction relative to the vehicle body. When the break-away bracket 41 is moved in the forward direction together with the movable portion of the steering column 5, the T-shaped engaging portion 71b of the energy absorbing plate 71 is brought into engagement with the recessed part 31a1 of the holding portion 31a of the body-side bracket 31.

After the engaging portion 71b of the energy absorbing plate 71 has been brought into engagement with the holding portion 31a of the body-side bracket 31, the break-away bracket 41 is further moved in the forward direction with the movable portion of the steering column 5, the straight lower arm section 71a3 of the U-shaped portion 71a of the energy absorbing plate 71 is plastically deformed by and along the semi-cylindrical portion 49f of the guide member 49 mounted on the front portion of the break-away bracket 49. In other words, the relative movement of the energy absorbing plate 71 relative to the mounting portion 45 for mounting the energy absorbing plate 71 causes plastic deformation of the lower arm section 71a3, so as to gradually change the position of the curved section 71a1 of the U-shaped portion 71a in the longitudinal direction of the energy absorbing plate 71. Described in greater detail, the front end portion of the instantly formed straight lower arm section 71a3 adjacent to the instantly formed curved section 71a1 is curved along the semi-cylindrical portion 49f, while the upper end part of the instantly formed curved section 71a1 which is adjacent to the instantly formed straight upper arm section 71a2 is straightened to contribute to new formation of the upper arm section 71a2. The plastic deformation of the U-shaped portion 71a of the energy absorbing plate 71 which takes place as described above results in absorption of the impact energy generated by the secondary collision of the vehicle occupant with the steering wheel. It is noted that the semi-cylindrical portion 49f of the guide member 49 which is held in pressing and sliding contact with the curved section 71a1 of the U-shaped portion 71a functions as the guide portion 48, which facilitates a change in the position of the curved section 71a1 by plastic deformation of the U-shaped portion 71a.

The column body 25 is axially contracted by more than the predetermined distance L1 from the initial position shown in FIGS. 1 and 2. Described in detail, the upper shaft 11 and the outer tube 21 are axially moved in the forward direction relative to the inner tube 22, by more than the predetermined distance L1, so that the ribs 61b of the energy absorbing member 61 undergo plastic or shearing deformation. This deformation of the ribs 61*b* also contribute to absorption of the impact energy generated by the secondary collision indicated above.

iii) Advantages of Shock Absorbing Steering Apparatus of First Embodiment

The shock absorbing steering apparatus constructed according to the first embodiment has various structural features which provide various advantages, some of which will be described below:

[1] In the first embodiment, the energy absorbing plate 71 is held by only the break-away bracket 41 fixed to the body-side bracket 31, so that the energy absorbing plate 71 can be easily mounted on the steering column 5, with a higher degree of positioning accuracy of the energy absorbing plate 71 relative to the vehicle body, than the energy absorbing plate provided in the conventional shock absorbing steering apparatus described above under the heading "BACKGROUND ART". Accordingly, the present shock absorbing steering apparatus suffers from a reduced amount of variation in the energy absorbing characteristic. The energy absorbing plate 71 is not required to be fixed at its rear end to the column body 25, leading to reduction in the cost of assembling of the steering apparatus.

[2] In the first embodiment, the break-away bracket 41 is fixed to the body-side bracket 31, at its right and left arms 41*a*, 41*b* that are spaced from each other in the lateral direction of the vehicle, and the energy absorbing plate 71 is mounted on the central portion 41*c* of the break-away bracket 41. Namely, the central portion 41*c* of the break-away bracket 41 is effectively utilized to hold the energy absorbing plate 71.

[3] In the first embodiment, the break-away bracket 41 holds the column body 25 such that the axial length of the column body 25 is adjustable by the telescopic mechanism 36, and such that the column body 25 is pivotable or tiltable through the tilting mechanism 35. In this arrangement, a tilting movement and an adjustment of the axial length of the column body 25 do not cause a movement of the break-away bracket 41 holding the energy absorbing plate 71, so that the energy absorbing plate 71 is operable as intended, irrespective of the operating states of the tilting mechanism 35 and the telescopic mechanism 36.

[4] In the first embodiment, the U-shaped portion 71*a* of the energy absorbing plate 71 includes the upper and lower arm sections 71*a*2, 71*a*3 which sandwich the front portion of the break-away bracket 41 in the direction of thickness of the break-away bracket 41, and further includes the engaging portion 71*b* which extends from the rear end of the upper arm section 71*a*2 in the direction of thickness of the break-away bracket 41. In this arrangement, the energy absorbing plate 71 can be easily mounted on the break-away bracket 41, by fitting the U-shaped portion 71*a* on the front portion of the break-away bracket 41, before the break-away bracket 41 is fixed to the body-side bracket 31.

[5] In the first embodiment, the impact energy generated by the secondary collision of the vehicle occupant with the steering wheel attached to the steering column 5 can be absorbed by plastic deformation of the lower arm section 71*a*3 of the U-shaped portion 71*a* of the energy absorbing plate 71 by the guide portion 48 provided on the break-away bracket 41, in the process of a displacement of the break-away bracket 41 relative to the energy absorbing plate 71, while the engaging portion 71*b* of the energy absorbing plate 71 is held in engagement with the holding portion 31*a* of the body-side bracket 31, after the break-away bracket 41 is moved and released from the body-side bracket 31 in the forward direction of the vehicle due to the secondary collision. The preset shock absorbing steering apparatus capable of thus absorbing the impact energy is relatively simple in construction with a relatively small number of components.

[6] The energy absorbing plate 71 used in the present first embodiment is a single elongate metallic strip, which is provided at its rear end with the engaging portion 71*b* which is engageable with the holding portion 31*a* of the body-side bracket 31, such that the engaging portion 71*b* receives a shearing load or stress. This arrangement makes it possible to reduce the thickness and width dimensions of the engaging portion 71*b* while maintaining required degrees of strength and rigidity of the engaging portion 71*b*. The thickness of the energy absorbing plate 71 and the width dimensions of the U-shaped portion 71*a* and engaging portion 71*b* can be determined as needed for the energy absorbing plate 71 to be able to exhibit the desired energy absorbing characteristic, while assuring the required strength and rigidity of the engaging portion 71*b*.

[7] In the present first embodiment provided with the initial-load adjusting mechanism, the impact energy absorbing load is increased at a relatively low rate in an initial period of engagement of the engaging portion 71*b* with the holding portion 31*a*, that is, in an initial period of absorption of the impact energy. Accordingly, the impact energy can be smoothly absorbed, without an abrupt increase of the impact energy absorbing load which would cause an accordingly large impact on the vehicle operator or occupant. While the initial-load adjusting mechanism is provided on the energy absorbing plate 71 serving as the impact energy absorbing member in the first embodiment, it is not essential to provide the energy absorbing member with the initial-load adjusting mechanism. That is, the initial-load adjusting mechanism may be provided between the impact energy absorbing member and at least one of the vehicle body and the break-away bracket 41, in addition to or in place of the initial-load adjusting mechanism provided on the impact energy absorbing member. This modification also applies to the other embodiments described below.

[8] In the first embodiment, there is provided the free-running distance L2 between the T-shaped engaging portion 71*b* of the energy absorbing plate 71 and the holding portion 31*a* of the body-side bracket 31, so that the engaging portion 71*b* is freely movable by this free-running distance L2 in the initial period of the secondary collision. Accordingly, the moment of generation of the impact energy absorbing load upon deformation of the U-shaped portion 71*a* of the energy absorbing plate 71 by the break-away bracket 41 is suitably delayed with respect to the moment at which the break-away bracket 41 is released from the vehicle body (body-side bracket 31). Accordingly, the impact generated in the initial period of the secondary collision can be made smaller in the present arrangement, than in an arrangement in which the deformation of the energy absorbing plate 71 is initiated as soon as the break-away bracket 41 has been released from the vehicle body. It is also noted that the moment at which the impact energy absorbing load is generated by deformation of the U-shaped portion 71*a* of the energy absorbing plate 71 by the break-away bracket 41 can be suitably adjusted as needed by adjusting the free-running distance L2.

[9] In the first embodiment wherein the holding portion 31*a* of the body-side bracket 31 has the recessed part 31*a*1 having a cutout open at its rear end, the engaging portion 71*b* of the energy absorbing plate 72 is engageable with this recessed part 31*a*1. The above-indicated free-running distance L2 is provided between the engaging portion 71*b* and the front end of the cutout of the recessed part 31*a*1. Thus, the recessed part 31*a*1 functions as guiding means for guiding a movement of the engaging portion 71*b* relative to the holding portion 31*a*, to thereby assure high stability of engagement of the engaging portion 71*b* with the holding portion 31*a*, even in the presence of the free-running distance L2. In the presence of the recessed part 31*a*1, the provision of the free-running distance L2 does not require the engaging portion 71*b* to be spaced a large distance apart from the holding portion 31*a* in the rearward direction of the vehicle.

[10] In the present first embodiment, the two plates 41*c*1, 41*c*2 superposed on each other are used to constitute the mounting portion 45 of the break-away bracket 41 on which the guide member 49 and the U-shaped energy absorbing plate 71 are mounted, that is, to constitute the substantially central portion 41*c* of the break-away bracket 41. The lower plate 41*c*2 has the projecting front end portion 41*c*3 which projects a suitable distance from the front end of the upper plate 41*c*1 in the forward direction and which receives a load via the guide member 49 when the energy absorbing plate 71 is deformed in pressing and sliding contact with the guide member 49, to absorb the impact energy. This arrangement eliminates a need of bending the break-away bracket 41 to form the projecting front end portion 41*c*3, leading to reduction in the cost of manufacture of the break-away bracket 41.

[11] In the present embodiment wherein the projecting front end portion 41*c*3 described above is provided by one of the two plates 41*c*1, 41*c*2 which projects from the other plate in the forward direction, the projecting front end portion 41*c*3 is suitably protected from being bent due to a load received through the guide member 49, so that the energy absorbing plate 71 can be deformed in the intended manner, in pressing and sliding contact with the guide member 49, for absorbing the impact energy. Accordingly, the stability in the amount of absorption of the impact energy by deformation of the energy absorbing plate 71 can be improved.

[12] In the present embodiment wherein the lower plate 41*c*2 has the projecting front end portion 41*c*3 projecting from the front end of the upper plate 41*c*1, the generally J-shaped guide member 49 is mounted on the projecting front end portion 41*c*3 such that the rear end face of the short upper arm of the J-shaped guide member 49 is held opposed to the front end of the upper plate 41*c*1 of the break-away bracket 41. In this arrangement, the upper arm section 71*a*2 of the t-shaped energy absorbing plate 71 can be displaced in contact with or in close proximity to the upper surface of the upper plate 41*c*1, so that the distance between the upper and lower arm sections 71*a*2, 71*a*3 of the energy absorbing plate 71 can be reduced.

[13] In the first embodiment, the upper arm section 71*a*2 of the U-shaped energy absorbing plate 71 is positioned and held with respect to the break-away-bracket 41, by positioning and holding means including the pair of upper positioning projections 49*a*1, 49*a*2 and the pair of upper positioning and holding pieces 49*b*1, 49*b*2 which are formed integrally with the guide member 49. The positioning and holding means assures stable engagement of the engaging portion 71*b* of the energy absorbing plate 71 with the holding portion 31*a* of the body-side bracket 31, with the upper arm section 71*a*2 being positioned relative to the break-away bracket 41, when the break-away bracket 41 is axially moved relative to the body-side bracket 31. The stable engagement of the engaging portion 71*b* with the holding portion 31*a* is permitted even in the presence of the free-running distance L2 between the holding portion 31*a* of the body-side bracket 31 and the T-shaped engaging portion 71*b* formed integrally with the upper arm section 71*a*2 of the energy absorbing plate 71.

[14] In the present first embodiment, the pair of upper positioning and holding pieces 49*b*1, 49*b*2 are formed integrally with the relatively long lower arm of the J-shaped guide member 49, in the form of the rear extension 49*n* extending in the rearward direction. In this arrangement, the upper arm section 71*a*2 of the U-shaped energy absorbing plate 71 is positioned relative to the break-away bracket 41, at the rear end of the rear extension 49*n* which is spaced a considerably large distance from the semi-cylindrical portion 49*f* of the guide member 49 in the rearward direction, so that the upper arm section 71*a*2 by the upper positioning and holding pieces 49*b*1, 49*b*2 can be positioned with high accuracy relative to the break-away bracket 41.

[15] In the present embodiment, the pair of lower positioning and holding pieces 49*c*1, 49*c*2 for positioning the lower arm 71*a*3 of the U-shaped energy absorbing plate 71 are also formed integrally with the rear extension 49*n* of the J-shaped guide member 49. Namely, the lower positioning and holding pieces 49*c*1, 49*c*2 function as a lower positioning and holding portion provided on the rear extension 49*n* of the guide member 49. The positioning and holding means 49*a*1, 49*a*2, 49*b*1, 49*b*2 and the holding portion 49*c*1, 49*c*2 constitute a compact positioning structure for positioning the upper and lower arm sections 71*a*2, 71*a*3 of the U-shaped energy absorbing plate 71, so as to assure a high degree of accuracy of positioning of the energy absorbing plate 71 relative to the break-away bracket 41 in the directions of width and thickness of the plate 71.

Figure 10:
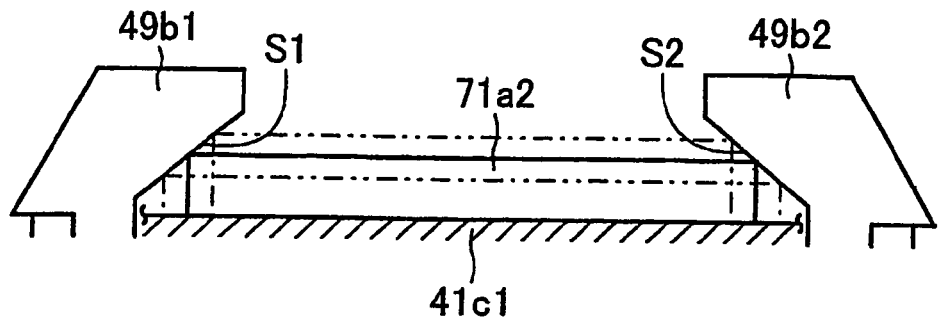
FIG. 10 is an enlarged fragmentary front elevational view showing a relationship between the guide member and energy absorbing plate shown in FIG. 3.

[16] In the first embodiment, the upper end portions of the upper positioning and holding pieces 49*b*1, 49*b*2 formed on the rear extension 49*n* of the guide member 49 have the opposed slant, surfaces S1 and S2 which are formed such that the distance between these slant surfaces S1, S2 decreases in the upward direction. The upper positioning and holding pieces 49*b*1, 49*b*2 having the slant surfaces S1, S2 permit accurate positioning of the energy absorbing plate 71, irrespective of the specific thickness and width dimensions of the energy absorbing plate 71 which are selected to adjust the desired amount of absorption of the impact energy, as indicated in FIG. 10. This advantage is also provided by the lower positioning and holding pieces 49*c*1, 49*c*2 which are also formed on the rear extension of the guide member 49 and which have the opposed slant surfaces S3 and S4 formed such that the distance between these slant surfaces S3, S4 decreases in the downward direction, as shown in FIG. 9.

[17] In the present first embodiment, the width W1 of the upright part of the T-shaped engaging portion 71*b* of the energy absorbing plate 71 is made smaller than a distance W2 between the two upper positioning and holding pieces 49*b*1, 49*b*2 of the guide member 49, so that the upright part of the engaging portion 71*b* is movable between the upper positioning and holding pieces 49*b*1, 49*b*2 in the direction of movement of the break-away bracket 41 relative to the body-side bracket 31. This dimensional relationship between the width W1 of the upright portion of the engaging portion 71*b* and the distance W2 between the upper positioning and holding pieces 49*b*1, 49*b*2 permits easy mounting of the energy absorbing plate 71 on the break-away bracket 41 with the guide member 49 attached thereto, by moving the U-shaped energy absorbing plate 71 in the rearward direction relative to the break-away bracket 41, with the upright portion of the T-shaped engaging portion 71*b* being passed between the two upper positioning and holding pieces 49*b*1, 49*b*2.

iv) Modification of Shock Absorbing Steering Apparatus of First Embodiment.

Figure 11:
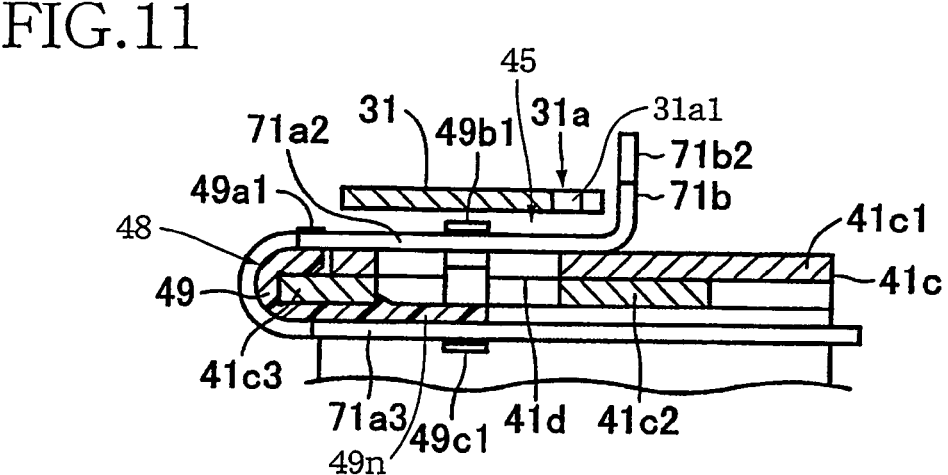
FIG. 11 is a fragmentary side elevational view in axial cross section showing a modification of the shock absorbing steering apparatus of the first embodiment shown in FIGS. 1-10.

The energy absorbing plate 71 is mounted on the break-away bracket 41 and the guide member 49, such that the upper arm section 71a2 is supported at its front end portion by the upper surfaces of the guide member 49 and the upper plate 41c1 of the break-away bracket 41, and is positioned at its rear end portion by the upper positioning and holding pieces 49b1, 49b2 of the guide member 49, as shown in FIG. 3. Namely, the upper arm section 71a2 is supported at its lower surface by a portion of the mounting portion 45 of the break-away bracket 41. However, this arrangement to support the upper arm section 71a2 of the energy absorbing plate 71 may be modified, as shown in FIG. 11. In this modification, the upper arm section 71a2 is supported at its front end portion by the upper surfaces of the guide member 49 and the upper plate 41c1, at its intermediate portion by the upper positioning and holding pieces 49b1, 49b2 of the guide member 49, and at its rear end portion by the upper surface of the upper plate 41c1. In this modification, too, the upper arm section 71a2 is supported at its lower surface by a portion of the mounting portion 45 of the break-away bracket 41. However, the upper positioning and holding pieces 49b1, 49b2 for positioning the upper arm section 71a2 at its intermediate portion cooperate with the guide member 49 and the upper plate 41c1 for supporting the upper arm section 71a2 at its front and rear end portions, to position the upper arm section 71a2 in its direction of thickness, with higher accuracy relative to the break-away bracket 41, while holding the upper arm section 71a2 against the break-away bracket 41 with a sufficiently large force.

Second Embodiment

In the first embodiment, the upper arm section 71a2 of the U-shaped energy absorbing plate 71 is positioned by the pair of upper holding pieces 49b1, 49b2 of the guide member 49, as shown in FIG. 3. In a second embodiment shown in FIG. 12, however, the upper arm section 71a2 is supported by positioning and holding means in the form of a rectangular three-sided clip 81. In the other aspects, the shock absorbing apparatus according to the present second embodiment is identical in construction and operation with that of the first embodiment described above, and the second embodiment has the advantages [1] through [13] described above with respect to the first embodiment.

Figure 12:
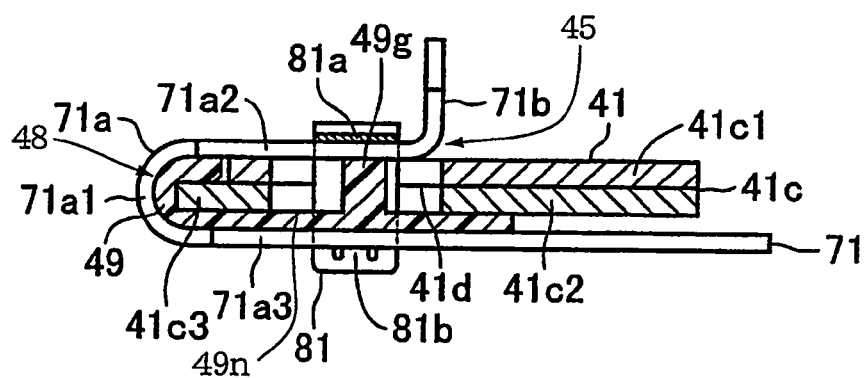
FIG. 12 is a fragmentary side elevational view in axial cross section showing a shock absorbing steering apparatus constructed according to a second embodiment of this invention.
Figure 13:
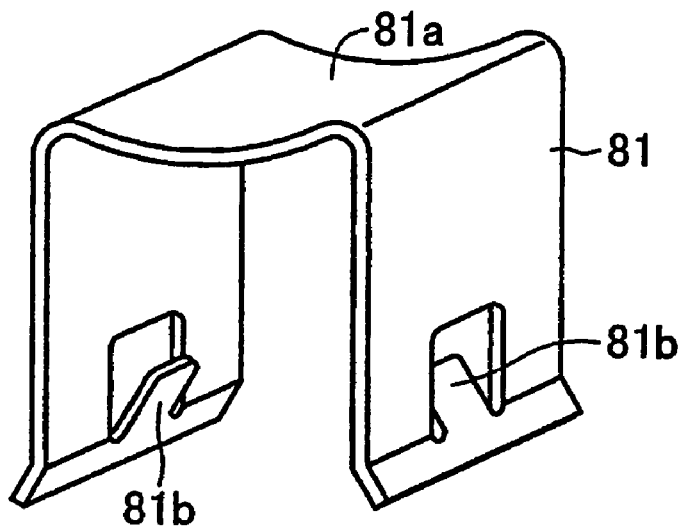
FIG. 13 is an enlarged perspective view of a rectangular three-sided clip shown in FIG. 12.

The rectangular three-sided clip 81 is formed from a metallic sheet into a structure having three sides consisting of one side in the form of an elastically deformable intermediate curved section 81a, and two opposed sides connected by the curved section 81a, as shown in FIG. 13. The curved section 81a is curved toward the interior space defined by the three sides, and has a convex inner surface for elastically contacting the upper surface of the upper arm section 71a2 of the energy absorbing plate 71. The two opposed sides of the three-sided clip 81 have respective elastically deformable engaging jaws 81b for elastically contacting the lower surface of the lower arm section 71a3 of the energy absorbing plate 71. The curved section 81a and engaging jaws 81b cooperate to constitute an elastically deformable portion for elastically engaging the upper and lower arm sections 71a2, 71a3 of the plate 71. The rectangular three-sided clip 81 is assembled with respect to the break-away bracket 41, and the guide member 49 and the energy absorbing plate 71 which have been mounted on the central portion 41c of the break-away bracket 41. The break-away bracket 41 has a through-hole 41d, so that the three-sided clip 81 can be inserted through the through-hole 41d in the direction from the upper arm section 71a2 toward the lower arm section 71a3, so as to hold the upper and lower arm sections 71a2, 71a3 in elastically pressing contact with the curved section 81a and the upper ends of the engaging jaws 81b, as shown in FIG. 12. The three-sided clip 81 can be released from the energy absorbing plate 71 when the energy absorbing plate 71 is displaced after the T-shaped engaging portion 71b is brought into engagement with the holding portion 31a of the body-side bracket 31.

As also shown in FIG. 12, the guide member 49 includes a support projection 49g formed on the rear extension 49n. The curved section 81a and the engaging jaws 81b of the rectangular three-sided clip 81 force the upper arm section 71a2 against the upper surface of the upper plate 41c1 of the break-away bracket 41 and the upper surface of the support projection 49g of the guide member 49, and forces the lower arm section 71a3 against the lower surface of the rear extension 49 of the guide member 49. Thus, the guide member 49 and the energy absorbing plate 71 are assembled with respect to the central portion 41c of the break-away bracket 41 in pressing contact with each other. In this second embodiment, the guide member 49, more specifically, the support projection 49g functions as a supporting portion of the mounting portion 45, which cooperates with the three-sided clip 81 to function to elastically hold therebetween the upper arm section 71a2 of the energy absorbing plate 71 in pressing contact therewith in the direction of thickness of the upper arm section 71a2.

In the present second embodiment, the upper and lower arm sections 71a2 and 71a3 of the energy absorbing plate 71 are elastically positioned and held by and between the rectangular three-sided clip 81 in the direction of thickness of the arm sections. Thus, the energy absorbing plate 71 is mounted on the break-away bracket 41 without a risk of rattling movements of the energy absorbing plate 71 relative to the break-away bracket 41. The second embodiment is also advantageous in that the thickness of the energy absorbing plate 71 can be selected within a certain range corresponding to a maximum amount of elastic deformation of the curved section 81a of the clip 81, without having to change the configuration of the clip 81. Thus, the present embodiment is effective where the amount of impact energy that can be absorbed by the energy absorbing plate 71 is adjusted by suitably tuning the thickness of the energy absorbing plate 71. Further, the impact energy generated by the secondary collision described above can be absorbed in the intended manner, by the elastic deformation of the energy absorbing plate 71, owing to the automatic releasing of the three-sided clip 81 from the energy absorbing plate 71 when the plate 71 is displaced relative to the break-away bracket 41 after the T-shaped engaging portion 71b is brought into engagement with the holding portion 31a of the body-side bracket 31.

Figure 14:
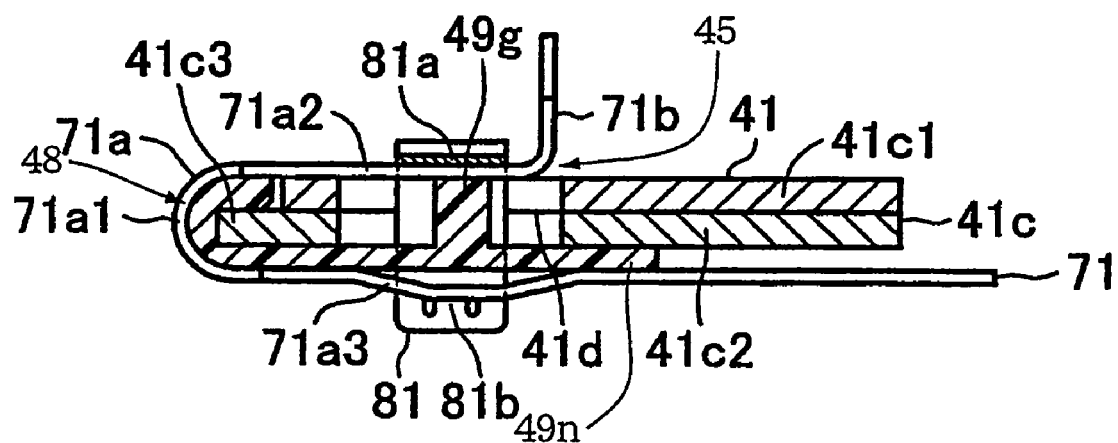
FIG. 14 is a fragmentary side elevational view in axial cross section showing a modification of the shock absorbing steering apparatus of the second embodiment shown in FIG. 12.

Referring next to FIG. 14, there is shown a modification of the second embodiment, wherein the lower arm section 71a3 of the energy absorbing plate 71 is partially curved at its intermediate portion in the direction away from the lower surface of the rear extension 49n of the guide member 49. This curved intermediate portion of the lower arm section 71a3 is elastically deformable and is held in elastically pressing contact at its lower surface with the engaging jaws 81b of the three-sided clip 81. In this modification of FIG. 14, the thickness of the energy absorbing plate 71 can be selected within a range wider than that in the second embodiment.

Third Embodiment

Figure 15:
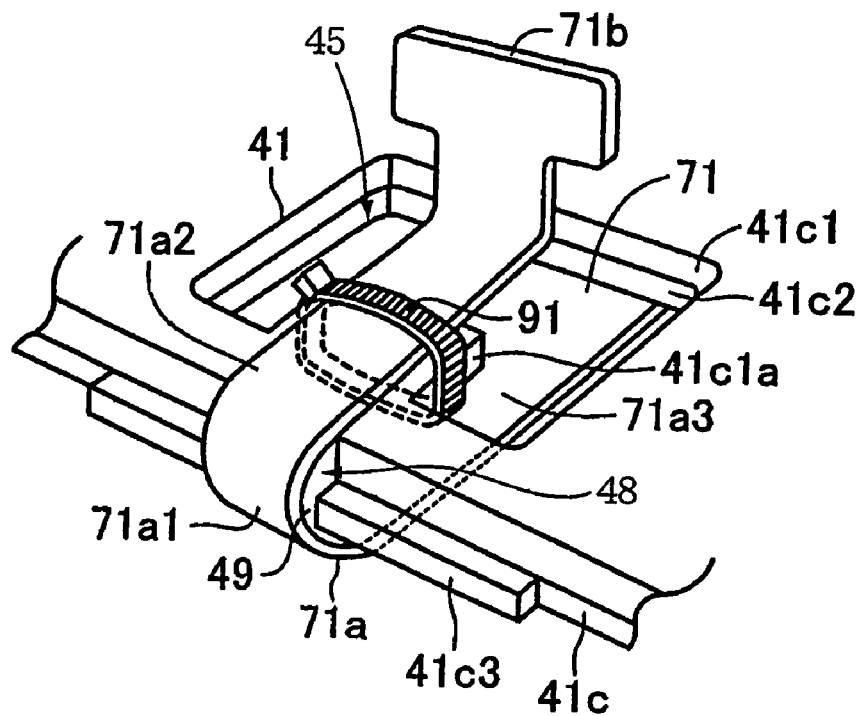
FIG. 15 is a fragmentary perspective view of a shock absorbing steering apparatus constructed according to a third embodiment of the invention.

A third embodiment of this invention is shown in FIG. 15. In this third embodiment, the upper arm section 71a2 of the energy absorbing plate 71 is positioned and held with respect to the break-away bracket 41 by positioning and means in the form of a holding band 91. In the other aspects, the third embodiment is identical in construction and operation with the first embodiment, and has the advantages [1] through [13] described above with respect to the first embodiment.

The holding band 91 is variable in its effective length of holding, and is arranged to hold together the upper arm section 71a2 of the energy absorbing plate 71 and a support piece 41c1a formed on the upper plate 41c1 of the break-away bracket 41. This support piece 41c1a functions as the supporting portion provided on the mounting portion 45. The holding band 91 is broken down or fractured when a load larger than a predetermined threshold acts on the holding band 91. That is, the holding band 91 is broken down when the energy absorbing plate 71 is displaced relative to the break-away bracket 41 after the T-shaped engaging portion 71b is brought into engagement with the holding portion 30a of the body-side bracket 31.

In the present third embodiment, the thickness and width of the energy absorbing plate 71 can be selected within relatively wide ranges, without having to change the configuration of the holding band 91, since the holding band 91 is capable of positioning and holding the upper arm section 71a2 of the energy absorbing plate 71 with respect to the break-away bracket 41, irrespective of the specific thickness and width of the plate 71 within the above-indicated ranges. In this respect, the cost of manufacture of the present steering apparatus can be reduced. Further, the impact energy can be absorbed in the intended manner by elastic deformation of the energy absorbing plate 71 in pressing and sliding contact with the guide member 49, since the holder band 91 is automatically broken down when the plate 71 is displaced relative to the break-away bracket 41 after the engaging portion 71b is brought into engagement with the holding portion 31a of the body-side bracket 31.

Figure 16:
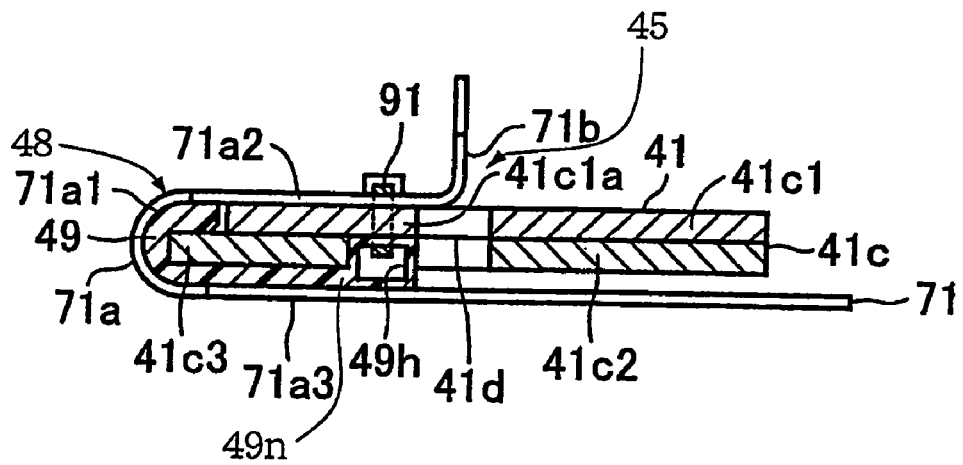
FIG. 16 is a fragmentary side elevational view showing a first modification of the shock absorbing steering apparatus of the third embodiment shown in FIG. 15.
Figure 17A:
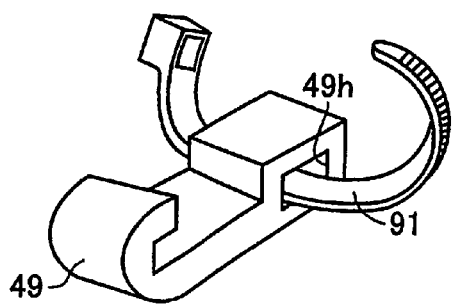
FIG. 17A is an enlarged perspective view of a guide member and a binding band shown in FIG. 16.
Figure 17B:
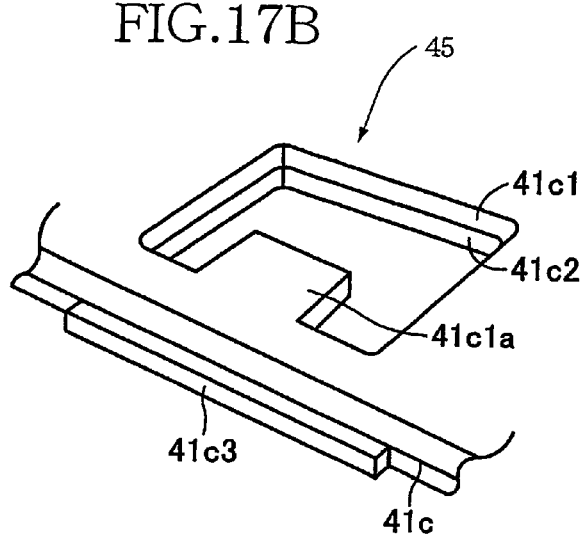
FIG. 17B is a fragmentary perspective view of a break-away bracket shown in FIG. 16.

Referring to FIGS. 16 and FIGS. 17A and 17B, there is shown a first modification of the third embodiment of the invention, wherein the rear extension 49n of the guide member 49 has an attaching hole 49h through which the holding band 91 is inserted. In this modification, the holding band 91 is prevented from being removed away from the support piece 41c1a of the upper plate 41c1 of the break-away bracket 41, in the rearward direction, and is operable to achieve the intended positioning and holding function with high stability.

Figure 18:
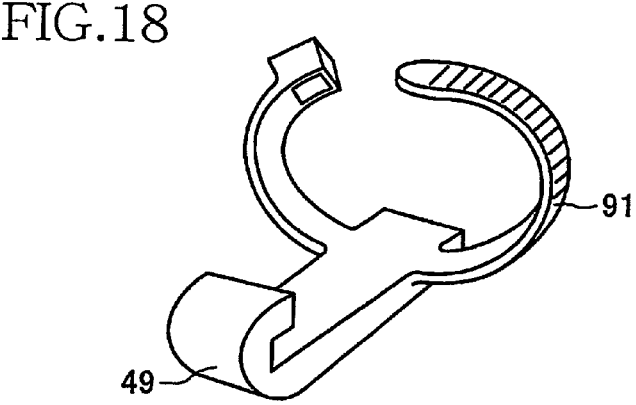
FIG. 18 is a fragmentary perspective view showing a second modification of the shock absorbing steering apparatus of the third embodiment, wherein the guide member and binding band shown in FIGS. 16 and 17 are formed integrally with each other.

FIG. 18 shows a second modification of the third embodiment, wherein the holding band 91 is formed integrally with the rear extension 49n of the guide member 49, such that the holding band 91 is adjustable in its holding force and broken down when a load acting thereon exceeds a given threshold. In this modification, the costs of manufacture and assembling of the steering apparatus can be reduced owing to the holding band 91 integral with the guide member 49.

Figure 19:
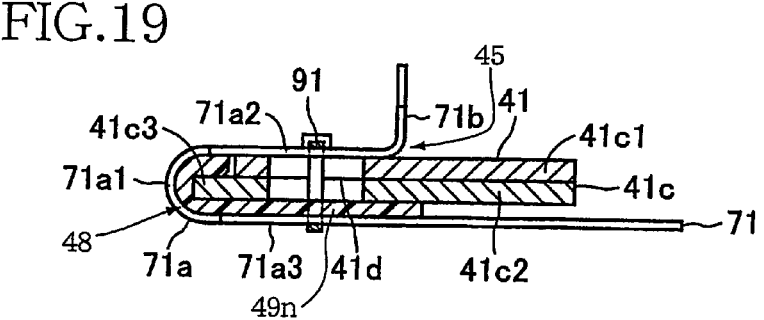
FIG. 19 is a fragmentary side elevational view in axial cross section showing a third modification of the shock absorbing steering apparatus of the third embodiment shown in FIG. 15.

FIG. 19 shows a third modification of the third embodiment, wherein the lengths of the upper arm section 71a2 of the energy absorbing plate 71 and the rear extension 49n of the guide member 49 are determined such that the rear ends of the upper arm section 71a2 and the rear extension 49n are located on the rear side of the through-hole 41d formed through the break-away bracket 41. The upper and lower arm sections 71a2 and 71a3 of the energy absorbing plate 71 and the rear extension 49n are held together by the holding band 91, which is also adjustable in its holding force and broken down when the load acting on the holding band 91 exceeds the threshold. In this modification, the holding band 91 prevents rattling movements of the energy absorbing plate 71 relative to the break-away bracket 41. In this modification, the upper plate 41c1 of the break-away bracket 41 functions as the supporting portion.

Figure 20:
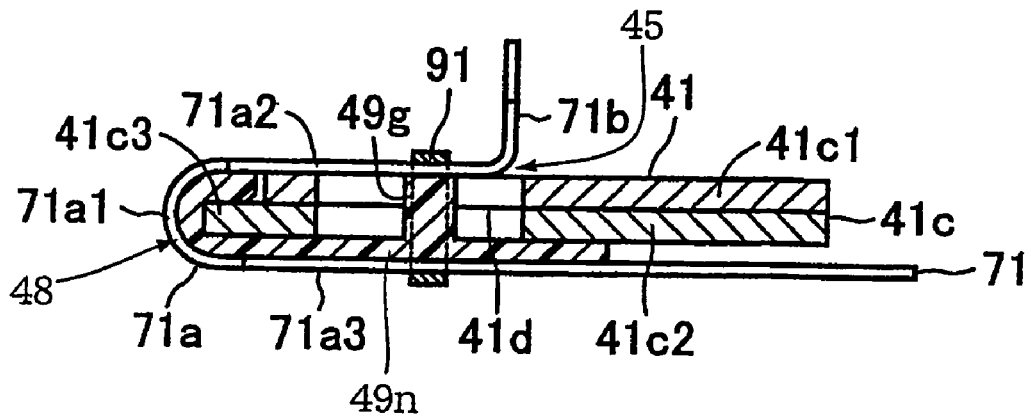
FIG. 20 is a fragmentary side elevational view in axial cross section showing a fourth modification of the shock absorbing steering apparatus of the third embodiment of FIG. 15.

FIG. 20 shows a fourth modification of the third embodiment, wherein the rear end of the upper arm section 71a2 of the energy absorbing plate 71 is not located on the rear side of the through-hole 41d of the break-away bracket 41, while the rear end of the rear extension 49n of the guide member 49 is located on the rear side of the through-hole 41d. Further, the support projection 49g is formed integrally with the rear extension 49n. In this modification, the upper and lower arm sections 71a2, 71a3, and the rear extension 49n and support projection 49g of the guide member 49 are held together by the holding band 91, which is also adjustable in its holding force and broken down when the load acting on the holding band 91 exceeds the threshold. In this modification, too, the holding band 91 prevents rattling movements of the energy absorbing plate 71 relative to the break-away bracket 41.

Fourth Embodiment

Figure 21:
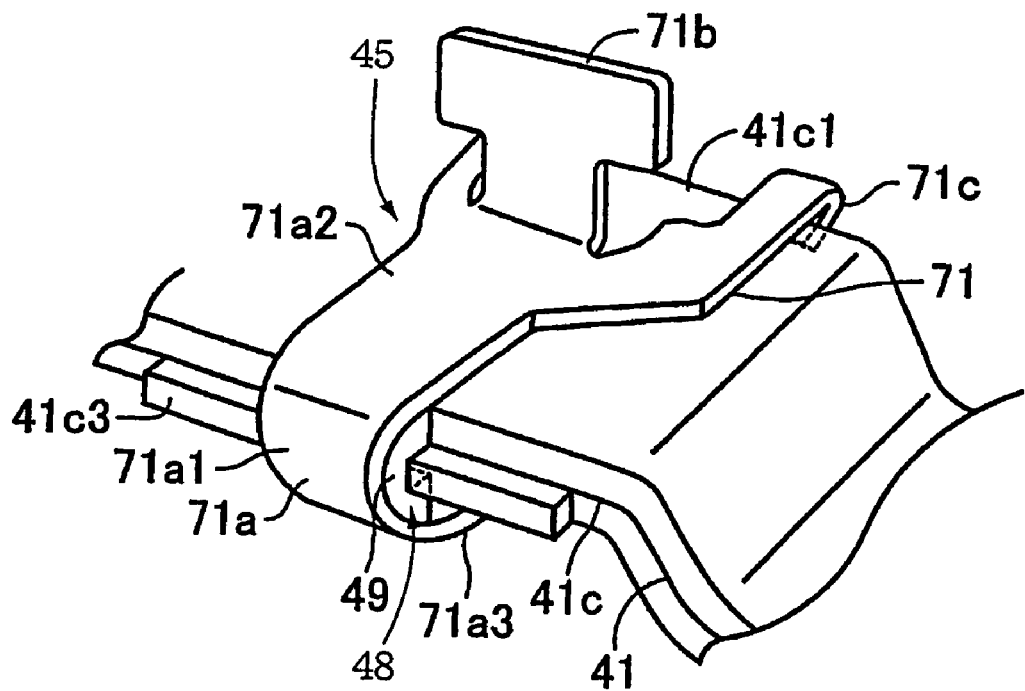
FIG. 21 is a fragmentary perspective view schematically illustrating a shock absorbing steering apparatus constructed according to a fourth embodiment of this invention.
Figure 23:
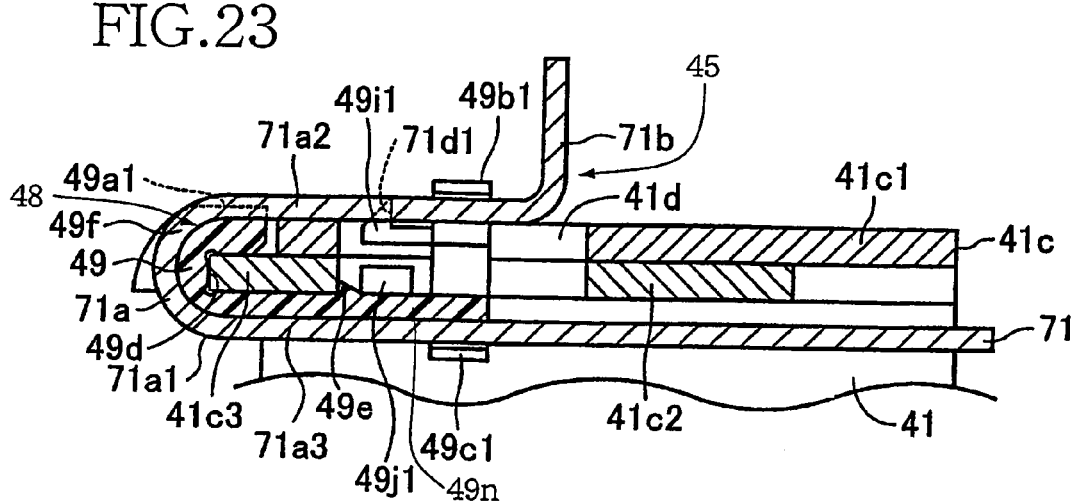
FIG. 23 is an enlarged fragmentary side elevational view in axial cross section showing a relationship among a break-away bracket, a guide member, an energy absorbing plate and other elements that are shown in FIG. 22.
Figure 24:
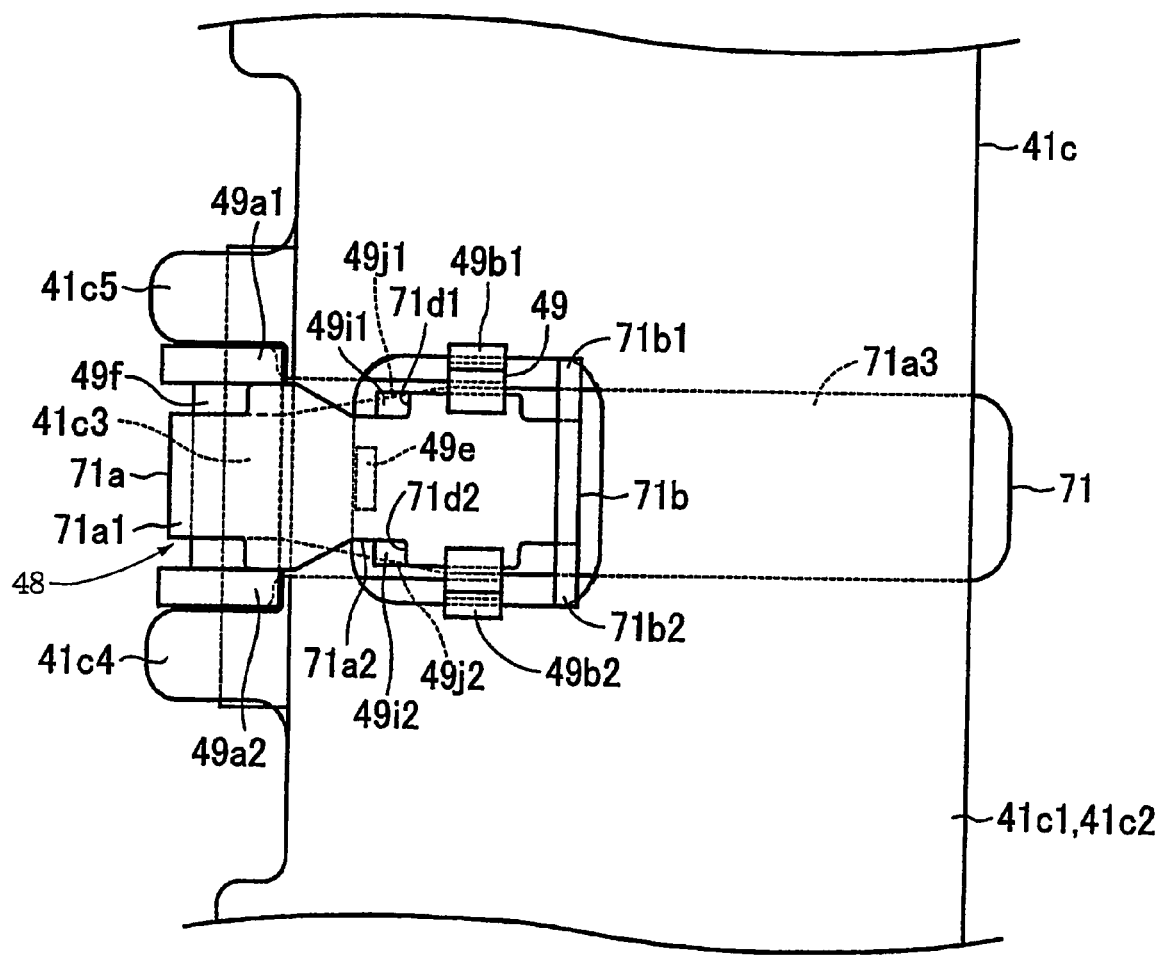
FIG. 24 is a plan view showing the relationship among the break-away bracket, guide member, energy absorbing plate and other elements shown in FIG. 23.

Referring next to FIG. 21, there is shown a fourth embodiment of this invention, wherein the upper arm section 71a2 of the energy absorbing plate 71 has U-shaped bent holding parts 71c formed at its rear end. The bent holding parts 71c function as the positioning and holding means for positioning and holding the energy absorbing plate 71 with respect to the break-away bracket 41. The bent holding parts 71c grip the rear end of the upper plate 41c1 of the break-away bracket 41, and is elastically deformable so that the bent holding parts 71c are released from the upper plate 41c1 when the energy absorbing plate 71 is displaced relative to the break-away bracket 41 after the engaging portion 71b is brought into engagement with the holding portion 31a of the body-side bracket 31. In the other aspects, the shock absorbing steering apparatus according to the present fourth embodiment is identical in construction and operation with the first embodiment, and the fourth embodiment has the advantages [1] through [13] described above with respect to the first embodiment.

In the fourth embodiment wherein the upper arm section 71a2 of the energy absorbing plate 71 includes the U-shaped bent holding parts 71c, the energy absorbing plate 71 can be positioned and held with respect to the break-away bracket 41, by simply designing the bent holding parts 71c depending upon the specific thickness and width of the energy absorbing plate 71. Further, the impact energy can be absorbed in the intended manner by elastic deformation of the energy absorbing plate 71 in pressing and sliding contact with the guide member 49, since the bent holding parts 71c are automatically broken down when the plate 71 is displaced relative to the break-away bracket 41 after the engaging portion 71b is brought into engagement with the holding portion 31a of the body-side bracket 31.

Fifth Embodiment

Referring to FIGS. 22-25, there is shown a fifth embodiment of this invention, wherein the central portion 41c of the break-away bracket 41 is constituted by the two plates 41c1, 41c2, as in the first embodiment, and a laterally central part of the front end portion of the lower plate 41c2 extends a suitable distance from the front end of the upper plate 41c1 in the forward direction, as the projecting front end portion 41c3. The guide member 49 formed of a resin material is mounted on this projecting front end portion 41c3.

In the fifth embodiment, the guide member 49 mounted on the projecting front end portion 41c3 of the lower plate 41c2 is positioned by and between a pair of positioning projections 41c4 and 41c5 formed on the upper plate 41c1, in the direction of width. These positioning projections 41c4, 41c5 prevent rattling movements of the guide member 49 relative to the break-away bracket 41 in the direction of width of the energy absorbing plate 71.

In the fifth embodiment, the guide member 49 includes the positioning and holding means in the form of the pair of upper positioning projections 49a1, 49a2 and the pair of upper positioning and holding pieces 49b1, 49b2, the holding portion in the form of the lower positioning and holding pieces 49c1, 49c2, the recessed portion 49d, the engaging protrusion 49e, the guide portion 48 in the form of the semi-cylindrical portion 49f, and the rear extension 49n, as in the first embodiment. In the fifth embodiment, the upper positioning projections 49a1, 49a2 extend from the semi-cylindrical portion 49f by a larger distance in the forward direction than in the first embodiment. In the fifth embodiment, the guide member 49 further includes a pair of engaging jaws 49i1 and 49i2 spaced apart from each other in the direction of width, and a pair of protrusions 49j1 and 49j2 spaced apart from each other in the direction of width.

The two engaging jaws 49i1, 49i2 are formed integrally with the two upper positioning and holding pieces 49b1, 49b2 such that the engaging jaws 49i1, 49i2 extend from the upper positioning and holding pieces 49b1, 49b2 in the forward direction. The engaging jaws 49i1, 49i2 are held in engagement with respective recesses 71d1, 71d2 formed in the upper arm section 71a2 of the U-shaped energy absorbing plate 71, so that the removal of the energy absorbing plate 71 from the guide member 49 in the forward direction is prevented.

The two protrusions 49j1, 49j2 are formed integrally with the rear extension 49n of the guide member 49, such that the two protrusions 49j1, 19j2 are located below the respective engaging jaws 49i1, 49i2, in order to prevent an excessive amount of downward deformation or bending of the engaging jaws 49i1, 49i2 and consequent breakage or fracture of the engaging jaws 49i1, 49i2, when the guide member 49 is mounted on the break-away bracket 41 or when the energy absorbing plate 71 is mounted on the guide member 49, with a backward movement of the plate 71 relative to the guide member 49.

Figure 25:
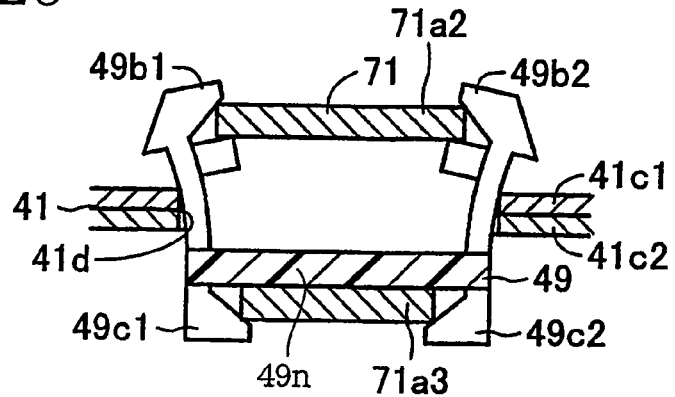
FIG. 25 is a fragmentary front elevational view in axial cross section showing a relationship among a communication hole of the break-away bracket, guide member, energy absorbing plate and other elements shown in FIG. 24.

In the present fifth embodiment, the two upper positioning and holding pieces 49b1, 49b2 are bent laterally outwardly of the guide member 49 when the energy absorbing plate 71 is mounted on the guide member 49 with the rearward movement of the plate 71, as shown in FIG. 25, so that the upper positioning and holding pieces 49b1, 49b2 are brought into abutting contact with the wall surfaces of the through-hole 41d. Thus, the upper positioning and holding pieces 49b1, 49b2 prevent rattling movements of the guide member 49 relative to the break-away bracket 41 in the direction of width of the guide member 49.

While the elements of the shock absorbing steering apparatus which are characteristic of the fifth embodiment have been described, the present steering apparatus is identical in construction and operation with the first embodiment, in the other aspects. The fifth embodiment has the advantages [1] through [17] described above with respect to the first embodiment.

Figure 26:
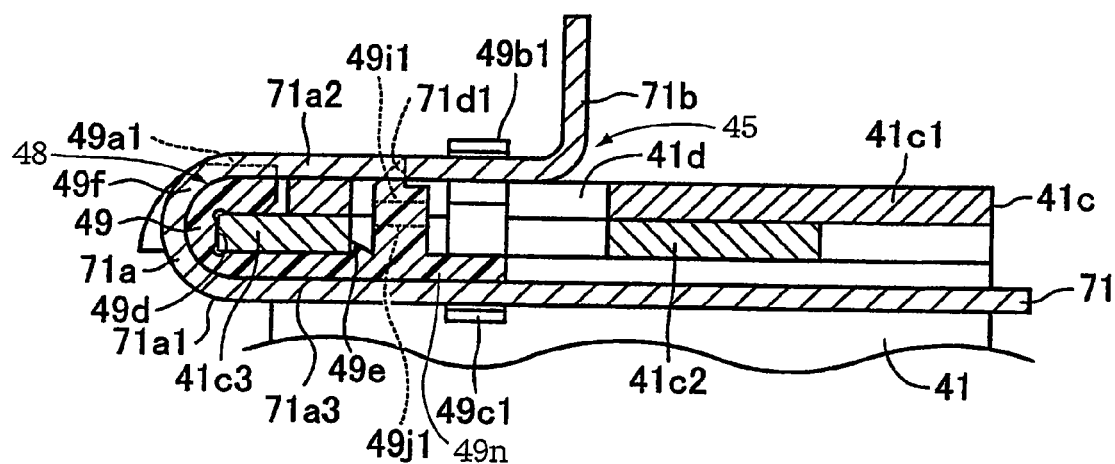
FIG. 26 is an enlarged fragmentary side elevational view in axial cross section corresponding to that of FIG. 23, showing a first modification of the shock absorbing steering apparatus of the fifth embodiment shown in FIGS. 22-24.
Figure 27:
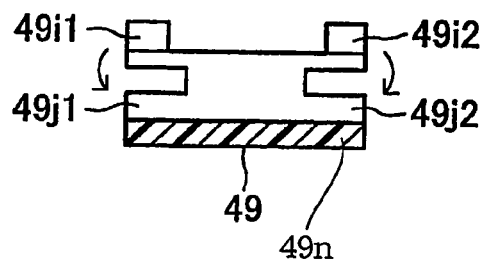
FIG. 27 is a fragmentary end view in axial cross section showing a relationship between a pair of engaging jaws and a pair of engaging projections of the guide member shown in FIG. 26.

Although the pair of engaging jaws 49i1, 49i2 provided in the fifth embodiment are formed so as to extend from the respective upper positioning and holding pieces 49b1, 49b2 in the forward direction, the engaging jaws 49i1, 49i2 may be formed independently of the upper positioning and holding pieces 49b1, 49b2, as in a first modification of the fifth embodiment shown in FIGS. 26 and 27. In this modification, the engaging jaws 49i1, 49i2 are bent downwards towards respective protrusions 49j1 and 49j2 also formed on the rear extension 49n of the guide member 49.

In the fifth embodiment, the removal of the U-shaped energy absorbing plate 71 in the forward direction is prevented by engagement of the two engaging jaws 49i1, 49i2 with the respective two recesses 71d1, 71d2 formed in the upper arm section 71a2 of the energy absorbing plate 71. However, the removal of the energy absorbing plate 71 may be presented by an arrangement in a second modification of the fifth embodiment shown in FIGS. 28 and 29, or an arrangement in a third modification of the fifth embodiment shown in FIG. 30.

Figure 28:
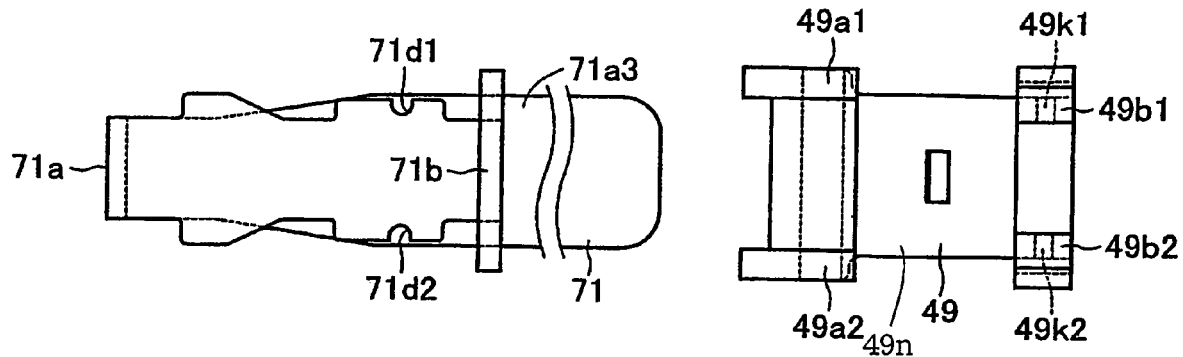
FIG. 28 is a fragmentary exploded plan view showing a second modification of the shock absorbing steering apparatus of the fifth embodiment, wherein the pair of engaging projections of the guide member are formed integrally with a pair of upper holding pieces.
Figure 29:
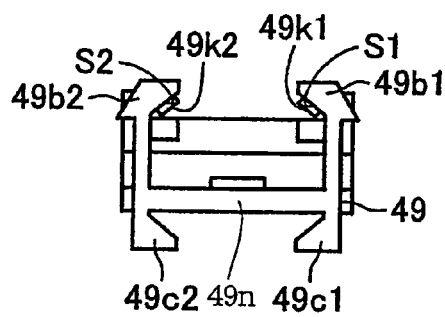
FIG. 29 is a rear elevational view of the guide member shown in FIG. 28.

In the second modification of the fifth embodiment shown in FIGS. 28 and 29, the two engaging jaws 49i1, 49i2 are replaced by a pair of engaging projections 49k1 and 49k2 which are formed integrally with the respective slant surfaces S1 and S2 of the upper positioning and holding pieces 49b1, 49b2. These engaging projections 49k1 and 49k2 are held in engagement with the respective recesses 71d1, 71d2 formed in the upper arm section 71a2 of the energy engaging plate 71 which has been mounted on the guide member 49. Thus, the engaging projections 49k1, 49k2 cooperate with the recesses 71d1, 71d2 to prevent the removal of the energy absorbing plate in the forward direction.

Figure 30:
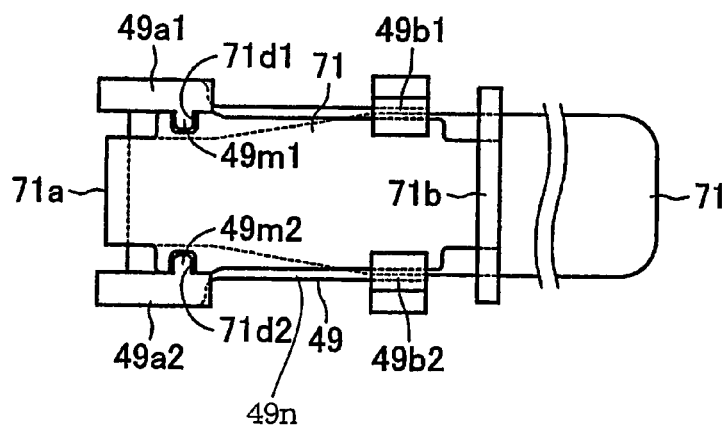
FIG. 30 is a fragmentary plan view showing a third modification of the shock absorbing steering apparatus of the fifth embodiment shown in FIGS. 22-24.

In the third modification of the fifth embodiment shown in FIG. 30, the two engaging jaws 49i1, 49i2 are replaced by a pair of engaging projections 49m1 and 49m2 which are formed integrally with the respective opposed surfaces of the upper positioning projections 49a1, 49a2. These engaging projections 49m1 and 49m2 are held in engagement with the respective recesses 71d1, 71d2 of the energy absorbing plate 71 mounted on the guide member 49. Thus, the engaging projections 49m1, 49m2 cooperate with the recesses 71d1, 71d2 to prevent the removal of the energy absorbing plate 71 in the forward direction.

Common Modifications of First Group of Embodiments

In the first through fifth embodiments described above, the positioning and holding means is provided in the steering apparatus of the type which has the free-running distance L2 in the axial direction between the engaging portion 71b formed integrally with the upper arm section 71a2 of the U-shaped energy absorbing plate 71 and the holding portion 31a of the body-side bracket 31. However, positioning and holding means may be provided in a steering apparatus of the type in which the engaging portion of the energy absorbing plate is brought into engagement with a holding portion provided on the vehicle body to provisionally hold the energy absorbing plate when the break-away bracket is mounted on a portion of the vehicle body. In the first group of embodiments, the upper arm section of the energy absorbing plate is positioned and held by the positioning and holding means with respect to the break-away bracket, so that the break-away bracket can be easily assembled with respect to the vehicle body (by screwing the bolts 44 into the nuts 32, as shown in FIG. 5), with a high degree of accuracy of positioning of the upper arm section of the energy absorbing plate relative to the break-away bracket.

In each of the first and fifth embodiments, the column body 245 is supported by a portion of the vehicle body through the rear support mechanism A and the front support mechanism B. However, a single support mechanism may be provided for supporting the column body by the vehicle body.

The shock absorbing steering apparatus according to each of the first through fifth embodiments is arranged such that the impact energy generated by the secondary collision of the vehicle operator or occupant can be absorbed by not only the deformation of the energy absorbing plate 71 in pressing and sliding contact with the guide member 49, but also the impact energy absorbing mechanism A provided on the column body 25. However, an impact energy absorbing mechanism of the type other than that of the impact energy absorbing mechanism C may be provided between the steering column 5 and the vehicle body. It is also noted that the provision of the impact energy absorbing mechanism C is not essential, and may be eliminated.

The above-described common modifications of the first group of embodiments are applicable to the other groups of embodiments which will be described.

Second Group of Embodiment

There will be described sixth through eighth embodiments of this invention, which are similar to each other and constitute the second group of embodiments.

Sixth Embodiment

Referring to FIGS. 31-35, there is shown a shock absorbing steering apparatus constructed according to a sixth embodiment of the present invention. The steering column 5 and the other elements of this steering apparatus are similar in construction with the first embodiment. The foregoing description of the first embodiment from the beginning up to the portion indicated by (*2), by reference to FIGS. 1-6, applies to the steering apparatus of this sixth embodiment. In the following description of the sixth embodiment and FIGS. 31-35, however, reference numerals 131, 141, 149 and 171 are respectively used to denote the body-side bracket, the break-away bracket, the guide member and the energy absorbing plate, which are denoted by respective reference numerals 31, 41, 49 and 71 in the first embodiment. Constituent parts of those elements 131, 141, 149 and 171 in the sixth embodiment are denoted by combinations of those reference numerals and alphabetic letters "a", "b", etc.

In the present sixth embodiment, the arcuate curved section 171a1 and the upper arm in the form of the upper arm section 171a2 of the U-shaped energy absorbing plate 171 have a smaller width than the lower arm in the form of the lower arm section 171a3, so that the impact energy absorbing load is increased at a relatively low rate in the initial period of engagement of the engaging portion 171b with the holding portion 131a of the body-side bracket 131, and increased to a desired value at a suitable point of time in the process of the engagement. Namely, the width of the curved section 171a1 is made smaller than that of the lower arm section 171a3, and this dimensional relationship provides an initial-load adjusting mechanism.

Figure 34:
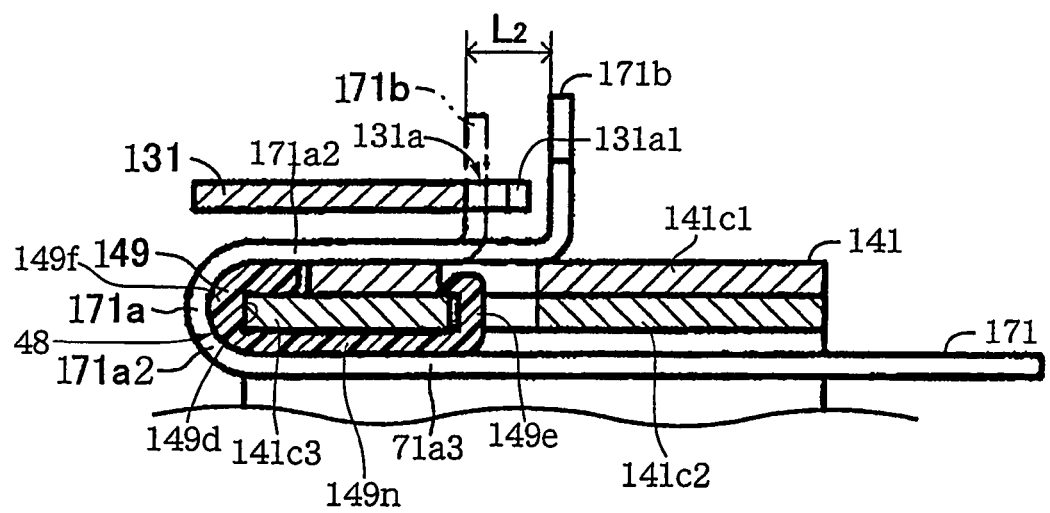
FIG. 34 is a side elevational view in axial cross section taken along line M-M of FIG. 33.
Figure 35:
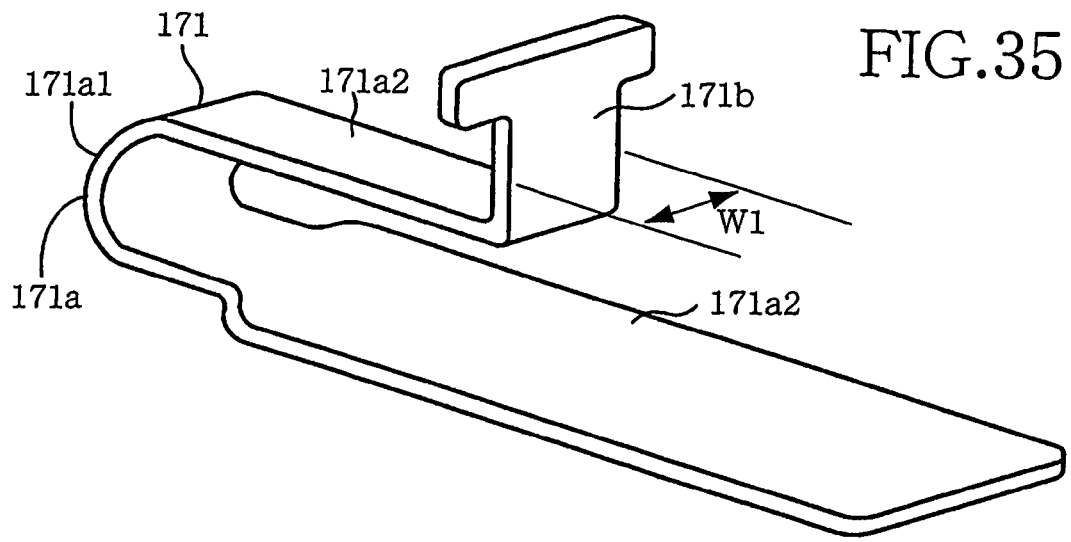
FIG. 35 is a perspective view of the energy absorbing plate shown in FIGS. 31-34.

The guide member 149 provided in this sixth embodiment has a recessed portion 149d engaging the projecting front end portion 141c3 of the lower plate 141c2 of the break-away bracket 131, and includes an arcuate semi-cylindrical portion 149f for plastically deforming the lower arm section 171a3 of the energy absorbing plate 171 in pressing and sliding contact therewith. As shown in FIG. 34, the guide member 149 is a generally J-shaped structure including a rear extension 149n which extends from the lower portion in the backward direction of the vehicle, so as to form a relatively long arm of the J-shape. The guide member 149 is mounted on the break-away bracket 141 such that the rear end face of a relatively short arm of the J-shape is opposed to the front end face of the upper plate 141c. The rear extension 149n is formed with a hook portion 149e at its rear end. This hook portion 149e is held in engagement with the rear end portion of the lower plate 141c2 of the break-away bracket 141, as shown in FIG. 34.

In the present shock absorbing steering apparatus, the break-away bracket 141 is moved and released from the body-side bracket 131 in the forward direction of the vehicle, with the breakage of the resin capsules 42 when an impact acting on the resin capsules 42 exceeds a predetermined upper limit in the event of a secondary collision of the vehicle operator or occupant upon collision of the vehicle with any object. As a result of the forward movement of the break-away bracket 141, the engaging portion 171b of the energy absorbing plate 171 mounted on the moving break-away bracket 141 is eventually brought into engagement with the holding portion 131a of the body-side bracket 131.

With a further forward movement of the break-away bracket 141 relative to the vehicle body after the engagement of the engaging portion 171b of the energy absorbing plate 171 with the holding portion 131a of the body-side bracket 131, the lower arm section 171a3 of the U-shaped portion 171a of the energy absorbing plate 171 is deformed by and along the semi-cylindrical section 149f of the guide member 149, in pressing and sliding contact with the arcuate surface of the semi-cylindrical portion 149f. Accordingly, the position of the instantly formed curved section 171a1 of the U-shaped portion 171a in the longitudinal direction of the energy absorbing plate 171 is gradually shifted while the instantly formed upper and lower arm sections 171a2 and 171a3 are moved in sliding contact with the upper plate 141c and the rear extension 149n of the guide member 149. Thus, the impact energy can be absorbed by deformation of the energy absorbing plate 171 in pressing and sliding contact with the guide member 149.

Figure 31:
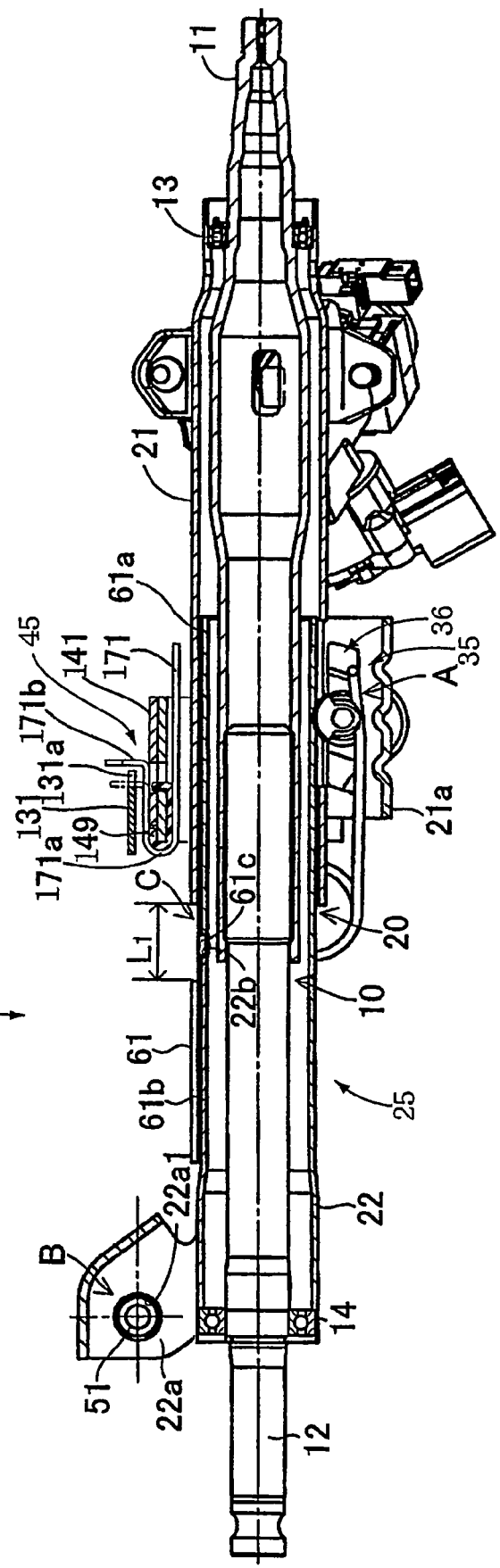
FIG. 31 is a side elevational view in axial cross section showing a shock absorbing steering apparatus constructed according to a sixth embodiment of this invention.
Figure 32:
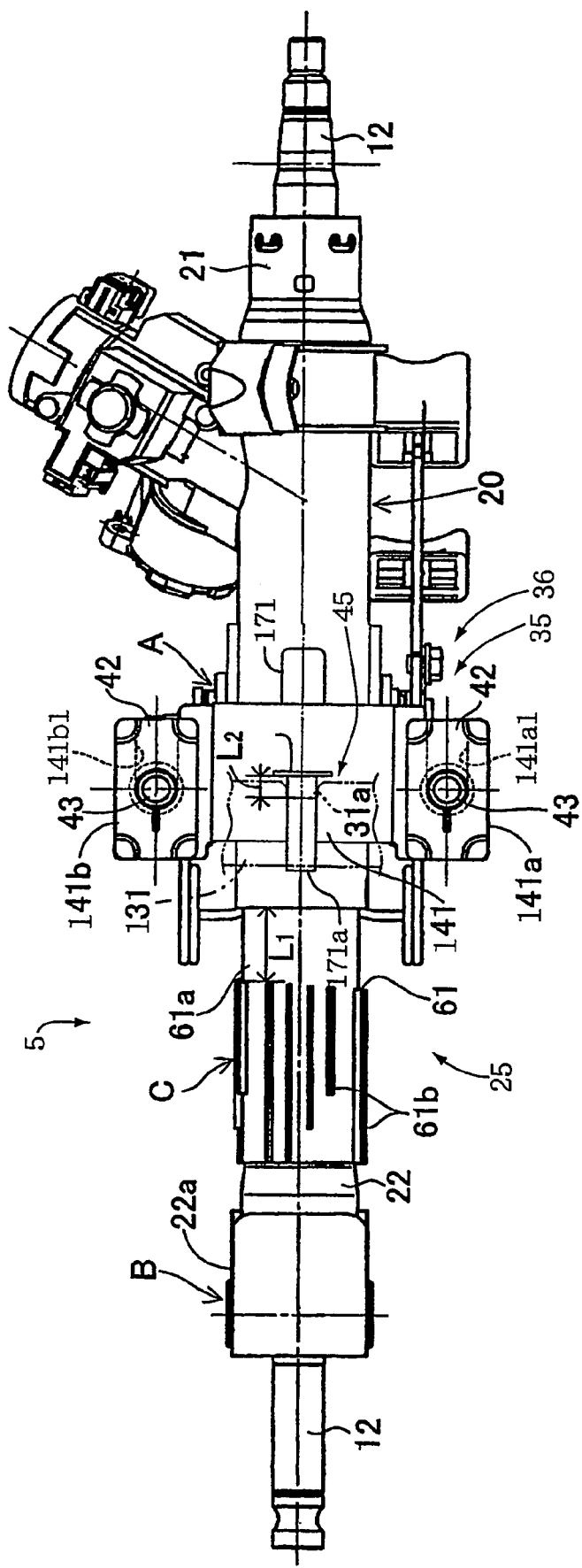
FIG. 32 is a plan view of the shock absorbing steering apparatus shown in FIG. 31.
Figure 33:
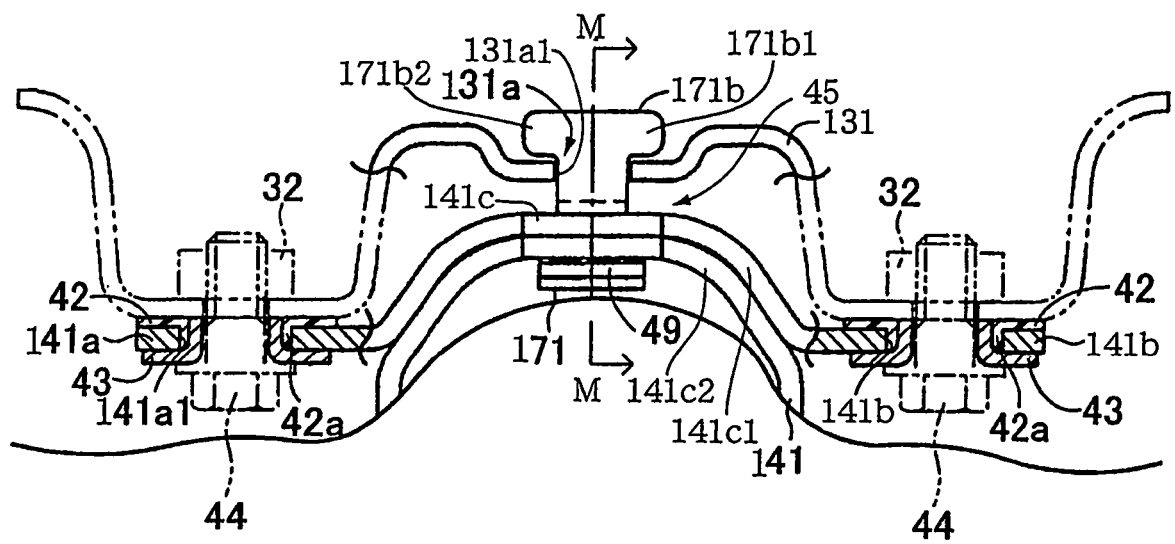
FIG. 33 is an enlarged fragmentary partially cut-away rear elevational view showing a relationship among a body-side bracket, a break-away bracket, an energy absorbing plate and other elements that are shown in FIG. 31.

The column body 25 is axially contracted by more than the predetermined distance L1 from the initial state indicated in FIGS. 31 and 32. Described in detail, the upper shaft 11 and the outer tube 21 are axially moved in the forward direction relative to the lower shaft 12 and the inner tube 22 by more than the predetermined distance L1, so that the ribs 61b of the energy absorbing member 61 are deformed in a shearing or plastic deformation mode, and the impact energy is also absorbed by the shearing or plastic deformation of the ribs 61b.

In the present sixth embodiment, positioning and holding means is not provided for positioning and holding the upper arm section 171a2 of the energy absorbing plate 171. However, the steering apparatus of the present embodiment has the advantages [1] through [12] described above with respect to the first embodiment. However, the positioning and holding means may be provided in this embodiment, as described above.

Figure 36:
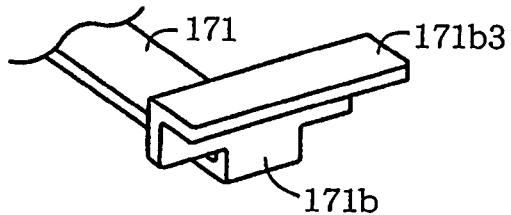
FIG. 36 is a fragmentary perspective view showing an energy absorbing plate employed in a first modification of the shock absorbing steering apparatus of the sixth embodiment shown in FIGS. 31-35.
Figure 37:
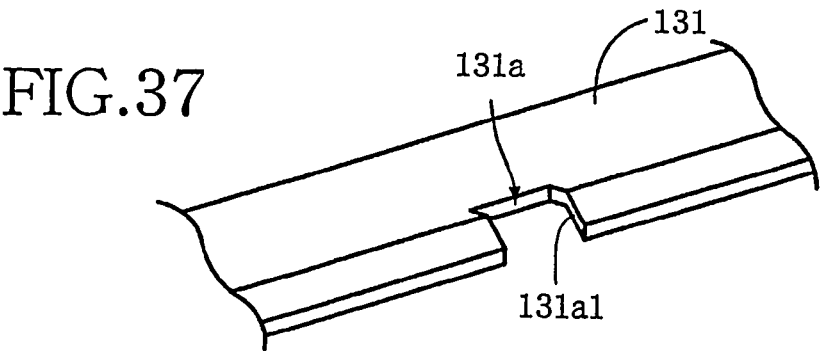
FIG. 37 is a fragmentary perspective view showing a body-side bracket employed in a second modification of the shock absorbing steering apparatus of the sixth embodiment shown in FIGS. 31-35.

While the steering apparatus of the sixth embodiment described above uses the energy absorbing plate 171 shown in FIGS. 31-35 and the body-side bracket 131 having the holding portion 131a, a modified energy absorbing plate 171 may be employed, as in a first modification of the sixth embodiment shown in FIG. 36, and a modified body-side bracket 131 may be employed, as in a second modification of the sixth embodiment shown in FIG. 37. In the energy absorbing plate 171 shown in FIG. 36, the T-shaped engaging portion 171b has an upper section which is bent to be L-shaped in cross section, so that the engaging portion 171b has an increased mechanical strength. In the body-side bracket 131 shown in FIG. 37, the rear end portion in which the holding portion 131a is formed is bent downwardly to increase its mechanical strength.

Figure 38:
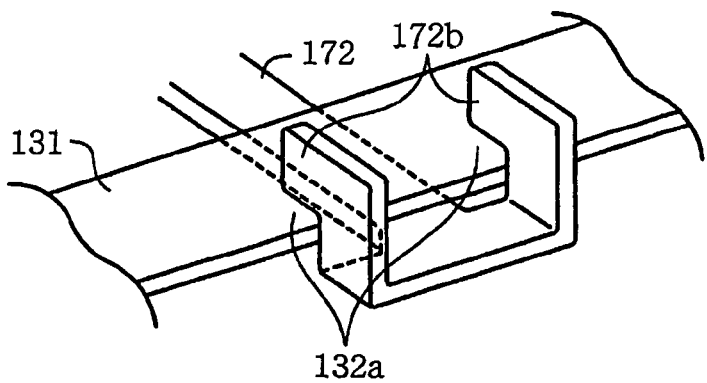
FIG. 38 is a fragmentary perspective view showing a body-side bracket and an energy absorbing plate that are employed in a third modification of the shock absorbing steering apparatus of the sixth embodiment shown in FIGS. 31-35.
Figure 39:
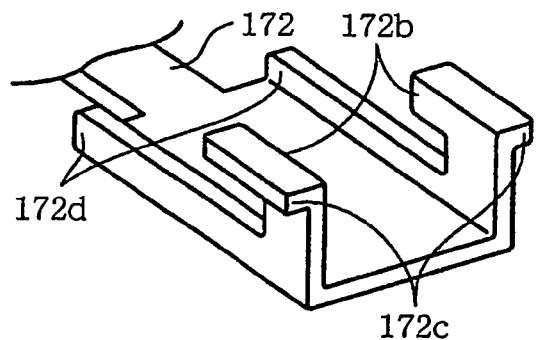
FIG. 39 is a fragmentary perspective view showing an energy absorbing plate employed in a fourth modification of the shock absorbing steering apparatus of the sixth embodiment shown in FIGS. 31-35.

Further, a modified body-side bracket 132 may be used as in a third modification of the sixth embodiment shown in FIG. 38. This modified body-side bracket 132 includes a holding portion 132a which does not have a cutout. This third modification uses a modified energy absorbing plate 172 including a pair of hooked engaging portions 172b in place of the T-shaped engaging portion 171b. The hooked engaging portions 172b are engageable with the holding portion 132a not having the cutout. In a fourth modification of the sixth embodiment shown in FIG. 39, the energy absorbing plate 172 of FIG. 38 is replaced by an energy absorbing plate 172 which includes an engaging portion in the form of has a pair of L-shaped bent portions 172c engageable with the holding portion 132a. Each bent portion 172c is L-shaped in cross section in a plane which is parallel to the direction of width of the plate 172 and perpendicular to the plane of the plate 172.

Figure 40:
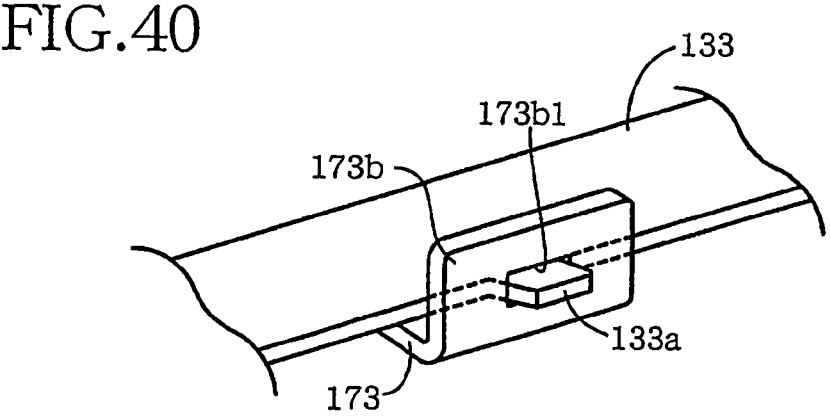
FIG. 40 is a fragmentary perspective view showing a body-side bracket and an energy absorbing plate employed in a fifth modification of the shock absorbing steering apparatus of the sixth embodiment shown in FIGS. 31-35.

Further, a modified body-side bracket 133 may be used as in a fifth modification of the sixth embodiment shown in FIG. 40. This modified body-side bracket 133 includes a holding portion in the form of an engaging protrusion 133a extending in the rearward direction. This fifth modification uses a modified energy absorbing plate 173 including an engaging portion 173b which has an engaging hole. 173b1 engageable with the engaging protrusion 133a.

Seventh Embodiment

Figure 41:
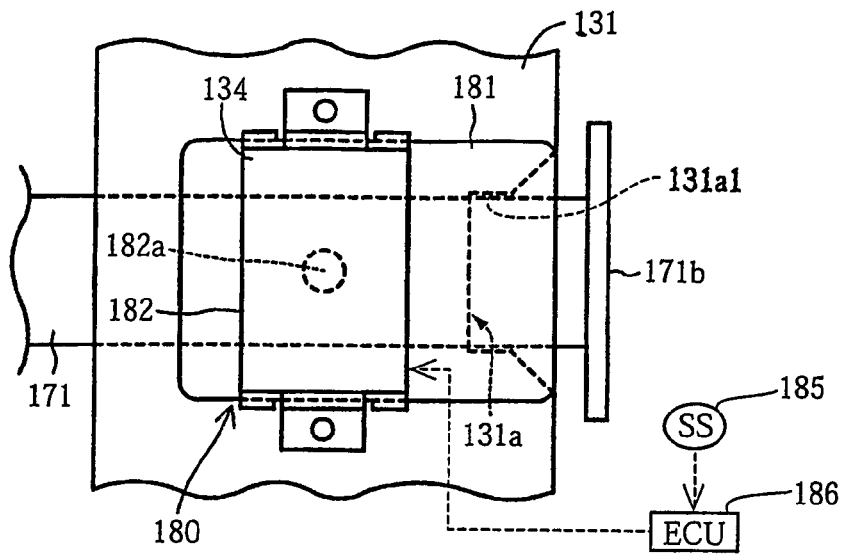
FIG. 41 is a fragmentary plan view showing a shock absorbing steering apparatus constructed according to a seventh embodiment of the present invention.
Figure 42:
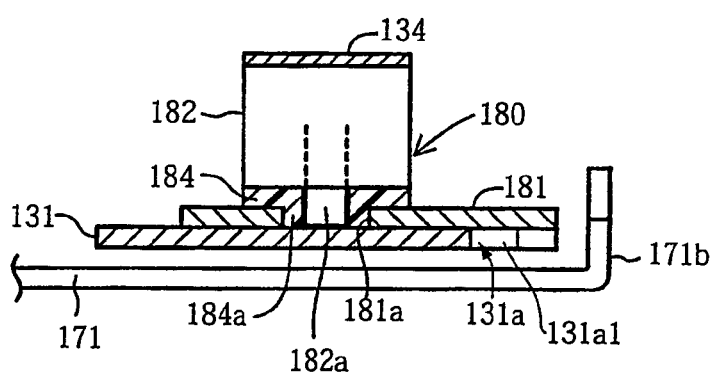
FIG. 42 is a fragmentary side elevational view in axial cross section of some elements of the shock absorbing steering apparatus shown in FIG. 41.
Figure 43:
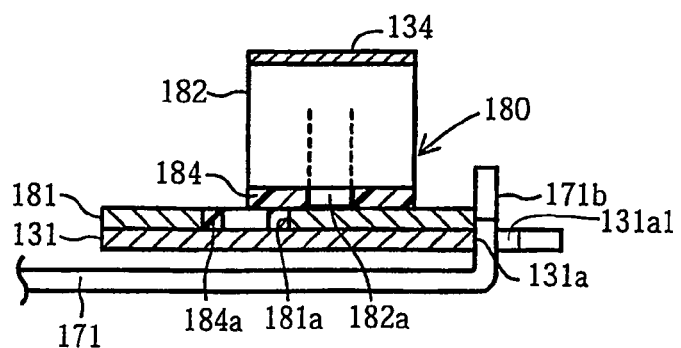
FIG. 43 is a side elevational view in axial cross section for explaining an operation of the elements shown in FIG. 42.

Referring next to FIGS. 41-43, there is shown a shock absorbing steering apparatus constructed according to a seventh embodiment of this invention. In this seventh embodiment, the body-side bracket 131 is provided with a load changeover device 180. The seventh embodiment is substantially identical in construction with the sixth embodiment of FIGS. 31-35, except for the load changeover device 180, and has not only the same advantages as those of the sixth embodiment, but also additional advantages owing to the provision of the load changeover device 180, which will be described.

The load changeover device 180 is an engagement adjusting mechanism arranged to permit or inhibit the engagement of the T-shaped engaging portion 171b of the energy absorbing plate 171 with the holding portion 131a of the body-side bracket 131. The load changeover device 180 includes an opening and closing plate 181 mounted on the body-side bracket 131, and an electromagnetic actuator 182 arranged to selectively permit and inhibit a movement of the opening and closing plate 181 in the forward direction of the vehicle.

The opening and closing plate 181 is mounted on the body-side bracket 131 via a holder 134 fixed to the bracket 131, such that the plate 181 is movable relative to the bracket 131 in the longitudinal direction of the vehicle, to selectively open and close the recessed part 131a1. The opening and closing plate 181 has a central through-hole 181a in which a cylindrical portion 184a of a resin collar 184 is fitted, as shown in FIG. 42 The electromagnetic actuator 182 is energized or de-energized under the control of an electronic control unit (ECU) 186 (constituted principally by a computer) according to an output signal of a sensor operable to detect a state of the vehicle or vehicle occupant, for example, a seat-belt sensor (SS) 185 arranged to detect that a seat belt is worn on the vehicle operator. The seat-belt sensor 185 and the ECU 186 are shown in FIG. 41. The electromagnetic actuator 182 is disposed above the opening and closing plate 181 and supported by the holder 134, and is provided with a stopper pin 182a. When the seat belt is worn on the vehicle operator, the electromagnetic actuator 182 is energized to move the stopper pin 182a downwards into the cylindrical portion 184 of the resin collar 184 fitted in the through-hole 181a, as shown in FIG. 42. When the seat belt is not worn on the vehicle operator, the electromagnetic actuator 182 is de-energized to retract the stopper pin 182a out of the cylindrical portion 184 to its upper retracted position, as shown in FIG. 43.

In the seventh embodiment arranged as described above, the forward movement of the opening and closing plate 181 is inhibited by the stopper pin 182a fitted in the cylindrical portion 184a of the resin collar 184 fitted in the through-hole 181a, as shown in FIG. 42, by energization of the electromagnetic actuator 182 when the seat belt is worn on the vehicle operator. In the position of the plate 181 of FIG. 42, the plate 181 prevents the engagement of the engaging portion 171b of the energy absorbing plate 171 with the recessed part 131a1 of the holding portion 131a of the body-side bracket 131.

Upon collision of the vehicle while the seat belt is worn on the vehicle operator, the break-away bracket 141 is axially moved and released from the body-side bracket 131 in the forward direction of the vehicle, and the engaging portion 171b of the energy absorbing plate 171 is accordingly moved in the forward direction, but the engaging portion 171b is not brought into engagement with the holding portion 131a of the body-side bracket 131. In this event, the impact energy absorbed by the energy absorbing plate 171 upon bending of the engaging portion 171b due to its abutting contact with the opening and closing plate 181 is smaller than in the sixth embodiment.

When the seat belt is not worn on the vehicle operator, on the other hand, the electromagnetic actuator 182 is de-energized to move upwards the stopper pin 182a out of the cylindrical portion 184a of the resin collar 184 fitted in the through-hole 181a of the opening and closing plate 181, so that the stopper pin 182a is brought to its the upper retracted position of FIG. 43. In this case, the plate 181 receives a load larger than a force required for fracture of the cylindrical portion 184a of the resin collar 184 (which force is smaller than a force required for fracture of the resin capsule 42 in the sixth embodiment), so that the plate 181 is moved in the forward direction, thereby permitting the engaging portion 171b of the energy absorbing plate 171 with the holding portion 131a of the body-side bracket 131.

Upon collision of the vehicle while the seat belt is not worn on the vehicle operator, the break-away bracket 141 is axially moved and released from the body-side bracket 131 in the forward direction of the vehicle, and the engaging portion 171b of the energy absorbing plate 171 is moved in the forward direction with the bracket 141, and brought into abutting contact with the opening and closing plate 181, with a result of fracturing of the cylindrical portion 184a of the resin collar 184. Accordingly, the plate 181 is pushed in the forward direction by the engaging portion 171b of the energy absorbing plate 171, so that the recessed part 131a1 of the holding portion 131 of the body-side bracket 131 is opened, permitting the engagement of the engaging portion 171b of the plate 171 with the holding portion 131a of the body-side bracket 131, as in the sixth embodiment.

The seventh embodiment employs the load changeover device 180 as means for selectively permitting and inhibiting absorption of the impact energy by the energy absorbing plate 171, such that the opening and closing plate 181 of the load changeover device 180 is permitted to be pushed forward by the engaging portion 171b of the energy absorbing plate 171, for thereby permitting the engaging portion 171b to be brought into engagement with the holding portion 131*a* of the body-side bracket 131, when the seat belt is not worn on the vehicle operator. However, the load changeover device 180 may be replaced by a load changeover device 180 according to a first modification shown in FIG. 44, or a load changeover device 200 according to a second modification shown in FIGS. 45-47.

Figure 44:
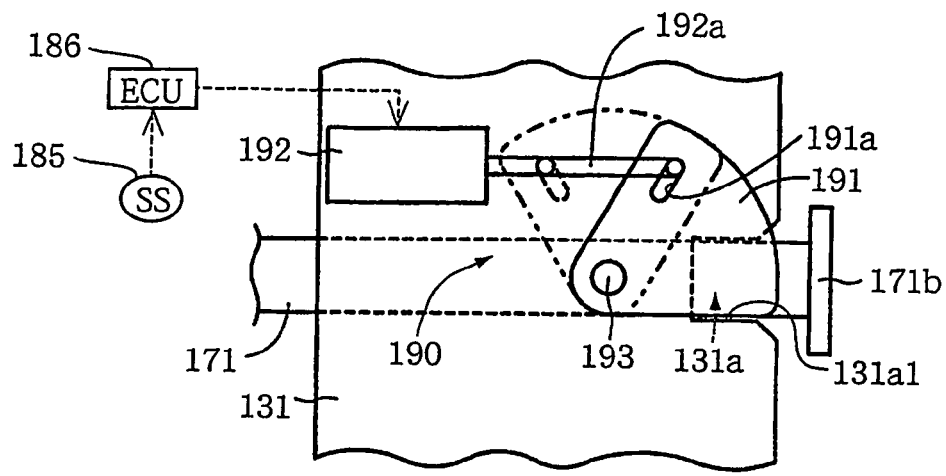
FIG. 44 is a fragmentary plan view showing a first modification of the shock absorbing steering apparatus of the seventh embodiment shown in FIGS. 40-43.

The load changeover device 190 of FIG. 44 is an engagement adjusting mechanism arranged to permit or inhibit the engagement of the engaging portion 171*b* of the energy absorbing plate 171 with the holding portion 131*a* of the body-side bracket 131. The load changeover device 190 includes an opening and closing plate 191 mounted on the body-side bracket 131, and an electromagnetic actuator 192 arranged to pivot the opening and closing plate 191.

The opening and closing plate 191 is mounted on the body-side bracket 131 such that the plate 191 is pivotable about a pivot pin 193 fixed to the bracket 131, between open and closed positions in which the recessed part 131*a*1 of the holding portion 131*a* of the body-side bracket 132 are respectively open and closed. The pivot pin 193 is located at a substantially middle point in the direction of width of the slot of the recessed part 131*a*1, and in front of the holding portion 131*a*. The plate 191 has an elongate hole 191*a* extending in a radial direction of the pivot pin 193.

The electromagnetic actuator 192 is energized or de-energized under the control of the electronic control unit (ECU) 186 (constituted principally by a computer) according to an output signal of a sensor operable to detect a state of the vehicle or vehicle occupant, for example, the seat-belt sensor (SS) 185 arranged to detect that the seat belt is worn on the vehicle operator, as in the seventh embodiment of FIGS. 41-43. The electromagnetic actuator 182 is disposed in front of the opening and closing plate 191 and supported by the body-side bracket 131, and is provided with a rod 192*a* having a rear end portion which is bent to have an L-shape and held in engagement with the elongate hole 191*a* of the plate 191.

When the seat belt is worn on the vehicle operator, the electromagnetic actuator 192 is energized to move the rod 192*a* in the rearward direction for pivoting the opening and closing plate 191 to its closed position indicated by solid line in FIG. 44, in which the recessed part 131*a*1 of the body-side bracket 131 is closed by the plate 191. When the seat belt is not worn on the vehicle operator, the electromagnetic actuator 192 is de-energized to move the rod 192*a* in the forward direction for pivoting the plate 191 to the open position indicated by two-dot chain line in FIG. 44, in which the recessed part 131*a*1 is open.

In the first modification shown in FIG. 44, the opening and closing plate 191 is held in its closed position indicated by solid line in FIG. 44, with the rearward movement of the rod 192*a* by energization of the electromagnetic actuator 192 when the seat belt is worn on the vehicle operator. In the closed position of the plate 191, a force of abutting contact of the engaging portion 171*b* of the energy absorbing plate 161 with the opening and closing plate 191 is simply received by the pivot pin 193, but is not transmitted to the rod 192*a*, so that the plate 181 is held in its closed state in which the recessed part 131*a*1 of the holding portion 131*a* of the body-side bracket 131 is closed by the plate 181, so that the plate 191 prevents the engagement of the engaging portion 171*b* of the energy absorbing plate 171 with the holding portion 131*a* of the body-side bracket 131.

Upon collision of the vehicle while the seat belt is worn on the vehicle operator, the break-away bracket 141 is axially moved and released from the body-side bracket 131 in the forward direction of the vehicle, and the engaging portion 171*b* of the energy absorbing plate 171 is accordingly moved in the forward direction, but the engaging portion 171*b* is not brought into engagement with the holding portion 131*a* of the body-side bracket 131. In this event, the impact energy absorbed by the energy absorbing plate 171 upon bending of the engaging portion 171*b* due to its abutting contact with the opening and closing plate 191 is smaller than in the sixth embodiment.

When the seat belt is not worn on the vehicle operator, on the other hand, the electromagnetic actuator 192 is de-energized to retract its rod 192*a* in the forward direction, so that the opening and closing plate 192 is pivoted to its open position in which the recessed part 131*a*1 of the holding portion 131*a* is held open, permitting the engagement of the engaging portion 171*b* with the holding portion 131*a*.

Upon collision of the vehicle while the seat belt is not worn on the vehicle operator, the break-away bracket 141 is axially moved and released from the body-side bracket 131 in the forward direction of the vehicle, and the engaging portion 171*b* of the energy absorbing plate 171 is moved in the forward direction, and brought into engagement with the holding portion 131*a* of the body-side bracket 131, as in the sixth embodiment.

In the load changeover device 190 of FIG. 44, the force of abutting contact of the engaging portion 171*b* of the energy absorbing plate 171 with the opening and closing plate 191 placed in its closed position is received by the pivot pin 193 and is not transmitted to the rod 192*a* of the electromagnetic actuator 192. Further, the opening and closing plate 191 is brought to its open position to permit the engagement of the engaging portion 171*b* with the holding portion 131*a*, so that the impact energy absorbed by the energy absorbing plate 171 does not act on the electromagnetic actuator 192. Accordingly, the required size and cost of manufacture of the electromagnetic actuator 192 can be reduced.

In the load changeover device 190 of FIG. 44, the opening and closing plate 191 is pivotably connected to the body-side bracket 132 through the pivot pin 193 and is pivoted by the rod 192*a* of the electromagnetic actuator 192 between its closed and open positions. However, this pivotable opening and closing plate 191 may be replaced by an opening and closing plate which is mounted on the body-side bracket 131 via a suitable holder, such that this latter plate is movable in the direction of width of the recessed part 131*a*1 of the holding portion 131*a*, between its open and closed positions in which the recessed part 131*a*1 is respectively open and closed.

Figure 45:
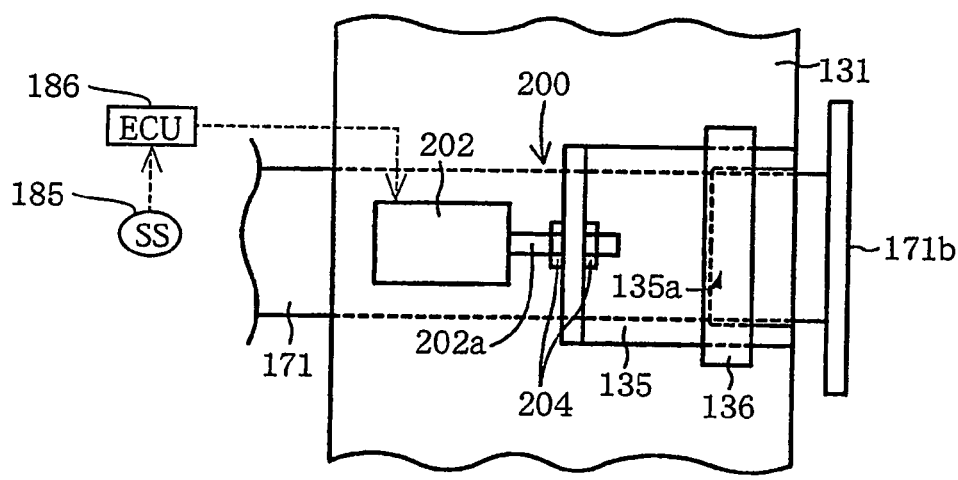
FIG. 45 is a fragmentary plan view showing a second modification of the shock absorbing steering apparatus of the seventh embodiment shown in FIGS. 40-43.
Figure 46:
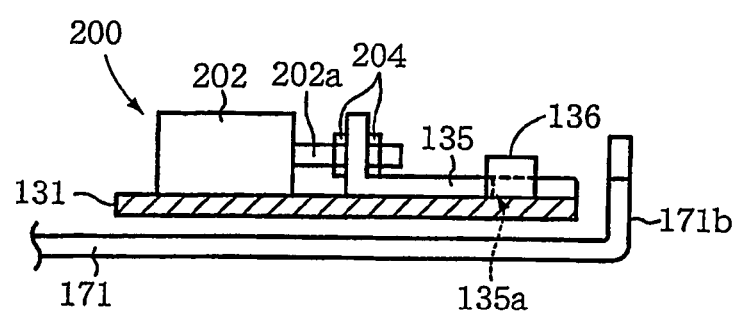
FIG. 46 is a fragmentary side elevational view of some elements of the shock absorbing steering apparatus shown in FIG. 45.
Figure 47:
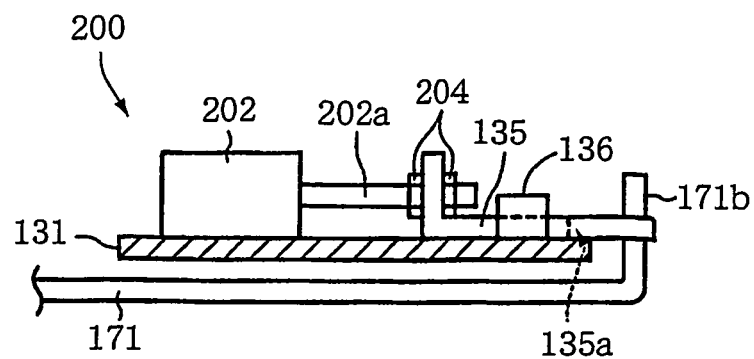
FIG. 47 is a side elevational view for explaining an operation of the elements shown in FIG. 46.

The load changeover device 200 shown in FIGS. 45-47 is an engagement adjusting mechanism arranged to permit or inhibit the engagement of the engaging portion 171*b* of the energy absorbing plate 171 with the holding portion 131*a* of the body-side bracket 131. The load changeover device 200 includes a support plate 135 mounted on the body-side bracket 131, and an electromagnetic actuator 202 arranged to move the support plate 135 in the longitudinal direction of the vehicle.

The support plate 135 is mounted on the body-side bracket 131 such that the support plate 135 is movable via a holder 136 fixed to the bracket 131, in the longitudinal direction of the vehicle. The support plate 135 is provided at its rear end portion with a recessed holding portion 135*a*, which corresponds to the holding portion 131*a* provided in the sixth and seventh embodiments.

The electromagnetic actuator 202 is energized or de-energized under the control of the electronic control unit (ECU) 186 (constituted principally by a computer) according to an output signal of a sensor operable to detect a state of the vehicle or vehicle occupant, for example, the seat-belt sensor (SS) 185 arranged to detect that the seat belt is worn on the vehicle operator, as in the seventh embodiment of FIGS. 41-43. The electromagnetic actuator 202 is disposed in front of the support plate 135 and supported by the body-side bracket 131, and is provided with a rod 202a which is moved forward to its front position shown in FIG. 46 by energization of the electromagnetic actuator 202 when the seat belt is worn on the vehicle operator, and moved rearward to its rear position shown in FIG. 47 by de-energization of the electromagnetic actuator 202 when the seat belt is not worn on the vehicle operator. The rod 202a has an externally threaded rear end portion fixed to the front end portion of the support plate 135, with a pair of nuts 204.

In the second modification of FIGS. 45-47, the electromagnetic actuator 202 is energized to move the rod 202a to its front position of FIGS. 45 and 46, when the seat belt is worn on the vehicle operator. In this front position of the rod 202a, the engaging portion 171b of the energy absorbing plate 171 cannot be brought into engagement with the recessed holding portion 135a.

Upon collision of the vehicle while the seat belt is worn on the vehicle operator, the break-away bracket 141 is axially moved and released from the body-side bracket 131 in the forward direction of the vehicle, and the engaging portion 171b of the energy absorbing plate 171 is accordingly moved in the forward direction, but the T-shaped engaging portion 171b is not brought into engagement with the recessed holding portion 135a of the support plate 135. In this event, the impact energy absorbed by the energy absorbing plate 171 is smaller than in the sixth embodiment.

When the seat belt is not worn on the vehicle operator, on the other hand, the electromagnetic actuator 192 is de-energized to hold its rod 202a in the rear position of FIG. 47, so that the engaging portion 171b of the energy absorbing plate 171 can be brought into engagement with the recessed holding portion 135a of the support plate 135.

Upon collision of the vehicle while the seat belt is not worn on the vehicle operator, the break-away bracket 141 is axially moved and released from the body-side bracket 131 in the forward direction of the vehicle, and the engaging portion 171b of the energy absorbing plate 171 is moved in the forward direction, and brought into engagement with the recessed holding portion 135a of the support plate. 135, as in the sixth embodiment.

In the load changeover device 200 of FIG. 2. 45-47, the impact energy absorbed by the energy absorbing plate 171 upon engagement of the engaging portion 171b with the recessed holding portion 135a of the support plate 135 is received by the body-side bracket 141 through the support plate 135 and the holder 136, and is not transmitted to the electromagnetic actuator 202.

Since the impact energy absorbing load generated upon engagement of the engaging portion 171b of the energy absorbing plate 171 with the recessed holding portion 135a of the support plate 134 is not applied to the electromagnetic actuator 202, the required size and cost of manufacture of this electromagnetic actuator 202 can be reduced.

Eighth Embodiment

Figure 48:
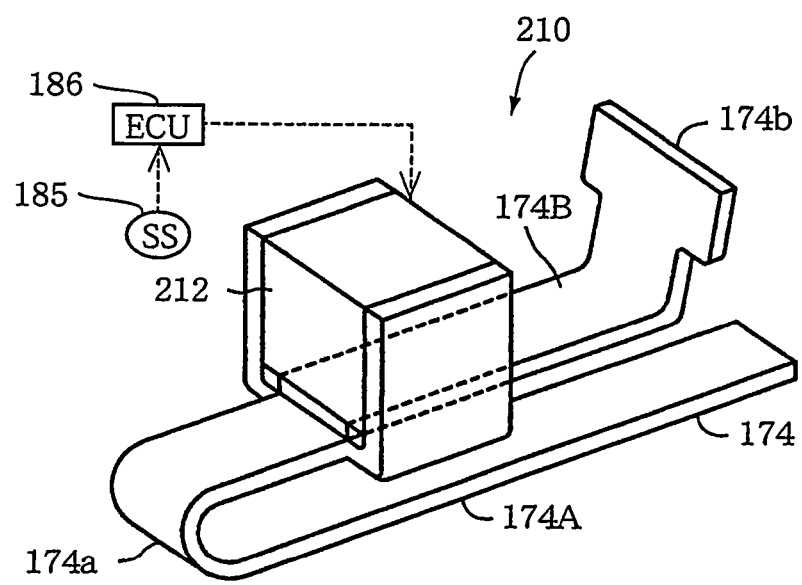
FIG. 48 is a fragmentary perspective view showing a shock absorbing steering apparatus constructed according to an eighth embodiment of this invention.
Figure 49:
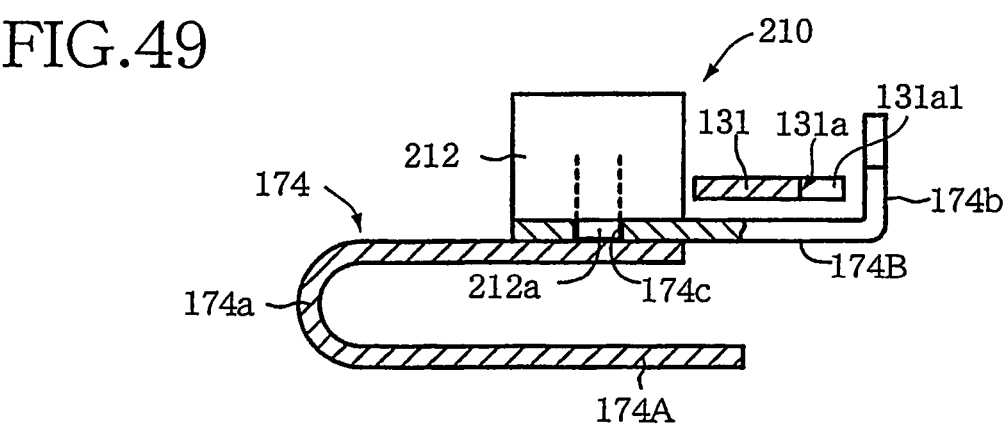
FIG. 49 is a fragmentary side elevational view in axial cross section showing some elements of the shock absorbing steering apparatus shown in FIG. 48.
Figure 50:
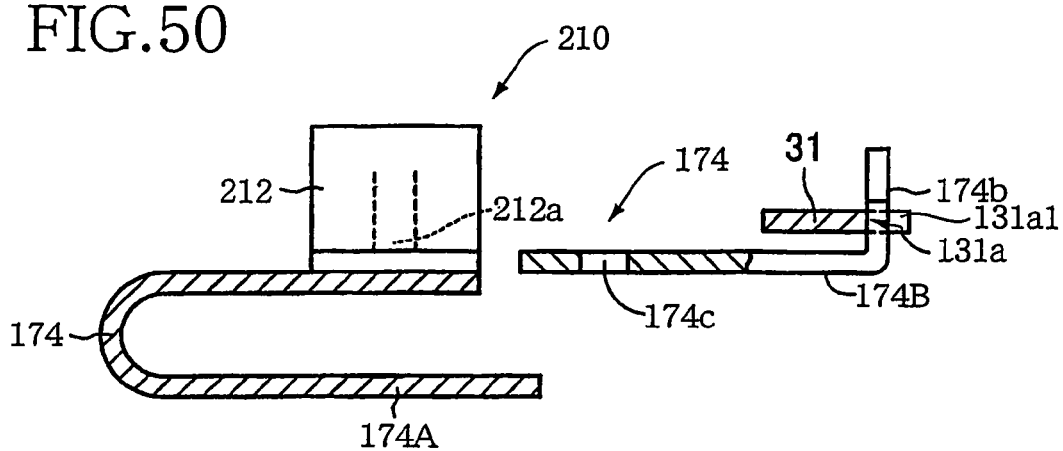
FIG. 50 is a side elevational view in axial cross section for explaining an operation of the elements shown in FIG. 49.

A shock absorbing steering apparatus according to an eighth embodiment of this invention is illustrated in the fragmentary view of FIGS. 48-50. This eighth embodiment employs an energy absorbing plate 174 consisting of two members 174A and 174B which are movable away from each other in the longitudinal direction of the vehicle, through an electromagnetic actuator 212 disposed so as to connect and disconnect a U-shaped portion 174a and a T-shaped engaging portion 174b of the energy absorbing plate 174 to and from each other. Namely, the present embodiment includes a load changeover device 210 arranged to change the impact energy absorbing load, by selectively connecting and disconnecting the two members 174A and 174B to and from each other. The shock absorbing steering apparatus according to the present eighth embodiment is identical in construction with the sixth embodiment, and has the same advantages as those of the seventh embodiment, in the presence of the load changeover device 210.

The load changeover device 210 includes an electromagnetic actuator 212, which is energized or de-energized under the control of the electronic control unit (ECU) 186 (constituted principally by a computer) according to an output signal of a sensor operable to detect a state of the vehicle or vehicle occupant, for example, the seat-belt sensor (SS) 185 arranged to detect that the seat belt is worn on the vehicle operator, as in the seventh embodiment of FIGS. 41-43. The electromagnetic actuator 212 is fixed to the member 174A having the U-shaped portion 174a of the energy absorbing plate 174, and has a connecting pin 212a engageable with a through-hole 174c formed in the member 174B having the engaging portion 174b of the plate 174.

The electromagnetic actuator 212 is de-energized to move the connecting pin 212a downwards into the through-hole 174c, as shown in FIG. 49, for thereby connecting the two members 174A, 174B of the plate 174, when the seat belt is not worn on the vehicle operator. When the seat belt is worn on the vehicle operator, on the other hand, the electromagnetic actuator 212 is energized to move the connecting pin 212a upwards to its upper retracted position of FIG. 50, in which the connecting pin 212a is not inserted in the through-hole 174c. In this retracted position of the connecting pin 212a, the two members 174A, 174B of the energy absorbing plate 174 are separable from each other.

In the eighth embodiment constructed as described above, the two members 174A, 174B of the energy absorbing plate 174 are connected to each other by the connecting pin 212a inserted in the through-hole 174c by de-energization of the electromagnetic actuator 212 when the seat belt is not worn on the vehicle operator. In this state, the energy absorbing plate 174 can effectively function to absorb the impact energy upon engagement of the engaging portion 174b with the holding portion 131a of the body-side bracket 131.

When the seat belt is worn on the vehicle operator, the electromagnetic actuator 212 is energized to move the connecting pin 212a to its upper retracted position in which the two members 174A, 174B of the energy absorbing plate 174 can be disconnected from each other. In this state, the engagement of the T-shaped engaging portion 174b of the energy absorbing plate 174 with the holding portion 131a of the body-side bracket 131 does not permit the energy absorbing plate 174 to effectively absorb the impact energy generated upon collision of the vehicle.

In the eighth embodiment described above, the energy absorbing plate 174 consists of the two members 174A and 174B which are separable from each other in the longitudinal direction of the vehicle, at the position of the electromagnetic actuator 212 disposed between the U-shaped portion 174a and the engaging portion 174b of the plate 174. However, the load changeover device 210 provided in the eighth embodiment may be replaced by a load changeover device 220 according to a modification shown in FIGS. 51-53. In this modification, a T-shaped engaging portion 175b of an energy absorbing plate 175 consists of a longitudinal member 175b1 and a transverse member 175b2, which are normally connected to each other by a resin tube 223 fitted in through-holes formed in the two members 175b1, 175b2. The load changeover device 220 includes an electromagnetic actuator 222 provided with a connecting pin 222a which is engageable with the resin tube 223.

The electromagnetic actuator 222 is energized or de-energized under the control of the electronic control unit (ECU) 186 (constituted principally by a computer) according to an output signal of a sensor operable to detect a state of the vehicle or vehicle occupant, for example, the seat-belt sensor (SS) 185 arranged to detect that the seat belt is worn on the vehicle operator, as in the seventh embodiment of FIGS. 41-43. The electromagnetic actuator 222 is supported by a holder member 224 attached to the back surface of the longitudinal member 175b1 of the engaging portion 185b of the energy absorbing plate 175, such that the connecting pin 222a can be inserted into the resin tube 223 fitted in through-holes formed through the longitudinal and transverse members 175b1, 175b2.

Figure 52:
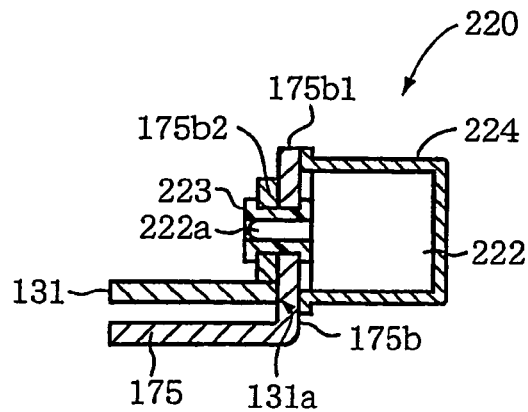
FIG. 52 is a fragmentary side elevational view in axial cross section showing some elements of the shock absorbing steering apparatus shown in FIG. 51.
Figure 53:
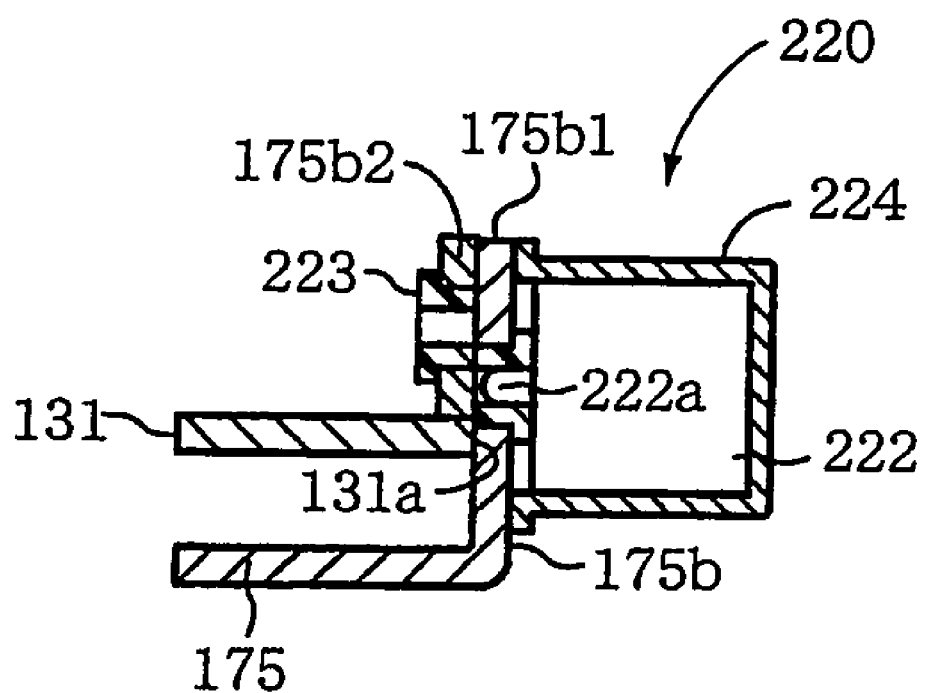
FIG. 53 is a side elevational view in axial cross section for explaining an operation of the elements shown in FIG. 52.

The electromagnetic actuator 222 is de-energized to move the connecting pin 222a into the resin tube 223 fitted in the through-holes, as shown in FIG. 52, for thereby connecting the longitudinal and transverse members 175b1, 175b2 of the engaging portion 175b of the energy absorbing plate 175 to each other, when the seat belt is not worn on the vehicle operator. When the seat belt is not worn on the vehicle operator, the electromagnetic actuator 222 is energized to retract the connecting pin 222a out of the through-hole formed in the transverse member 175b2, as shown in FIG. 53. In this state, the longitudinal and transverse members 175b1, 175b2 can be separated from each other by fracturing or breakage of the resin tube 223 when the engaging portion 175b is brought into engagement with the holding portion 131a.

Figure 51:
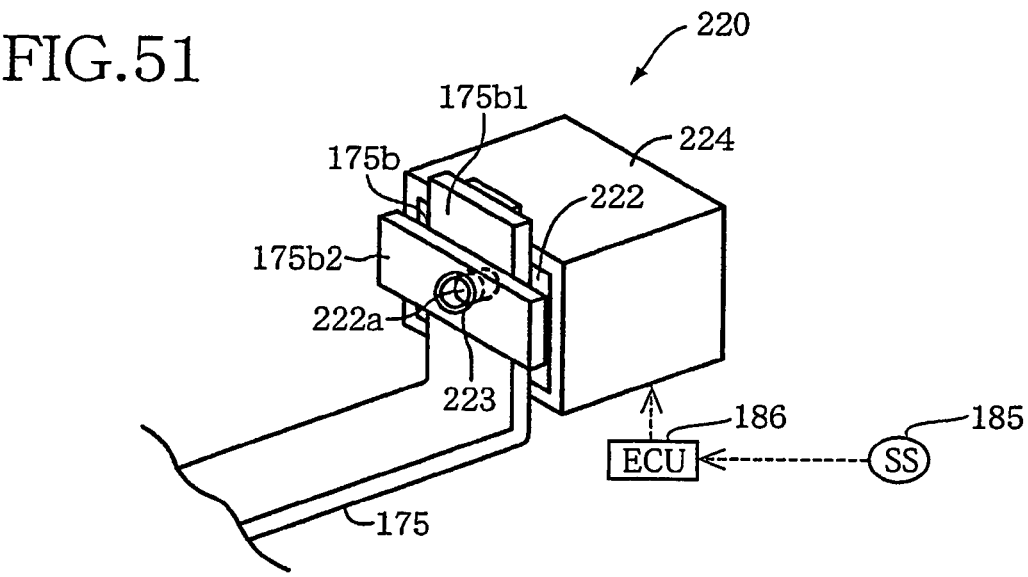
FIG. 51 is a fragmentary perspective view showing a modification of the shock absorbing steering apparatus of the eighth embodiment shown in FIGS. 48-50.

In the modification of FIGS. 51-53, the longitudinal and transverse members 175b1, 175b2 of the engaging portion 175b of the energy absorbing plate 175 are connected to each other, with the connecting pin 222a inserted in the resin pin 223 by de-energization of the electromagnetic actuator 222 when the seat belt is not worn on the vehicle operator. In this state, the energy absorbing plate 175 effectively functions to absorb the impact energy upon engagement of the T-shaped engaging portion 175b of the energy absorbing plate 175 with the holding portion 131a of the body-side bracket 131.

When the seat belt is worn on the vehicle operator, the electromagnetic actuator 222 is energized to retract the connecting pin 222a out of the through-hole of the transverse member 175b2, so that the resin tube 223 is broken or fractured upon engagement of the engaging portion 175b with the holding portion 131a, whereby the longitudinal and transverse members 175b1, 175b2 of the engaging portion 175b are separated or disconnected from each other. In this state, the energy absorbing plate 175 does not effectively function to absorb the impact energy.

Third Group of Embodiments

There will be described ninth through eleventh embodiments of this invention, which are similar to each other and constitute the third group of embodiments.

Ninth Embodiment

Referring to FIGS. 54-58, there is shown a shock absorbing steering apparatus constructed according to a ninth embodiment of the present invention. The steering column 5 and the other elements of this steering apparatus are similar in construction with the first embodiment. The foregoing description of the first embodiment from the beginning up to the portion indicated by (*1), by reference to FIGS. 1-6, applies to the steering apparatus of this ninth embodiment. In the following description of the ninth embodiment and in FIGS. 54-58, however, reference numerals 231, 241, 249 and 271 are respectively used to denote the body-side bracket, the break-away bracket, the guide member and the energy absorbing plate, which are denoted by respective reference numerals 31, 41, 49 and 71 in the first embodiment. Constituent parts of those elements 231, 241, 249 and 271 in the ninth embodiment are denoted by combinations of those reference numerals and alphabetic letters "a", "b", etc.

In the ninth embodiment, the break-away bracket 241 includes a main body portion having an almost laterally central portion 241c which consists of two plates 241c1 and 241c2 superposed on each other, as shown in FIGS. 54-58. The upper plate 241c1 extends from the front end of the lower plate 241c2 by a suitable distance in the axial direction of the column body 25. That is, the upper plate 241c1 includes a projecting front end portion 241c3, on which a guide member 249 formed of a resin is mounted. An impact energy absorbing member in the form of an energy absorbing plate 271 is mounted on the central portion 241c of the break-away bracket 241, with the guide member 249 being interposed therebetween. In the present embodiment, the central portion 241c of the break-away bracket 241 and the guide member 249 attached to the projecting front end portion 241c3 of the central portion 241c cooperate to constitute the mounting portion 45 on which the impact energy absorbing member in the form of the plate 271 is mounted.

Figure 57:
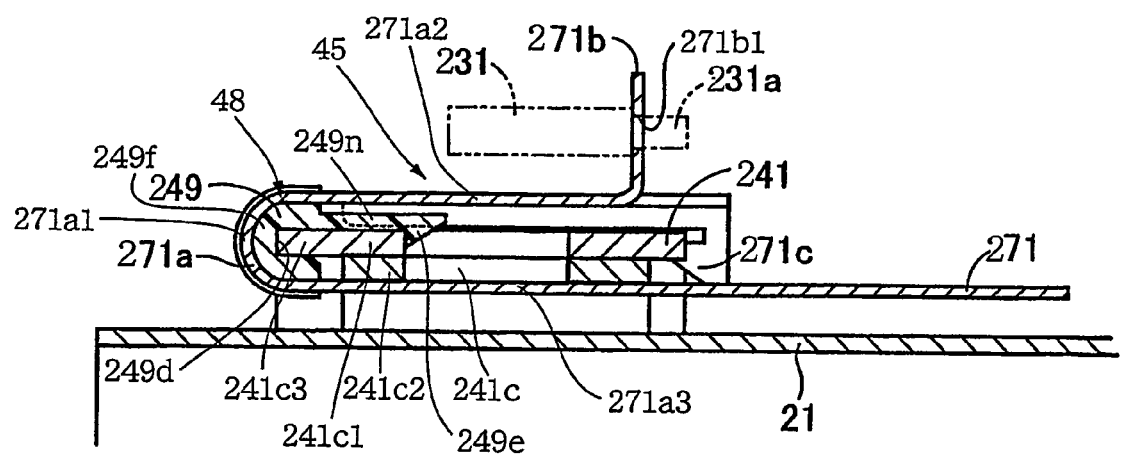
FIG. 57 is a side elevational view in axial cross section taken along line N-N of FIG. 56.

The guide member 249 has a recessed portion 249d in which the projecting front end portion 241c3 of the break-away bracket 241 is fitted, and includes a semi-cylindrical portion 249f for plastic deformation of a lower arm section 271a3 of the energy absorbing plate 271, which will be described. The guide member 249 further includes a rear extension 249n extending along the upper plate 241c1 of the break-away bracket 241 in the rearward direction. The guide member 49, which is thus generally J-shaped as seen in FIG. 57, is mounted on the break-away bracket 241 such that the rear end face of the short lower arm is held opposed to the front end of the lower plate 241c2 of the break-away bracket 241. The rear extension 249n has an engaging protrusion 249e extending downwards from its rear end. The guide member 249 is mounted on the break-away bracket 241 such that the engaging protrusion 249e is held in engagement with the upper plate 241c1.

Figure 58:
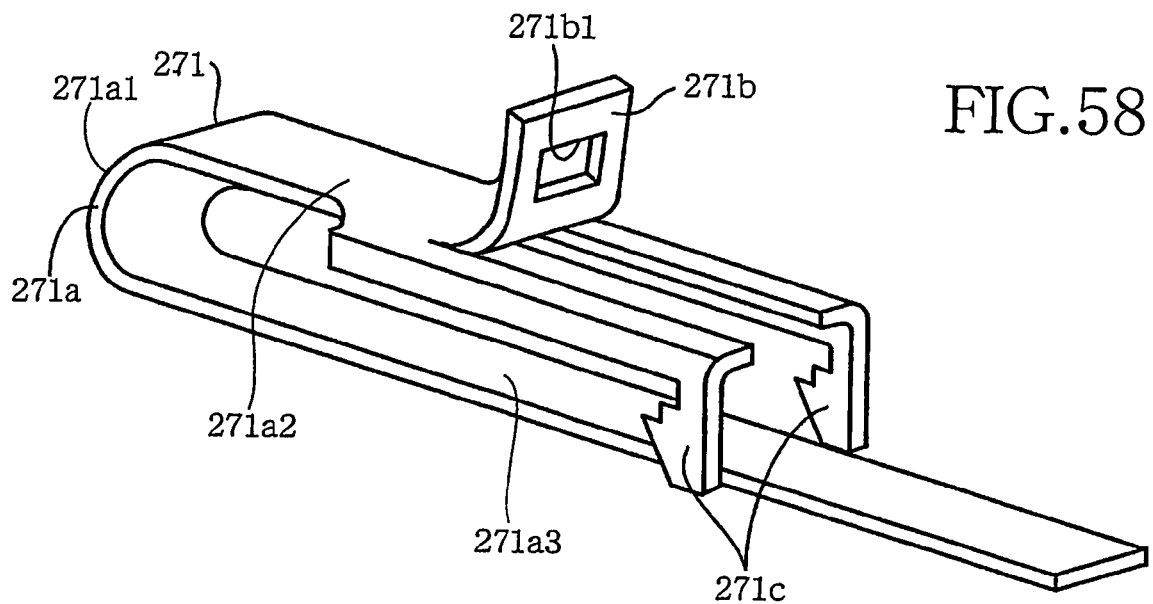
FIG. 58 is a perspective view of the energy absorbing plate shown in FIGS. 54-57.

The energy absorbing plate 271 is an elongate metallic plate capable of functioning to absorb the impact energy generated in the event of the secondary collision of the vehicle operator with the steering wheel upon collision of the vehicle, such that the impact energy is absorbed with a forward movement of the break-away bracket 241 relative to the vehicle body, which takes place when the movable portion of the steering column 5 is axially moved forward relative to the vehicle body by the secondary collision. As shown in FIG. 58, the energy absorbing plate 271 includes a U-shaped portion 271a held in engagement with the guide member 249 such that the U-shaped portion 271a is displaceable relative to the break-away bracket 241. The energy absorbing plate 271 further includes an engaging portion 271b formed at its upper rear end portion. The engaging portion 271b is engageable with a holding portion 231a formed on the body-side bracket 231. The energy absorbing plate 271 further includes holder portions 271c for engagement with the break-away bracket 241.

The U-shaped portion 271a is fitted on the two plates 241c1 and 241c2 of the break-away bracket 241 and the guide member 249 of the mounting portion 45, such that opposed two straight arms of the U-shaped portion 271a sandwich the two mutually superposed plates 241c1, 241c2 of the break-away bracket 241 in the vertical direction, as shown in FIG. 57. The U-shaped portion 271a includes an arcuate curved section 271a1, and the above-indicated two straight arms in the form of an upper arm section 71a2 and the above-indicted lower arm section 271a3 which are connected together by the curved section 271a1. The guide member 249 has a front portion held in contact with the curved section 271a1, and functions as a guide portion 48 operable to deform the energy absorbing plate 271 along the curvature of the curved section 271a1, in pressing and sliding contact with the curved section 271a1. The guide portion 48 also functions as a forcing portion operable to force a deformable member in the form of the energy absorbing plate 271, so as to cause deformation of the deformable member.

The upper straight arm section 271a2 extends from the upper end of the curved section 271a1 rearwardly of the steering column 5, in parallel with the upper surface of the upper plate 241c1 of the break-away bracket 241. As shown in FIG. 58, the upper arm section 271a2 is bent at its opposite lateral ends for structural reinforcement. These bent lateral ends terminate at their rear ends in the above-indicated holder portions 271c in the form of jaws. The above-indicated engaging portion 271b is formed by bending upwards a laterally central part of the upper arm section 271a2. The engaging portion 271b has a rectangular engaging hole 271b1 which is engageable with the holding portion 231a in the form of a projection formed on the body-side bracket 231. Thus, the engaging portion 271b of the energy absorbing plate 271 is engageable with the holding portion 231a of the body-side bracket 231. The engaging portion 271b and the holding portion 231a can be used to provisionally hold the steering column 5 on the body-side bracket 231 via the break-away bracket 241, when the steering column 5 is mounted on the vehicle body through the break-away bracket 241. It is also noted that the holder portions 271c in the form of jaws function as positioning and holding means for positioning and holding the upper arm section 271a2 with respect to the break-away bracket 241.

On the other hand, the lower straight arm section 271a3 extends from the lower end of the curved section 271a1 rearwardly of the steering column 5, and is held in contact with or in close proximity to the lower surface of the lower plate 241c2 of the break-away bracket 241. When the break-away bracket 241 is moved forward relative to the vehicle body, the lower arm section 271a3 is forced by the semi-cylindrical portion 249f of the guide member 249 (functioning as the guide portion 48) in sliding contact with the semi-cylindrical portion 249f, and is plastically deformed along the curvature of the semi-cylindrical portion 249f. This plastic deformation of the lower arm section 271a3 results in absorbing the impact energy generated upon the above-described secondary collision.

In the ninth embodiment constructed as described above, the U-shaped portion 271a of the energy absorbing plate 271 is deformed by and along the guide member 249 mounted in the front portion of the break-away bracket 241, in pressing and sliding contact with the semi-cylindrical portion 249f of the guide member 249, when the break-away bracket 241 is moved relative to the body-side bracket 231 in the forward direction of the vehicle in the event of the secondary collision of the vehicle occupant upon collision of the vehicle. This deformation of the energy absorbing plate 271 takes place while the plate 271 is displaced along the upper and lower surfaces of the respective upper and lower plates 241c1 and 241c2, so that the impact energy generated in the event of the secondary collision can be absorbed, with high stability, by the deformation of the energy absorbing plate 271.

Figure 54:
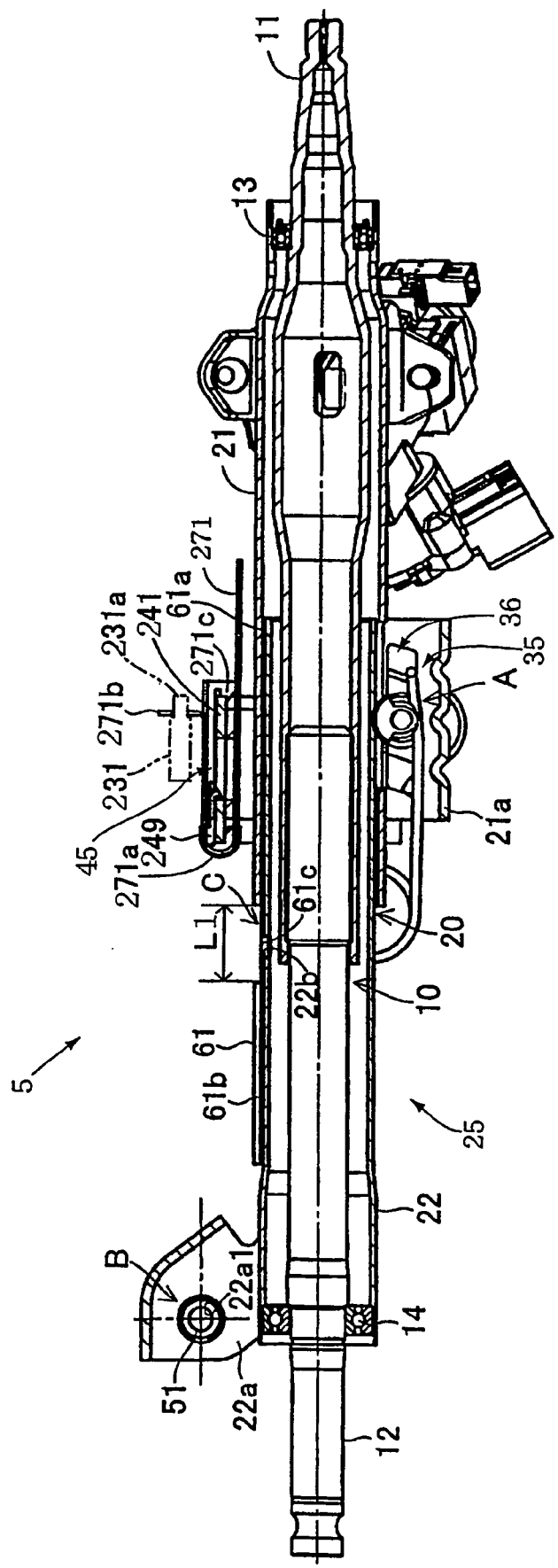
FIG. 54 is a side elevational view in axial cross section showing a shock absorbing steering apparatus constructed according to a ninth embodiment of the present invention.
Figure 55:
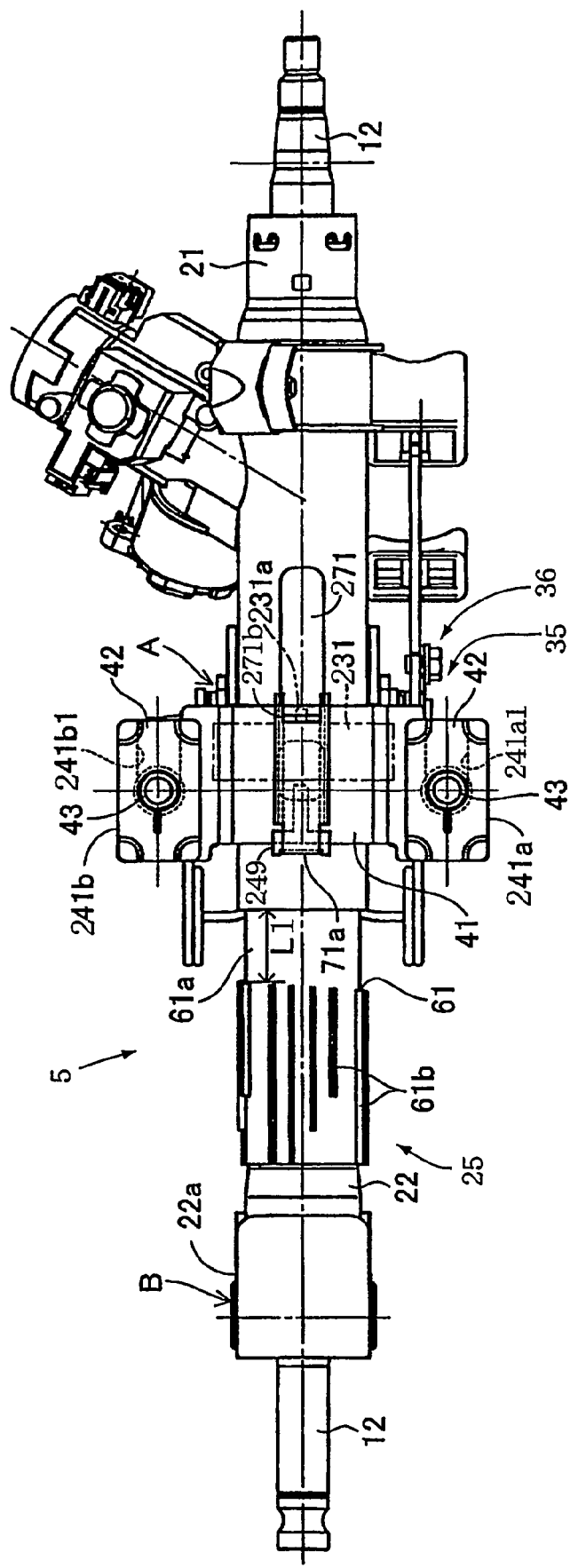
FIG. 55 is a plan view of the shock absorbing steering apparatus shown in FIG. 54.

In the event of the secondary collision, the column body 25 is axially contracted by more than the predetermined axial distance L1 from the initial state shown in FIGS. 54 and 55. Described in detail, the ribs 61b of the energy absorbing member 61 undergo shearing or plastic deformation when the upper shaft 11 and the outer tube 21 are axially moved relative to the lower shaft 12 and the inner tube 22, respectively, in the forward direction by more than the predetermined axial distance L1.

Figure 56:
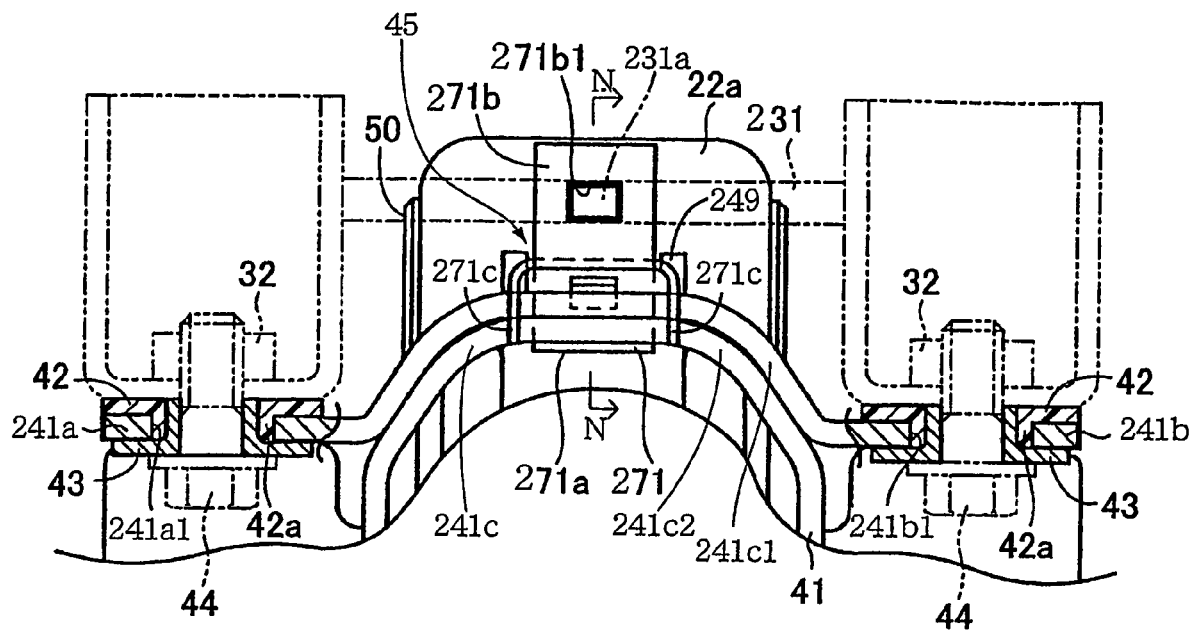
FIG. 56 is an enlarged fragmentary partially cut-away rear elevational view showing a relationship among a body-side bracket, a break-away bracket, an energy absorbing plate and other elements of the apparatus shown in FIG. 54.

In the steering apparatus according to the present ninth embodiment, the engaging portion 271b of the energy absorbing plate 271 is engageable with the holding portion 231a of the body-side bracket 231. This engagement can be utilized to provisionally hold the steering column 5 on the vehicle body during the assembling of the steering column 5 with respect to the vehicle body, more specifically, in the process of fixing the steering column 5 at its break-away bracket 241 to a portion of the vehicle body (by screwing the bolts 44 into the respective nuts 32, as shown in FIG. 56). The provisional holding of the steering column 5 on the vehicle body by engagement of the engaging portion 271b with the holding portion 231a facilitates the mounting of the steering column 5 on the vehicle body through the break-away bracket 241. During this provisional holding of the steering column 5, the engaging portion 271b is subjected to a shearing load or stress, so that the thickness of the engaging portion 271b required to have the required strength and rigidity can be reduced, making it possible to reduce the weight of the energy absorbing plate 271. The present steering apparatus has various advantages including the advantages [1]-[6] and [10]-[13] described above with respect to the first embodiment.

Figure 59:
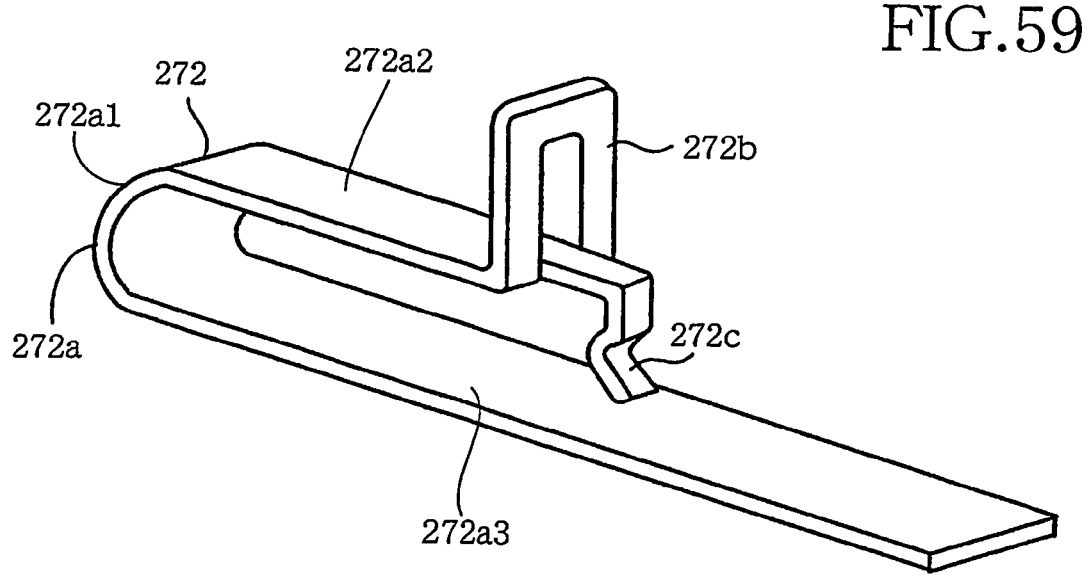
FIG. 59 is a perspective view showing an energy absorbing plate employed in a modification of the shock absorbing steering apparatus of the ninth embodiment shown in FIGS. 54-57.

Although the ninth embodiment employing the energy absorbing plate 271 shown in FIG. 58, this plate 271 may be replaced by an energy absorbing plate 272 constructed as shown in FIG. 59 according to one modification of the ninth embodiment. This energy absorbing plate 272 includes a U-shaped portion 272a having an upper arm section 272a2 and a lower arm section 272a3. The upper arm section 272a2 is provided at its rear end portion with an engaging portion 272b engageable with the body-side bracket 231, and a holder portion 272c for engagement with the break-away bracket 241. The engaging portion 272b is formed by bending upwards a U-shaped section of the rear end portion of the upper arm section 272a2, while the holder portion 272c is formed by bending downwards a rear end part of a laterally central section of the rear end portion of the upper arm section 272a2. The engaging portion 272b and holder portion 272c of the modified energy absorbing plate 272 of FIG. 59 are simpler in construction than the engaging portion 271b and holder portion 271c of the energy absorbing plate 271 of FIG. 58.

While the holding portion 231a of the body-side bracket 231 in the ninth embodiment is arranged to cooperate with the engaging portion 271b to provisionally hold the steering column 5 on the vehicle body, the holding portion 231a may be replaced by an engaging portion in the form of an engaging pin, for example, which is not formed integrally with the body-side bracket 231 and which is supported by an electromagnetic actuator mounted on the body-side bracket 231, as in the following tenth embodiment of the invention. In this modification, the engaging pin is movable in opposite directions by the electromagnetic actuator, for engagement with and disengagement from the engaging portion provided for the provisional holding of the steering column 5.

In the modification indicated above, the engaging pin retractable by the electromagnetic actuator may function as the load changeover device and the engagement adjusting mechanism described above. That is, where the engaging pin is held in its retracted position for disengagement from the engaging portion 271*b* of the energy absorbing plate 271, a forward movement of the break-away bracket 241 relative to the vehicle body upon collision of the vehicle does not cause plastic deformation of the U-shaped portion 271*a* of the energy absorbing plate 271 in pressing and sliding contact with the guide member 249, so that the plate 271 is disabled to absorb the impact energy.

Tenth Embodiment

Figure 60:
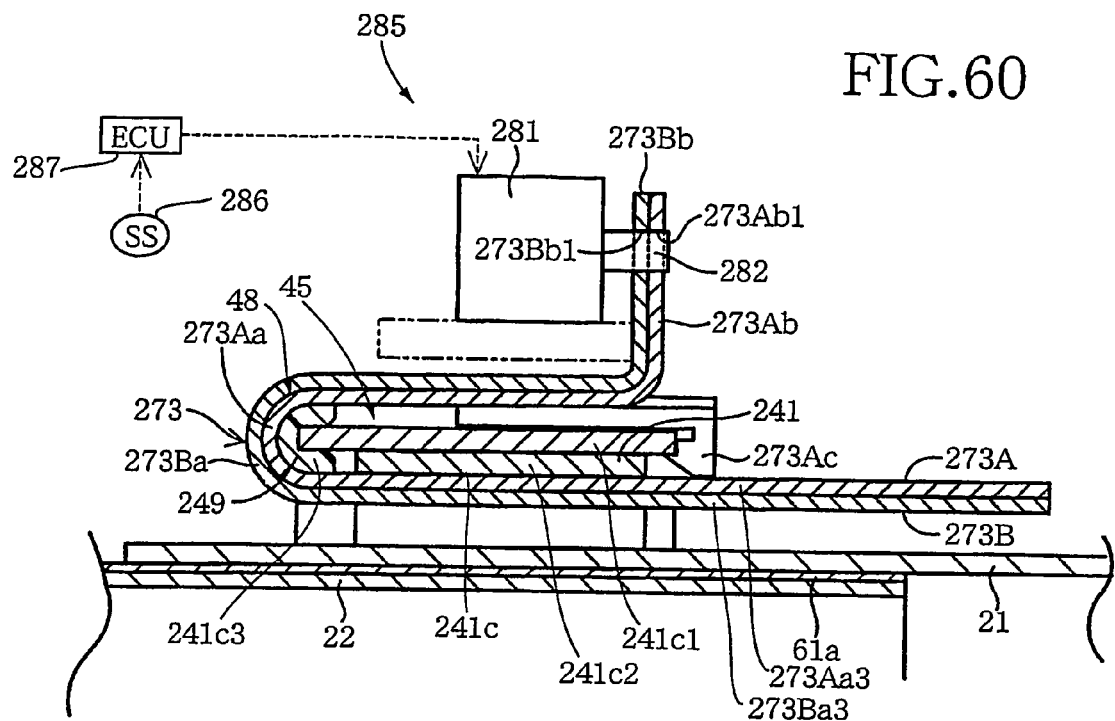
FIG. 60 is an enlarged fragmentary side elevational view showing a shock absorbing steering apparatus constructed according to a tenth embodiment of the instant invention.
Figure 61:
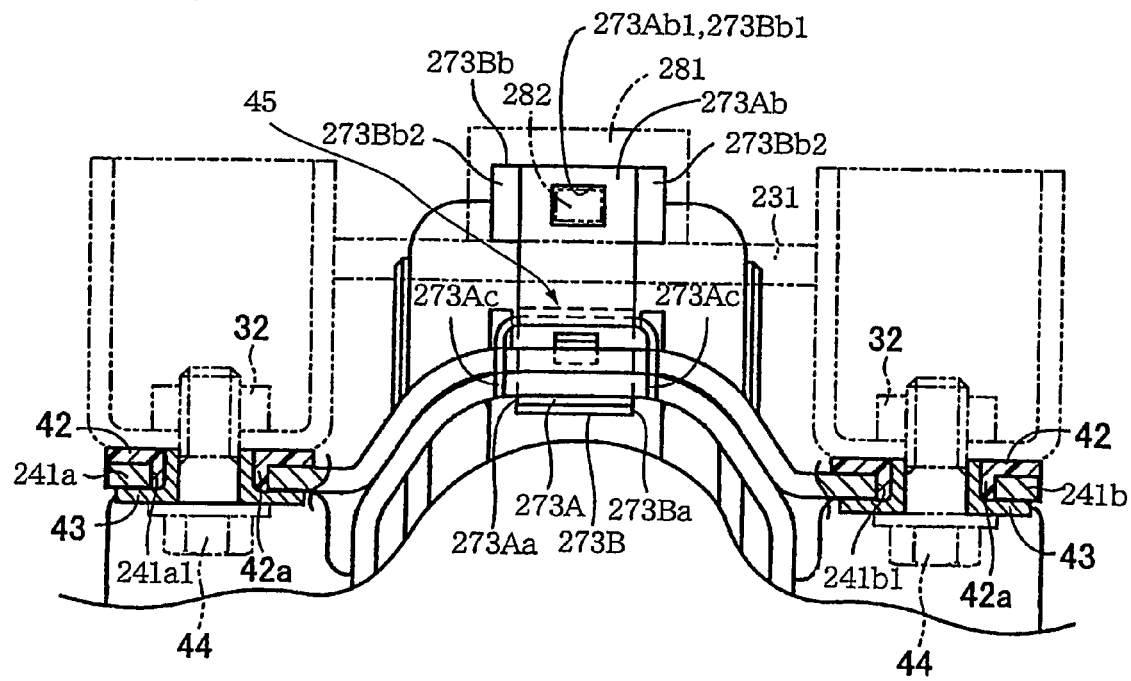
FIG. 61 is a fragmentary partially cut-away rear elevational view showing a relationship among a body-side bracket, a break-away bracket, an energy absorbing plate, a solenoid coil and other elements of the shock absorbing steering apparatus shown in FIG. 60.
Figure 62:
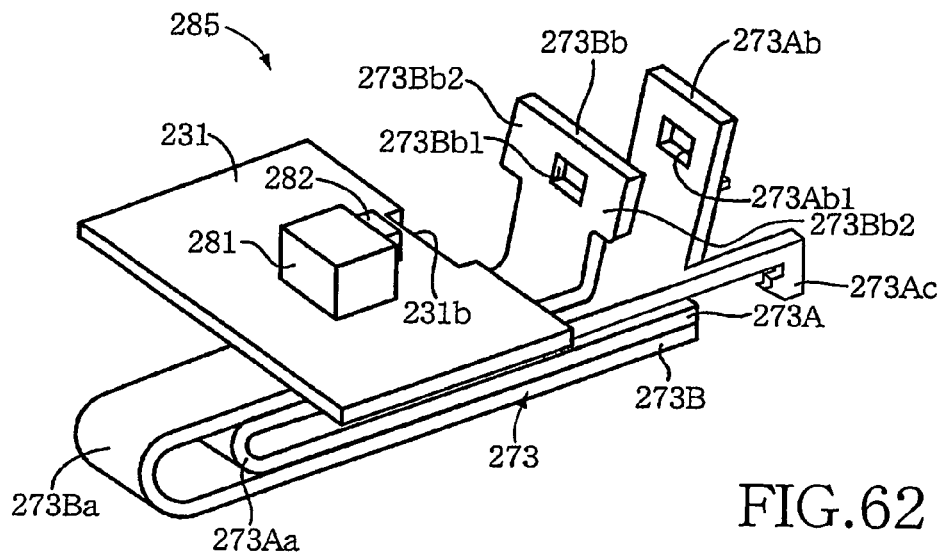
FIG. 62 is a perspective view schematically illustrating the relationship among the body-side bracket and energy absorbing plate that are shown in FIGS. 60 and 61.

The shock absorbing steering apparatus according to the tenth embodiment is shown in the fragmentary views of FIGS. 60-62. Although the energy absorbing plate 271 used in the ninth embodiment is a single elongate metallic plate, an energy absorbing plate 273 used in the tenth embodiment consists of two plates 273A and 273B which are superposed on each other and each of which functions as an impact energy absorbing member. On the other hand, the body-side bracket 231 is provided with an electromagnetic actuator 281 fixed thereto. The electromagnetic actuator 281 includes a solenoid coil, and supports an engaging pin 282 functioning as a holding portion, such that the engaging pin 282 is movable between a retracted position and an advanced position. The two plates 273A and 273B of the energy absorbing plate 273 are engageable with the engaging pin 282 placed in its advanced position, and not engageable with the engaging pin 282 placed in its retracted position. It is noted that the energy absorbing plate 273 may be replaced by an energy absorbing plate consisting of three or more plates superposed on each other.

The plate 273A includes a U-shaped portion 273Aa including an upper arm section having an engaging portion 273Ab engageable with the engaging pin 282 and a holder portion 273Ac for engagement with the break-away bracket 241. The U-shaped portion 273Aa is fitted on the mounting portion 45 of the break-away bracket 241. The U-shaped portion 273Aa further includes a lower arm section 273Aa3 extending below the mounting portion 45. The lower arm section 273Aa3 is plastically deformed by and along the guide portion 48, so to absorb the impact energy generated upon the secondary collision. The engaging portion 273Ab has a rectangular engaging hole 273Ab1 which is engageable with the engaging pin 282 placed in the advanced position. The engagement of the engaging hole 273Ab1 with the engaging pin 282 can be utilized to provisionally hold the steering column 5 on the vehicle body such that the engaging portion 273Ab is subjected to a shearing stress or load.

The other plate 273B includes a U-shaped portion 273Ba including an upper arm section having an engaging portion 273Bb engageable with the engaging pin 282 and the body-side bracket 231. The U-shaped portion 273Ba is fitted at its inner surface on the outer surface of the U-shaped portion 273Aa of the plate 273A The U-shaped portion 373Ba further includes a lower arm section 273Ba3 extending below the mounting portion 45. The lower arm section 273Ba3 is plastically deformed by and along the guide portion 48, so to absorb the impact energy generated upon the secondary collision. The engaging portion 273Bb has a rectangular engaging hole 273Bb1 engageable with the engaging pin 282 placed in the advanced position, and a pair of protruding portions 273Bb2 which are spaced apart from each other in the direction of width of the plate 273B and which are engageable with a recessed holding portion 231*b* of the body-side bracket 231. The engagement of the engaging hole 273Bb1 with the engaging pin 282 can be utilized to provisionally hold the steering column 5 on the vehicle body such that the engaging portion 273Bb is subjected to a shearing stress.

The tenth embodiment of FIGS. 60-61 is substantially identical with the ninth embodiment, except for the energy absorbing plate 273 and the electromagnetic actuator 281 having the engaging pin 282. Upon collision of the vehicle while the engaging portions 273Ab, 273Bb of the two plates 273A, 273B with the engaging pin 282 placed in the advanced position, the U-shaped portions 273Aa, 273Ba of the plates 273A, 273B are deformed by and along the guide portion 48 of the break-away bracket 241 while the break-away bracket 241 is moved relative to the body-side bracket 231 in the forward direction of the vehicle. The impact energy generated upon the vehicle collision can be absorbed with high stability, by deformation of the U-shaped portions 273Aa, 273Ba while these U-shaped portions are displaced relative to the break-away bracket 241 along the upper and lower surfaces of the break-away bracket 241.

When the break-away bracket 241 is moved forward relative to the vehicle body upon the vehicle collision while the engaging pin 282 is placed in the retracted position in which the engaging portions 273Ab, 273Bb of the plates 273A, 273B are released from the engaging pin 282 in the retracted position, the plate 273A is not held by the body-side bracket 231, and the U-shaped portion 273Aa of that plate 273A is not deformed by the forward movement of the break-away bracket 241, while the two protruding portions 273Bb2 of the engaging portion 273Bb of the other plate 273B are brought into engagement with the recessed holding portion 231*b* of the body-side bracket 231, so that the U-shaped portion 273Ba of that plate 273B is deformed by the forward movement of the break-away bracket 241. Thus, the tenth embodiment is arranged to selectively permit and inhibit the deformation of the U-shaped portion 273Aa of the plate 273A, for thereby changing in two steps the amount of impact energy that can be absorbed by the energy absorbing plate 273, depending upon whether the seat belt is worn on the vehicle operator or not. It will be understood that an engagement adjusting mechanism or a load changeover device 285 is constituted by the engaging portions 273Ab, 273Bb of the two plates 273A, 273B, the electromagnetic actuator 281 and the engaging pin 282.

The electromagnetic actuator 281 is energized or de-energized under the control of an electronic control unit (ECU) 287 (constituted principally by a computer) according to an output signal of a sensor operable to detect a state of the vehicle or vehicle occupant, for example, a seat-belt sensor (SS) 286 arranged to detect that the seat belt is worn on the vehicle operator, as shown in FIG. 60, as in the seventh embodiment of FIGS. 41-43. The electromagnetic actuator 281 is energized to move the engaging pin 282 to its retracted position to permit only the plate 273B to absorb the impact energy, when the seat belt is worn on the vehicle operator. When the seat belt is not worn on the vehicle operator, on the other hand, the electromagnetic actuator 282 is de-energized to hold the engaging pin 282 in the advanced position for engagement with the engaging portions 273Ab, 273Bb of the two plates 273A, 273B, permitting the two plates 273A, 273B to absorb the impact energy, so that a larger amount of the impact energy can be absorbed by deformation of the energy absorbing plate 273.

The steering apparatus according to the tenth embodiment is substantially identical with the ninth embodiment, except for the load changeover device 285, and has substantially the same advantages as the ninth embodiment.

In the tenth embodiment, the engaging portion 273Bb of the plate 273B is provided with the pair of protruding portions 273Bb2, while the body-side bracket 231 is provided with the recessed holding portion 231a, so that the protruding portions 273Bb2 of the plate 273B are engageable with the holding portion 231a, even when the engaging pin 282 is held in its retracted position by the electromagnetic actuator 281. In other words, the amount of the impact energy that is absorbed by the energy absorbing plate 273 consisting of the two plates 273A, 273B can be changed in two steps by the load changeover device 285. However, the load changeover device 285 of this type may be replaced by a load changeover device which does not include the protruding portions 273Bb2 and the recessed holding portion 231b and in which the ECU 286 is arranged to control the electromagnetic actuator 287 such that the engaging pin 282 has two retracted positions as well as the advanced position. In one of the two retracted positions, the engaging pin 282 is released from the engaging portion 273Ab of the plate 273A but is held in engagement with the engaging portion 273Bb of the other plate 273B. In the other retracted position, the engaging pin 282 is released from the engaging portions 273Ab, 273Bb of the two plates 273A, 273B. In this modification, the amount of the impact energy absorbed by the energy absorbing plate 273 can be changed in three steps corresponding to the two retracted positions and the advanced position of the engaging pin 282.

Eleventh Embodiment

In the ninth embodiment, the steering column 5 can be provisionally held by the vehicle body, during assembling of the steering column 5 on the vehicle body. That is, the engaging portion 271b of the energy absorbing plate 271 mounted on the break-away bracket 241 is brought into engagement with the holding portion 231a of the body-side bracket 231, to provisionally hold the steering column 5 on the vehicle body. To this end, the energy absorbing plate 271 is provided with the holder portions 271c for engagement with the break-away bracket 241. In the eleventh embodiment shown in FIGS. 63 and 64, an energy absorbing plate 274 different in construction from the energy absorbing plate 271 is employed. The present eleventh embodiment is substantially identical in construction with the ninth embodiment, except for the energy absorbing plate 274, and has substantially the same advantages as the ninth embodiment.

Figure 63:
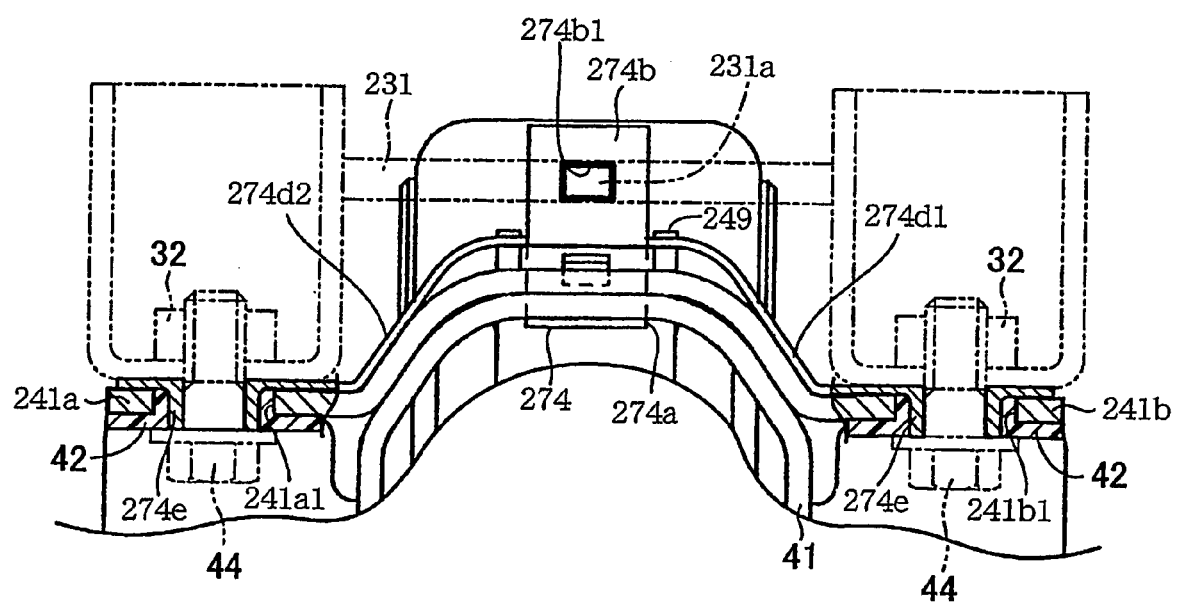
FIG. 63 is an enlarged fragmentary partially cut-away rear elevational view corresponding to that of FIG. 56, showing a shock absorbing steering apparatus constructed according to an eleventh embodiment of this invention.
Figure 64:
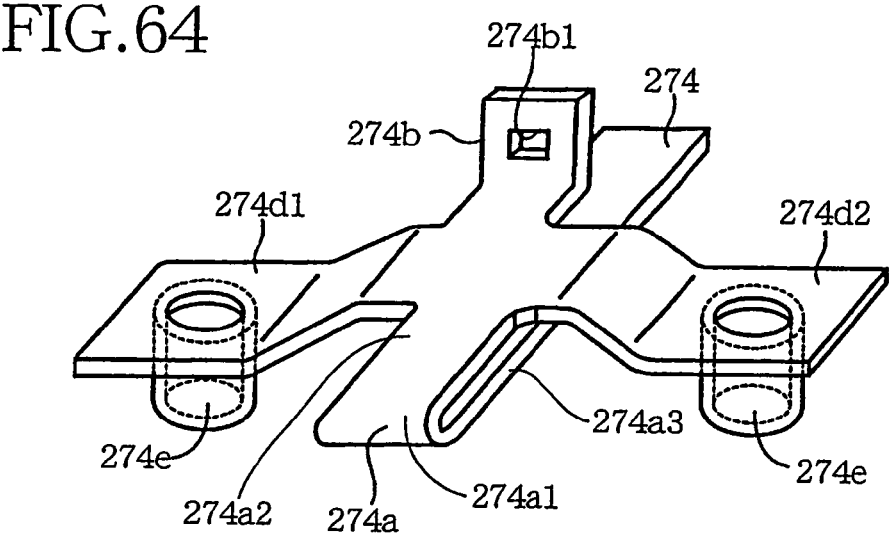
FIG. 64 is a perspective view schematically illustrating an energy absorbing plate shown in FIG. 63.

The energy absorbing plate 274 employed in the eleventh embodiment includes a U-shaped portion 274a having a curved section 274a1, an upper arm section 274a2 and a lower arm section 274a3. The upper arm section 274a2 is provided at its rear end portion with an engaging portion 274b which is engageable with the body-side bracket 231. The upper arm section 274a2 is further provided, at its intermediate portion in front of the engaging portion 274b, with a pair of wing portions 274d1, 274d2, which extend from the upper arm section 274a2 in the opposite directions parallel to the direction of width of the upper arm section 274a2. The two wing portions 274d1, 274d2 have respective cylindrical portions 274e press-fitted in the resin capsules 42 fitted in respective slots 241a1, 241b1 formed in the break-away bracket 241 such that the slots 241a1, 241b1 are spaced apart from each other in the direction of width of the upper arm section 274a2 (in the lateral direction of the vehicle), as shown in FIG. 63. Upon secondary collision of the vehicle operator, the resin capsules 42 are broken or fractured, and the cylindrical portions 274e are released from the slots 241a1, 241b1, so that the break-away bracket 241 is permitted to be moved relative to the body-side bracket 231. The resin capsules 42 are fitted in the respective slots 241a1, 241b1 formed in the respective arms 241a, 241b of the break-away bracket 241, such that the flanges of the resin capsules 42 are held in contact with the lower surfaces of the arms 241a, 241b. The two wing portions 274d1, 274d2 may be considered to be a single portion formed between the curved section 274a1 of the U-shaped portion 274a and the engaging portion 274b.

In the eleventh embodiment, the steering column 5 can be provisionally held by the vehicle body, by engagement of the engaging portion 274b of the energy absorbing plate 274 with the holding portion 231a, when the steering column 5 is assembled with respect to the vehicle body. In this provisionally held state of the steering column 5, the weight of the steering column 5 is received by the wing portions 274d1, 274d2 and the engaging portion 274b of the energy absorbing plate 274, while the curved section 274a1 and the lower arm section 274a3 which are to be deformed by the guide portion 48 are substantially free from a load due to the weight of the steering column 5. Accordingly, the U-shaped portion 274a of the energy absorbing plate 274 is not deformed during assembling of the steering column 5 on the vehicle body, owing to the provisional holding of the steering column 5 as described above, so that the energy absorbing plate 274 is capable of absorbing the impact energy in the intended manner. It will be understood that the wing portions 274d1, 274d2 also function as positioning means for positioning the upper arm section 274a2 with respect to the break-away bracket 241.

Twelfth Embodiment

Figure 65:
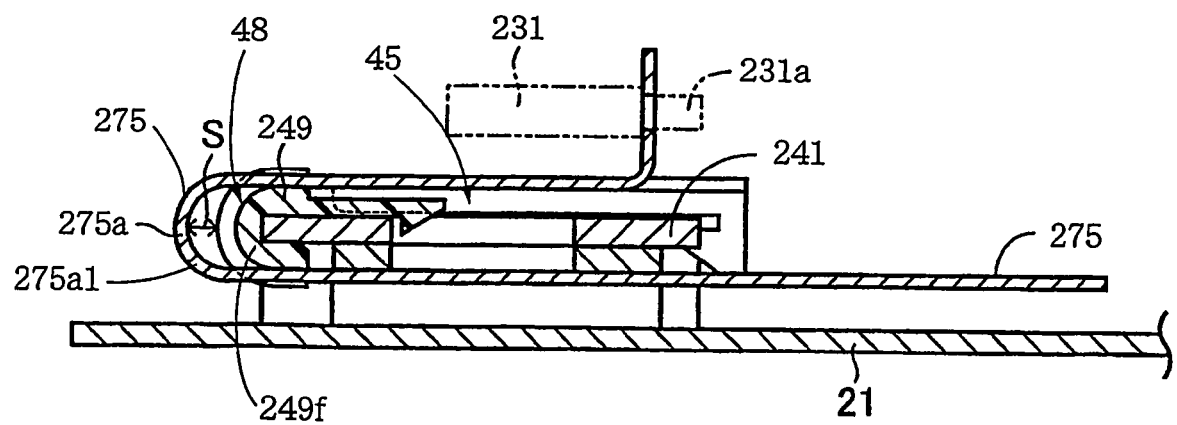
FIG. 65 is a side elevational view in axial cross section corresponding to that of FIG. 57, showing a shock absorbing steering apparatus constructed according to a twelfth embodiment of this invention.

In the ninth embodiment, the curved section 271a1 of the U-shaped portion 271a of the energy absorbing plate 271 is held in contact with the semi-cylindrical portion 249f of the guide member 249 located within the U-shaped portion 271a. In the present twelfth embodiment employing an energy absorbing plate 285 including a U-shaped portion 285a, there is provided a suitable amount of air gap S between the front end of the U-shaped portion 275a and the front end of the mounting portion 45 located within the break-away bracket 241, as shown in FIG. 65. In other words, the air gap S is provided between a semi-cylindrical portion 275a1 of the U-shaped portion 275a and the front end of the guide portion 48.

In the present twelfth embodiment, the air gap S permits a free forward movement of the break-away bracket 241 and the guide member 249, that is, a free forward movement of the mounting portion 45, in an initial period of the secondary collision. Accordingly, the moment at which the deformation of the U-shaped portion 275a of the energy absorbing plate 275 by the break-away bracket 241 is initiated is delayed with respect to the moment at which the break-away bracket 241 is released from the vehicle body (body-side bracket 231). Accordingly, the impact energy absorbing load in the initial period of the secondary collision in the present twelfth embodiment is made smaller than in the apparatus wherein the deformation of the energy absorbing plate is initiated substantially at the same time as the moment of releasing of the break-away bracket 241 from the body-side bracket 231. The moment of generation of the impact energy absorbing load based on the deformation of the U-shaped portion 275a of the energy absorbing plate 275 can be adjusted as desired, by turning the amount of the air gap S. The steering apparatus of the present twelfth embodiment is substantially identical in construction with the ninth embodiment, and has substantially the same advantages as the ninth embodiment. It will be understood that a similar air gap S may be provided in the other embodiments of this invention.

Fourth Group of Embodiments

There will be described thirteenth and fourteenth embodiments of this invention, which are similar to each other and constitute the fourth group of embodiments.

Thirteenth Embodiment

Figure 66:
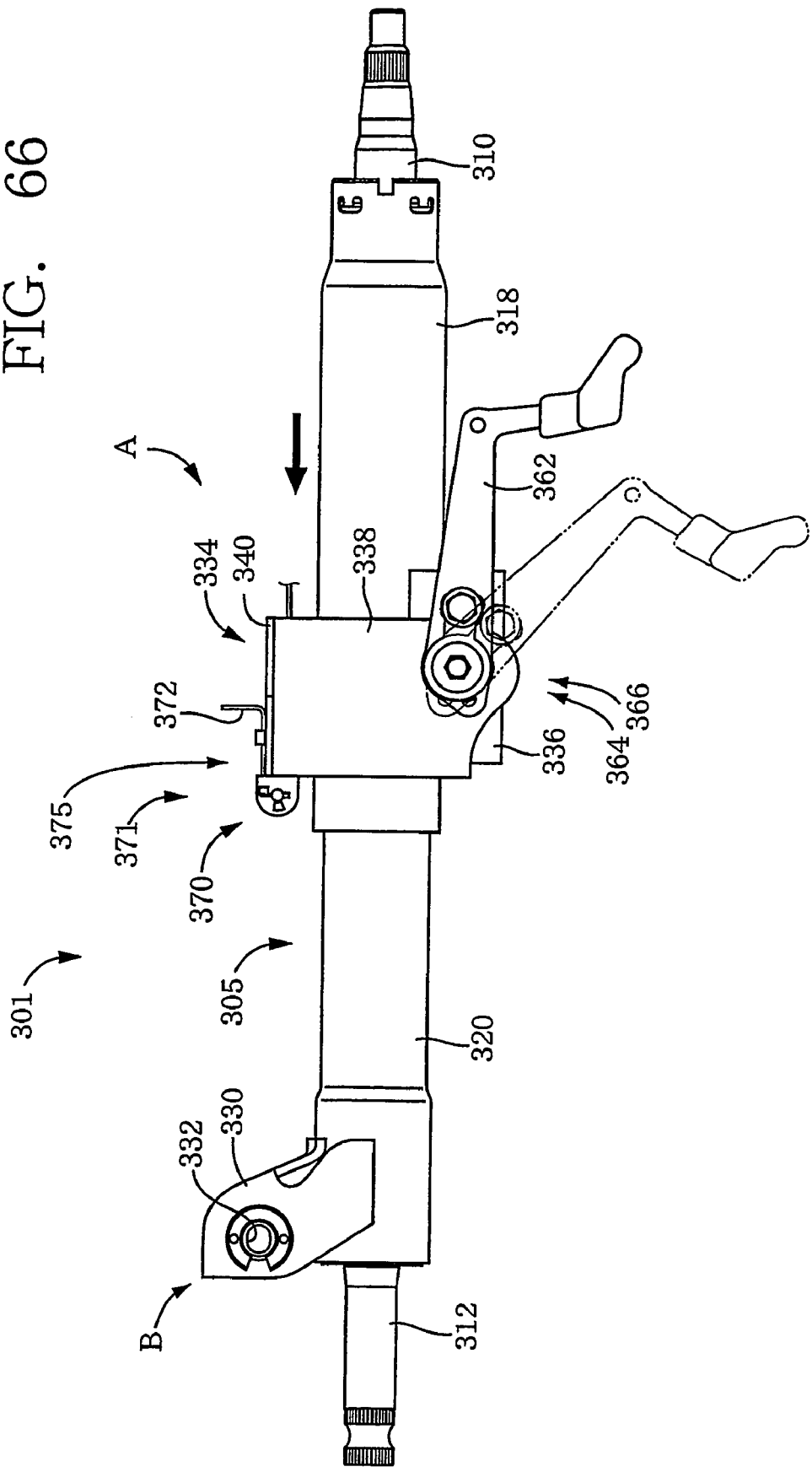
FIG. 66 is a side elevational view showing a shock absorbing apparatus constructed according to a thirteenth embodiment of the present invention.
Figure 67:
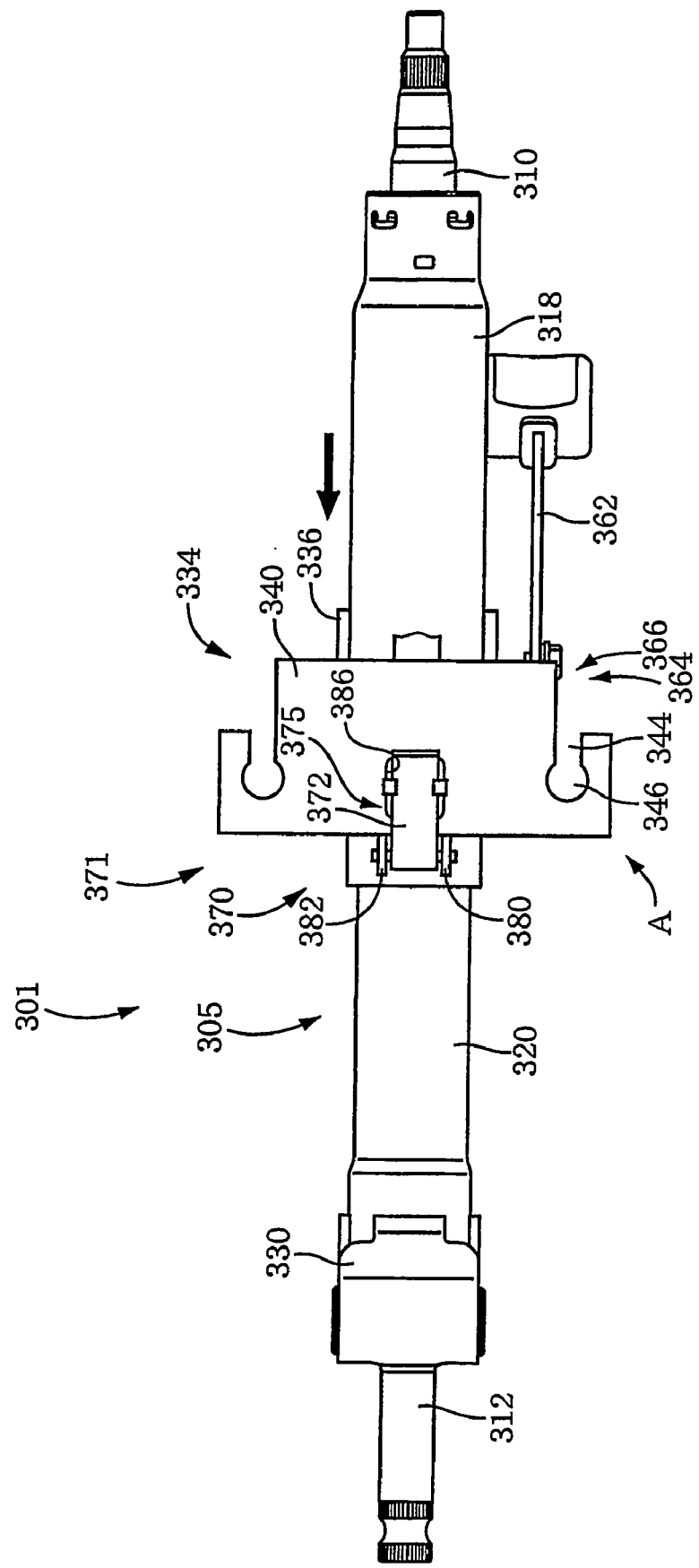
FIG. 67 is a plan view of a steering column shown in FIG. 66.
Figure 68:
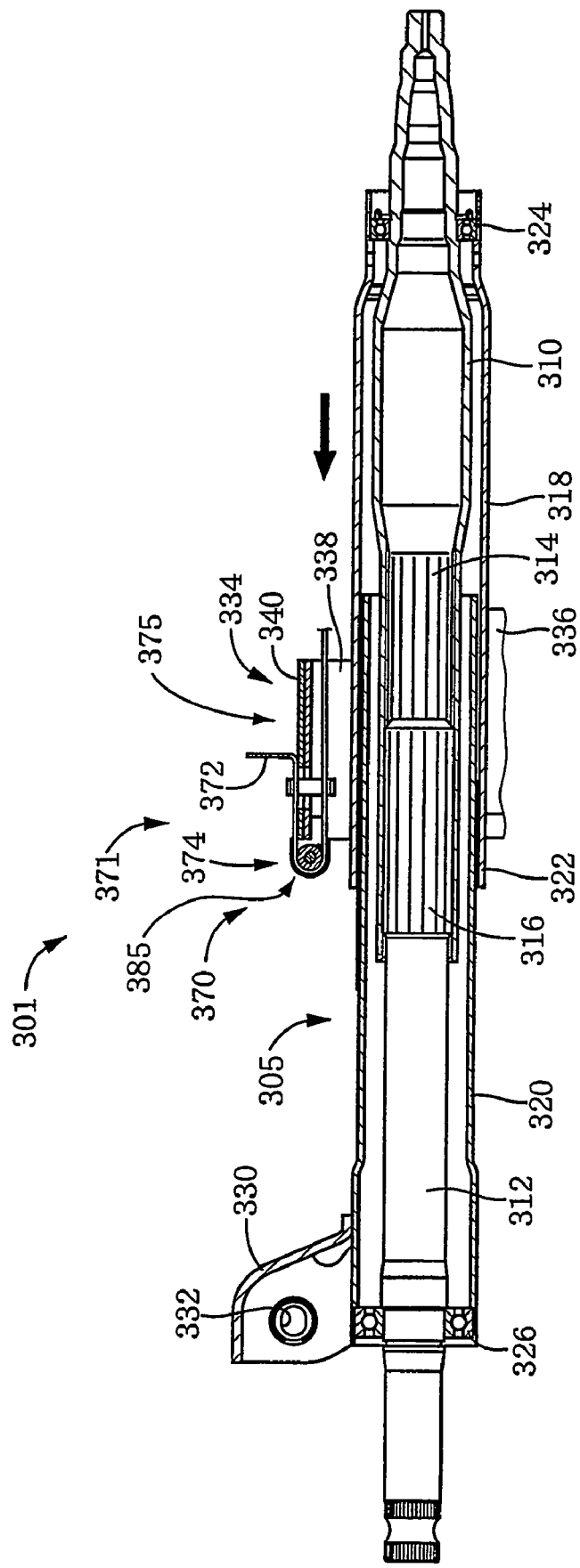
FIG. 68 is a side elevational view in cross section of the steering column shown in FIG. 66.
Figure 69A:
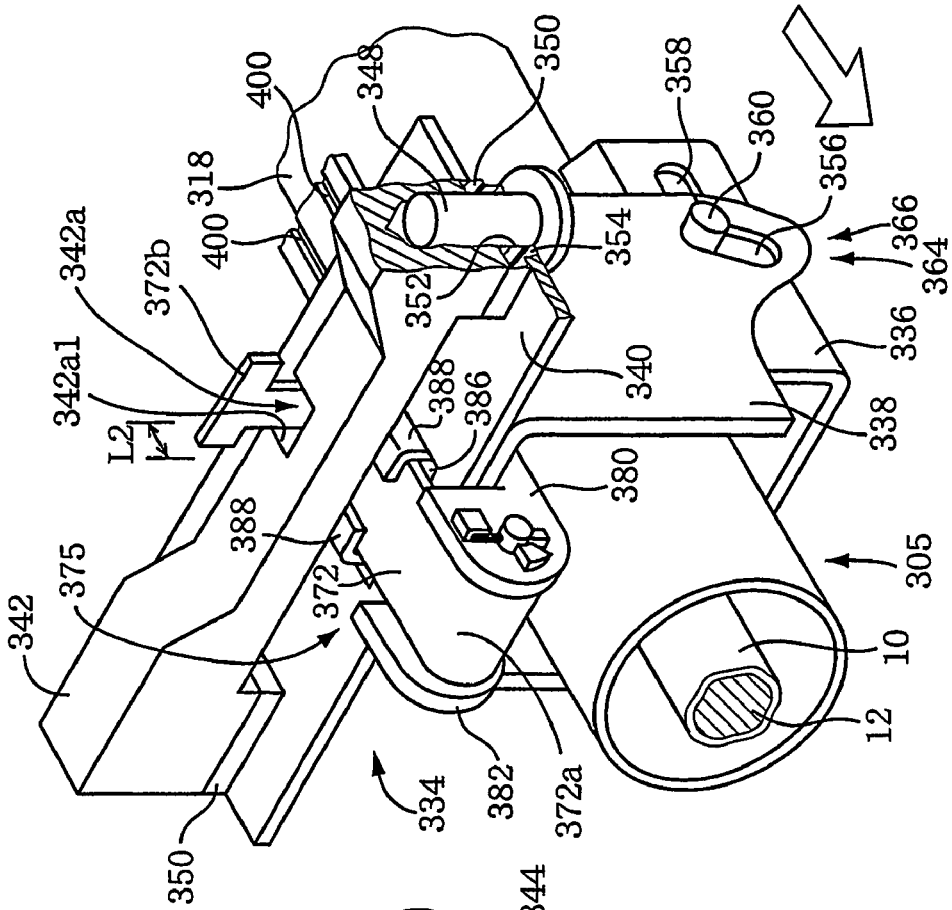
FIGS. 69A and 69B are perspective views showing a rear tube of the steering column shown in FIG. 66 as attached to the vehicle body, and a shock absorbing device provided in the thirteenth embodiment.
Figure 69B:
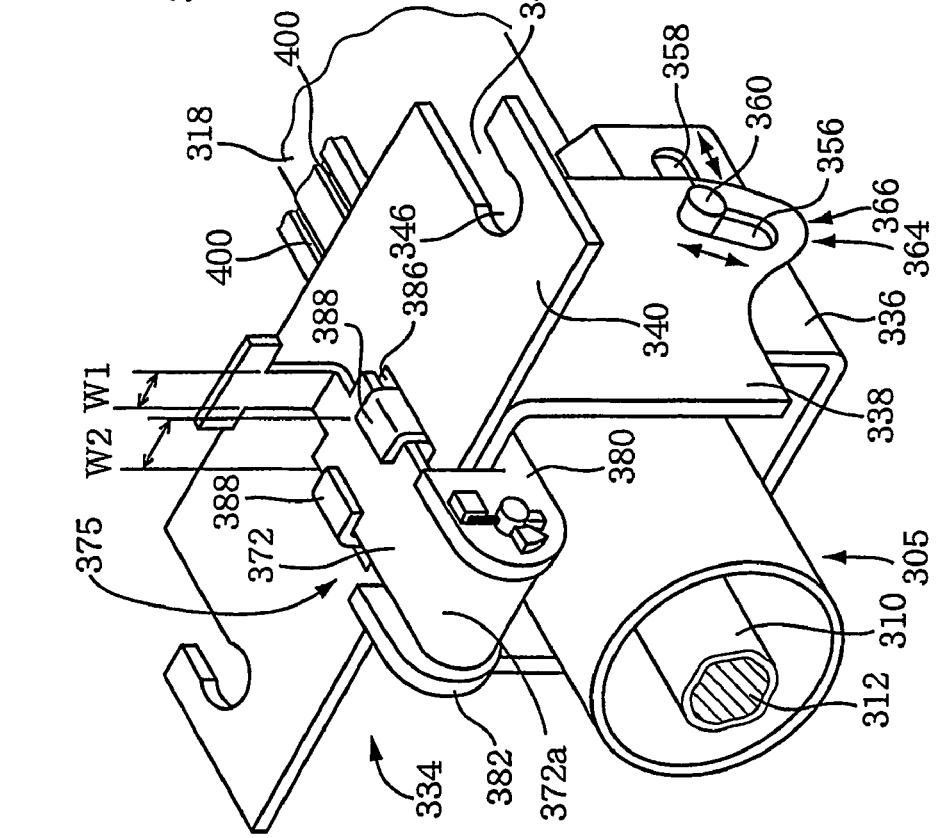

The shock absorbing steering apparatus according to the thirteenth embodiment of this invention will be described referring to a side elevational view of FIG. 66 showing the apparatus, a plan view of FIG. 67 showing a steering column 301 provided in the apparatus, a side elevational view of FIG. 68 showing in cross section the steering column 301, and perspective views of FIGS. 69A and 69B showing a rear tube 318 of the steering column 301 as attached to the vehicle body and a shock absorbing device 371 provided in the apparatus. In the steering column 301 shown in FIGS. 66-68, the steering wheel is attached to the right end of the steering column 301 as seen in these figures, while the steering gearbox is operatively connected to the left end of the steering column 301 as seen in the figures. The steering column 301 is mounted on the vehicle body, so as to have an inclined posture or attitude, such that the right end of the steering column 301 as seen in FIGS. 66-68 is located above and rearwardly of the left end as seen in the figures. In the interest of simplification of description of the following embodiments, the right and left ends of the steering column 301 and the corresponding ends of each element thereof as seen in FIGS. 66-68 will be referred to as the rear ends and the front ends, respectively, and the direction from the left end toward the rear end and the direction from the rear end toward the front end will be referred to as the rearward and forward directions, respectively, unless otherwise specified.

In the present steering apparatus, the steering column 301 includes a column body 305 as a major portion thereof, which includes a shaft portion and a tubular portion supporting the shaft portion such that the shaft portion extends through the tubular portion. The shaft portion includes a rear shaft 310 to which a steering wheel is attached, and a front shaft 312 connected to the steering gearbox for steering front wheels of the vehicle. The rear shaft 310 is a tubular member, while the front shaft 312 is a rod. The front shaft 312 has a rear end portion inserted in a front end portion of the rear shaft 310. The front end portion of the rear shaft 310 has a splined inner circumferential surface 314, while the rear end portion of the front shaft 312 has a splined outer circumferential surface 316 held in meshing engagement with the splined inner circumferential surface 314, such that the rear shaft 310 and the front shaft 312 are axially movable relative to each other and are rotatable together as a unit. On the other hand, the tubular portion includes a rear tube 318 on the side of the steering wheel, and a front tube 320 on the side of the steering gearbox. The front tube 320 has a rear end portion inserted in a cylindrical liner 322 fitted in a front end portion of the rear tube 318, with substantially no clearance between the outer circumferential surface of the rear end portion of the front tube 320 and the inner circumferential surface of the cylindrical liner 322. These outer and inner circumferential surfaces of the front tube 320 and the mating cylindrical liner 322 have been subjected to a treatment for reducing their frictional resistance to thereby assure a smooth axial relative movement of the rear and front tubes 318, 320. The rear tube 318 is provided at its rear end portion with a radial bearing 324, while the front rube 320 is provided at its front end portion with a radial bearing 326. The rear shaft 310 is rotatably supported at an axially intermediate portion thereof by the radial bearing 324, while the front shaft 312 is rotatably supported at an axially intermediate portion thereof by the radial bearing 326. The column body 305 thus constructed is axially contractible and extensible. Namely, the axial length of the column body 305 is variable.

The column body 305 is attached at its rear and front tubes 318 and 320 to a portion of the vehicle body through respective rear and front support mechanisms A and B. The front support mechanism B includes a bracket 330 which is fixed to the front end portion of the front tube 320 and which has a shaft hole 332 through which a support shaft (not shown) fixed to the vehicle body is inserted. Thus, the front tube 320, that is, the column body 305 is mounted to the vehicle body such that the column body 305 is pivotable about the support shaft of the front support mechanism B. The front support mechanism A includes a column holder structure in the form of a break-away bracket 334 fixed to a portion of the vehicle, more specifically, to a reinforcement of an instrumental panel of the vehicle. The rear tube 318 is provided with a supported member 336 fixed thereto, while the break-away bracket 334 includes a supporting member 338 of a U-shaped channel structure supporting the supported member 336, and a supported plate 340 fixed to the vehicle body (the reinforcement of the instrumental panel). That is, the steering column 301 includes the column body 305, the front support mechanism B having the bracket 330, and the rear support mechanism A having the break-away bracket 334.

The rear support mechanism A will be described in greater detail by reference to FIGS. 69A and 69B. The above-described reinforcement is provided with a body-side bracket 342 fixed thereto, while the supported plate 340 of the break-away bracket 334 has a pair of slots 344 formed through respective end portions that are spaced from each other in the direction of extension of the reinforcement (in the transverse direction of the vehicle). Each of these slots 344 includes a generally circular pin hole 346 at its front end portion. The pin hole 346 has a diameter slightly larger than the width of the other portion of the slot 344. Fixing pins 348 are inserted through the respective pin holes 346 such that the supported plate 440 is interposed between the heads of the pins 348 and the body-side bracket 342, and is thus fixed to the body-side bracket 342. Described more specifically, an intermediate plate 350 is interposed between the supported plate 340 and the body-side bracket 342. The intermediate plate 350 has insert holes 352 in which the stems of the fixing pins 348 are inserted, and includes annular protrusions 354 extending from its lower surface. The insert holes 352 are formed through these annular protrusions 354, and the annular protrusions 354 are fitted in the pin holes 346. Although the diameter of the fixing pins 348 is smaller than the width of the slots 344, the fixing pins 348 are normally prevented from moving from the pin holes 346 through the other portion of the slots 344, in the presence of the annular protrusions 354 fitted in the pin holes 346, so that the rear tube 318 is prevented from axially moving relative to the body-side bracket 342.

The rear support mechanism A further includes a tilting mechanism 364 and a telescopic mechanism 366 through which the column body 305 is supported by the break-away bracket 334. The supporting member 338 and the supported member 336 have respective elongate holes 356 and 358, respectively. These elongate holes 356, 358 are formed such that a direction of extension of the elongate holes 356 intersects a direction of extension of the elongate holes 358. The column body 305 is pivotable about the support shaft of the front support mechanism B, by an angle corresponding to the length of the elongate holes 356 formed through the supporting member 338, and is axially contractible and extensible by an axial distance corresponding to the length of the elongate holes 358 formed through the supported member 336. Referring to FIG. 66, there is shown a lock lever 362 for the tilting mechanism 364 and the telescopic mechanism 366. The lock lever 362 has a locking position indicated by solid line and a releasing position indicated by two-dot chain line. The supported member 336 is firmly locked to the supporting member 338 when the lock lever 362 is manually operated to the locking position. In this locking position, therefore, the tilting and axial length adjustment of the column body 305 by the tilting and telescopic mechanisms 364, 366 are inhibited. The tilting and axial length adjustment of the column body 305 are permitted by operating the lock lever 362 to the releasing position.

In the event of a secondary collision of the vehicle operator with the steering wheel (not shown) attached to the rear shaft 310 of the steering column 301 upon collision of the vehicle with any object, the rear tube 318 is released from the vehicle body, that is, an axial movement of the break-away bracket 334 relative to the body-side bracket 342 is permitted by breakage or fracturing of the annular protrusions 354 of the intermediate plate 350, which is formed of a resin or any other material that is comparatively brittle and has a comparatively low coefficient of friction. Described in detail, an impact acting on the steering wheel in the axial direction of the steering column 301 exceeds a predetermined threshold value, the annular protrusions 354 are broken, permitting a movement of the break-away bracket 334 in the forward direction of the vehicle while, with the supported plate 340 being moved relative to the fixing pins 348 in the direction of extension of the slots 344, namely, relative to the vehicle body, so that the rear tube 318, rear shaft 310 and break-away bracket 334 are moved together relative to the vehicle body (body-side bracket 342). In the present steering column 301, those rear tube 318, rear shaft 310 and break-away bracket 334 constitute a movable portion of the column body 305 which is permitted to be axially moved relative to the vehicle body, when the impact acting on the column body 305 exceeds the predetermined threshold value. A maximum distance of axial movement of the movable portion of the column body 305 is defined by an abutting contact of the upper end face of the front shaft 312 with a shoulder formed on the inner circumferential surface of the rear shaft 310. However, this maximum distance is sufficient to effectively absorb the impact energy generated by the secondary collision, irrespective of the axial length of the column body 305 as adjusted by the telescopic mechanism 366, that is, irrespective of the axial position in which the rear tube 318 and rear shaft 310 are locked with the lock lever 362 held in the locking position. (*3)

Figure 70:
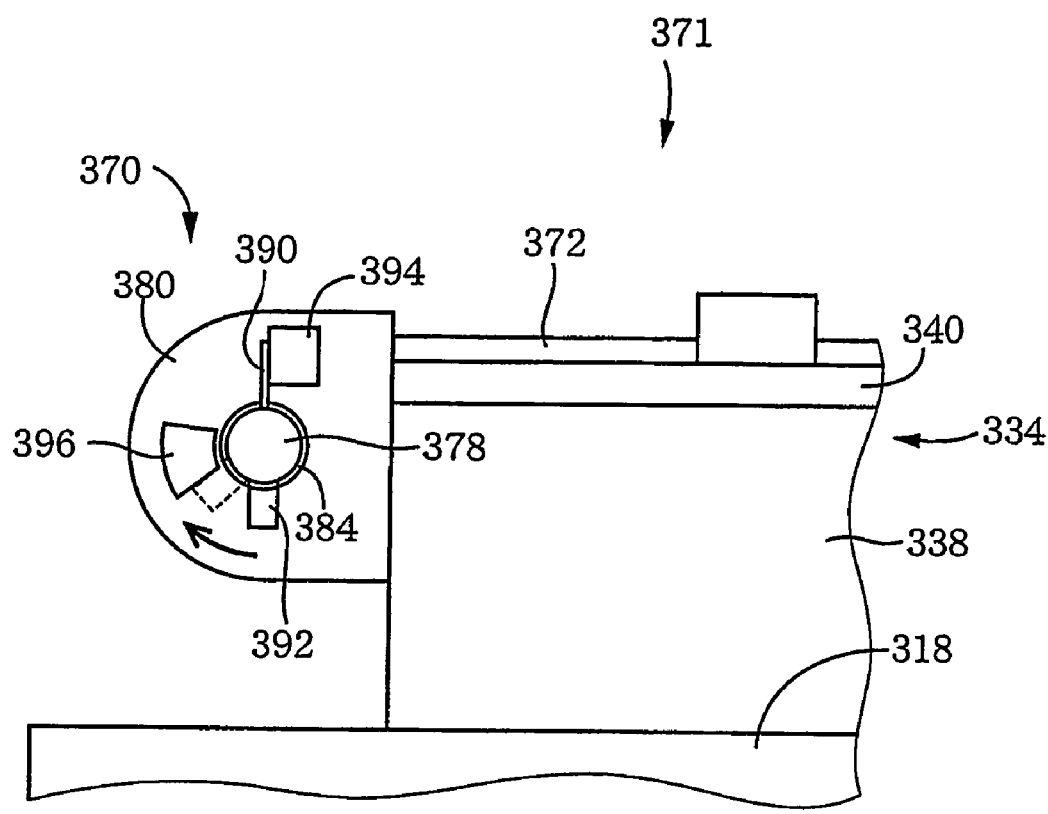
FIG. 70 is an enlarged view of a portion of a resistance generating device, which is shown in FIG. 66.
Figure 71:
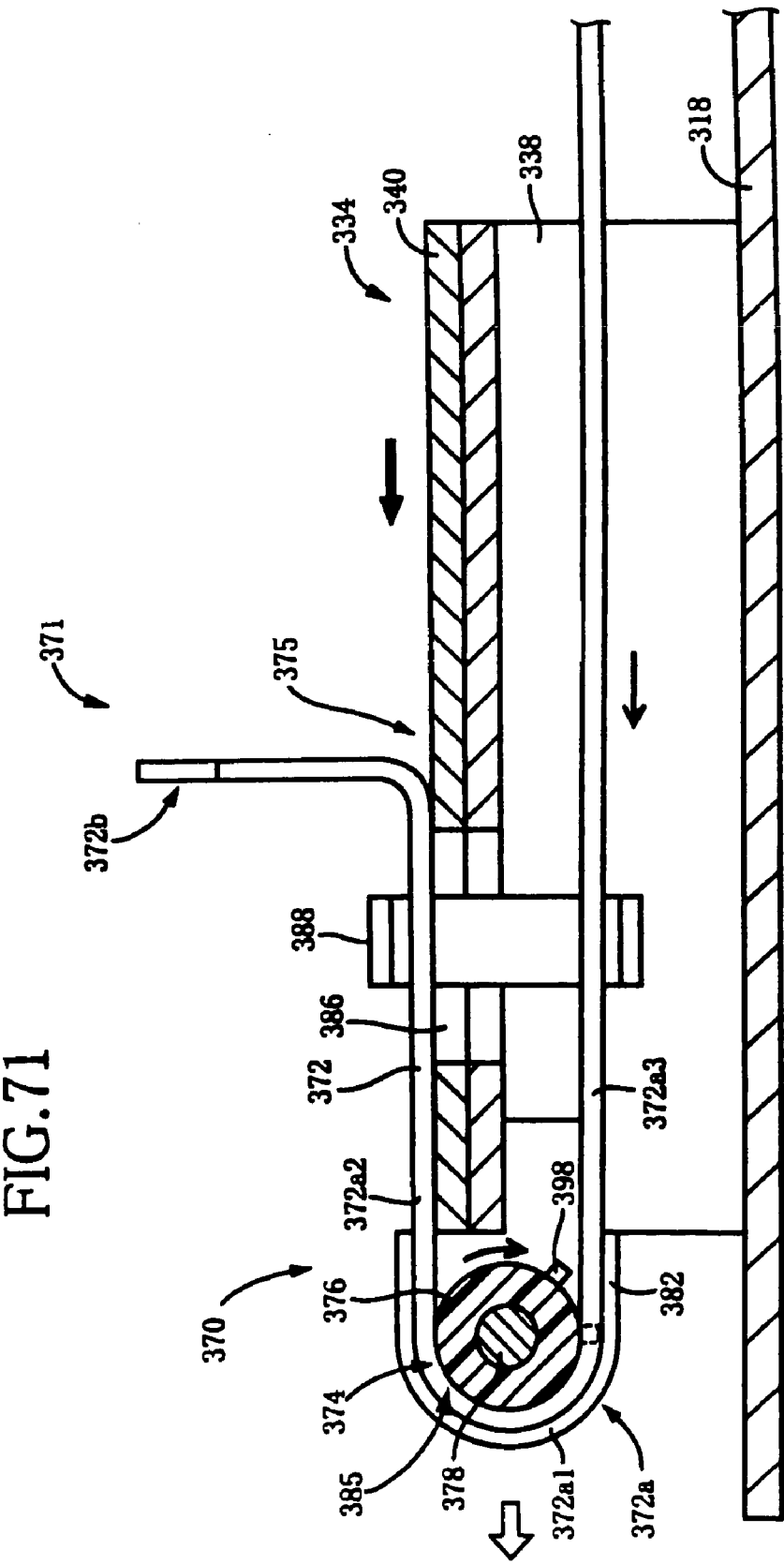
FIG. 71 is an enlarged view of a portion of the resistance generating device, which is shown in FIG. 68.
Figure 72:
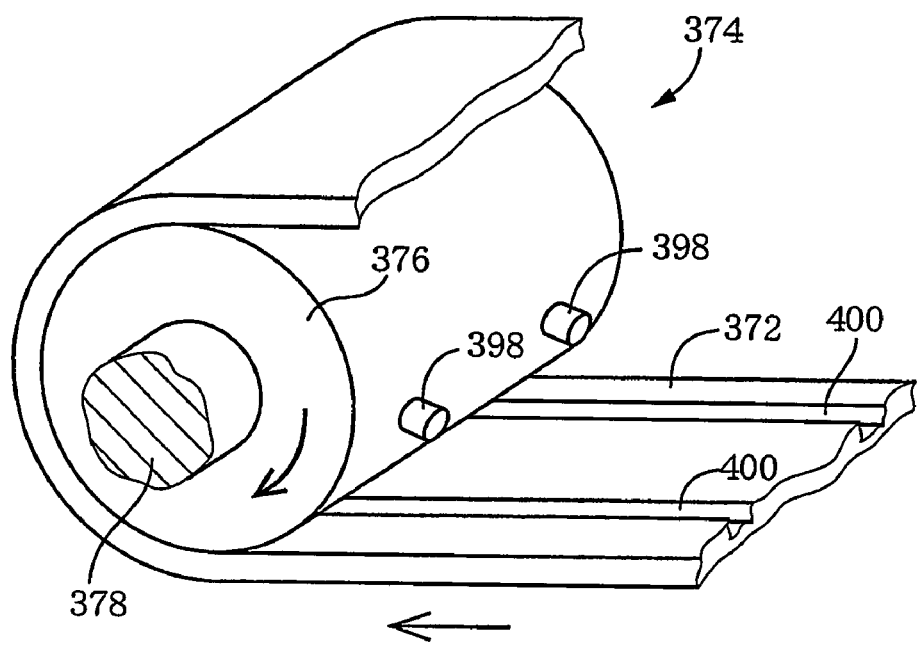
FIG. 72 is a perspective view showing grooves formed in a shock absorbing plate of the resistance generating device shown in FIGS. 66-71, and protrusions which are formed on a presser roller for deformation of the shock absorbing plate and which are engageable with the grooves.

The present steering apparatus includes a resistance generating device 370 arranged to generate a force of resistance to an axial movement of the steering column 301, more precisely, to an axial movement of the movable portion of the column body 305. This force of resistance may be referred to as an impact energy absorbing load. The resistance generating device 370 is arranged to generate a force of resistance to the axial movement of the movable portion of the column body 305, which is primarily based on a force of resistance to deformation of a deformable member. The present steering apparatus includes a shock absorbing device 371, which includes the resistance generating device 370, and a mechanism which permits the axial movement of the movable portion of the column body 305. FIG. 70 shows in enlargement a portion of the resistance generating device 370 shown in FIG. 66, and FIG. 71 shows in enlargement a portion of the resistance generating device 370 shown in FIG. 68, while FIG. 72 is a perspective view showing a part of the portion of the device 370 shown in FIG. 70.

The resistance generating device 370 includes a deformable member in the form of an impact energy absorbing plate 372 (hereinafter referred to as an "EA plate 372"), and a forcing member in the form of a presser roller 374 for forcing the EA plate 372 so as to cause deformation of the EA plate 372. The EA plate 372 functions as an impact energy absorbing member arranged to generate the impact energy absorbing load, and is mounted on a mounting portion 375 of the break-away bracket 334. The mounting portion 375 is located in a substantially central portion of the break-away bracket 334 as seen in the transverse direction (direction of width) of the vehicle.

The presser roller 374 includes a relatively thick-walled cylindrical roller portion 376, and a shaft portion 378 inserted through a core of the roller portion 376 such that the roller portion 376 and the shaft portion 378 are not rotatable and axially movable relative to each other. The shaft portion 378 is rotatably supported at its opposite end portions through respective sliding bushings by respective bearing members 380, 382 disposed at the front end portion of the break-away bracket 334.

The EA plate 372 is a generally elongate strip formed of a metallic material, and includes a U-shaped portion 372a. The U-shaped portion 372a includes a curved section 372a1, and an upper arm section 372a2 and a lower arm section 372a3 which extend in parallel with each other from respective opposite ends of the curved section 372a1 in the forward direction of the vehicle. As shown in FIG. 71, the upper arm section 372a2 is supported on the upper surface of the supported plate 340 which is a base portion of the break-away bracket 334, while the lower arm section 372a3 is located below and extends in parallel with an upper plate portion of the supporting member 338 which is another base portion of the break-away bracket 334. The presser roller 374 is disposed within the U-shaped portion 372a such that the outer circumferential surface of the presser roller 374 is held in contact with a semi-cylindrical inner surface of the curved section 372a1. The EA plate 372 is mounted on a mounting portion 375 of the break-away bracket 334, by moving the EA plate 372 in the rearward direction relative to the mounting portion 334 such that the mounting portion 375 is sandwiched by and between the upper and lower arm sections 372a2 and 372a3 in a direction perpendicular to the planes of the arm sections. As described below in detail, the EA plate 372 is deformed in pressing contact with the presser roller 374 when the presser roller 374 is moved forward with the break-away bracket 334 as a result of a forward movement of the movable portion of the column body 25 relative to the vehicle body in the event of a collision of the vehicle operator with the steering wheel upon vehicle collision. Thus, the presser roller 374 held in pressing contact with the inner surface of the curved section 372a1 functions as a guide portion 385 provided in the mounting portion 375, for causing deformation of the EA plate 372.

The EA plate 372 further includes an engaging portion 372b extending from the rear end of the upper arm section 372a2 substantially perpendicularly to the plane of the upper arm section, in a direction away from the lower arm section 372*a*3. In other words, the engaging portion 372*b* is formed by bending the rear end portion of the upper arm section 372*a*2 in the direction away from the lower arm section 372*a*3. As shown in FIGS. 69A and 69B, the engaging portion 372*b* is generally T-shaped, and is engageable with the body-side bracket 342 when the break-away bracket 334 is moved forward relative to the body-side bracket 342. Described in detail, the body-side bracket 342 includes a holding portion 342*a* having a recessed part 342*a*1. When the break-away bracket 334 is moved forward relative to the body-side bracket 342, the T-shaped engaging portion 372*b* of the EA plate 372 is brought into engagement with the holding portion 342*a* of the body-side bracket 342. When the engaging portion 372*b* is brought into engagement with the holding portion 342*a*, the engaging portion 372*b* receives a shearing stress or load. Before the break-away bracket 334 is moved forward relative to the body-side bracket 342, there is a free-running distance L2 between the engaging portion 372*b* and the holding portion 342*a* (more precisely, the front end of a cutout formed in the recessed part 342*a*1), as indicated in FIG. 69B, so that the engaging portion 372*b* (movable portion of the column body 305) is movable relative to the holding portion 342*a* by this free-running distance L2 in the event of the secondary collision.

The EA plate 372 is positioned with respect to the mounting portion 375 of the break-away bracket 334. Described in detail, the break-way bracket 334 has a rectangular hole 386, and includes a pair of U-shaped positioning and holding pieces 388 fixed to respective opposite surfaces defining opposite two sides of the rectangle of the rectangular hole 386, as shown in FIGS. 69A and 69B. The two U-shaped positioning and holding pieces 388 are opposed to each other in the direction of width of the EA plate 372, and are formed to position the upper and lower arm sections 372*a*2, 372*a*3 of the EA plate 372. The upper arm section 372*a*2 is located between the upper surface of the supported plate 340 and the lower surfaces of the upper arms of the U-shaped positioning and holding pieces 388, so that the upper arm section 372*a*2 is positioned in the directions of width and thickness of the upper arm section 372*a*2. Similarly, the lower arm section 372*a*3 is located between the lower surface of the supported plate 340 and the upper surfaces of the lower arms of the U-shaped positioning and holding pieces 388, so that this lower arm section 372*a*3 is also positioned in the directions of width and thickness of the lower arm section 372*a*3. These U-shaped positioning and holding pieces 388 function as positioning and holding means for positioning and holding the upper arm section 372*a*2 with respect to the break-away bracket 334, and positioning means for positioning the lower arm section 372*a*3 with respect to the break-away bracket 334. The U-shaped positioning and holding pieces 388 also function as restricting members for restricting an increase in the distance between the upper and lower arm sections 372*a*2, 372*a*3, to thereby facilitate the deformation of the deformation of the EA plate 372 in pressing contact with the presser roller 374. The T-shaped engaging portion 272*b* of the EA plate 272 which is engageable with the holding portion 342*a* of the body-side bracket 342 has an upright part engageable with the cutout formed through the recessed part 342*a*. This upright part has a width W1 smaller than a distance W2 between the two positioning and holding pieces 388, as indicated in FIG. 69A, so that the upright part can be moved between the positioning and holding pieces 388 when the EA plate 372 is mounted on the mounting portion 375 by moving the EA plate 372 in the rearward direction relative to the mounting portion 375.

The presser roller 374 carries a break-away pin 390 and a projection 392 fixedly extending in opposite radial directions from one end portion of the shaft portion 378, as shown in FIG. 70. Where a torque applied to the presser roller 374 is relatively small, a rotary motion of the presser roller 374 is prevented by the break-away pin 390 in abutting contact with a pin-abutting member 394 fixed to the corresponding baring member 380. Where the torque applied to the presser roller 374 is larger than a given threshold value, the break-away pin 390 is broken or bent off upon abutting contact of the pin 390 with the pin-abutting member 394. After the break-away pin 390 is broken, a further rotary motion of the presser roller 374 is permitted until the projection 392 is brought into abutting contact with a stopper member 396 fixed to the bearing member 380, as indicated by broken line in FIG. 70. In the present embodiment, the presser roller 374 is permitted to be further rotated by an angle of about 45°.

When the movable portion of the column body 305 is released and axially moved forward from the vehicle body, as indicated by white arrow in FIG. 71, that is, when the break-away bracket 334 is moved forward relative to the body-side bracket 342, the engaging portion 372*b* of the EA plate 372 is brought into engagement with the holding portion 342*a* of the body-side bracket 342, and the EA plate 372 is thereafter pushed forward by the presser roller 374 in pressing contact between. As a result, the position of the curved section 372*a*1 in the longitudinal direction of the EA plate 372 is gradually changed, with deformation of the EA plate 372 while the upper arm section 372*a*2 is moved rearward and the lower arm section 372*a*3 is moved forward. Thus, the EA plate 372 is deformed as it is displaced relative to the break-away bracket 334 in pressing contact with the presser roller 374.

Where the impact acting on the steering column 301 upon the secondary collision is comparatively small, the movable portion of the column body 305 is axially moved at a relatively low velocity. In this case, the break-away pin 390 is not broken upon abutting contact with the pin-abutting member 394, and a further rotary motion of the presser roller 374 is prevented, so that the EA plate 372 is deformed along the curvature of the outer circumferential surface of the presser roller 374, in pressing and sliding contact with this outer circumferential surface. In this respect, it is noted that the roller portion 376 of the presser roller 374 is formed of a hard resin, so that a frictional resistance between the roller portion 376 and the EA plate 372 is comparatively small. Accordingly, a force required to bend the front end portion of the instantly formed lower arm section 372*a*3 along the curvature of the presser roller 374 and straighten the front end portion of the instantly formed upper arm section 372*a*2 is considered to be substantially equal to a force of resistance to the deformation of the EA plate 372. The resistance generating device 370 generates a resisting force based on this force of resistance to the deformation of the EA plate 372, which is considered to be a reaction force generated by the axial movement of the movable portion of the column body 305, which reaction force is the impact energy absorbing load. The resisting force based on the force of resistance to the deformation of the EA plate 372 is theoretically held constant irrespective of the velocity of the axial movement of the movable portion of the column body 305 or the break-away bracket 334, unless the force of resistance to the deformation of the EA plate 372 varies.

Where the impact acting on the steering column 301 is comparatively large, the movable portion of the column body 305 and the break-away bracket 334 are moved at an accordingly high velocity. In this case, the EA plate 372 is forced to be deformed at a comparatively high rate within a relatively short time. Accordingly, the torque applied to the presser roller 374 due to a force of friction between the roller portion 376 and the EA plate 372 is increased instantaneously. As a result, the break-away pin 390 is broken, permitting the presser roller 374 to be further rotated. As shown in FIG. 72, the presser roller 374 has two short cylindrical projections 398 formed from a metallic round rod. The cylindrical projections 398 are partly embedded in the roller portion 376, and partly project from the outer circumferential surface of the roller portion 376. The two cylindrical projections 398 are spaced from each other in the axial direction of the roller portion 376. On the other hand, the EA plate 372 has two parallel grooves 400 formed in one of its opposite major surfaces such that the two grooves 400 are aligned with the respective two grooves 400 in the axial direction of the roller portion 376 (in the direction of width of the EA plate 372). Each of the grooves 400 has a width slightly smaller than the diameter of the cylindrical projections 398. As the presser roller 374 is rotated, the cylindrical projections 398 come into engagement with the respective grooves 400, while deforming the side walls of each groove 400 so as to increase the width of the groove 400. At this time, the force of resistance to the deformation of the EA plate 372 is equal to a sum of the force required to straight and bend the upper and lower arm sections 372$a$2, 372$a$3, a force required to deform above-indicated side walls of the grooves 400, and a force of friction between the cylindrical projections 398 and the grooves 400. This force of resistance upon engagement of the cylindrical projections 398 with the grooves 400 is larger than that before this engagement (namely, before the presser roller 374 is rotated with breakage of the break-away pin 390). Thus, the force of resistance to the deformation of the EA plate 372 is increased with a change in the state of engagement between the deformable member in the form of the EA plate 372 and the forcing member in the form of the presser roller 374, so that the resisting force generating by the resistance generating device 370 is accordingly increased. After the resisting force is increased with the engagement of the cylindrical projections 398 with the grooves 400, the increased resisting force is maintained.

Figure 73:
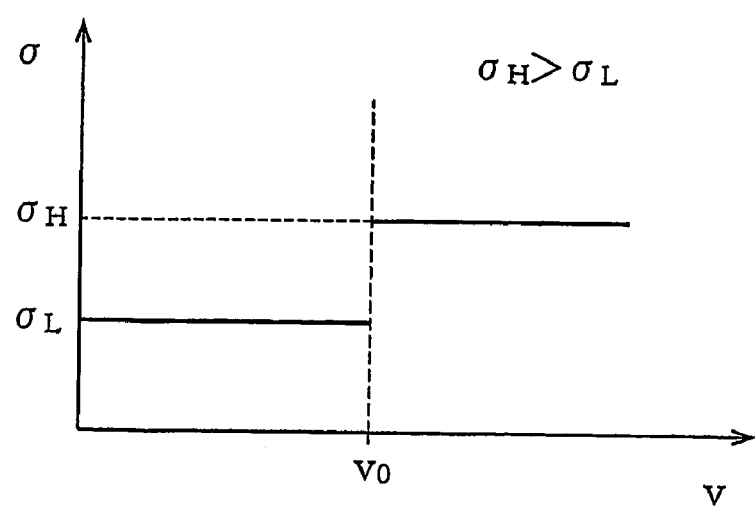
FIG. 73 is a view indicating a relationship between a magnitude of a resisting force a generated by the resistance generating device shown, in FIGS. 66-71, and a moving speed v of a column moving portion.

Referring to the graph of FIG. 73, there is schematically shown a relationship between the velocity v of movement of the movable portion of the column body 305 (more precisely, the maximum velocity v for a comparatively short time after the application of the impact to the steering column 301) and a resisting force (impact energy absorbing load) a generated by the resistance generating device 370. It will be understood from this graph that a relatively large resisting force $\sigma_H$ is generated when the velocity v is higher than a threshold value $v_0$ above which the presser roller 374 is rotatable with the breakage of the break-away pin 390, and a relatively small resisting force $\sigma_L$ is generated when the velocity v is lower than the threshold value $v_0$. Thus, the present resistance generating device 370 is considered to include a resistance changing mechanism operable to change the force of resistance to the deformation of the EA plate 372, depending upon the velocity of axial movement of the steering column 301. The amount of impact energy to be absorbed is a product of the distance of axial movement of the steering column 301 and the resisting force generated by the resistance generating device 370. In this respect, the shock absorbing device 371 including the resistance generating device 370 is considered to include an impact-energy-absorption-amount changing mechanism operable to change the amount of absorption of the impact energy depending upon the velocity of axial movement of the movable portion of the column body 305. It is also noted that the deformable member in the form of the EA plate 372 is arranged such that the U-shaped portion 372$a$ is movable relative to the forcing member in the form of the presser roller 374. In other words, the presser roller 374 functioning as the guide member 385 and the EA plate 372 are displaceable relative to each other in sliding contact with each other, at a velocity depending upon the velocity of movement of the movable portion of the column body 305. In this respect, the resistance changing mechanism of the resistance generating device 370 is considered to change the state of engagement between the deformable member and the forcing member depending upon the velocity of the relative displacement therebetween. The state of engagement described above is changed according to the torque applied to the presser roller 374, namely, according to a force which varies with the velocity of the relative displacement. Thus, the above-indicated impact-energy-absorption-amount changing mechanism is arranged to change the amount of absorption of the impact energy, depending upon the force acting thereon, without using any electrical means.

It will also be understood from the foregoing description of the thirteen embodiment that the cylindrical projections 398 provided on the presser roller 374 and engageable with the grooves 400 formed in the EA plate 372 function as a deformation-resistance increasing member operable to increase the force of resistance to the deformation of the EA plate 372, and that the mechanism for permitting the rotation of the presser roller 374 when the velocity of movement of the break-away bracket 334 is relatively large, that is, the mechanism including the break-away pin 390 and pin-abutting member 394, and the bearing members 380, 382 for rotatably supporting the presser roller 374 functions as an engaging mechanism operable to bring the cylindrical projections 398 into engagement with the EA plate 372 when the velocity of the relative movement between the guide portion 385 in the form of the presser roller 374 and the deformable member in the form of the EA plate 372. The deformation-resistance increasing member and the engaging mechanism constitute a major portion of an energy-absorbing-load changing mechanism operable to change the impact energy absorbing load depending upon the velocity of movement of the break-away bracket 334. This energy-absorbing-load changing mechanism is arranged to increase the impact energy absorbing load when the velocity of movement of the break-away bracket 334 exceeds a predetermined threshold value.

The present steering apparatus according to the thirteenth embodiment has various advantages including the advantages [1]-[6], [8], [9], [13] and [17] described above with respect to the first embodiment, and an additional advantage owing to the provision of the energy-absorbing-load changing mechanism that the amount of the impact energy that can be absorbed is adjustable depending upon the actual impact acting on the steering column 301 in the event of the secondary collision of the vehicle operator with the steering wheel.

Fourteenth Embodiment

Figures 74A, 74B:
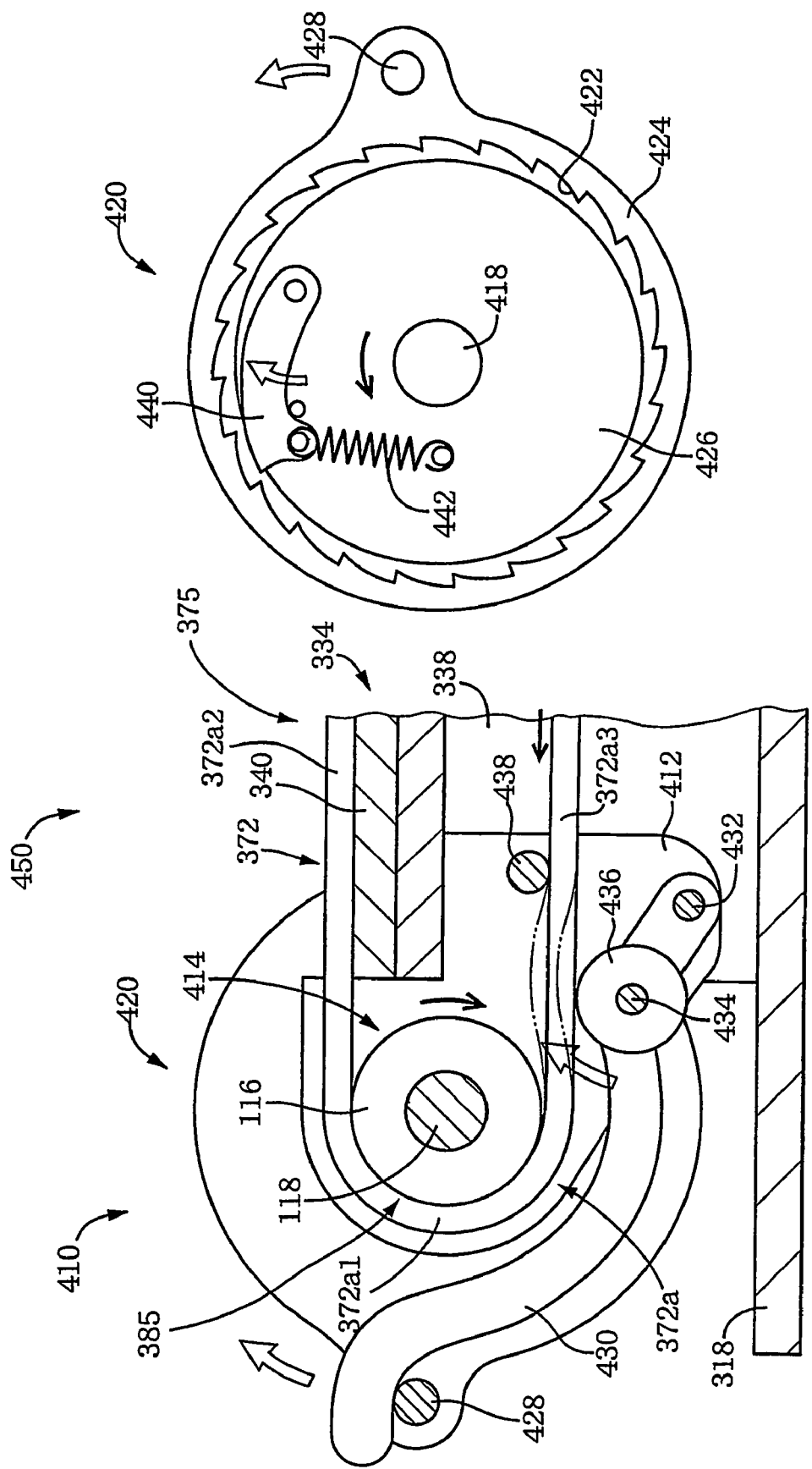
FIGS. 74A and 74B are views showing a resistance generating device employed in a shock absorbing steering apparatus constructed according to a fourteenth embodiment of the present invention.

The steering apparatus according to the fourteenth embodiment employs a resistance generating 410 device different from the resistance generating device 370 employed in the shock absorbing steering apparatus according to the thirteenth embodiment. The fourteenth embodiment is identical with the thirteenth embodiment, except for the resistance generating device 410, which will be described referring to FIG. 74A which is a cross sectional view corresponding to that of FIG. 71, and FIG. 74B which is a rear elevational view of a centrifugal clutch provided in the resistance generating device shown in FIG. 74A The resistance generating device 410 includes a pair of bearing members (one of which is shown in FIG. 74) 412 disposed at the front end portion of a column holder structure in the form of the break-away bracket 334, and a presser member in the form of a presser roller 414 rotatably supported by the bearing members 412. The presser roller 414 is employed as a forcing member for forcing the EA plate 372 so as to cause deformation of this EA plate 372. Like the presser roller 374 employed in the thirteenth embodiment, the presser roller 414 functions as the guide portion 385 of the mounting portion 375, and includes a roller portion 416 and a shaft portion 418 which are formed integrally with each other. The presser roller 414 is rotatably supported at its shaft portion 418 by the pair of bearing members 412. In the present embodiment, the roller portion 416 is formed of a metallic material, having a comparatively high coefficient of friction with respect to the surface of the EA plate 372 (which does not have the grooves 400). The opposite end portions of the shaft portion 418 projects from the respective bearing members 412 in the opposite axial directions outwardly of the bearing members 412. On one of these opposite end portions, there is mounted a centrifugal clutch 420 which includes a ratchet plate 424 having an outer ratchet teeth 422, and a rotary disc 426 disposed radially inwardly of the ratchet plate 424. The ratchet plate 424 has a central hole through which the corresponding end portion of the shaft portion 418 is inserted via a sliding bushing (not shown), such that the ratchet plate 424 is rotatable relative to the shaft portion 418. On the other hand, the rotary disc 426 is fixed to the shaft portion 418, at an axial position of the shaft portion 418 outwardly of the ratchet plate 424, such that the rotary disc 426 is rotated together with the presser roller 414. On the other end portion of the shaft portion 418 which is remote from the centrifugal clutch 420, there is mounted a non-toothed rotary plate (not shown) such that this rotary plate is rotatable relative to the shaft portion 418, like the ratchet plate 424. The ratchet plate 424 and the rotary plate have the same diameter, and respective radially protruding lugs connected to each other by a connecting rod 428. The break-away bracket 334 has a cutout formed in its front end portion, so that the bearing members 412 are fixedly fitted in this cutout, as shown in FIG. 74A.

A pair of pivotal levers 430 (one of which is shown in FIG. 74A) are disposed between the two bearing members 412 such that each of the pivotal leer 430 is located adjacent to the inner surface of the corresponding bearing member 412. The pivotal levers 430 are pivotable about a pivot shaft 432 which is supported at its opposite ends by the respective bearing members 412. Further, the pivotal levers 430 are connected to each other at their intermediate portions by a roller shaft 434 parallel to the pivot shaft 432, so that the pivotal levers 430 are pivoted about the pivot shaft 432 as a unit, while maintaining the same angular position. An auxiliary roller 436 having a smaller diameter than the presser roller 414 is rotatably mounted on the roller shaft 434. The auxiliary roller 436 is located between the lower arm section 372$a$3 of the EA plate 372 and the outer circumferential surface of the rear tube 318, so that pivotal motions of the pivotal levers 430 in the clockwise direction as seen in FIG. 74A cause the auxiliary roller 436 to be brought into pressing contact with the lower or outer surface of a front end portion of the lower arm section 372$a$3, which is located near the curved section 372$a$1. The free end portions of the pivotal levers 430 remote from the pivot shaft 432 are arranged to be engageable with the connecting rod 428 described above. Further, the pivotal levers 430 are suitably curved so as to avoid an interference thereof with the EA plate 372 and the presser roller 414. The two bearing members 412 are connected to each other by a restricting rod 438, which is fixed at its opposite ends to the respective bearing members 412. This restricting rod 438 is located such that the restricting rod 438 is held in contact with the upper surface of the lower arm section 372$a$3 of the EA plate 372. In the present resistance generating device 410, the pivotal motions of the pivotal levers 430 in the clockwise direction causes the auxiliary roller 436 to contact the outer surface of the lower arm section 372$a$3 of the EA plate 372, at a longitudinal position of the EA plate 372 between the presser roller 414 and the restricting rod 438 which are in contact with the inner surface of the EA plate 372, so that the lower arm section 372$a$3 is nipped by and between the auxiliary roller 436 and the presser roller 414 and restricting rod 438. In this respect, the presser roller 414 and the restricting rod 438 may be considered to function as a restricting member for restricting an increase in the distance between the upper and lower arm sections 372$a$2, 372$a$3 of the EA plate 372.

The centrifugal clutch 420 has an engaging jaw in the form of a pivotal pawl 440 pivotally attached to a radially outer portion of the rotary disc 426. This engaging pawl 440 is connected at its free end to a tension spring 442, so that the pivotal pawl 440 is normally released from the ratchet teeth 422. When the rotating speed of the rotary disc 426, that is, the rotating speed of the presser roller 424 exceeds a predetermined threshold, a centrifugal force acting on the pivotal pawl 440 becomes larger than a biasing force of the tension spring 442, so that the pivotal pawl 440 is pivoted about its fixed end, with a result of a movement of the free end of the pivotal pawl 440 in the radially outward direction of the rotary disc 426, and engagement of the free end with one tooth of the ratchet teeth 422. Consequently, the rotary disc 426 and the ratchet plate 424 are rotated as a unit, and the pivotal levers 430 are pivoted by the connecting rod 428 in the clockwise direction, so that the auxiliary roller 436 is brought into pressing contact with the lower arm section 372$a$3 of the EA plate 372, whereby the front end portion of the lower arm section 372$a$3 is curved inwardly of the U-shaped portion 372$a$, as indicated by two-dot chain line in FIG. 74A. In this state, the presser roller 414 is bound by the EA plate 372, and the rotation of the presser roller 414 is restricted, so that the EA plate 372 is deformed in frictionally sliding contact with respect to the outer circumferential surface of the roller portion 416 of the presser roller 414. Namely, when the operating state of the centrifugal clutch 420 is changed from a released state to an engaged state, the state of engagement between the presser roller 414 and the EA plate 372 is changed, so as to increase a force of resistance to the deformation of the EA plate 372, so that the impact energy absorbing load is accordingly increased. Once the centrifugal clutch 420 is engaged, the centrifugal clutch 420 is locked in the engaged state, and the rotation of the presser roller 414 is kept restricted, so that the increased force of resistance is maintained as long as the impact energy is absorbed. In FIGS. 74A and 74B, white arrows indicate the motions of the various elements of the resistance generating device 410 while the centrifugal clutch 420 is in the engaged state.

When the movable portion of the column body 305 is axially moved forward with a forward movement of the break-away bracket 334 relative to the body-side bracket 342 upon the secondary collision of the vehicle operator with the steering wheel, the EA plate 372 is deformed while a force of resistance to the deformation of the EA plate 372 is generated by the resistance generating device 410, as in the thirteenth embodiment. In the present fourteenth embodiment, the presser roller 414 is rotated with the forward movement of the EA plate 372. When the impact acting on the steering column 301 is comparatively small, the movable portion of the column body 305, that is, the break-away bracket 334 is moved at a comparatively low velocity, and the presser roller 414 is rotated at an accordingly low speed, so that the centrifugal clutch 414 is not brought into its engaged state. In this state, the EA plate 372 is deformed while the pressure roller 414 is rotated, so that the force of resistance to the deformation of the EA plate 372 is comparatively small. When the impact acting on the steering column 301 is comparatively large, the movable portion of the column body 305 is moved at a comparatively high velocity, and the presser roller 414 is rotated at an accordingly high speed, so that the centrifugal clutch 414 is brought into its engaged state, with a result of an increase in the force of resistance to the deformation of the EA plate 372, as described above. As in the thirteenth embodiment, the force of resistance to the deformation is increased when the velocity v of movement of the movable portion of the column body 305 exceeds the predetermined threshold $v_0$, as indicated in the graph of FIG. 73. Thus, the present resistance generating device 410 is also considered to include a resistance changing mechanism operable to change the force of resistance to the deformation of the EA plate 372, depending upon the velocity of movement of the break-away bracket 334, and, a shock absorbing device 450 including the resistance generating device 410 is considered to include an impact-energy-absorption-amount changing mechanism operable to change the amount of absorption of the impact energy depending upon the velocity of axial movement of the movable portion of the column body 305.

The present fourteenth embodiment is also arranged such that the U-shaped portion 372a of the EA plate 372 provided as a deformable member is moved relative to the forcing member in the form of the presser roller 414. That is, the presser roller 414 functioning as the guide portion 385 and the EA plate 372 are displaced relative to each other at a velocity corresponding to the velocity of movement of the movable portion of the column body 305, in frictionally sliding contact with each other. The state of engagement between the presser roller 414 and the EA plate 372 is changed depending upon a centrifugal force acting on the rotary disc 426 of the centrifugal clutch 420 which is rotated with the presser roller 414. The impact-energy-absorption-amount changing mechanism indicted above is also arranged to change the amount of absorption of the impact energy, depending upon the force acting thereon, without using any electrical means.

In the fourteenth embodiment, the presser roller 414 functions as a movable member, more precisely, a rotatable member which is provided as the guide portion 385 and which is rotated as the EA plate 372 is displaced relative to the guide portion 385. The fourteenth embodiment includes a mechanism operable to restrict a rotary motion of the presser roller 374 when the velocity of movement of the break-away bracket 334 is relatively high. That is, the centrifugal clutch 420, pivotal levers 430 and auxiliary rollers 436 constitute a major portion of a movable-member-movement restricting or inhibiting mechanism operable to restrict or inhibit the rotary motion of the rotatable member in the form of the presser roller 414 when the velocity of the rotary motion is relatively high. The movable member and the movable-member-movement restricting or inhibiting mechanism constitute a major portion of an energy-absorbing-load changing mechanism operable to change the impact energy absorbing load depending upon the velocity of forward movement of the break-away bracket 334. This energy-absorbing-load changing mechanism is arranged to increase the impact energy absorbing load when the velocity of movement of forward movement of the break-away bracket 334 exceeds the predetermined threshold.

The steering apparatus according to the present fourteenth embodiment has the same advantages as the steering apparatus according to the thirteenth embodiment, including the advantage that the energy-absorbing-load changing mechanism permits a change in the energy absorbing load depending upon the impact actually acting on the steering column 301 upon the secondary collision of the vehicle operator with the steering wheel.

The steering apparatus according to the fourteenth embodiment may be modified so as to replace the resistance generating device 410 with a resistance generating device 530, which will be described by reference to FIG. 75A which is a cross sectional view corresponding to that of FIG. 71, and FIG. 75B which is a rear elevational view showing a centrifugal stopper 542 provided in the resistance generating device 530 shown in FIG. 75A.

The present resistance generating device 530 is similar in construction to the resistance generating device 410 provided in the fourteen embodiment of FIGS. 74A and 74B, and includes a forcing member in the form of a presser roller 532 which is rotatably supported by a first bearing member 432 and a second bearing member (not shown) that are disposed at the front end portion of the break-away bracket 334. Like the presser roller 414 provided in the fourteenth embodiment, the presser roller 534 includes a roller portion 536 and a shaft portion 538 which are formed integrally with each other. The shaft portion 538 is rotatably supported at its opposite ends by the first bearing member 532 and the second bearing member. The roller portion 536 is formed of a metallic material, and has a multiplicity of small projections 540 formed on the outer circumferential surface such that the projections 540 are evenly distributed over the entirety of the outer circumferential surface.

As is apparent from FIG. 75B, the rotary disc 426 identical with that of the fourteenth embodiment is fixedly mounted on the end portion of the shaft portion 538 at which the shaft portion 538 is supported by the first bearing member 532. The rotary plate 426 and the presser roller 534 are rotated as a unit. The first bearing member 532 is formed with the ratchet teeth 422 identical with those formed on the ratchet plate 424 used in the fourteenth embodiment. That is, the first bearing member 532 is equivalent to a combination of the ratchet plate 424 and the corresponding one of the two bearing members 412 in the fourteenth embodiment. The rotary disc 426 has the pivotal pawl 440 and the tension spring 442, as in the fourteenth embodiment. When the rotating speed of the presser roller 534 exceeds a predetermined threshold, a centrifugal force acting on the pivotal pawl 440 becomes larger than the biasing force of the tension spring 442, so that the pivotal pawl 440 is pivoted about its fixed end, with a result of a movement of the free end of the pivotal pawl 440 in the radially outward direction of the rotary disc 426, and engagement of the free end with one tooth of the ratchet teeth 422, whereby a further rotary motion of the presser roller 534 is inhibited. The first bearing member 532, the rotary plate 426, the pivotal pawl 440 and the tension spring 442 constitute the above-indicated centrifugal stopper 542, which is arranged to stop the rotary motion of the presser roller 534, by utilizing the centrifugal force. In other words, the centrifugal stopper 542 functions to lock the presser roller 534. Like the fourteenth embodiment wherein the centrifugal clutch 420 is not provided on the second bearing member 412, the centrifugal stopper 542 is not provided on the second bearing member in the present modification, which is provided to merely rotatably support the shaft portion 538 of the presser roller 534 at the corresponding end portion.

When the movable portion of the column body 305 is released from the vehicle body and axially moved forward relative to the vehicle body upon the secondary collision of the vehicle operator with the steering wheel, the EA plate 372 is deformed while a force of resistance to the deformation of the EA plate 372 is generated by the resistance generating device 530, as in the fourteenth embodiment. In the present embodiment, too, the presser roller 534 is rotated with the forward movement of the EA plate 372. When the impact acting on the steering column 301 is comparatively small, the movable portion of the column body 305, that is, the break-away bracket 334 is moved at a comparatively low velocity, and the presser roller 414 is rotated at an accordingly low speed, so that the centrifugal stopper 542 is not brought into its operated or engaged state. In this state, the EA plate 372 is deformed while the pressure roller 414 is rotated, so that the force of resistance to the deformation of the EA plate 372 is comparatively small. When the impact acting on the steering column 301 is comparatively large, the movable portion of the column body 305 is moved at a comparatively high velocity, and the presser roller 414 is rotated at an accordingly high speed, so that the centrifugal stopper 542 is brought into its engaged state, with a result of stopping of the rotary motion of the presser roller 534. In the presence of the projections 540 held in contact with the EA plate 372, a relatively large force is required to move the EA plate 372 in frictionally sliding contact with the projections 540 formed on the circumferential surface of the presser roller 534. Therefore, the force of resistance to the deformation of the EA plate 372 is increased. Namely, the resistance generating device 530 generates an increased force of resistance to the deformation of the EA plate 372, that is, a relatively large impact energy absorbing load. Once the centrifugal clutch 420 is engaged, the centrifugal clutch 420 is locked in the engaged state, and the rotation of the presser roller 414 is kept restricted, so that the increased, force of resistance is maintained as long as the impact energy is absorbed.

In the present modification of the fourteenth embodiment, too, the state of engagement between the deformable member in the form of the EA plate 372 and the forcing member in the form of the presser roller 534 is changed, and the generated force of resistance to the deformation of the EA plate 372 is increased, depending upon the velocity of relative movement of the EA plate 373 and the presser roller 534. The relationship between the velocity of movement of the movable portion of the column body 305 and the generated force of resistance is the same as indicated in the graph of FIG. 73. Thus, the present resistance generating device 530 is also considered to include a resistance changing mechanism operable to change the force of resistance to the deformation of the EA plate 372, depending upon the velocity of axial movement of the steering column 301, and, a shock absorbing device 550 including the resistance generating device 530 is considered to include an impact-energy-absorption-amount changing mechanism operable to change the amount of absorption of the impact energy depending upon the velocity of axial movement of the steering column 301. Further, the presser roller 534 functions as a movable member, more precisely, a rotatable member, and the centrifugal stopper 542 constitutes a major portion of the movable-member movement restricting or inhibiting mechanism, which cooperates with the movable member in the form of the presser roller 534 to constitute a major portion of the energy-absorbing-load changing mechanism operable to change the impact energy absorbing load depending upon the velocity of forward movement of the break-away bracket 334 or steering column 301. This energy-absorbing-load changing mechanism is arranged to increase the impact energy absorbing load when the velocity of movement of forward movement of the break-away bracket 334 exceeds the predetermined threshold.

Fifth Group of Embodiments

There will be described fifteenth, sixteenth and seventeenth embodiments of this invention, which are similar to each other and constitute the fifth group of embodiments.

Fifteenth Embodiment

Figure 77:
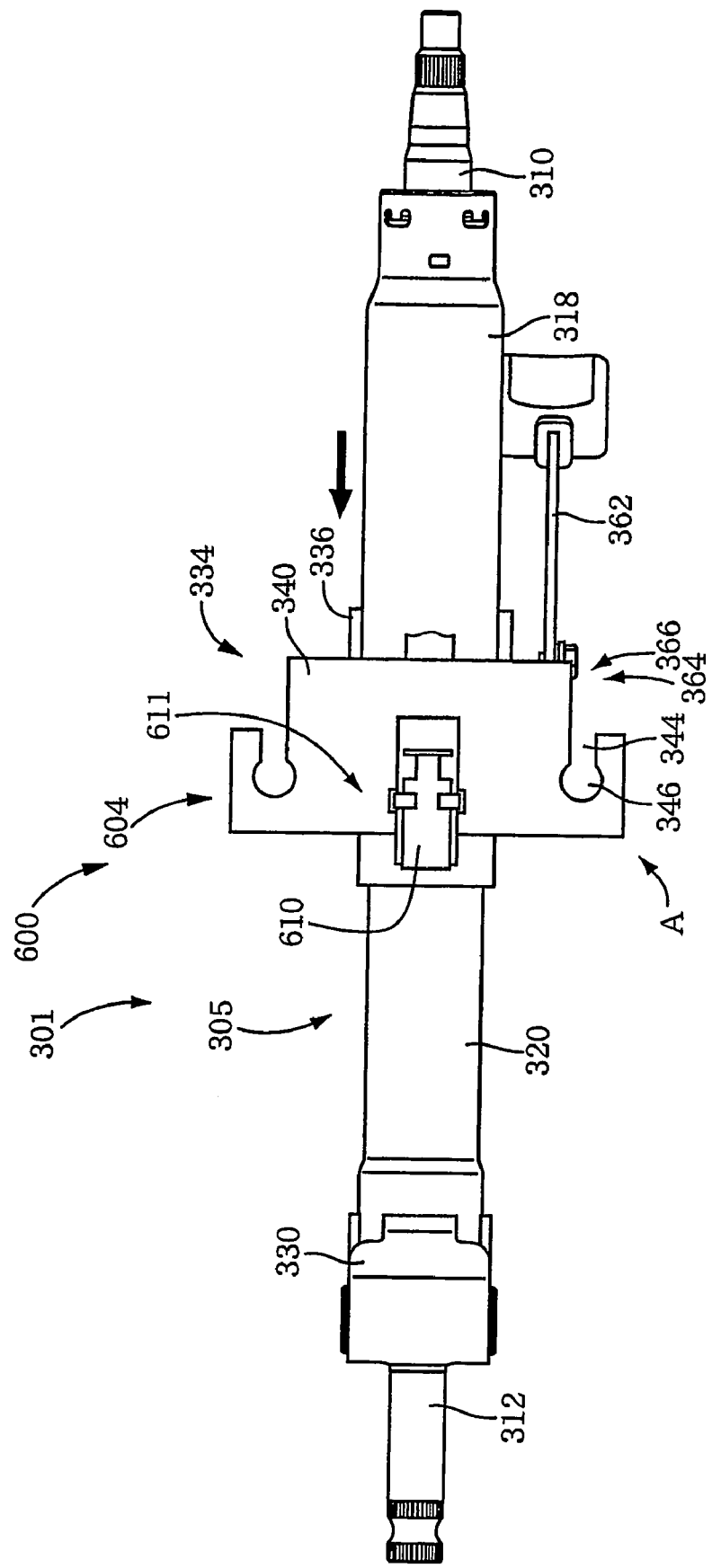
FIG. 77 is a plan view of a steering column shown in FIG. 76.
Figure 78:
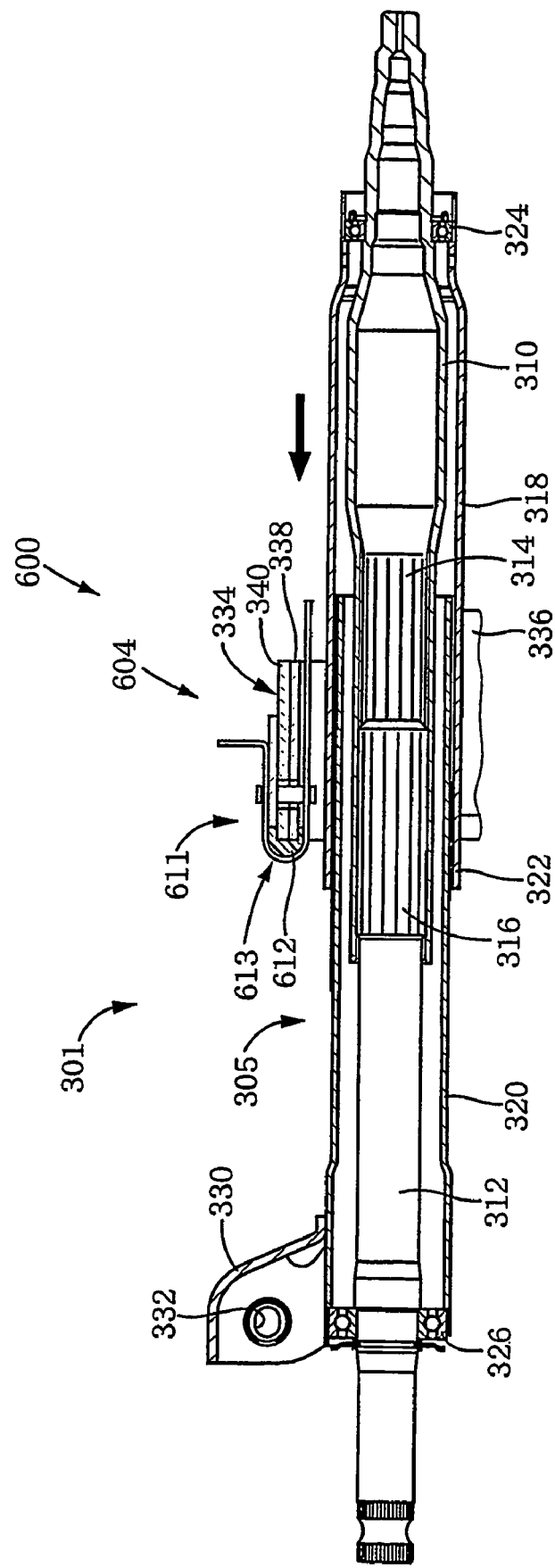
FIG. 78 is a side elevational view in cross section of the steering column shown in FIG. 76.
Figure 79A:
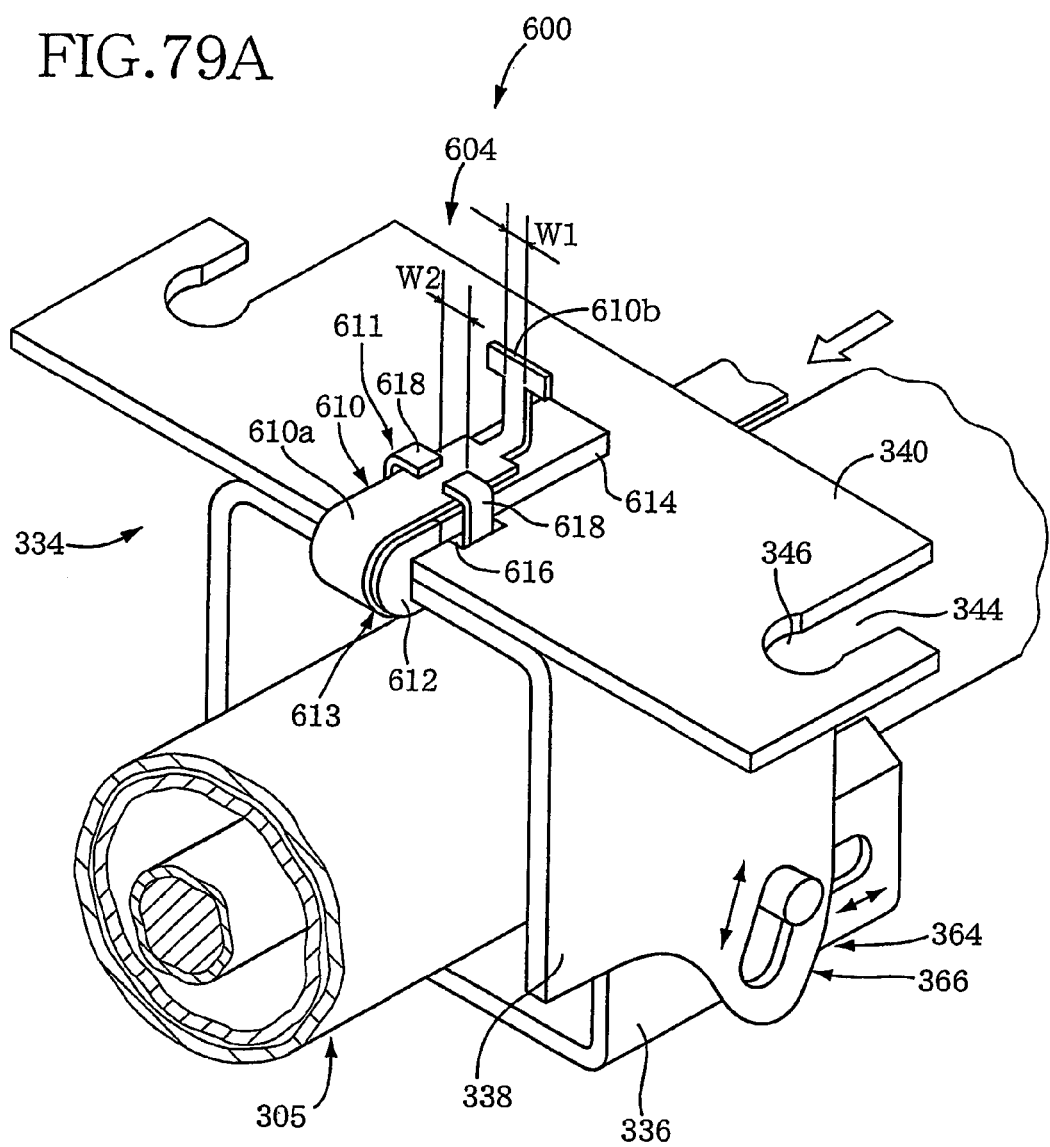
FIGS. 79A and 79B are perspective views showing a rear tube of the steering column shown in FIG. 76, as attached to the vehicle body, and a shock absorbing device provided in the apparatus of FIG. 76.
Figure 79B:
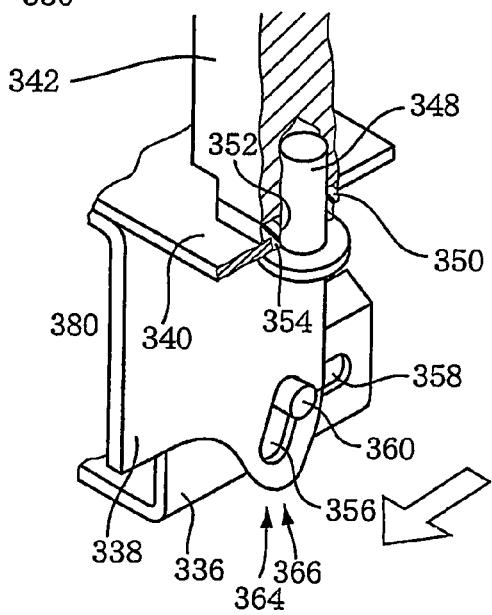

The fifteenth embodiment of this invention will be described referring to a side elevational view of FIG. 76 showing the apparatus, a plan view of FIG. 77 showing the steering column 301 provided in the apparatus, a side elevational view of FIG. 78 showing in cross section the steering column 301, and perspective views of FIGS. 79A and 79B showing the rear tube 318 of the steering column 301 as attached to the vehicle body and a shock absorbing device 600 provided in the apparatus. In the steering apparatus according to the present fifteenth embodiment, the construction of the steering column 301, and the arrangement for mounting the steering column 301 on the vehicle body, are similar to those in the thirteenth embodiment. The foregoing description of the thirteenth embodiment from the beginning up to the portion indicated by (*3), by reference to FIGS. 66-69, applies to the steering apparatus of this fifteenth embodiment.

Figure 80:
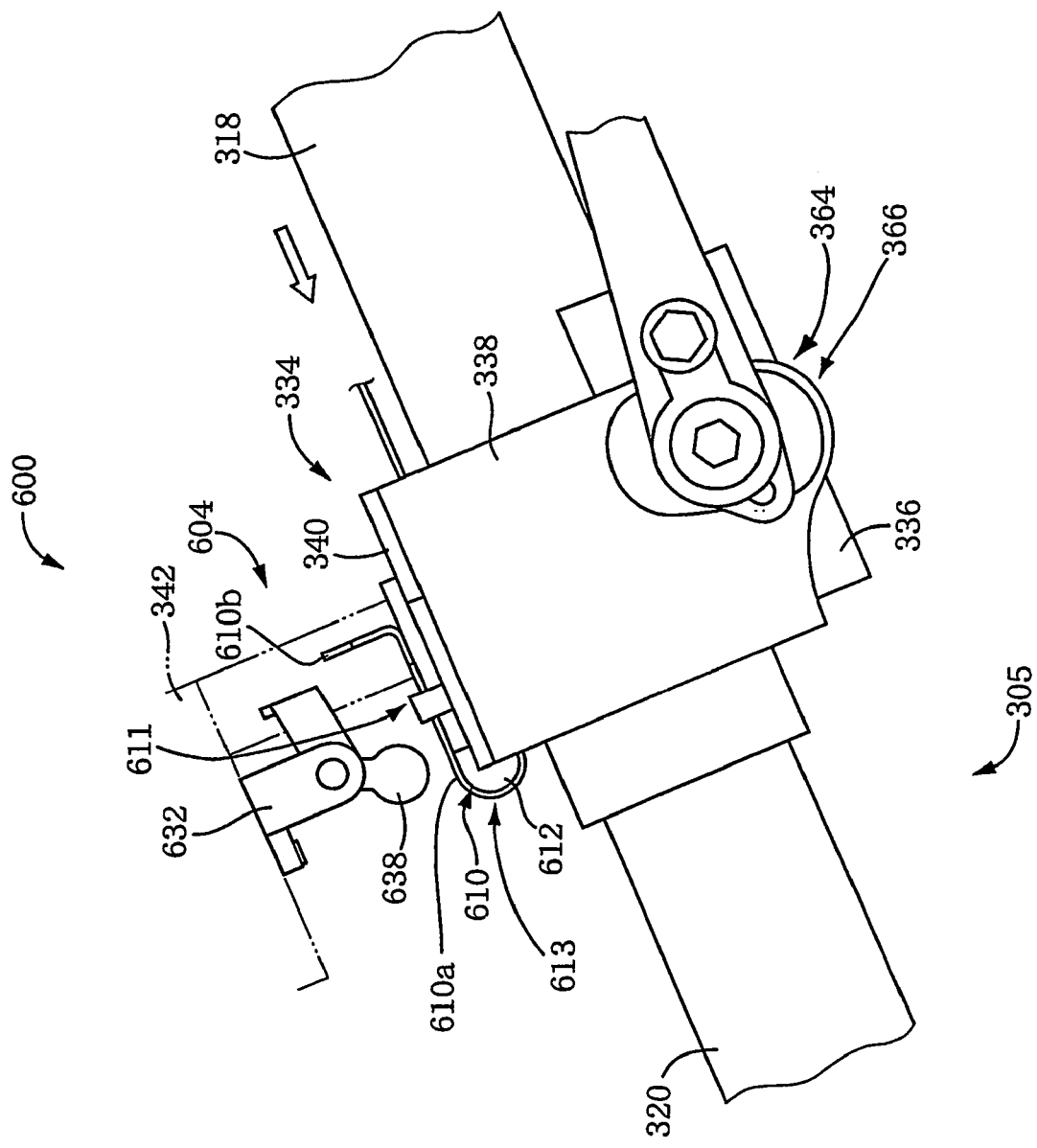
FIG. 80 is a view corresponding to a side elevational view of the steering column, showing the shock absorbing device shown in FIGS. 79A and 79B.

The shock absorbing device 600 is shown in the perspective views of FIGS. 79A and 79B, a fragmentary side elevational view of FIG. 80, a fragmentary side elevational view in cross section of FIG. 81, and front elevational view of FIGS. 82A and 82B. The shock absorbing device 600 is interposed between the rear tube 318 (movable portion of the column body 305) and the vehicle body, more specifically, between the break-away bracket 334 and the body-side bracket 342 attached to the reinforcement of the instrumental panel of the vehicle. The shock absorbing device 600 includes a load generating device 604 arranged to generate an impact energy absorbing load. The load generating device 604 includes a deformable member in the form of an impact energy absorbing plate 610 (hereinafter referred to as an "EA plate 619"), and generates the impact energy absorbing load based on a force required to cause deformation of the EA plate 610. The EA plate 610 is mounted on a mounting portion 611 which is located in a substantially central part of the break-away bracket 334 as seen in the transverse direction (direction of width) of the vehicle.

In the front end portion of the mounting portion 611 of the break-away bracket 334, there is fixed disposed a guide member 612 formed of a resin material. The guide member 612 is a generally semi-cylindrical member, and is mounted on the front end portions of the supported plate 340 and supporting member 338 of the break-away bracket 335 which are superposed on each other. Described more specifically, the guide member 612 has a recessed part in which the front end portions of the supported plate 340 and supporting member 338 are fitted. The guide member 612 functions as a forcing member for forcing the EA plate 372 so as to cause deformation of the EA plate 372, and constitutes a guiding portion 613 of the mounting portion 611 of the break-away bracket 334. The mounting portion 611 includes a back-up plate 612 which rests on the upper surface of the supported plate 340, for backing an upper arm section 610a2 of the EA plate 610.

The EA plate 610 is a generally elongate strip formed of a metallic material, and includes a U-shaped portion 610a. The U-shaped portion 610a includes a curved section 610a1, and the above-indicated upper arm section 6102a2 and a lower arm section 610a3 which extend in parallel with each other from respective opposite ends of the curved section 610a1 in the rearward direction of the vehicle. As most clearly shown in FIG. 81, the upper arm section 372a2 is supported on the upper surface of the back-up plate 614, while the lower arm section 610a3 is located below and extends in parallel with an upper plate portion of the supporting member 338. The curved section 610a1 of the EA plate 610 is held at its inner surface in contact with the semi-cylindrical outer surface of the guide member 612. The EA plate 610 is mounted on the mounting portion 611 of the break-away bracket 334, by moving the EA plate 610 in the rearward direction relative to the mounting portion 611 such that the mounting portion 611 is sandwiched by and between the upper and lower arm sections 610a2 and 610a3 in a direction perpendicular to the planes of the arm sections. The guide member 613 is closely fitted in the U-shaped portion 610a of the EA plate 610, so as to prevent removal of the EA plate 610. The EA plate 610 further includes an engaging portion 610b extending from the rear end of the upper arm section 610a2 substantially perpendicularly to the plane of the upper arm section, in a direction away from the lower arm section 610a3. In other words, the engaging portion 610b is formed by bending the rear end portion of the upper arm section 610a2 in the direction away from the lower arm section 610a3. As shown in FIGS. 79 and 82B, the engaging portion 610b is generally T-shaped, and is engageable with the body-side bracket 342 when the break-away bracket 334 is moved forward relative to the body-side bracket 342, as described below in detail.

The EA plate 610 is positioned with respect to the mounting portion 611 of the break-away bracket 334. Described in detail, the break-way bracket 334 has a rectangular hole 616, and includes a pair of positioning and holding pieces 388 fixed to respective opposite surfaces defining opposite two sides of the rectangle of the rectangular hole 616, as shown in FIGS. 79. The two positioning and holding pieces 618 are provided as positioning and holding means for positioning and holding the EA plate 610 with respect to the break-away bracket 334. The function of the positioning and holding pieces 618 are similar to that of the positioning and holding pieces 388 used in the thirteenth embodiment. In the fifteenth embodiment, the upper arm section 610a2 is supported by the underlying back-up plate 614, while the upper arm section 610a2 is positioned and held by the positioning and holding pieces 618. The T-shaped engaging portion 610b of the EA plate 610 has an upright part engageable with a holding portion in the form of a rocking body 638 (described below in detail) pivotally attached to the body-side bracket 342. This upright part has a width WI smaller than a distance W2 between the two positioning and holding pieces 618, as indicated in FIG. 79, as in the thirteenth embodiment wherein the width W1 is smaller than the distance W2 between the two positioning and holding pieces 388.

To the body-side bracket 342 attached to the reinforcement, there is fixed a U-shaped bracket 632 having a pair of arm portions 630, as shown in FIGS. 81, 82A and 82B. The arm portions 630 of the U-shaped bracket 632 have respective shaft holes 634, and a support shaft 636 is fixed at its opposite ends in the respective shaft holes 634. The rocking body 638 indicated above is pivotally supported by the support shaft 636. The rocking body 638 functions as an inertia mass, and consists of a generally U-shaped main member 640, a weight member 642 in the form of a round rod, and a cylindrical collar 644. The U-shaped main member 640 includes opposite side walls 646 having respective shaft holes 648. The support shaft 636 extends through the shaft holes 648 and the cylindrical collar 644, and the cylindrical collar 644 is fixed at its opposite end faces to the opposite inner surfaces of the side walls 646. Thus, the rocking body 638 is pivotally supported by the bracket 632. The weight member 642 is fixed at its opposite end faces to the free end portions of the inner surfaces of the side walls 646. The rocking body 638 has a normal or original operating position, namely, an attitude in a state of equilibrium in weight, as indicated by solid line in FIGS. 80 and 81. FIG. 80 shows the steering column 301 as actually mounted on the vehicle body via the body-side bracket 342 such that the steering column 301 is inclined. On the other hand, FIG. 81 shows the positional relationship between the shock absorbing device 600 and the rocking body 638. The rocking body 638 is pivotable about an axis of the support shaft 636, within a predetermined angular range defined by two angular positions one of which is indicated by two-dot chain line in FIG. 81. Namely, the rocking body 638 is pivotable in the clockwise direction as seen in FIG. 81, until the weight member 642 comes into abutting contact with a stopper 650 fixed to the U-shaped bracket 632. The angular position of the rocking body 638 indicated by the two-dot chain line is referred to as a "stroke end position". FIG. 82A shows the rocking body 638 placed in its normal or original position, while FIG. 82B shows the rocking body 638 placed in its stroke end position.

Figure 83A:
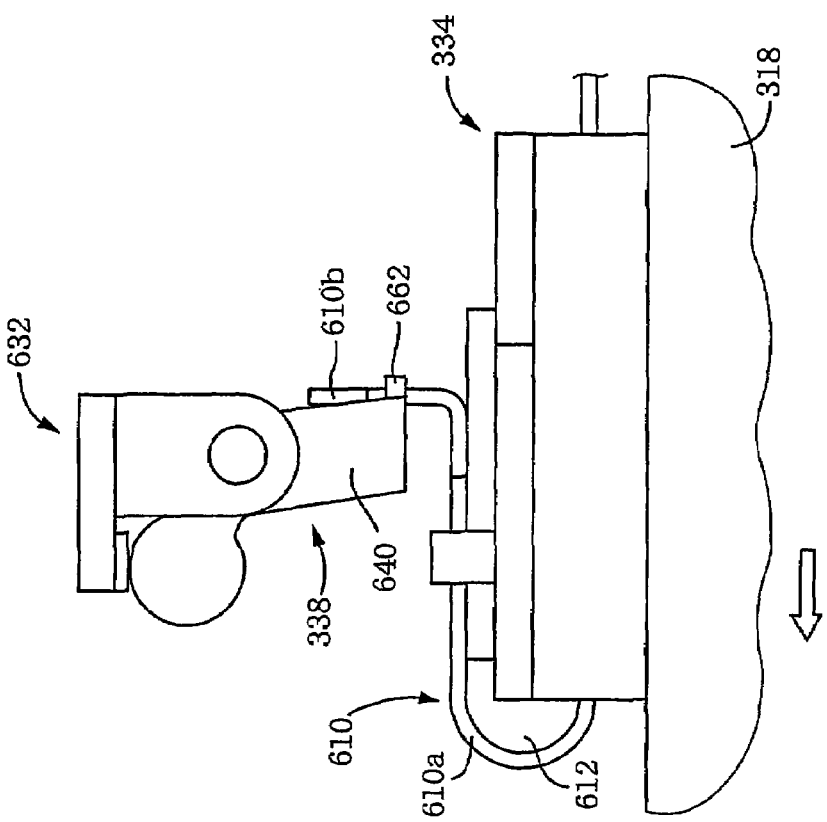
FIGS. 83A and 83B are views showing the column moving portion in its moving state after it is released, in the shock absorbing device shown in FIGS. 79A and 79B.
Figure 83B:
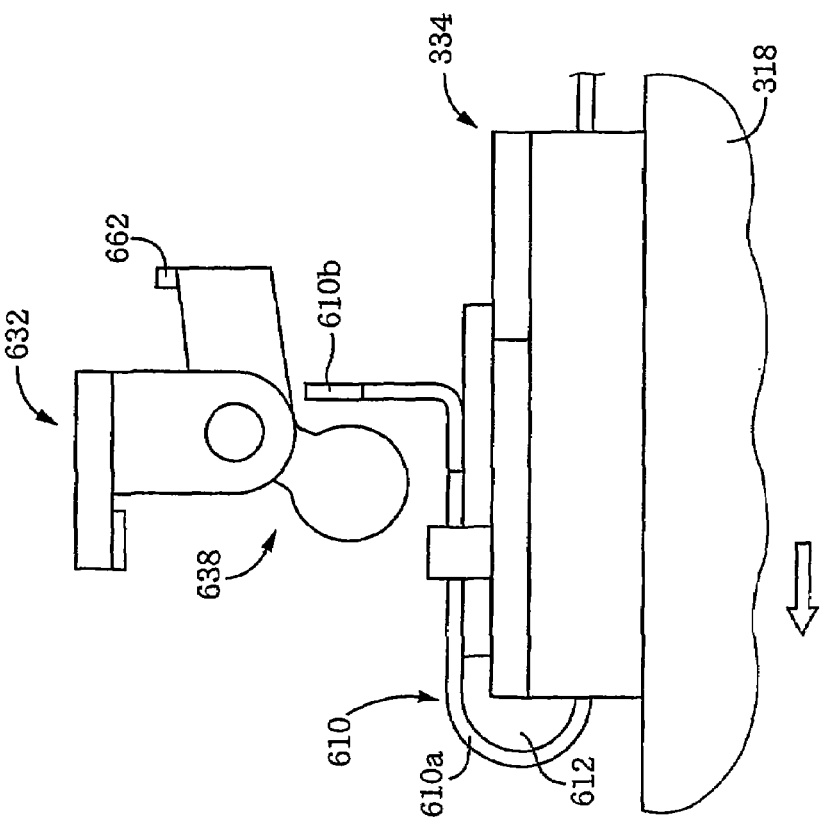

When the impact acting on the steering column 301 exceeds a predetermined threshold in the event of a secondary collision of the vehicle operator with the steering wheel, for example, the movable portion of the column body 305 is released from the body-side bracket 342 and axially moved forward, namely, the break-away bracket 334 is axially moved forward, as in the thirteenth embodiment. In the present embodiment, the load generating device 604 of the shock absorbing device 600 generates or does not generate an impact energy absorbing load, depending upon the operating position or attitude of the rocking body 638 during the forward movement of the break-away bracket 334. FIG. 83A shows the break-away bracket 334 in the process of the forward movement while the rocking body 638 is placed in the original position, while FIG. 83B shows the break-away bracket 334 when the engaging portion 610b of the EA plate 610 comes into abutting contact with a connecting portion 662 of the main member 640 of the rocking body 638 while the rocking body 638 is placed in its stroke end position.

The connecting portion 662 of the main member 640 connects the two side walls 646, and has a recessed holding portion 664 with which the engaging portion 610b of the EA plate 610 is engageable during the forward movement of the break-away bracket 334 while the rocking body 638 is placed in the stroke end position. While the rocking body 638 is placed in its normal or original position of FIG. 83A, the connecting portion 662 is located above the, engaging portion 610b, the engaging portion 610b does not come into engagement with the holding portion 664 of the connecting portion 662. In this case, therefore, the EA plate 610 is moved forward with the break-away bracket 334, without deformation of the EA plate 610. Thus, the load generating device 604 does not generate an impact energy absorbing load when the rocking body 638 is placed in the original position. When the rocking body 638 has been pivoted from the original position by more than a predetermined angle toward the stroke end position, as shown in FIG. 83B, the engaging portion 610b of the EA plate 610 is brought into engagement with the holding portion 664 of the connecting portion 662 of the main member 640 of the rocking body 638. Since this engagement of the engaging portion 610b with the holding portion 664 prevents a further forward movement of the EA plate 610 relative to the body-side bracket 342 (U-shaped bracket 632), so that the U-shaped portion 610a of the EA Plate 610 is deformed in pressing sliding contact with the guide member 312. Namely, the EA plate 610 is deformed while it is displaced relative to the break-away bracket 334, so that the load generating device 604 generates an impact energy absorbing load based on a force required to case the deformation.

In the event of a collision of the vehicle with any object, the inertia mass in the form of the rocking body 368 is displaced, more specifically, pivoted by an inertial force. The angle of the pivoting of the rocking body 368 is determined by not only the inertial force, but also the gravity also acting on the rocking body 638 so as to prevent the pivoting. Namely, the angle of the pivoting depends on the magnitude of the impact acting on the vehicle upon its collision. In this respect, the load generating device 604 is considered to include an inertia-mass-displacement permitting device arranged to permit a displacement of the inertia mass depending upon the magnitude of the impact acting on the vehicle body. The load generating device 604 generates an impact energy absorbing load when the magnitude of the impact applied to the vehicle body is larger than a threshold above which the angle of the pivoting of the rocking body 638 is sufficient to permit the engagement of the engaging portion 610b of the EA plate 610 with the holding portion 664 provided on the rocking body 638.

The load generating device 604 of the shock absorbing device 600 includes a first member or a forcing member in the form of the guide member 612 which is not movable relative to the movable portion of the column body 305, and a second member or a deformable member in the form of the EA plate 610 which is moved relative to and in sliding contact with the forcing member when the movable member is moved while the deformable member is prevented from being moved relative to the vehicle body. The load generating device 604 generates an impact absorbing load based on a force required to cause deformation of the deformable member during its movement relative to the forcing member. The movement of the deformable member relative to the vehicle body is permitted or inhibited depending upon the amount of displacement of the inertia mass in the form of the rocking body 638, so that the impact energy absorbing load generated by the load generating device 604 is changed in two steps. That is, the present load generating device 604 is considered to include an energy-absorbing-load change mechanism arranged to change the impact energy absorbing load depending upon the amount of displacement of the inertia mass 638. Further, the shock absorbing device 600 including this load generating device 604 is considered to include an impact-energy-absorption-amount changing mechanism arranged to change the amount of absorption of the impact energy depending upon the amount of displacement of the inertia mass.

In the present steering apparatus, the rocking body 638 which has the holding portion 664 engageable with the EA plate 610 is supported by the vehicle body such that the rocking body 638 undergoes a displacement in the form of a pivotal motion due to an inertial force, such that the amount of the pivotal motion changes with the magnitude of the impact acting on the vehicle body in the event of a collision of the vehicle. The engaging portion 610b of the EA plate 610 is brought into engagement with the holding portion 664 when the amount of the pivotal motion (displacement) of the rocking body 638 is larger than a predetermined threshold. In this respect, the present steering apparatus is considered to include an engagement adjusting mechanism arranged to permit or inhibit the engagement of the engaging portion 610b with the rocking body 638.

The steering apparatus according to the present fifteenth embodiment has various advantages including the advantages [1]-[6], [13] and [17] of the first embodiment, and an additional advantage that the above-described impact-energy-absorption-amount changing mechanism, or the engagement adjusting mechanism permits the absorption of the impact energy depending upon the magnitude of the impact generated upon collision of the vehicle.

Figure 84:
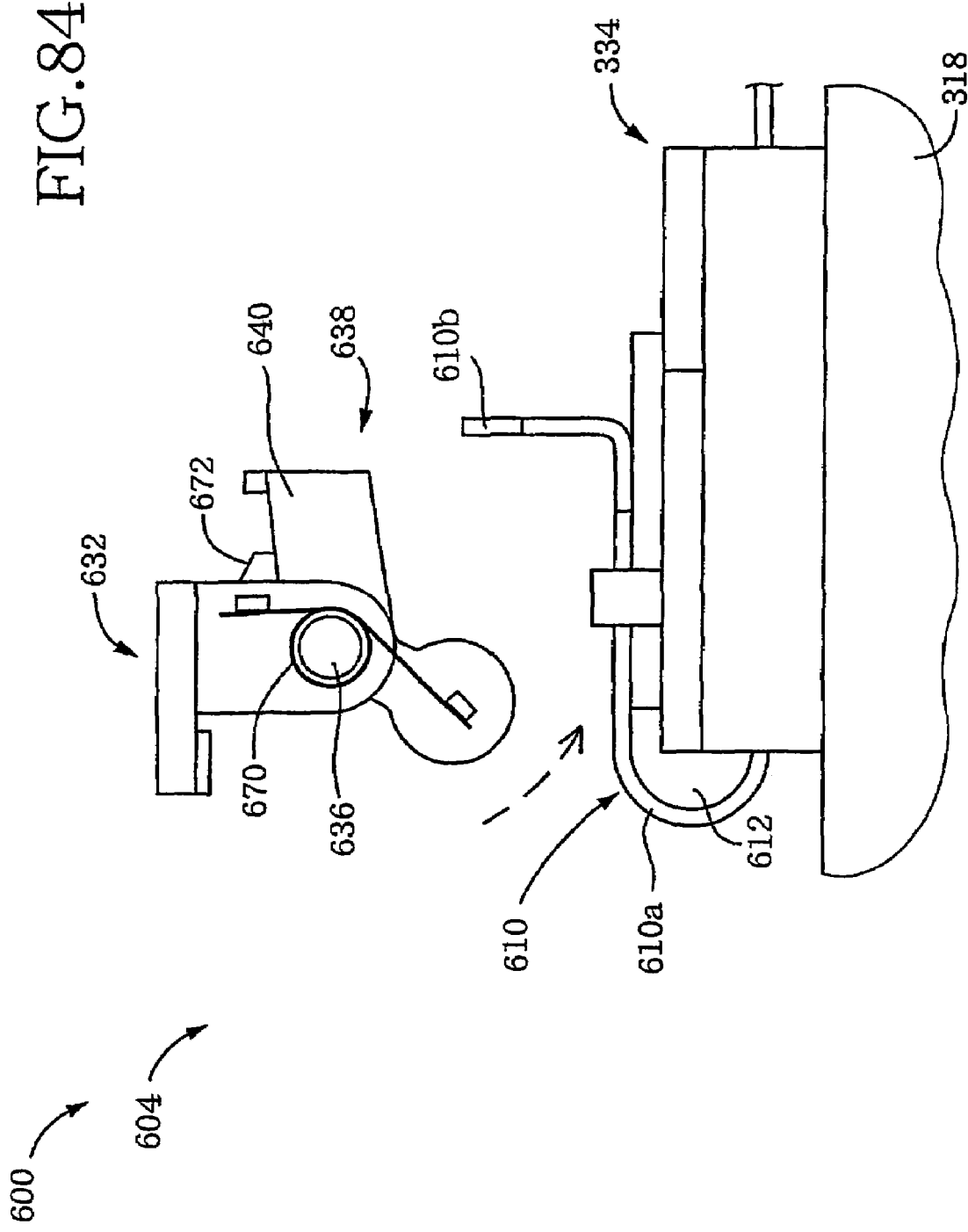
FIG. 84 is a view corresponding to a side elevational view of the steering column, showing the shock absorbing device provided in a modification of the shock absorbing steering apparatus of the fifteenth embodiment.

The rocking body 638 having the holding portion 664, which is employed in the fifteenth embodiment, may be modified as shown in FIG. 84. In a steering apparatus of FIG. 84 according to this modification of the fifteenth embodiment, one of the opposite end portions of the support shaft 636 extends from the corresponding arm portion 630 of the U-shaped bracket 632 in the direction away from the other end portion. A spring 670 is disposed on the above-indicated one end portion of the support shaft 636, so as to bias the rocking body 638 in the counterclockwise direction as seen in FIG. 84, as indicated by arrow-headed broken line in the figure. The above-indicated arm portion 630 is provided with a stopper 672, so that the main member 640 of the rocking body 638 is normally held in abutting contact with the stopper. 672, so as to define the normal or original position of the rocking body 638. In this arrangement, the clockwise pivoting of the rocking body 638 is prevented when the impact acting on the vehicle body upon collision of the vehicle is relatively small. The inertia-mass-displacement permitting device described above may incorporate a one-way clutch mechanism (not shown) arranged to prevent a counterclockwise pivoting motion of the rocking body 638 back to the original position after a clockwise pivoting motion by the inertial force upon collision of the vehicle. In the fifteenth embodiment, substantially no energy absorbing load is generated by the load generating device 604 when the engaging portion 610b of the EA plate 610 is not brought into engagement with the rocking body 638, that is, when the impact applied to the vehicle body is smaller than the predetermined threshold. However, a basic impact energy absorbing load may be generated by a device other than the load generating device 604, for example, by adjusting a coefficient of friction of the liner 322 (described above with respect to the thirteenth embodiment) interposed between the front tube 320 and the rear tube 318, or a clearance between these two tubes 320, 318.

Sixteenth Embodiment

Figure 85:
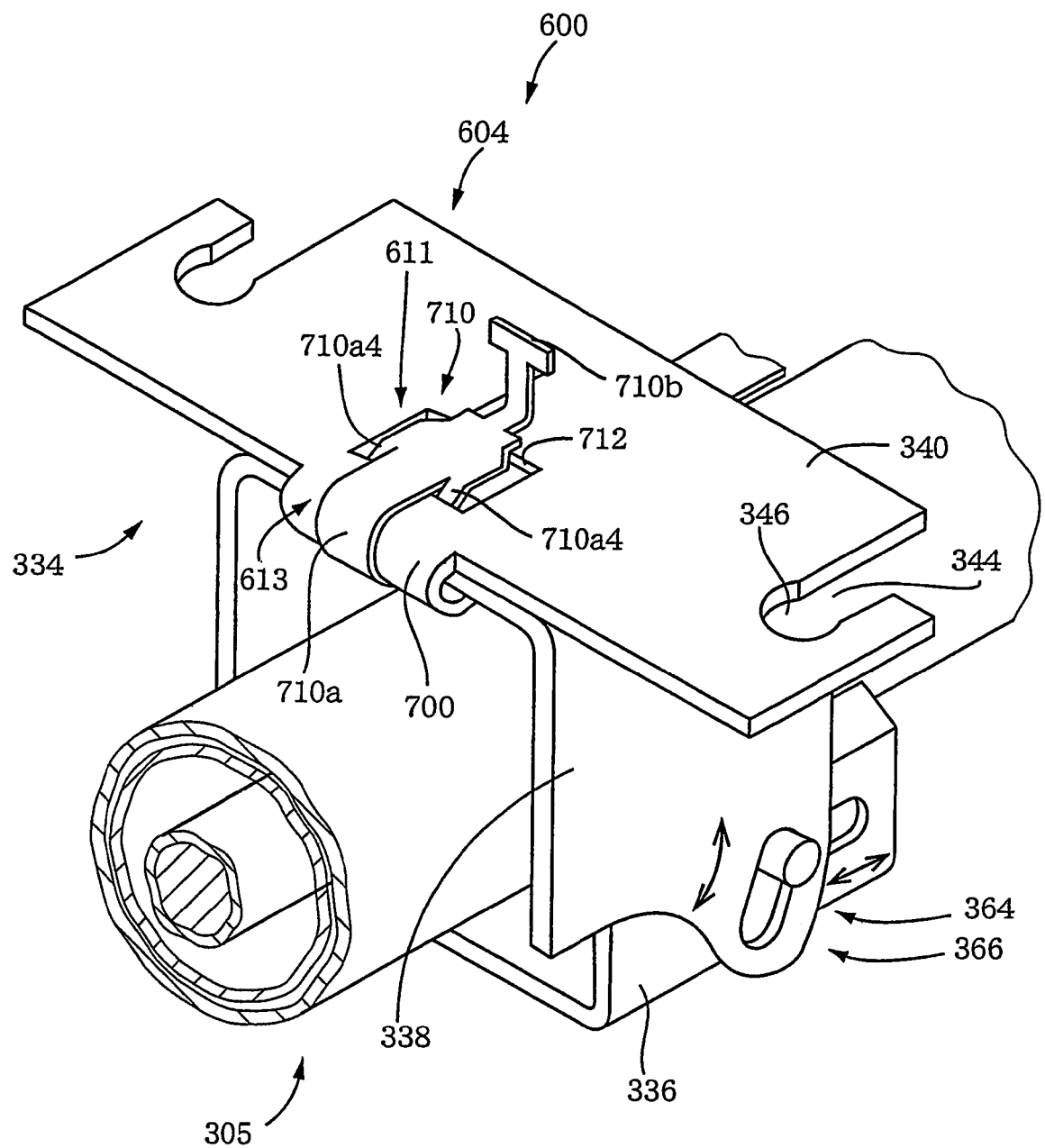
FIG. 85 is a perspective view showing a shock absorbing plate provided in a shock absorbing steering apparatus constructed according to a sixteenth embodiment of this invention, and a portion of the apparatus on which the shock absorbing plate is mounted.
Figure 86:
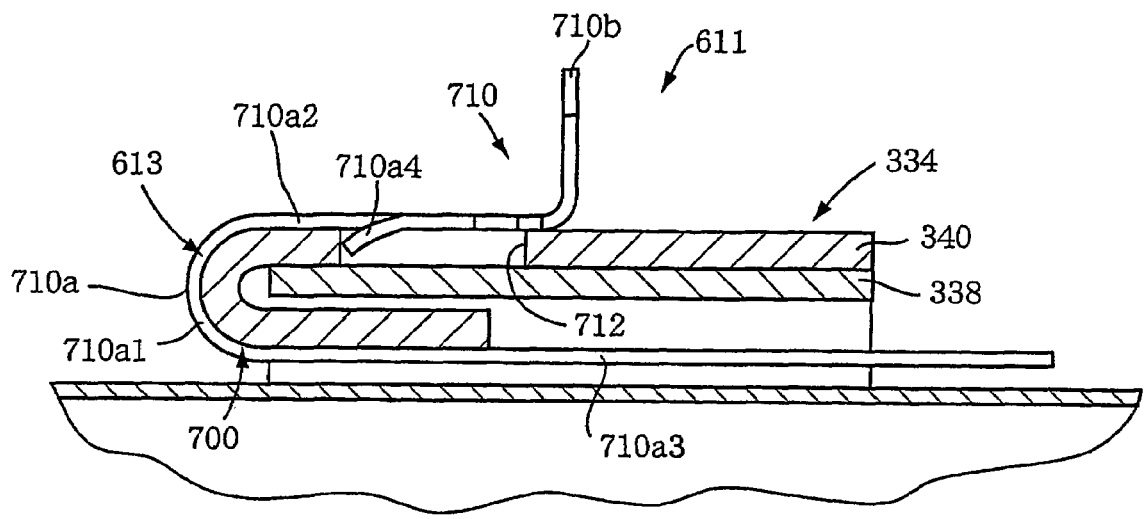
FIG. 86 is a cross sectional view of the portion of the apparatus on which the shock absorbing plate shown in FIG. 85 is mounted.

Referring to FIGS. 85 and 86, there is shown an energy absorbing plate (EA plate) 710 mounted on the break-away bracket 334 in a steering apparatus according to the sixteenth embodiment. A structural arrangement for mounting the EA Plate 710 on the break-away bracket 334 in this sixteenth embodiment is different from that in the fifteenth embodiment. In the other aspects, the steering apparatus of the sixteenth embodiment is identical with the fifteen embodiment, and has various advantages including the advantages of the fifteenth embodiment.

In the present steering apparatus, the mounting portion 611 of the break-away bracket 334 does not include the guide member 612. The mounting portion 611 includes the supported plate 340 and the supporting member 338 which are base portions of the break-away bracket 334 and which are superposed on each other. In this embodiment, the supported plate 340 includes a generally U-shaped projecting portion (semi-cylindrical portion) 700 in which the front end portion of the supporting member 338 is accommodated.

Like the EA plate 610 employed in the fifteenth embodiment, the EA plate 710 includes a U-shaped portion 110*a*, and an engaging portion 710*b*. The U-shaped portion 710*a* consists of a curved section 710*a*1, an upper arm section 710*a*2 and a lower arm section 710*a*3, and the engaging portion 710*b* is formed by bending upwards the rear end portion of the upper arm section 710*a*2. The EA plate 710 is mounted on the mounting portion 611 such that the curved section 710*a*1 is held at its inner surface in close contact with the semi-cylindrical outer surface of the U-shaped projecting portion 700 of the supported plate 340. When the break-away bracket 334 is axially moved forward relative to the vehicle body while the engaging portion 710*b* of the EA plate 710 is held in engagement with the holding portion of the body-side bracket, the EA plate 710 is deformed in pressing sliding contact with the outer surface of the U-shaped projecting portion 700. In the present embodiment, the U-shaped projecting portion 700 functions as the guide portion 613 of the mounting portion 611. The upper arm section 710*a*2 of the EA plate 710 has a pair of lugs whose front end portions are obliquely downwardly bent to form a pair of engaging jaws 710*a*4. On the other hand, the supported plate 340 of the break-away bracket 334 has a rectangular hole 714, so that the upper arm section 710*a*2 is positioned and held with respect to the break-away bracket 334, with the engaging jaws 710*a*4 held in engagement with the front side wall of the rectangular hole 714. Thus, the pair of engaging jaws 710*a*4 function as positioning and holding means for positioning and holding the EA plate 710 with respect to the break-away bracket 334. The EA plate 710 can be easily mounted on the mounting portion 611, by moving the EA plate 710 in the rearward direction relative to the break-away bracket 344, such that the mounting portion 611 is sandwiched by and between the upper and lower arm sections 710*a*2 and 710*a*3. It is noted that a dimension of the rectangular hole 712 in the transverse direction of the vehicle is larger by a suitable amount than a distance between the lateral end faces of the engaging jaws 710*a*4, so that the position of the EA plate 710 (upper arm section 710*a*2) relative to the mounting portion 611 (supported plate 340) can be adjusted in the transverse direction of the vehicle within a distance range corresponding to the above-indicted amount.

Figure 87:
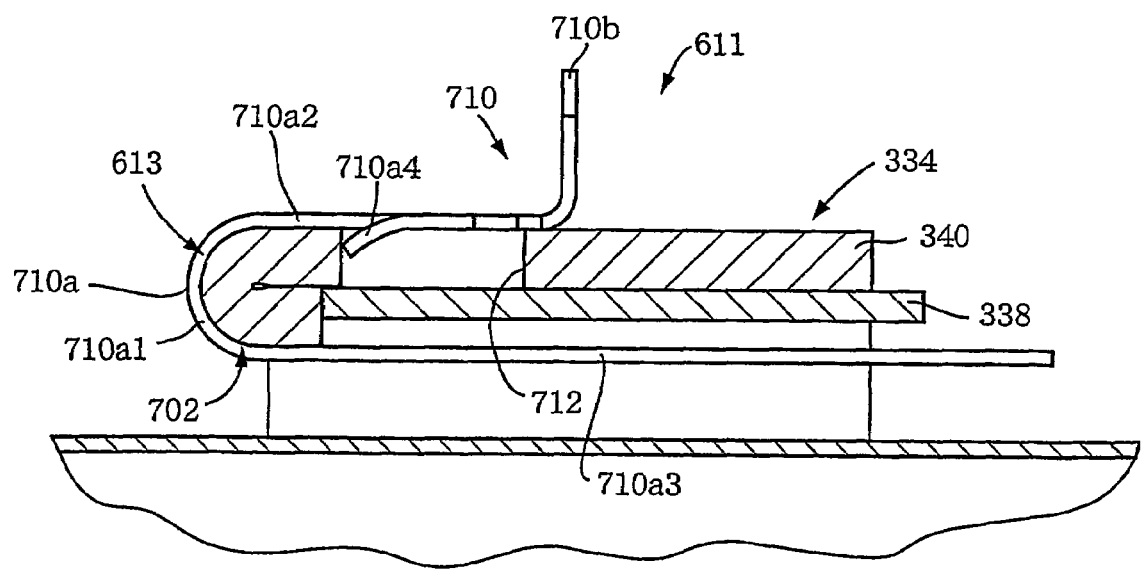
FIG. 87 is a cross sectional view of a portion of a modification of the shock absorbing steering apparatus of the sixteenth embodiment, on which a shock absorbing plate is mounted.

Referring next to FIG. 87, there is shown a modification of the mounting portion 611 employed in the sixteenth embodiment. In this modification, the supported plate 340 has a bent projecting portion 702 projecting from the front end of the supporting member 338. The bent projecting portion 702 has a bent end having a surface in contact with the front end face of the supporting member 338. This bent projecting portion 702 functions as the guide portion 613 of the mounting portion 611.

Seventeenth Embodiment

Figure 88:
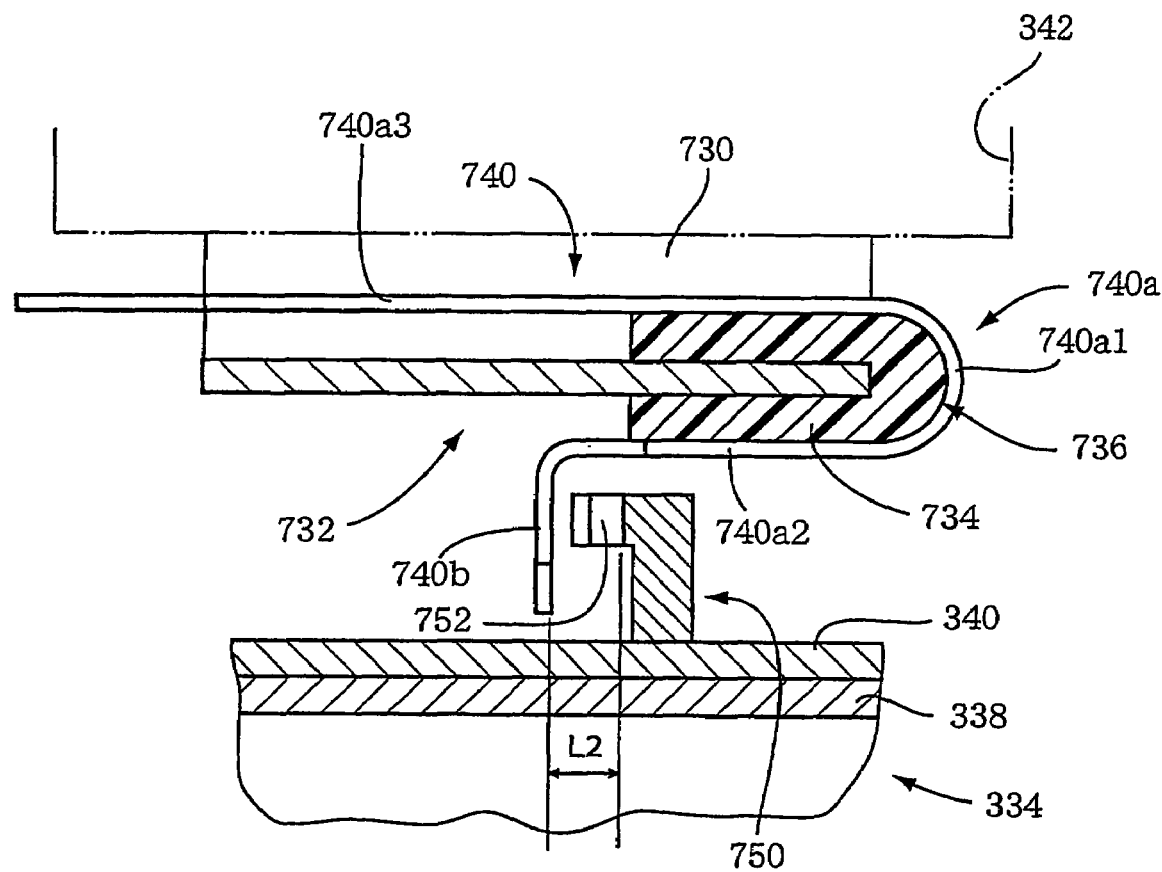
FIG. 88 is a cross sectional view showing a shock absorbing plate provided in a shock absorbing steering apparatus constructed according to a seventeenth embodiment of this invention, and a portion of the apparatus on which the shock absorbing plate is mounted.

FIG. 88 shows an energy absorbing plate (EA plate) 740 as mounted on a portion of the vehicle body, in a shock absorbing steering apparatus constructed according to a seventeenth embodiment of this invention. While the EA plates employed in all of the preceding embodiments are mounted on the break-away bracket attached to the steering column 301, the EA plate 740 employed in the present seventeenth embodiment is mounted on the body-side bracket 342 attached to the vehicle body. In the other aspects, the steering apparatus of the seventeenth embodiment is identical with that of the fifteenth embodiment.

In the present steering apparatus, the body-side bracket 342 is provided with a channel-shaped mounting member 730 which has a mounting portion 732. This mounting portion 732 is a rear end portion of an almost central part of the mounting member 730 as seen in the transverse direction of the vehicle. A U-shaped guide member 734 is fitted on the rear end section of the mounting portion 732. Like the EA plate 610 employed in the fifteenth embodiment, the EA plate 740 has a U-shaped portion 740*a* including a curved section 740*a*1. The EA plate 740 is mounted on the mounting portion 732 such that the curved section 740*a*1 is held at its inner surface in contact with the semi-cylindrical outer surface of the guide member 734 functioning as a guide portion 736 of the mounting member 732, and such that the guide member 734 is sandwiched by and between upper and lower arm sections 740*a*2, 740*a*3 of the EA plate 740. The EA plate 740 includes a T-shaped engaging portion 740*b* formed by bending downward the front end portion of the lower arm section 740*a*3.

On a portion of the upper surface of the supported member 340 of the break-away bracket 334 attached to the steering body 305, which portion is located below the lower arm section 740*a*3 of the EA plate 740, there is fixedly provided a holding member 752 which has a recessed portion 750 having a recess open in the forward direction of the vehicle. This recessed portion 750 functions as a holding portion with which the engaging portion 740*b* of the EA plate 740 is engageable when the movable portion of the column body 305 (break-away bracket 344) is axially moved relative to the vehicle body (body-side bracket 342). The column body 305 is mounted on the vehicle body via the break-away bracket 334 and the body-side bracket 342, such that there is a free-running distance L2 between the engaging portion 740*b* and the recessed portion 750 (holding portion).

When the movable portion of the column body 305 is axially moved relative to the vehicle body after the holding member 752 is brought into engagement with the engaging portion 740*b* of the EA plate 740 in the event of the secondary collision, the EA plate 740 is deformed in pressing sliding contact with the guide member 734 (guide portion 736), and the impact generated upon the secondary collision is absorbed by the deformation of the EA plate 740. In the present seventeenth embodiment, an impact energy absorbing member in the form of the EA plate 740 is mounted on a portion of the vehicle body, while the holding portion engageable with the engaging portion 740*b* of the impact energy absorbing member is provided on the steering column. This embodiment is also capable of effectively absorbing the impact energy upon the secondary collision, and may incorporate various technical features provided in the preceding embodiments and their modifications which have been described above.

The invention claimed is:

1. A shock absorbing steering apparatus for use in a vehicle, comprising:

a steering column to be fixed to a portion of a body of the vehicle such that the steering column is releasable from the body of the vehicle and movable in a forward direction of the vehicle in the event of a secondary collision of an occupant of the vehicle upon a collision of the vehicle, one of the steering column and said portion of the body of the vehicle including a mounting portion, and the other of the steering column and said portion of the body of the vehicle including a holding portion;

an impact energy absorbing member to be mounted on the mounting portion, the impact energy absorbing member including an engaging portion which is engageable with the holding portion and being deformable as the steering column is moved in the forward direction of the vehicle while the engaging portion is held in engagement with the holding portion, whereby the impact energy absorbing member absorbs an impact energy generated by the secondary; and an engagement adjusting mechanism operable to permit or inhibit an engagement between the engaging portion of the impact energy absorbing member and said holding portion;

wherein the impact energy absorbing member is arranged to be positioned relative to the mounting portion such that the engaging portion and the holding portion are spaced from each other by a predetermined free-running distance in said forward direction before the steering column is moved in the forward direction relative to the portion of the body of the vehicle.

2. The shock absorbing steering apparatus according to claim 1, wherein the engagement adjusting mechanism includes an actuator operable between a first position for permitting the engagement between the engaging portion and the holding portion, and a second for inhibiting said engagement.

3. The shock absorbing steering apparatus according to claim 2, wherein the engagement adjusting mechanism is arranged such that an impact energy absorbing load to be generated by deformation of the impact energy absorbing member does not act on said actuator when the engaging portion is brought into engagement with the holding portion.

4. The shock absorbing apparatus according to claim 1, wherein the engagement adjusting mechanism is operable to permit or inhibit the engagement between the engaging portion and the holding portion, on the basis of an output of a sensor provided to detect a state of the vehicle or an occupant of the vehicle.

5. The shock absorbing steering apparatus according to claim 1, wherein one of the engaging portion and the holding portion includes a recessed part which has a recess engageable with the other of the engaging and holding portions and cooperates with said other to define therebetween the predetermined free-running distance.

6. The shock absorbing steering apparatus according to claim 1, wherein the impact energy absorbing member is a plate having an end portion formed as said engaging portion.

7. The shock absorbing steering apparatus according to claim 6, wherein the engaging portion and the holding portion are arranged such that the engaging portion receives a shearing load after the engaging portion is brought into engagement with the holding portion.

8. The shock absorbing steering apparatus according to claim 6, wherein the impact energy absorbing member includes a plurality of plates which are superposed on each other and each of which has said engaging portion.

9. The shock absorbing steering apparatus according to claim 6, wherein the impact energy absorbing plate includes a generally U-shaped portion consisting of a curved section and two arm sections extending from respective opposite ends of the curved section, the impact energy absorbing member being arranged to be mounted on said mounting portion such that the two arm sections extend in a direction almost parallel to a direction of movement of the steering column relative to the portion of the body of the vehicle and such that the mounting portion is sandwiched by and between the two arm sections in a direction of thickness of the plate of the impact energy absorbing member, said energy absorbing member being deformed by one end portion of the mounting portion, during the movement of the steering column relative to the portion of the body of the vehicle in the forward direction of the vehicle with the engaging portion held in engagement with the holding portion, such that a position of the curved section in the impact energy absorbing member is gradually changed, whereby the impact energy generated by the secondary collision is absorbed in the process of deformation of the impact energy absorbing member.

10. The shock absorbing steering apparatus according to claim 9, wherein the engaging portion is formed integrally with one of the two arm sections such that the engaging portion extends, from one end of said one arm section which is remote from the curved section, in a direction away from the other of the two arm sections.

11. A shock absorbing steering apparatus for use in a vehicle, comprising:

a steering column to be fixed to a portion of a body of the vehicle such that the steering column is releasable from the body of the vehicle and movable in a forward direction of the vehicle in the event of a secondary collision of an occupant of the vehicle upon a collision of the vehicle, one of the steering column and said portion of the body of the vehicle including a mounting portion, and the other of the steering column and said portion of the body of the vehicle including a holding portion;

an impact energy absorbing member to be mounted on the mounting portion, the impact energy absorbing member including an engaging portion which is engageable with the holding portion and being deformable as the steering column is moved in the forward direction of the vehicle while the engaging portion is held in engagement with the holding portion, whereby the impact energy absorbing member absorbs an impact energy generated by the secondary collision; and an engagement adjusting mechanism operable to permit or inhibit an engagement between the engaging portion of the impact energy absorbing member and said holding portion;

wherein the engagement adjusting mechanism includes a mechanism operable to cause the holding portion to be displaced by an amount corresponding to a magnitude of an impact applied to the body of the vehicle upon the collision of the vehicle, and a mechanism operable to permit the engagement between the engaging portion and the holding portion when the amount of displacement of the holding portion is larger than a predetermined threshold.

12. The shock absorbing steering apparatus according to claim 11, wherein said mechanism operable to cause the holding portion to be displaced by the amount corresponding to the magnitude of the impact is arranged to cause a displacement of the holding portion by utilizing an inertia mass of the holding portion.

13. A shock absorbing steering apparatus for use in a vehicle, comprising:

a steering column to be fixed to a portion of a body of the vehicle such that the steering column is releasable from the body of the vehicle and movable in a forward direction of the vehicle in the event of a secondary collision of an occupant of the vehicle upon a collision of the vehicle, one of the steering column and said portion of the body of the vehicle including a mounting portion, and the other of the steering column and said portion of the body of the vehicle including a holding portion; and an impact energy absorbing member to be mounted on the mounting portion, the impact energy absorbing member including an engaging portion which is engageable with the holding portion and being deformable as the steering column is moved in the forward direction of the vehicle while the engaging portion is held in engagement with the holding portion, whereby the impact energy absorbing member absorbs an impact energy generated by the secondary collision;

wherein the steering column includes a column body, and a column holder structure which holds the column body and which is fixed to said portion of the body of the vehicle such that the column holder structure is releasable and movable away from the portion of the body of the vehicle in the forward direction of the vehicle, in the event of said secondary collision, and the column holder structure includes said mounting portion while said portion of the body of the vehicle is provided with said holding portion; and the impact energy absorbing member is a plate, and includes a generally U-shaped portion consisting of a curved section and two arm sections extending from respective opposite ends of the curved section, and one of the two arm sections includes an end portion terminating in said engaging portion, the impact energy absorbing member being arranged to be mounted on said mounting portion such that the two arm sections extend in a direction almost parallel to a direction of movement of the steering column relative to the portion of the body of the vehicle and such that the mounting portion is sandwiched by and between the two arm sections in a direction of thickness of the plate of the impact energy absorbing member, the impact energy absorbing member being deformed by a front end portion of the mounting portion, during the movement of the steering column relative to the portion of the body of the vehicle in the forward direction of the vehicle with the engaging portion held in engagement with the holding portion, such that a position of the curved section in the impact energy absorbing member is gradually changed, whereby the impact energy generated by the secondary collision is absorbed in the process of deformation of the impact energy absorbing member.

14. The shock absorbing steering apparatus according to claim 13, wherein the column holder structure includes a pair of arms which are spaced apart from each other in a lateral direction of the vehicle, and a central portion which is located almost intermediate between the pair of arms in the lateral direction, the column holder structure being fixed at the pair of arms to said portion of the body of the vehicle, and the mounting portion being located in the central portion of the column holder structure.

15. The shock absorbing steering apparatus according to claim 13, wherein the column holder structure holds the column body through a tilting mechanism.

16. The shock absorbing steering apparatus according to claim 13, wherein the column holder structure holds the column body through a telescopic mechanism.

17. The shock absorbing steering apparatus according to claim 13, wherein the engaging portion is formed integrally with one of the two arms such that the engaging portion extends, from an end of said end portion of said one arm section which end is remote from the curved section, in a direction away from the other of the two arm sections.

18. The shock absorbing steering apparatus according to claim 13, wherein the front end portion of the mounting portion is formed as a guide portion for guiding a displacement of the curved section of the impact energy absorbing member along a curvature of the front end portion while the impact energy absorbing member is deformed.

19. The shock absorbing steering apparatus according to claim 18, wherein the mounting portion of the column holder structure consists of two plates which are superposed on each other such that one end portion of one of the two plates projects from a corresponding front end face of the other of the two plates in the forward direction of the vehicle, and the guide portion of the mounting portion is constituted by a guide member which is generally J-shaped in cross section and which has a short arm and a long arm, the guide member being fitted on said one end portion of said one plate such that a rear end face of the short arm is held opposed to the front end face of said other plate.

20. The shock absorbing steering apparatus according to claim 18, wherein the mounting portion of the column holder structure includes a plate having a generally U-shaped projecting end portion which constitutes the guide portion.

21. The shock absorbing steering apparatus according to claim 18, wherein the impact energy absorbing member is mounted on the mounting portion such that there is an air gap between the curved section and the guide portion.

22. The shock absorbing steering apparatus according to claim 13, further comprising positioning and holding means for positioning and holding said one arm section of the impact energy absorbing member with respect to the column holder structure.

23. The shock absorbing steering apparatus according to claim 22, wherein the positioning and holding means includes a pair of positioning and holding pieces disposed on opposite sides of said one arm section such that the pair of positioning and holding pieces are spaced from each other in a direction of width of said one arm section.

24. The shock absorbing steering apparatus according to claim 23, wherein the pair of positioning and holding pieces have respective mutually opposed slant surfaces which are formed such that a distance between the opposed slant surfaces decreases in a direction from said other arm section toward said one arm section.

25. The shock absorbing steering apparatus according to claim 24, wherein said one arm section of the generally U-shaped portion of the impact energy absorbing member is supported by a portion of the mounting portion, at an inner surface of said one arm section which faces inwardly of the generally U-shaped portion.

26. The shock absorbing steering apparatus according to claim 23, wherein the engaging portion is formed integrally with said one arm section such that the engaging portion extends, from one end of said one arm section which is remote from the curved section, in a direction away from the other of the two arm sections and such that the engaging portion has a larger height than the pair of positioning and holding pieces, as measured from an outer surface of said one arm section that is opposite to an inner surface thereof which faces inwardly of the generally U-shaped portion, the engaging portion being engageable at a free end portion thereof with said holding portion, and having a width smaller than a distance between the pair of positioning and holding pieces, at a height position of the engaging portion which corresponds to the height of the pair of positioning and holding pieces.

27. The shock absorbing steering apparatus according to claim 22, wherein the mounting portion includes a guide member located at a front end portion thereof and operable to guide a displacement of the curved section of the impact energy absorbing member while the impact energy absorbing member is deformed, and the guide member includes a rear extension extending in a rearward direction of the vehicle, the pair of positioning and holding means being provided on the rear extension.

28. The shock absorbing steering apparatus according to claim 27, wherein the rear extension of the guide member includes a positioning and holding portion for positioning and holding the other of the two arm sections of the impact energy absorbing member.

29. The shock absorbing steering apparatus according to claim 22, wherein the mounting portion includes a supporting portion, and the positioning and holding means includes a generally rectangular three-sided clip having an elastically deformable portion which cooperates with the supporting portion to elastically hold therebetween said one arm section of the generally U-shaped portion of the impact energy absorbing member in elastically pressing contact therewith in a direction of thickness of said one arm section.

30. The shock absorbing steering apparatus according to claim 22, wherein the mounting portion includes a supporting portion, and the positioning and holding means includes a holding band which cooperates with the supporting portion to hold said one arm section of the generally U-shaped portion of the impact energy absorbing member, the holding band having a variable effective length of holding.

31. The shock absorbing steering apparatus according to claim 13, wherein the column holder structure has a pair of slots which are spaced apart from each other in a lateral direction of the vehicle and through which the column holder structure is attached to the portion of the body of the vehicle such that the column holder structure is releasable and movable away from the portion of the body of the vehicle in the forward direction of the vehicle, the column holder structure further including a central portion which is located almost intermediate between the pair of slots in the lateral direction and which includes the mounting portion on which the impact energy absorbing member is mounted; and the impact energy absorbing member includes a pair of wing portions which extend from said one arm section in respective opposite directions parallel to the lateral direction of the vehicle and which are provided with respective cylindrical portions which are respectively press-fitted in the pair of slots of the column holder structure and which are releasable from the pair of slots when the column holder structure is moved away from the portion of the body of the vehicle in the forward direction of the vehicle.

32. A shock absorbing steering apparatus for use in a vehicle, comprising:

a steering column to be fixed to a portion of a body of the vehicle such that the steering column is releasable from the body of the vehicle and movable in a forward direction of the vehicle in the event of a secondary collision of an occupant of the vehicle upon a collision of the vehicle, one of the steering column and said portion of the body of the vehicle including a mounting portion, and the other of the steering column and said portion of the body of the vehicle including a holding portion;

an impact energy absorbing member to be mounted on the mounting portion, the impact energy absorbing member including an engaging portion which is engageable with the holding portion and being deformable as the steering column is moved in the forward direction of the vehicle while the engaging portion is held in engagement with the holding portion, whereby the impact energy absorbing member absorbs an impact energy generated by the secondary collision; and an energy-absorbing-load changing mechanism operable to change an impact energy absorbing load to be generated by deformation of the impact energy absorbing member, depending upon a velocity of the movement of the steering column in the forward direction of the vehicle relative to the portion of the body of the vehicle;

wherein the energy-absorbing-load changing mechanism increases the impact energy absorbing load with an increase in the velocity of movement of the steering column.

33. The shock absorbing steering apparatus according to claim 32, wherein the energy-absorbing-load changing mechanism changes the impact energy absorbing load by changing a force of resistance to the deformation of the impact energy absorbing member.

34. The shock absorbing steering apparatus according to claim 33, wherein the impact energy absorbing member is a plate, and includes a generally U-shaped portion consisting of a curved section and two arm sections extending from respective opposite ends of the curved section, and one of the two arm sections includes an end portion terminating in said engaging portion, the impact energy absorbing member being arranged to be mounted on said mounting portion such that the two arm sections extend in a direction of movement of the steering column relative to the portion of the body of the vehicle and such that the mounting portion is sandwiched by and between the two arm sections in a direction almost parallel to a direction of thickness of the plate of the impact energy absorbing member, the impact energy absorbing member being deformed by an end portion of the mounting portion, during the movement of the steering column relative to the portion of the body of the vehicle in the forward direction of the vehicle with the engaging portion held in engagement with the holding portion, such that a position of the curved section in the impact energy absorbing member is gradually changed, whereby the impact energy generated by the secondary collision is absorbed in the process of deformation of the impact energy absorbing member; and said energy-absorbing-load changing mechanism includes (a) a deformation-resistance increasing member provided on said mounting portion and engageable with the impact energy absorbing member so as to increase the force of resistance to the deformation of the impact energy absorbing member, and (b) an engaging mechanism operable to cause engagement of the deformation-resistance increasing member with the impact energy absorbing member when a velocity of movement of the impact energy absorbing member relative to said front end portion of the mounting portion is higher than a predetermined threshold.

35. The shock absorbing steering apparatus according to claim 33, The shock absorbing steering apparatus according to claim 33, wherein the impact energy absorbing member is a plate, and includes a generally U-shaped portion consisting of a curved section and two arm sections extending from respective opposite ends of the curved section, and one of the two arm sections includes an end portion terminating in said engaging portion, the impact energy absorbing member being arranged to be mounted on said mounting portion such that the two arm sections extend in a direction almost parallel to a direction of movement of the steering column relative to the portion of the body of the vehicle and such that the mounting portion is sandwiched by and between the two arm sections in a direction almost parallel to a direction of thickness of the plate of the impact energy absorbing member, the impact energy absorbing member being deformed by an end portion of the mounting portion, during the movement of the steering column relative to the portion of the body of the vehicle in the forward direction of the vehicle with the engaging portion held in engagement with the holding portion, such that a position of the curved section in the impact energy absorbing member is gradually changed, whereby the impact energy generated by the secondary collision is absorbed in the process of deformation of the impact energy absorbing member; and said energy-absorbing-load changing mechanism includes (a) a movable member provided on said mounting portion and engageable with the impact energy absorbing member such that the movable member is movable when the impact energy absorbing member is displaced relative to said front end portion of the mounting portion, and (b) a movable-member-movement restricting mechanism operable to restrict a movement of the movable member when a velocity of movement of the movable member is higher than a predetermined threshold.

36. A shock absorbing steering apparatus for use in a vehicle, comprising:

a steering column to be fixed to a portion of a body of the vehicle such that the steering column is releasable from the body of the vehicle and movable in a forward direction of the vehicle in the event of a secondary collision of an occupant of the vehicle upon a collision of the vehicle, one of the steering column and said portion of the body of the vehicle including a mounting portion, and the other of the steering column and said portion of the body of the vehicle including a holding portion;

an impact energy absorbing member to be mounted on the mounting portion, the impact energy absorbing member including an engaging portion which is engageable with the holding portion and being deformable as the steering column is moved in the forward direction of the vehicle while the engaging portion is held in engagement with the holding portion, whereby the impact energy absorbing member absorbs an impact energy generated by the secondary collision; and an initial-load adjusting mechanism operable to reduce a rate of increase of an impact energy absorbing load to be generated by the impact energy absorbing member in an initial period of the absorption of the impact energy, the initial-load adjusting mechanism being provided in at least one position selected from among: a position between the impact energy absorbing member and the portion of the body of the vehicle; a position on the impact energy absorbing member; and a position between the impact energy absorbing member and the steering column.

37. A shock absorbing steering apparatus for use in a vehicle, comprising:

a steering column to be fixed to a portion of a body of the vehicle such that the steering column is releasable from the body of the vehicle and movable in a forward direction of the vehicle in the event of a secondary collision of an occupant of the vehicle upon a collision of the vehicle, one of the steering column and said portion of the body of the vehicle including a mounting portion, and the other of the steering column and said portion of the body of the vehicle including a holding portion; and an impact energy absorbing member to be mounted on the mounting portion, the impact energy absorbing member including an engaging portion which is engageable with the holding portion and being deformable as the steering column is moved in the forward direction of the vehicle while the engaging portion is held in engagement with the holding portion, whereby the impact energy absorbing member absorbs an impact energy generated by the secondary collision;

wherein the engaging portion of the impact energy absorbing member and the holding portion are engageable with each other so as to provisionally hold the steering column on the portion of the body of the vehicle through the impact energy absorbing member when the steering column is fixed to the portion of the body of the vehicle.

38. A shock absorbing steering apparatus for use in a vehicle, comprising:

a steering column to be fixed to a portion of a body of the vehicle such that the steering column is releasable from the body of the vehicle and movable in a forward direction of the vehicle in the event of a secondary collision of an occupant of the vehicle upon a collision of the vehicle, one of the steering column and said portion of the body of the vehicle including a mounting portion, and the other of the steering column and said portion of the body of the vehicle including a holding portion;

an impact energy absorbing member to be mounted on the mounting portion, the impact energy absorbing member including an engaging portion which is engageable with the holding portion and being deformable as the steering column is moved in the forward direction of the vehicle while the engaging portion is held in engagement with the holding portion, whereby the impact energy absorbing member absorbs an impact energy generated by the secondary collision; and an energy-absorbing-load changing mechanism operable to change an impact energy absorbing load to be generated by deformation of the impact energy absorbing member, depending upon a velocity of the movement of the steering column in the forward direction of the vehicle relative to the portion of the body of the vehicle;

wherein the energy-absorbing-load changing mechanism changes the impact energy absorbing load such that the impact energy absorbing load is larger when the velocity of movement of the steering column is higher than a predetermined threshold, than when the velocity is not higher than the predetermined threshold.

* * * * *